United States Patent
Sato et al.

(10) Patent No.: US 8,736,861 B2
(45) Date of Patent: May 27, 2014

(54) IMAGE FORMING APPARATUS

(75) Inventors: Naoki Sato, Kanagawa (JP); Hideo Kikuchi, Kanagawa (JP); Masahide Nakaya, Kanagawa (JP)

(73) Assignee: Ricoh Company, Ltd., Toyko (JP)

( * ) Notice: Subject to any disclaimer, the term of this patent is extended or adjusted under 35 U.S.C. 154(b) by 1596 days.

(21) Appl. No.: 11/518,943

(22) Filed: Sep. 12, 2006

(65) Prior Publication Data

US 2007/0059016 A1    Mar. 15, 2007

(30) Foreign Application Priority Data

Sep. 12, 2005 (JP) .................................. 2005-264412
Sep. 12, 2005 (JP) .................................. 2005-264413
Jul. 4, 2006 (JP) .................................. 2006-184778

(51) Int. Cl.
*G03G 15/00* (2006.01)

(52) U.S. Cl.
USPC ................. 358/1.14; 399/88; 399/67; 363/71; 363/89; 323/285

(58) Field of Classification Search
USPC ................. 358/1.14; 381/28; 399/281, 69, 88; 307/66; 363/71, 21.1, 21.05; 323/285
See application file for complete search history.

(56) References Cited

U.S. PATENT DOCUMENTS

| | | | | |
|---|---|---|---|---|
| 2,038,553 A | * | 4/1936 | Dubilier | 307/150 |
| 2,546,035 A | * | 3/1951 | Lichtenstein et al. | 307/110 |
| 3,333,330 A | * | 8/1967 | Linkous | 29/596 |
| 4,567,410 A | * | 1/1986 | Martin et al. | 388/816 |
| 4,998,098 A | * | 3/1991 | Schweitzer, III | 340/662 |
| 5,012,121 A | * | 4/1991 | Hammond et al. | 307/64 |
| 5,016,124 A | * | 5/1991 | Fukushima et al. | 360/69 |
| 5,263,087 A | * | 11/1993 | Fosgate | 381/28 |
| 5,416,702 A | * | 5/1995 | Kitagawa et al. | 701/36 |
| 5,440,473 A | * | 8/1995 | Ishii et al. | 363/21.05 |
| 5,493,747 A | * | 2/1996 | Inakagata et al. | 15/22.1 |
| 5,515,257 A | * | 5/1996 | Ishii | 363/21.1 |
| 5,621,630 A | * | 4/1997 | Suzuki et al. | 363/71 |
| 5,650,669 A | * | 7/1997 | Aldous | 307/66 |

(Continued)

FOREIGN PATENT DOCUMENTS

EP    1 473 972 A1    11/2004
JP    10-282821    10/1998

(Continued)

OTHER PUBLICATIONS

Mohan, et al., "DC-to-DC Switch-Mode Converters", XP-002426219, 1989, pp. 63-66 and 229-230.

(Continued)

*Primary Examiner* — Ashish K Thomas
(74) *Attorney, Agent, or Firm* — Oblon, Spivak, McClelland, Maier & Neustadt, L.L.P.

(57) ABSTRACT

An image forming apparatus is disclosed that includes a power storage unit. The power storage unit includes a constant voltage generation part configured to generate a constant voltage from a commercial power supply, the constant voltage generation part being connected to an external apparatus operating by consuming power; a voltage increasing circuit configured to increase the constant voltage generated by the constant voltage generation part; a capacitor configured to store an electric charge supplied from the voltage increasing circuit; a circuit control part configured to control charging of the capacitor; and an output part configured to output power stored in the capacitor, the power having a voltage different from the constant voltage.

24 Claims, 100 Drawing Sheets

(56) References Cited

U.S. PATENT DOCUMENTS

| | | | |
|---|---|---|---|
| 5,969,505 A * | 10/1999 | Okamura | 320/122 |
| 6,229,979 B1 * | 5/2001 | Ishii et al. | 399/281 |
| 6,239,513 B1 * | 5/2001 | Dean et al. | 307/64 |
| 6,242,896 B1 * | 6/2001 | Nieberger | 323/285 |
| 6,281,485 B1 * | 8/2001 | Siri | 250/203.4 |
| 6,941,088 B2 * | 9/2005 | Atsushi et al. | 399/69 |
| 7,706,708 B2 * | 4/2010 | Mori | 399/69 |
| 7,855,471 B2 * | 12/2010 | Sugawara | 307/46 |
| 7,949,885 B2 * | 5/2011 | Kikuchi et al. | 713/300 |
| 8,008,892 B2 * | 8/2011 | Kikuchi | 320/134 |
| 2005/0139591 A1 | 6/2005 | Takamatsu et al. | |
| 2007/0189797 A1 * | 8/2007 | Smith | 399/88 |

FOREIGN PATENT DOCUMENTS

| | | |
|---|---|---|
| JP | 2000-4544 | 1/2000 |
| JP | 2001-251868 | 9/2001 |
| JP | 2001-268786 | 9/2001 |
| JP | 2002-184554 | 6/2002 |
| JP | 2002-281690 | 9/2002 |
| JP | 2003-140484 | 5/2003 |
| JP | 2003-297526 | 10/2003 |
| JP | 2004-95525 | 3/2004 |
| JP | 2004-129412 | 4/2004 |
| JP | 2004-236492 | 8/2004 |
| JP | 2004-266984 | 9/2004 |
| JP | 2004-294554 | 10/2004 |
| JP | 2005-18049 | 1/2005 |
| JP | 2005-110378 | 4/2005 |
| WO | WO 2004/093304 A1 | 10/2004 |

OTHER PUBLICATIONS

Power Supply, http://en.wikipedia.org/wiki/Power_adapter supply-Wikipedia, the free encyclopedia, 9 pages.

Office Action mailed Mar. 19, 2013, in Japanese Patent Application No. 2011-209983.

* cited by examiner

IMAGE FORMING APPARATUS

BACKGROUND OF THE INVENTION

1. Field of the Invention

The present invention relates generally to image forming apparatuses, and more particularly to an image forming apparatus including a power storage unit that supplies stored power to a heating part.

2. Description of the Related Art

Image forming apparatuses such as copiers, printers, facsimile machines, and MFPs (MultiFunction Peripherals) have a process of fixing heated toner onto plain paper. Heat roller fixing is often employed as a fixing method because of the need for high speed and safety. According to heat roller fixing, a heating roller heated by a heating member such as a halogen heater and a pressure roller disposed opposite the heating roller are in press contact with each other. Plain paper is caused to pass between the heating roller and the pressure roller, so that an unfixed toner image is fixed on the plain paper by heat and pressure.

Generally, the heating roller employs a roller whose core bar is formed of metal such as iron or aluminum, and has large heat capacity. Therefore, at the time of use, the heating roller requires a long rise time of a few to tens of minutes before rising to a usable temperature of approximately 180° C., thus requiring a user to wait for a long time.

Increasing the power capacity of the heating member such as a halogen heater makes it possible to apply large current, thus enabling reduction in the waiting period of the user. However, this is not desirable because if the commercial power supply is around 100 V, excessive cost is required for an apparatus and interconnections for applying large current.

It is also possible to decrease the heat capacity of the heating roller in order to reduce the rise time of the heat roller. However, decreasing the heat capacity of the heating roller causes a drop in the temperature of the heating roller in the case of successively forming images, thus producing a waiting period every time a predetermined number of copies are printed.

Therefore, in the image forming apparatus, power is supplied to the heating roller even in its standby period in which a user does not perform image forming, thereby maintaining the temperature of the heating roller at a preheating temperature slightly lower than the usable temperature of the heating roller so that the heating roller rises to the usable temperature in a short time at the time of use. Accordingly, extra energy unnecessary for image forming is consumed in the standby period in which the image forming apparatus is not in use.

However, a recent increase in environmental conservation activities has required the image forming apparatus to have more advanced energy-saving features. It is considered that reduction in standby energy consumption, which occupies a large proportion of the entire power consumption of the image forming apparatus, has a significant power saving effect.

Therefore, there is proposed a technique to reduce the startup time of a fixing unit by providing an auxiliary power supply (a secondary battery), charging the auxiliary power supply during the standby period of the fixing unit, and supplying power to the fixing unit from a main power supply unit and the auxiliary power supply when the fixing unit is started (see, for example, Patent Document 1).

However, the technique disclosed in Patent Document 1 generally employs a lead storage battery, a nickel-cadmium battery, or a nickel-hydrogen battery as the secondary battery. Therefore, the secondary battery is characterized in that the capacity is degraded and reduced by repeated charging and discharging and that the useful service life becomes shorter as a discharge current becomes larger. Further, there is also the phenomenon of capacity reduction due to the memory effect. Accordingly, this technique is not sufficient to be used as the image forming apparatus.

In view of this, there is proposed a technique to control electric energy supplied to an auxiliary heater by using an auxiliary power supply, employing a chargeable and dischargeable capacitor as the auxiliary power supply (see, for example, Patent Document 2). According to this technique, a heating roller is heated with not only power supplied from a commercial power supply but also power supplied from the auxiliary power supply. The supplied electric energy is controlled by starting or stopping supplying power from the capacitor in accordance with the temperature of the heating roller.

[Patent Document 1] Japanese Laid-Open Patent Application No. 10-282821

[Patent Document 2] Japanese Laid-Open Patent Application No. 2003-297526

However, an image forming apparatus using the capacitor disclosed in Patent Document 2 requires a dedicated charger separately from the capacitor, thus being higher in cost and larger in installation space.

SUMMARY OF THE INVENTION

Embodiments of the present invention may solve or reduce one or more of the above-described problems.

According to one embodiment of the present invention, there is provided an image forming apparatus in which the above-described problems are solved.

According to one embodiment of the present invention, there is provided an image forming apparatus that can be reduced in cost and size.

According to one embodiment of the present invention, there is provided an image forming apparatus including a power storage unit that includes a constant voltage generation part configured to generate a constant voltage from a commercial power supply, the constant voltage generation part being connected to an external apparatus operating by consuming power; a voltage increasing circuit configured to increase the constant voltage generated by the constant voltage generation part; a capacitor configured to store an electric charge supplied from the voltage increasing circuit; a circuit control part configured to control charging of the capacitor; and an output part configured to output power stored in the capacitor, the power having a voltage different from the constant voltage.

According to one aspect of the present invention, it is possible to provide an image forming apparatus that can be reduced in cost and size. The external apparatus is, for example, a load of the image forming apparatus. Therefore, image formation is performed with a commercial power supply, and if an image forming operation is not being performed, it is possible to charge a power storage unit. Accordingly, there is no need to provide a charger as a single unit, so that it is possible to reduce cost and size. Since the capacitor can be charged at much higher speed than, for example, a lithium battery, the image forming operation is prevented from being delayed. Further, since there is provided an output part to output the voltage of a constant voltage generation part that is different from the voltage stored in the capacitor, it is possible to supply power to loads having different operating voltages.

According to one embodiment of the present invention, there is provided an image forming apparatus including a power storage unit that includes a rectification circuit configured to rectify a current supplied from a commercial power supply; a voltage decreasing circuit configured to decrease a voltage rectified by the rectification circuit; a capacitor configured to store an electric charge supplied from the voltage decreasing circuit; a circuit control part configured to control charging of the capacitor; an output part configured to output power of the capacitor to an external apparatus; and a constant voltage generation part configured to generate a constant voltage from the commercial power supply in order to supply the constant voltage to the image forming apparatus, the constant voltage being different from a voltage of the capacitor.

According to one embodiment of the present invention, there is provided an image forming apparatus including a power storage unit that includes a power supply generation circuit configured to generate power supply of one of a constant current, constant power, and a constant voltage from a commercial power supply, the power supply generation circuit being connected to an external apparatus that operates by consuming power; a capacitor configured to store an electric charge supplied from the power supply generation circuit; a circuit control part configured to control charging of the capacitor; a voltage increasing part configured to increase a voltage supplied from the capacitor; and an output part configured to output power having a voltage thereof increased by the voltage increasing part to the external apparatus.

According to one aspect of the present invention, the output of a power supply generation circuit can be used as a power supply of an external apparatus when required by the external apparatus, and the power supply generation part can be used as a charger in the case of charging a capacitor. As a result, it is possible to charge the capacitor without the need for a dedicated charger. Accordingly, it is possible to reduce the cost and the size of an image forming apparatus.

Thus, according to the present invention, it is possible to provide an image forming apparatus that can be reduced in cost and size.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention. The present invention may be roughly classified into two modes of implementation. In the first mode of implementation, a description is given of an image forming apparatus including a power storage unit that stores energy from commercial power supply in a capacitor after performing conversion into a constant voltage and increasing the voltage. In the second mode of implementation, a description is given of an image forming apparatus including a power storage unit that stores energy from commercial power supply in a capacitor after performing conversion into a constant voltage, and increases the voltage after extracting the energy from the capacitor.

[First Mode of Implementation]

According to a power storage unit according to this mode of implementation, a dedicated charger for charging a capacitor is not used. Commercial power supply is converted into direct current (DC), and the output of a power supply generation circuit (DC/DC converter) that stabilizes output voltage is supplied for an image forming operation when necessary, and in the other times, is used to charge a capacitor bank. The configuration of a power supply circuit is simplified by using the DC/DC converter used for a main body load also for charging the capacitor bank without using a dedicated charger. As a result it is possible to reduce the manufacturing cost and the installation space of the image forming apparatus.

Figure 1:
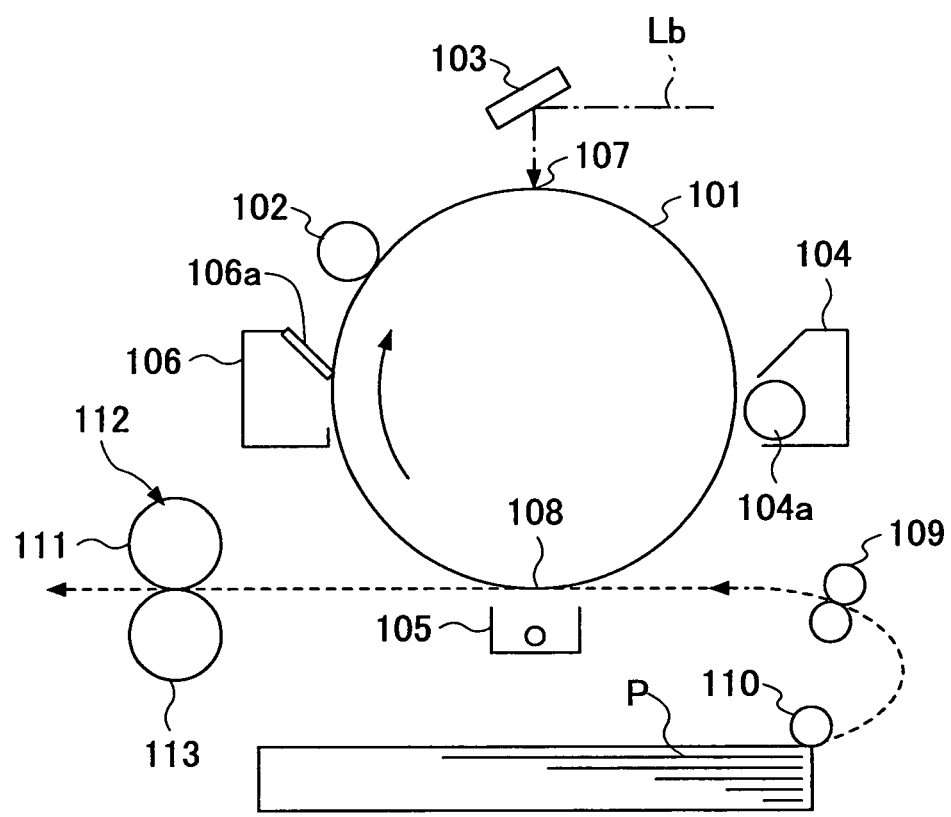
FIG. 1 is a schematic sectional view of a fixing unit of an image forming apparatus according to one embodiment of the present invention.

First a description is given of an image forming apparatus to which a power storage unit is applied according to the first mode of implementation. FIG. 1 is a schematic sectional view of a fixing unit of the image forming apparatus. For example, a drum-shaped photosensitive body 101 is used as an image carrier formed of a rotary body. The photosensitive body 101 is rotated, for example, in the arrow-indicated direction by a driving part (not graphically illustrated). A charging unit 102 serving as a charging part; a mirror 103 forming part of an exposure part; a development unit 104 serving as a development part; a transfer unit 105 serving as a transfer part to transfer an unfixed toner image on the photosensitive body 101 onto transfer paper P, which may be replaced by OHP paper; and a cleaning unit 106 serving as a cleaning part are successively disposed around the photosensitive body 101 in its rotating direction.

The charging unit 102 includes a charging roller. The development unit 104 includes a development roller 104a. The cleaning unit 106 includes a blade 106a that slides on the exterior cylindrical surface of the photosensitive body 101. The photosensitive body 101 is scanned with exposure light Lb via the mirror 103 by the exposure part between the charging unit 102 and the development roller 104a. The photosensitive body 101 has an exposure part 107, which is a position illuminated with the exposure light Lb. The transfer unit 105 opposes the lower surface of the photosensitive body 101. The photosensitive body 101 has a transfer part 108, which is a position opposite the transfer unit 105.

The transfer paper P is fed from a paper feed tray (not graphically illustrated) by a paper feed roller 110 and guided by a conveying guide so as to stop temporarily at a pair of registration rollers 109. A fixing unit 112 having a heating roller 111, serving as a heating unit, is disposed at a position on the downstream side of the transfer part 108 in the direction in which the transfer paper P is conveyed.

In the image forming apparatus of this mode of implementation, image forming is performed as follows. At the time of use, the photosensitive body 101 starts rotating. While the photosensitive body 101 is rotating, the photosensitive body 101 is evenly charged by the charging unit 102 in the dark. The exposure light Lb is emitted onto the exposure part 107 of the photosensitive body 101 via the mirror 103 by the exposure part so as to scan the photosensitive body 101. As a result, an electrostatic latent image corresponding to an image to be formed is formed. The electrostatic latent image on the photosensitive body 101 moves to a position corresponding to the development unit 104 as the photosensitive body 101 rotates, where the electrostatic latent image is made visible with toner by the development unit 104, so that a toner image is formed.

On the other hand, after feeding of the transfer paper P from the paper feed tray is started by the paper feed roller 110, the transfer paper P is conveyed through a conveyance path indicated by the broken line so as to stop temporarily at the position of the registration rollers 109, where the transfer paper P waits for such feed timing as to cause the transfer paper P to coincide with the toner image on the photosensitive body 101 at the transfer part 108. When this feed timing arrives, the transfer paper P, which has stopped at the position of the registration rollers 109, is fed by the registration rollers 109 to be conveyed toward the transfer part 108.

The toner image on the photosensitive body 101 and the transfer paper P coincide with each other at the transfer part 108, so that the toner image on the photosensitive body 101 is transferred onto the transfer paper P by an electric field created by the transfer unit 105. Accordingly, the photosensitive body 101, the charging unit 102, the exposing part, the development unit 104, and the transfer unit 105 form an image forming part that forms an unfixed image of an unfixed toner image on the transfer paper P. The transfer paper P is conveyed toward the fixing unit 112 while carrying the transferred toner image. While passing through the fixing unit 112, the transfer paper P has the toner image fixed thereon by heating and pressure, and is output onto a paper output part (not graphically illustrated). Further, residual toner that has escaped being transferred at the transfer part to remain on the photosensitive body 101 reaches a position corresponding to the cleaning unit 106 as the photosensitive body 101 rotates. The photosensitive body 101 has the residual toner cleaned by the blade 106a while passing the cleaning unit 106, and prepares for formation of the next image.

Figure 2A:
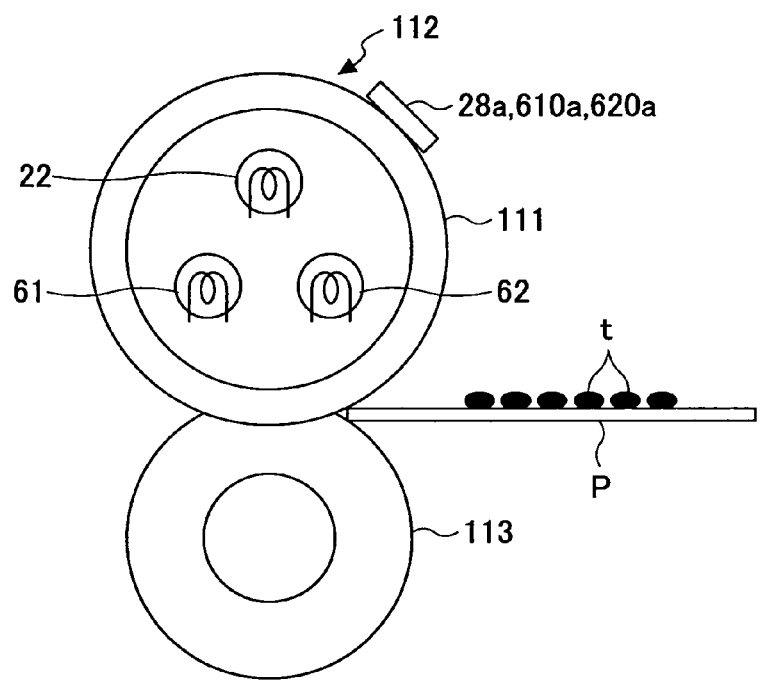
FIG. 2A is an enlarged view of the fixing unit of FIG. 1.

FIG. 2A is an enlarged view of the fixing unit 112. The fixing unit 112 includes the heating (fixing) roller 111 serving as a heating part and a pressure roller 113 serving as a pressure member pressed against the fixing roller 111. The fixing roller 111 and the pressure roller 113 are rotated by a driving part (not graphically illustrated). The fixing roller 111 is heated by heat generation of AC (alternating current) fixing heaters 61 and 62 and a DC (direct current) fixing heater 22 so that the temperature of the fixing roller 111 increases. Halogen heaters are employed for the AC fixing heaters 61 and 62 and the DC fixing heater 22. However, the AC fixing heaters 61 and 62 and the DC fixing heater 22 are not limited to halogen heaters, and other heating members such as heating resistors may be employed.

Thermistors 28a, 610a, and 620a are in contact with the surface of the fixing roller 111 so as to detect the surface temperature (fixing temperature) of the fixing roller 111. The thermistor 610a is disposed in a measurement area corresponding to one of the AC fixing heaters 61 and 62, and the thermistor 620a is disposed in a measurement area corresponding to the other one of the AC fixing heaters 61 and 62. The thermistor 28a is disposed in a measurement area corresponding to the DC fixing heater 22.

The AC fixing heaters 61 and 62 are primary heaters that are turned ON to heat the fixing roller 111 when the temperature of the heating roller 111 is below a target temperature. The DC fixing heater 22 is a secondary heater (auxiliary heater) that is turned ON to heat the fixing roller 111 when the main power of the image forming apparatus is turned on or when the image forming apparatus is started from an OFF mode for power saving to be available for copying, that is, at a warm-up time of the fixing unit 112 or at a time when the temperature of the fixing roller 111 is below a target temperature at the time of image forming.

In this fixing unit 112, the transfer paper P carrying the toner image is heated and pressed by the fixing roller 111 and the pressure roller 113, respectively, when the transfer paper P passes through the nip part of the fixing roller 111 and the pressure roller 113. As a result, the toner image is fixed onto the transfer paper P.

Figure 2B:
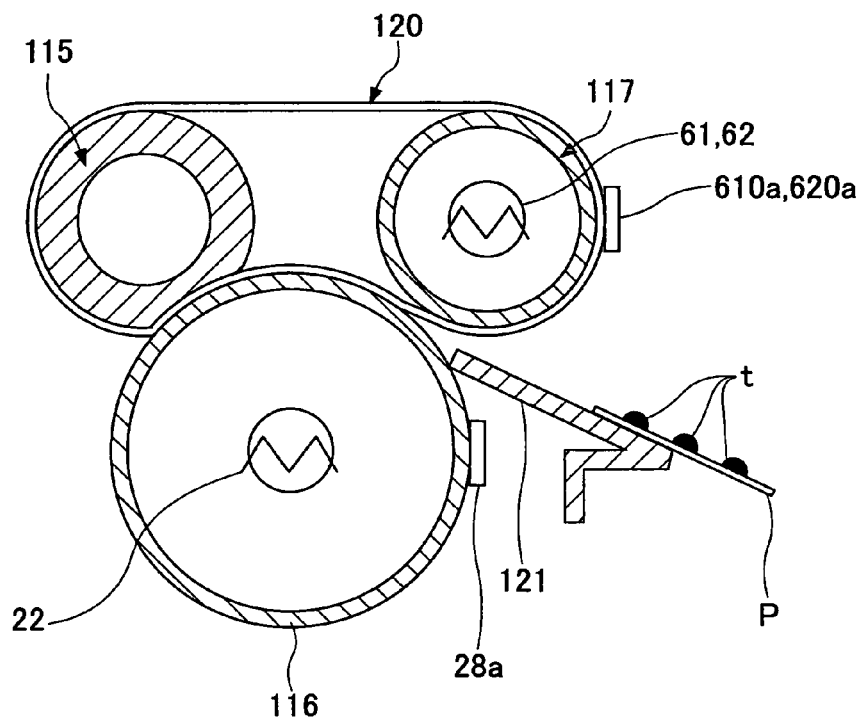
FIG. 2B is a diagram showing a belt fixing unit, which is a variation of the fixing unit of FIG. 1.

Further, the configuration of the fixing unit 112 is not limited to that of FIG. 2A. Any configuration may be employed if the fixing (heating) roller is heated complementarily by the DC fixing heater 22. FIG. 2B is a diagram showing a belt fixing unit, which is a variation of the fixing unit 112.

The belt fixing unit includes a belt roller 115 and a heat roller 117 between which a fixing belt 120 is stretched in a loop manner. The belt fixing unit further includes a pressure roller 116 that presses the fixing belt 120 between the belt roller 115 and the heat roller 117. The heat roller 117 is provided with the AC fixing heaters 61 and 62 and the thermistors 610a and 620a that detect the increased temperature of the heat roller 117. Further, the pressure roller 116 is provided with the fixing (halogen) heater 22 and the thermistor 28a that detects the temperature of the pressure roller 116 increased by the fixing heater 22.

When the belt roller 115 rotates, the heat roller 117 rotates through the fixing belt 120, and the pressure roller 116 that applies pressure to the fixing belt 120 rotates because of sliding resistance. The transfer paper P on which the toner image is formed is conveyed between the fixing belt 120 and the pressure roller 116, so that the toner image is fused and fixed onto the transfer paper P. A description is given below of embodiments with respect to a power storage unit that supplies power to the DC fixing heater 22.

First Embodiment

Figure 3:
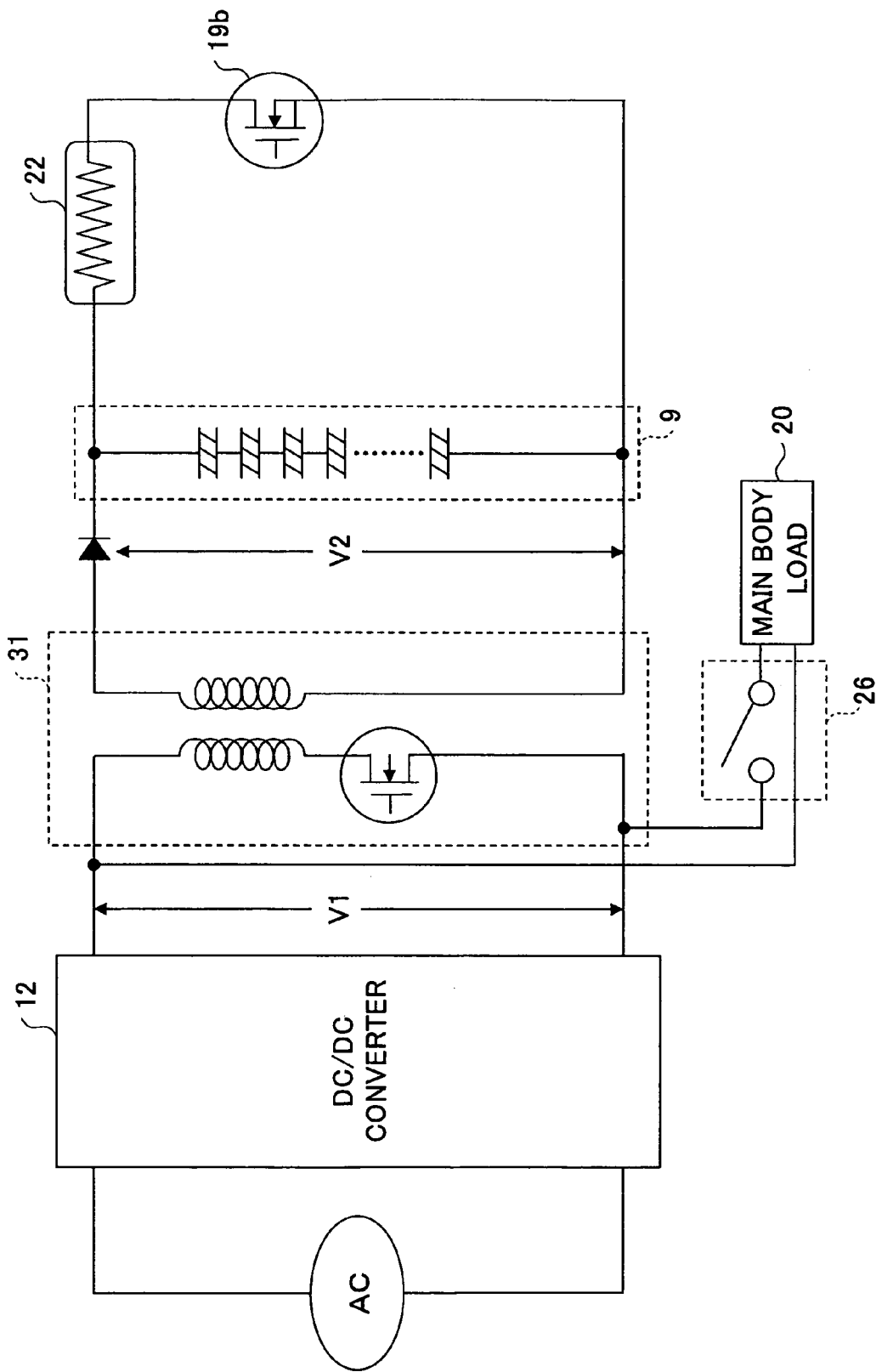
FIG. 3 is a schematic circuit diagram showing a power storage unit according to a first embodiment of the present invention.
Figure 4:
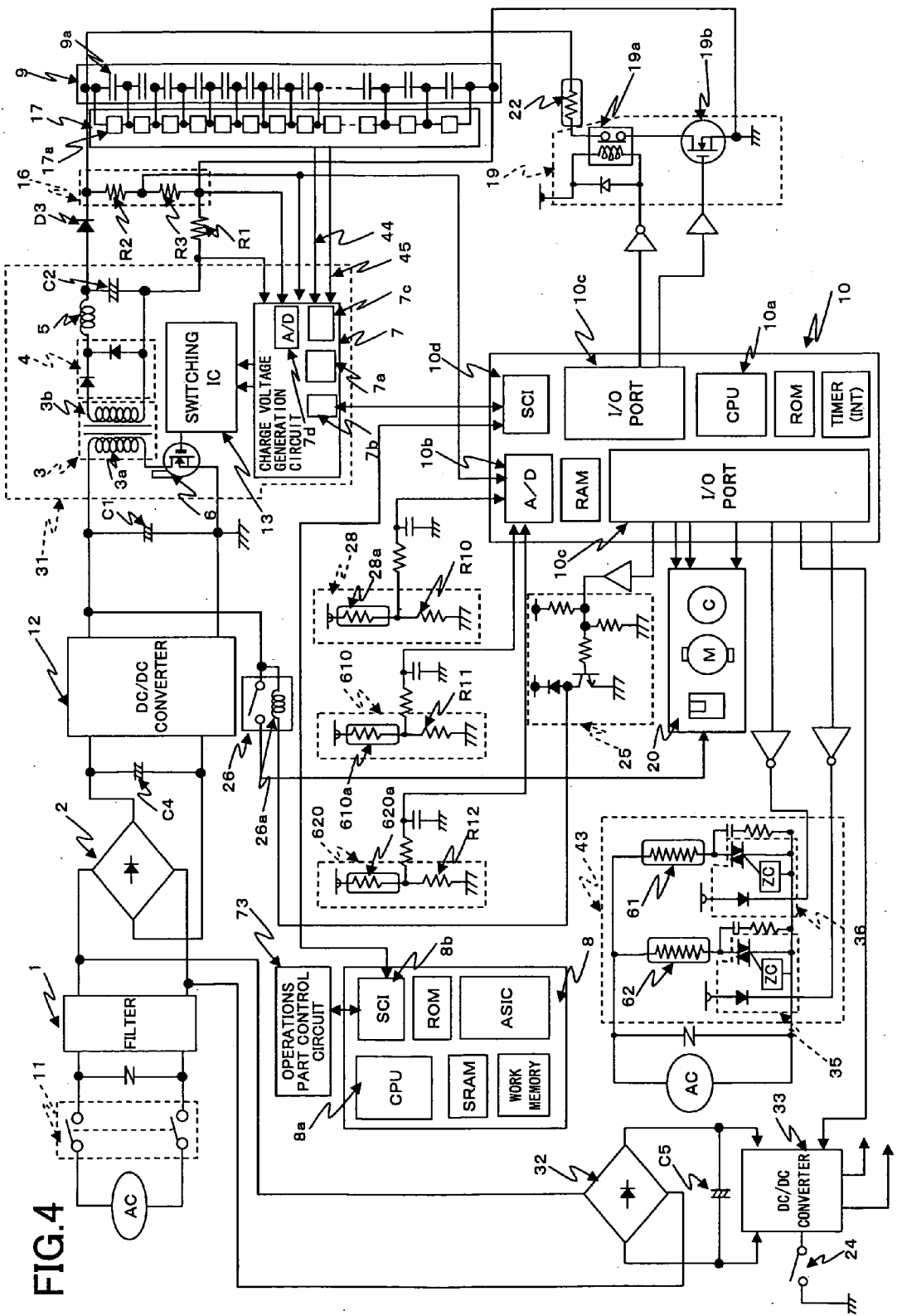
FIG. 4 is a circuit diagram showing the power storage unit and an image forming apparatus according to the first embodiment of the present invention.

FIG. 3 is a schematic circuit diagram showing a power storage unit according to a first embodiment. According to the power storage unit of FIG. 3, an AC commercial power supply is connected to a DC/DC converter 12 after being subjected to rectification, and the output of the DC/DC converter 12 is connected to a main body load 20 and a charging part 31 of an image forming apparatus. The charging part 31 includes a high-frequency transformer 3 (FIG. 4). The charging part 31 increases the voltage V1 of the DC/DC converter 12 to a voltage V2, and charges a capacitor bank 9 with the voltage V2. The stored power (energy) is supplied to the fixing heater 22 by a temperature increase FET control buffer circuit 19b in accordance with the temperature of the DC fixing heater 22. Further, the DC/DC converter 12 and the main body load 20 are connected through a make-and-break (opening and closing) circuit 26. In the case of performing an image forming operation, the make-and-break circuit 26 is closed so that the main body load 20 performs image forming using power supplied from the DC/DC converter 12. At this point, if the temperature of the fixing heater 22 is lower than a predetermined temperature, the capacitor bank 9 is discharged so as to supply power to the fixing heater 22. Further, if no image forming operation is being performed, it is possible to charge the capacitor bank 9 even if the make-and-break circuit 26 is opened. A detailed description is given below.

FIG. 4 is a circuit diagram showing the power storage unit and the image forming apparatus according to this embodiment. In FIG. 4, the same elements as those of FIG. 3 are referred to by the same reference numerals. The AC power supply is connected to the DC/DC converter 12 via a main power switch 11, a filter 1, and a full-wave rectification circuit 2. The DC/DC converter 12 is connected to the charging part 31, and is also connected to the main body load 20 via the make-and-break circuit 26. The charging part 31 is connected to the capacitor bank 9 via a charge voltage detection circuit 16 and an equalization circuit 17. The capacitor bank 9 is connected to the DC fixing heater 22 via a discharging circuit 19. Further, the AC power supply and the AC fixing heaters 61 and 62 are connected. The temperatures of the DC fixing heater 22 and the AC fixing heaters 61 and 62 are detected by the correspondingly disposed DC heater thermistor 28a and the AC heater thermistors 610a and 620a, respectively. The AC power supply is also connected to a DC/DC converter 33 via a full-wave rectification circuit 32, and is connected to a main body load that is not graphically illustrated. The DC/DC converter 33 is connected to an energy saving mode cancellation switch (energy saving cancellation SW) 24. The energy saving cancellation SW 24 is opened in an energy saving mode, and is closed in the case of canceling the energy saving mode.

The power storage unit includes an engine control part 10 that controls the temperatures of the DC fixing heater 22 and the AC fixing heaters 61 and 62 and the opening and closing of the make-and-break circuit 26. The engine control part 10 is connected to the make-and-break circuit 26 via a constant current/constant power charge voltage generation circuit 7 of the charging part 31 and a relay drive circuit 25. Further, the engine control part 10 is connected to the charge voltage detection circuit 16, the discharging circuit 19, the DC fixing heater 22, the AC fixing heaters 61 and 62, a control circuit 8, the DC heater thermistor 28a, the AC heater thermistors 610a and 620a, and the main body load 20. A description is given below of a configuration of the power storage unit as a single unit.

First, a brief description is given of the control circuit 8 that controls the entire image forming apparatus. The control circuit 8 includes a CPU 8a that controls the entire image forming apparatus, a serial controller (SCI) 8b connected to the CPU 8a, a ROM, a RAM, a work memory for image loading used for a printer, a frame memory for temporarily storing the image data of an image to be written, an ASIC having the function of controlling the periphery of the CPU 8a, and its interface circuit. Various programs for image forming are stored in the ROM. For example, the control circuit 8 communicates with the engine control part 10, and instructs the engine control part 10 to open or close the make-and-break circuit 26 and to perform switching of a switching circuit.

An operations part control circuit 73 and the engine control part 10 that controls the temperatures of the DC fixing heater 22 and the AC fixing heaters 61 and 62 are connected to the CPU 8a via the serial controller (SCI) 8b. The operations part control circuit 73 inputs system settings by detecting panel operations by a user, and displays the status of the system settings to a user. If a user operates a panel in order to perform image forming, the operations part control circuit 73 detects the contents of the operation, and transmits to the engine control part 10 an image forming operation start signal to instruct the engine control part 10 to perform image forming.

Next, a description is given of the operation where the capacitor bank 9 is charged from the AC power supply through the charging part 31. The AC power supply (commercial supply) and the full-wave rectification circuit 2 are connected via the main power switch 11. An alternating current from the AC power supply is subjected to full-wave rectification in the full-wave rectification circuit 2. The full-wave rectification circuit 2 is connected to a smoothing capacitor C4 and the DC/DC converter 12. The output of the full-wave rectification circuit 2 has ripple components thereof removed by the smoothing capacitor C4, and is input to the DC/DC converter 12.

The output of the DC/DC converter 12, which is stabilized to a predetermined voltage thereby, is supplied to the load 20 of the image forming apparatus, and is supplied to the display part and the control unit of the image forming apparatus. A description is given below of the load 20 of the image forming apparatus.

Further, the DC/DC converter 12 is connected to the charging part 31. The charging part 31 includes the high-frequency transformer 3, a rectification circuit 4, a choke coil 5, a capacitor C2, a switching regulator IC (hereinafter simply referred to as "switching IC") 13, a FET 6, and the constant current/constant power charge voltage generation circuit 7.

The output of the DC/DC converter 12, which is stabilized to a predetermined voltage thereby, is supplied to the load 20 of the image forming apparatus via the make-and-break circuit 26. The make-and-break circuit 26 includes a relay 26a. When the relay 26a is energized, the make-and-break circuit 26 is closed so that power is supplied from the DC/DC converter 12 to the load 20 of the image forming apparatus.

The output of the DC/DC converter 12 is connected to a primary coil 3a of the high-frequency transformer 3. The FET 6 is connected in series to the primary coil 3a as a switching part. The FET 6 is turned ON and OFF by a PWM signal output from the switching IC 13, so that a switching current flows through the primary coil 3a.

This switching current flowing through the primary coil 3a induces a switching voltage in a secondary coil 3b of the high-frequency transformer 3. Accordingly, it is possible to control the output voltage of the secondary coil 3b by controlling the conduction period of the switching current.

A diode is connected as the rectification circuit 4 to the secondary coil 3b of the high-frequency transformer 3. The switching current is rectified in the rectification circuit 4 and smoothed by the choke coil 5 and the capacitor C2 so as to be converted into DC output. The DC output is supplied through a diode D3 to the capacitor bank 9 so as to charge each of nine capacitor cells of the capacitor bank 9.

The switching IC 13 generates a PWN signal, and inputs the PWN signal to the gate of the FET 6 so as to control the conduction period of the primary coil 3a, thereby controlling the output voltage of the high-frequency transformer 3. The frequency of the PWM signal is determined by resistance and capacitance (neither graphically illustrated) connected to the output side of the switching IC 13.

The switching IC 13 includes a voltage-pulse width conversion circuit that modulates pulse width in accordance with the output voltage of the constant current/constant power charge voltage generation circuit 7. Accordingly, the switching IC 13 outputs a PWM signal of modulated pulse width to the gate of the FET 6 in accordance with the output voltage of the constant current/constant power charge voltage generation circuit 7. Since the primary coil 3a of the high-frequency transformer 3 is switched based on the pulse width of the PWM signal, it is possible to generate the output voltage of the secondary coil 3b of the high-frequency transformer 3 under control.

The capacitor bank 9 of this embodiment includes n capacitor cells 9a (electric double layer capacitors) that are connected in series. When each capacitor cell 9a is fully charged, the voltage across the capacitor cell 9a is A [V]. Therefore, when the n capacitor cells 9a are fully charged, a voltage (energy) of A×n [V] (hereinafter simply referred to as B [V]) is stored.

Each end of the capacitor bank 9 is connected to the charge voltage detection circuit 16. The output of the charge voltage detection circuit 16 is connected to each of the constant current/constant power charge voltage generation circuit 7 and an A/D converter 10b of the engine control part 10. The charge voltage detection circuit 16 includes a divider circuit formed of a resistor R2 and a resistor R3, and detects the voltage of the capacitor bank 9 by voltage division of the resistor R2 and the resistor R3.

A resistor R1 is connected in series between the smoothing capacitor C2 and the capacitor bank 9, so that the charging current of the capacitor bank 9 can be detected by monitoring the voltage across the resistor R1. The voltage across the resistor R1 is input to the constant current/constant power charge voltage generation circuit 7.

The capacitor bank 9 is connected to the equalization circuit 17. The equalization circuit 17 detects the full charge of each individual capacitor cell 9a to put a corresponding bypass circuit into operation, thereby equalizing the charge voltages of the capacitor cells 9a. When a first one of the capacitor cells 9a is fully charged to, for example, 2.5 V by the charging part 31, the equalization circuit 17 bypasses charging current to a second one of the capacitor cells 9a. The bypass circuit of the second one of the capacitor cells 9a operates in the same manner, so that the charge voltages of the capacitor cells 9a are equalized.

When the equalization circuit 17 detects the full charge of any one of the capacitor cells 9a (that any one of the capacitor cells 9a is fully charged) and puts a corresponding bypass circuit into operation, the equalization circuit 17 outputs a single cell full charge signal 44 to the constant current/constant power charge voltage generation circuit 7. Further, when the equalization circuit 17 detects the full charges of all the capacitor cells 9a and puts all the bypass circuits into operation, the equalization circuit 17 outputs a all cell full charge signal 45 to the constant current/constant power charge voltage generation circuit 7. A detailed description is given below of the equalization circuit 17.

A description is given of the constant current/constant power charge voltage generation circuit 7. The constant current/constant power charge voltage generation circuit 7 may correspond to a circuit control part that controls charging of a capacitor. The constant current/constant power charge voltage generation circuit 7 controls the high-frequency transformer 3 that is a booster circuit based on the charge voltage and the charging current of the capacitor bank 9 so that the capacitor bank 9 is charged with constant current or constant power.

The constant current/constant power charge voltage generation circuit 7 detects the charge voltage and the charging current of the capacitor bank 9 and detects the operation of the equalization circuit 17, and generates voltage for charging the capacitor bank 9 with constant current/constant power and outputs the generated voltage to the switching IC 13.

The constant current/constant power charge voltage generation circuit 7 successively detects the voltage across the resistor R1 connected in series to the capacitor bank 9, and outputs a preset voltage to the switching IC 13 in accordance with the detected voltage. The constant current/constant power charge voltage generation circuit 7 includes a CPU 7a, an SCI 7b, an A/D converter 7c, and a charging current detection circuit 7d.

The constant current/constant power charge voltage generation circuit 7 detects the voltage across the capacitor bank 9 by the output of the charge voltage detection circuit 16. If the voltage across the capacitor bank 9 is lower than a preset value, the constant current/constant power charge voltage generation circuit 7 outputs a voltage for performing preset constant current charging to the switching IC 13. The voltage output to the switching IC 13 may be determined using a prepared table defining the relationship between the voltage across the capacitor bank 9 and the voltage to be output or be calculated by operations.

When the voltage across the capacitor bank 9 is higher than or equal to the preset value, the constant current/constant power charge voltage generation circuit 7 detects the charging current of the capacitor bank 9 and the voltage across the capacitor bank 9 in order to perform constant power charging, and outputs a voltage for performing preset constant power charging to the switching IC 13 in accordance with the detected charging current and charge voltage.

The voltage output to the switching IC 13 is predetermined by operation as a voltage for performing constant power charging based on the charging current of the capacitor bank 9 and the voltage across the capacitor bank 9. The switching IC outputs a PWM signal corresponding to this voltage to the gate of the FET 6.

Further, when the constant current/constant power charge voltage generation circuit 7 detects the single cell full charge signal 44, the constant current/constant power charge voltage generation circuit 7 outputs the voltage for performing the preset constant current charging to the switching IC 13. Next, when the constant current/constant power charge voltage generation circuit 7 detects the all cell full charge signal 45, the constant current/constant power charge voltage generation circuit 7 outputs a signal to stop charging to the switching IC 13.

The capacitor bank 9 is connected to the discharging circuit 19. As described below, the power (energy) stored in the capacitor bank 9 is supplied to the DC fixing heater 22 by the control of the engine control part 10.

Next, a description is given of the engine control part 10. The engine control part 10 includes a charging control part that controls charging of the capacitor bank 9 or discharging of the capacitor bank 9.

The engine control part 10 includes a CPU 10a, a serial controller (SCI) 10d connected to the CPU 10a, an input/output (I/O) port 10c, an A/D converter 10b, a ROM, a RAM, and a timer (an interruption control circuit [INT]). A program for causing the engine control part 10 to function as a charging control part is contained in the ROM. When the main power switch 11 is turned ON, the program is read into the RAM and is executed by the CPU 10a.

Temperature detection circuits 28, 610, and 620 that detect the surface temperatures (fixing temperatures) of the fixing (heating) roller 111 of the fixing unit 112 are connected to the A/D converter 10b.

The temperature detection circuit 28 includes the DC heater thermistor 28a and a resistor R10 connected in series thereto, and detects the temperature of the measurement area corresponding to the DC fixing heater 22. The temperature detection circuit 610 includes the AC heater thermistor 610a and a resistor R11 connected in series thereto, and detects the temperature of the measurement area corresponding to the AC fixing heater 61. The temperature detection circuit 620 includes the AC heater thermistor 620a and a resistor R12 connected in series thereto, and detects the temperature of the measurement area corresponding to the AC fixing heater 62.

The power supplied to the AC fixing heater 61 and the AC fixing heater 62 is controlled by an AC heater control circuit 43. The power supplied to the DC fixing heater 22 is controlled by the discharging circuit 19.

The AC heater control circuit 43 that supplies power to the AC fixing heaters 61 and 62 and the discharging circuit 19 that supplies power to the DC fixing heater 22 are connected to the I/O port 10c. Further, the load 20 including one or more of a motor, a solenoid, a clutch, etc., necessary to perform an image forming operation is connected to the I/O port 10c. The relay drive circuit 25 that controls driving of the relay 26a is connected to the I/O port 10c.

The engine control part 10 communicates with the constant current/constant power charge voltage generation circuit 7 through the serial controller (SCI) 10d. The engine control part 10 detects the voltage across the capacitor bank 9 by the charge voltage detection circuit 16, and determines whether the capacitor bank 9 is capable of discharging (releasing stored energy). Further, the engine control part 10 outputs a charging instruction signal or a charging enabling signal to the constant current/constant power charge voltage generation circuit 7 when no discharging is being performed, in a standby period, or at the time of an energy saving mode.

First, a description is given of the AC heater control circuit 43. At the time of the main power supply being ON and at the time of a regular copying operation, the engine control part 10 supplies power to the AC fixing heater 61 and the AC fixing heater 62 in order to fix toner.

When the temperature detection circuit 610 or the temperature detection circuit 620 detects a temperature lower than or equal to a preset temperature, the engine control part 10 outputs a signal to turn ON a phototriac drive circuit 35 or 36 to the phototriac drive circuit 35 or 36. As a result, power is supplied to the AC fixing heater 61 or 62.

When the temperature detection circuit 610 or the temperature detection circuit 620 detects a temperature higher than or equal to a preset temperature, the engine control part 10 outputs a signal to turn OFF the phototriac drive circuit 35 or 36 to the phototriac drive circuit 35 or 36. As a result, supplying power to the AC fixing heater 61 or 62 is stopped.

Next, a description is given of supplying power to the DC fixing heater 22. When the main power supply is turned ON or when the temperature detection circuit 28 detects a temperature at which an unfixed image is generated during successive copying, the engine control part 10 outputs a signal for discharging the capacitor bank 9 from the I/O port 10c to the FET control buffer circuit 19b and a relay driving circuit 19a. The FET control buffer circuit 19b turns ON an FET, and the relay driving circuit 19a closes a relay, so that power is supplied from the capacitor bank 9 to the DC fixing heater 22.

When the temperature detection circuit 28 detects a temperature higher than or equal to a preset temperature, the engine control part 10 outputs a signal for stopping discharging of the capacitor bank 9 from the I/O port 10c to the FET control buffer circuit 19b and the relay driving circuit 19a. The FET control buffer circuit 19b turns OFF the FET, and the relay driving circuit 19a opens the relay, so that supplying power to the DC fixing heater 22 is stopped.

The image forming apparatus enters an energy saving mode after passage of a certain period of time since the end of an image forming operation. Therefore, the engine control part 10 outputs a partial power supply output stop signal from the I/O port 10c to the DC/DC converter 33. By closing the energy saving cancellation SW 24 (a press cover opening SW, the original detection SW of an ADF, etc.), the DC/DC converter 33 returns to a normal operation, and the energy saving mode is canceled. Further, if more time passes after the end of the image forming operation, it is possible to reduce power consumption by opening the make-and-break circuit 26.

Figure 5:
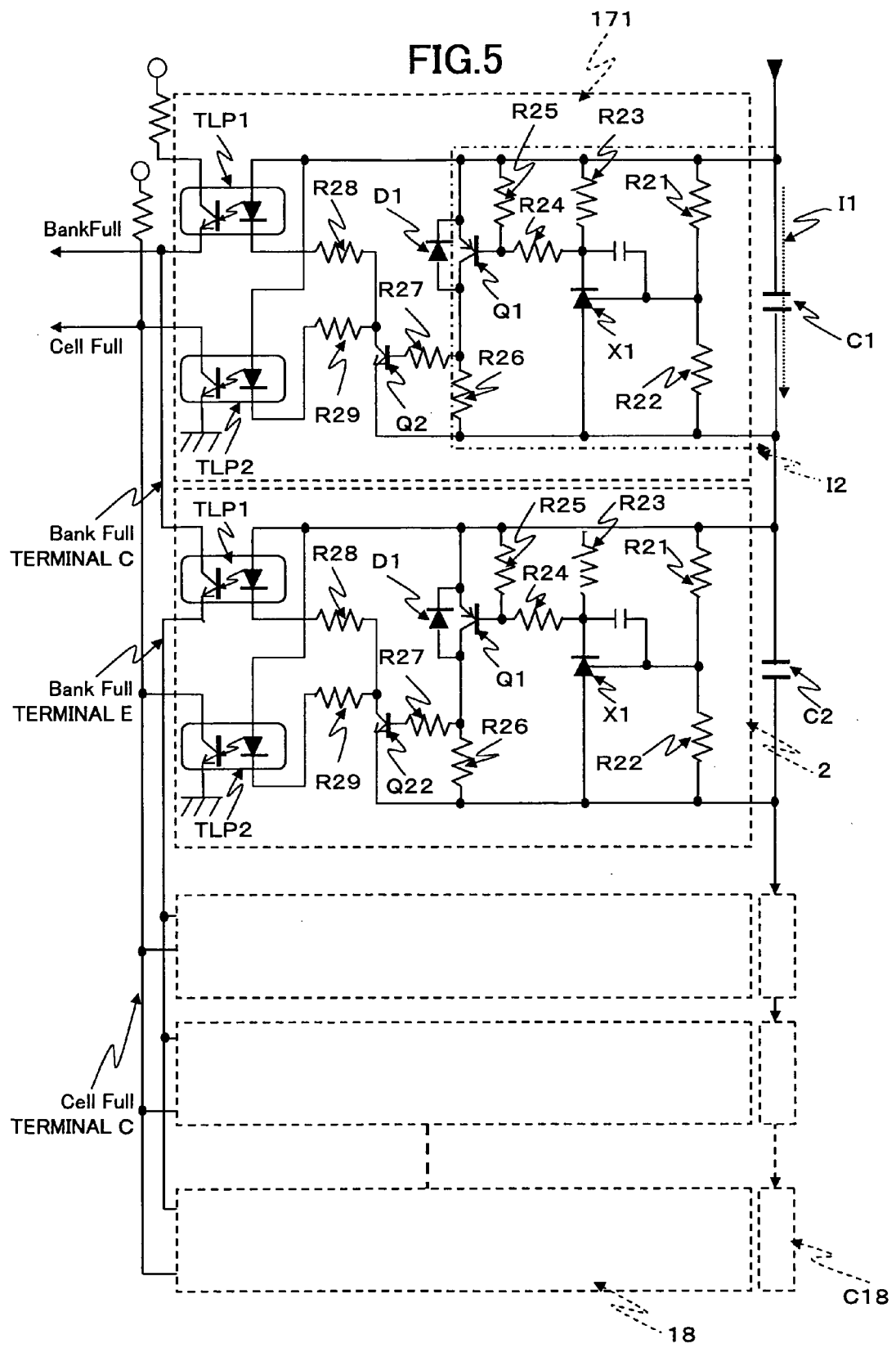
FIG. 5 is a circuit diagram showing an equalization circuit according to the first embodiment of the present invention.

Next, a detailed description is given of the equalization circuit 17. FIG. 5 is a circuit diagram showing the equalization circuit 17. The equalization circuit 17 is connected in parallel to each of the capacitor cells 9a, which are shown as C1 through C18 in FIG. 5. Accordingly, 18 balance circuits connected in series are connected in parallel to the 18 capacitor cells C1 through C18. In FIG. 5, the capacitor cells C3 through C18 are omitted for convenience of graphical representation.

The capacitor cells C1 through C18 are electric double layer capacitors connected in series in order to store power (energy).

A balance circuit 171 is connected in parallel between the terminals of the capacitor cell C1. The balance circuit 171 includes a shunt regulator X1, resistors R21 through R29, a transistor Q1, and a diode D1.

The voltage across the capacitor cell C1 is detected by the shunt regulator X1 and a voltage divider circuit formed of the resistors R21 and R22. A divided voltage generated by the voltage divider circuit of the resistors R21 and R22 is input to the control terminal of the shunt regulator X1. When the capacitor cell C1 is charged so that the voltage across the capacitor cell C1 reaches a predetermined voltage, the shunt regulator X1 is turned ON.

When the shunt regulator X1 is turned ON, a base current flows to the transistor Q1 through the resistor R23 so as to turn ON the transistor Q1. When the transistor Q1 is turned ON, the charging current of the capacitor cell C1 is bypassed through a channel I2 to the capacitor cell C2 by a current determined by the resistance of the resistor R25.

Further, when the transistor Q1 is turned ON, the transistor Q2 is also turned ON, so that current flows through the resistors R27 and R28 to the light emitting diodes of photocouplers TLP1 and TLP2. The photocoupler TLP2 is connected to a Cell Full terminal, and outputs the single cell full charge signal 44 when each of the capacitor cells C1 through C18 is charged. The photocoupler TLP1 is connected to a Bank Full terminal, and is connected in series to the other balance circuits. Accordingly, the photocoupler TLP1 outputs the all cell full charge signal 45 when all the capacitor cells C1 through C18 are charged to a predetermined voltage, and all the balance circuits are in operation.

The all cell full charge signal 45 causes the constant current/constant power charge voltage generation circuit 7 to stop charging, and outputs a full charge signal to the CPU 10a of the engine control part 10. This signal causes the engine control part 10 to close the relay driving circuit 19a of the discharging circuit 19.

The all cell full charge signal 45 causes the engine control part 10 to close the relay 26a of the make-and-break circuit 26.

The engine control part 10 has an "in-charging" flag that is set when the charging part 31 starts charging. The engine control part 10 resets the "in-charging" flag when receiving the all cell full charge signal 45, and sets the "in-charging" flag when not receiving the all cell full charge signal 45.

Figure 6:
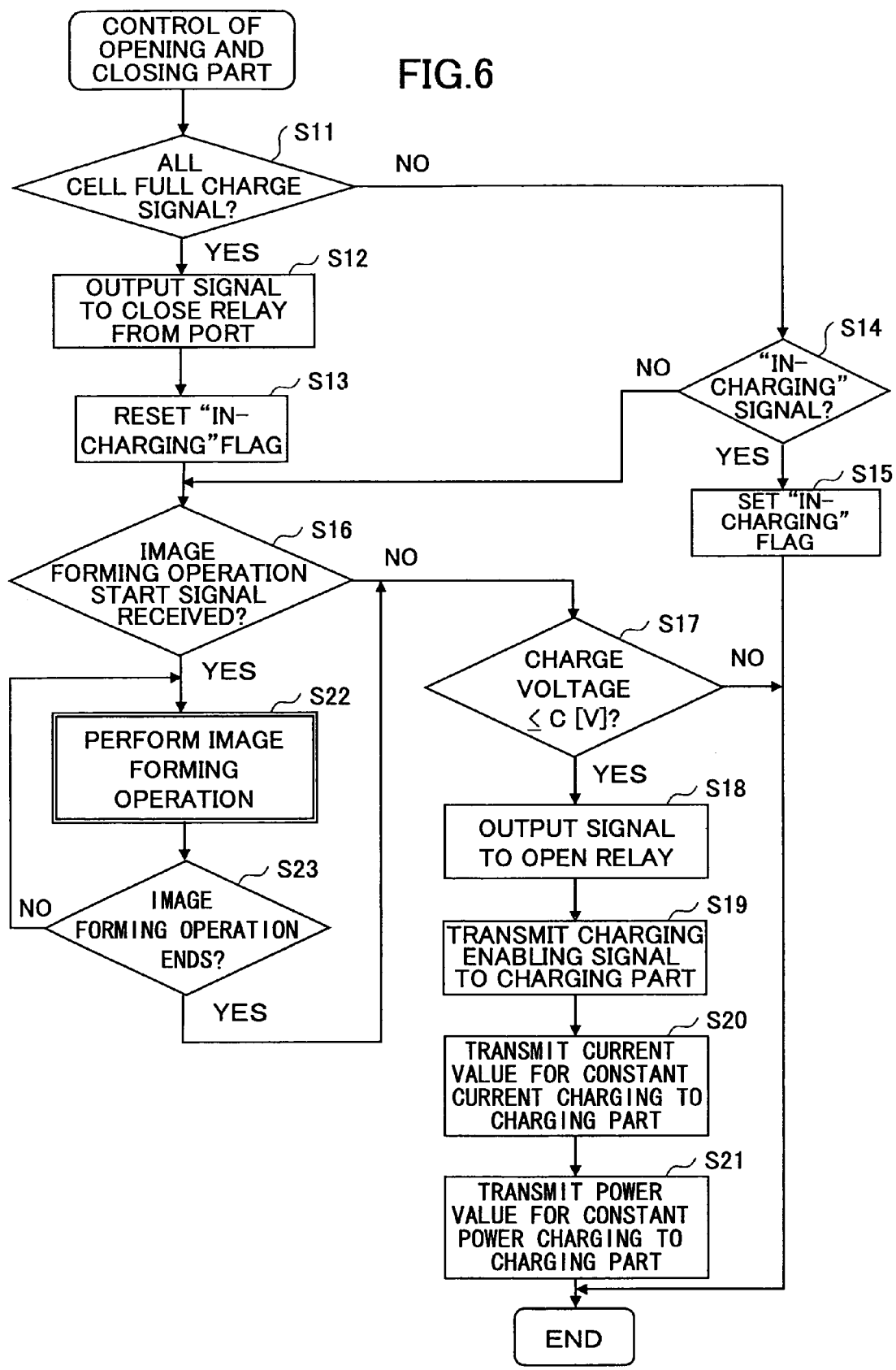
FIG. 6 is a flowchart of the operation where an engine control part controls the opening and closing of a make-and-break circuit and controls charging according to the first embodiment of the present invention.

A description is given, with reference to the flowchart of FIG. 6, of the operation where the CPU 10a of the engine control part 10 controls the opening and closing of the make-and-break circuit 26 and controls charging using the above-described configuration.

In step S11, the engine control part 10 determines whether the all cell full signal 45 has been transmitted periodically or with predetermined timing from the constant current/constant power charge voltage generation circuit 7.

For example, when the image forming apparatus enters an energy saving mode, the control circuit 8 of the image forming apparatus transmits an operation mode signal indicating an operation mode to the engine control part 10. Therefore, the engine control part 10 determines whether the all cell full charge signal 45 has been transmitted when the engine control part 10 receives the operation mode signal. As a result, it is possible to control the opening and closing of the make-and-break circuit 26 in accordance with the operation mode.

When the all cell full charge signal 45 has been transmitted (YES in step S11), there is no need to charge the capacitor bank 9. Accordingly, in step S12, the engine control part 10 outputs a signal to close the make-and-break circuit 26 from the I/O port 10c to the relay drive circuit 25. As a result, the output of the DC/DC converter 12 is supplied to the main body load 20 side. In step S13, the engine control part 10 resets the "in-charging" flag because the capacitor bank 9 is not being charged.

In the case of not being fully charged (NO in step S11), in step S14, the engine control part 10 determines whether the charging part 31 is performing charging. Whether the charging part 31 is performing charging may be determined by either referring to the "in-charging" flag or communicating with the constant current/constant power charge voltage generation circuit 7. If the charging part 31 is performing charging (YES in step S14), in step S15, the engine control part 10 sets the "in-charging" flag, and ends the operation. Although not graphically represented in the flowchart, the engine control part 10 inhibits an image forming operation and inhibits switching to the energy saving mode when the "in-charging" flag is set.

Next, in step S16, the engine control part 10 determines whether an image forming operation start signal has been received from the image forming apparatus. If the image forming operation start signal has been received (YES in step S16), in step S22, the engine control part 10 performs an image forming operation, and waits until the image forming operation ends (steps S22 and S23). If the temperature of the DC fixing heater 22 becomes so low as to generate an unfixed image during the image formation, the engine control part 10 turns ON the FET of the FET control buffer circuit 19b so as to supply power from the capacitor bank 9.

When the image forming operation ends (YES in step S23), in step S17, the engine control part 10 determines whether the charge voltage has lowered because of the image formation.

If the image forming operation start signal is not received (NO in step S16), or the image forming operation ends as described above, in step S17, the engine control part 10 determines whether the charge voltage of the capacitor bank 9 is lower than or equal to a predetermined value (for example, C [V], which satisfies C<B).

If the charge voltage is lower than or equal to C [V] (YES in step S17), in step S18, the engine control part 10 outputs a signal to open the make-and-break circuit 26 from the I/O port 10c to the relay drive circuit 25. As a result, all the output of the DC/DC converter 12 can be used for the charging part 31 side.

Further, in step S19, the engine control part 10 transmits a charging enabling signal (indicating that it is possible to perform charging) to the constant current/constant power charge voltage generation circuit 7. As a result, the constant current/constant power charge voltage generation circuit 7 can perform charging.

Next, in step S20, the engine control part 10 transmits a current value for the charging part 31 to perform constant current charging to the constant current/constant power charge voltage generation circuit 7. Then, in step S21, the engine control part 10 transmits a power value for the charging part 31 to perform constant power charging to the charging part 31. If the current value for performing constant current charging and the power value for performing constant power charging have been transmitted from the engine control part 10, the charging part 31 performs constant current charging or constant power charging based on this current value or power value. On the other hand, if the current value for performing constant current charging and the power value for performing constant power charging are not transmitted, the charging part 31 performs constant current charging or constant power charging based on a preset value. The "in-charging" flag is set, and the operation ends.

The charging part 31 performs charging if charging is performable. Although not shown in the flowchart, when the charging part 31 starts charging, the charging part 31 transmits an "in-charging" signal to indicate that charging is being performed to the engine control part 10. When the "in-charging" signal has been transmitted from the charging part 31, the engine control part 10 inhibits an image forming operation. When the all cell full charge signal 45 is detected, the engine control part 10 authorizes an image forming operation to be started.

In the case of an operation mode that does not require the capacitor bank 9 to be charged, for example, in the case of making a few copies, the engine control part 10 authorizes an image forming operation even if the charge voltage is lower than or equal to C [V].

If the charge voltage is higher than C [V] (NO in step S17), the operation ends since there is no need to perform charging.

If a predetermined period of time passes after the end of the image formation in step S23, the image forming apparatus enters an energy saving mode in which the temperature of a fixing heater is managed by being gradually reduced and power supplied to a CPU and a display panel such as a liquid crystal display is reduced. The power storage unit of this embodiment can charge the capacitor bank 9 even if the make-and-break circuit 26 is opened to supply no power to the main body load 20 at the time of the energy saving mode if the charge voltage is lower than or equal to C [V].

In the case of performing or ending image formation, the image forming apparatus transmits an opening/closing instruction signal to give an instruction for opening or closing the make-and-break circuit 26 to the engine control part 10. A description is given, with reference to the flowchart of FIG. 7, of the operation where the engine control part 10 controls the make-and-break circuit 26 based on the opening/closing instruction signal.

When the control circuit 8 of the image forming apparatus transmits an opening/closing instruction signal to the engine control part 10, in step S61, the engine control part 10 determines whether the opening/closing instruction signal is a signal to open the make-and-break circuit 26.

If the opening/closing instruction signal is a signal to open the make-and-break circuit 26 (YES in step S61), in step S62, the engine control part 10 opens the make-and-break circuit 26. As a result, it is possible to perform charging using all the output of the DC/DC converter 12.

If the opening/closing instruction signal is not a signal to open the make-and-break circuit 26 (NO in step S61), in step S63, the engine control part 10 closes the make-and-break circuit 26, and ends the operation.

Figure 8:
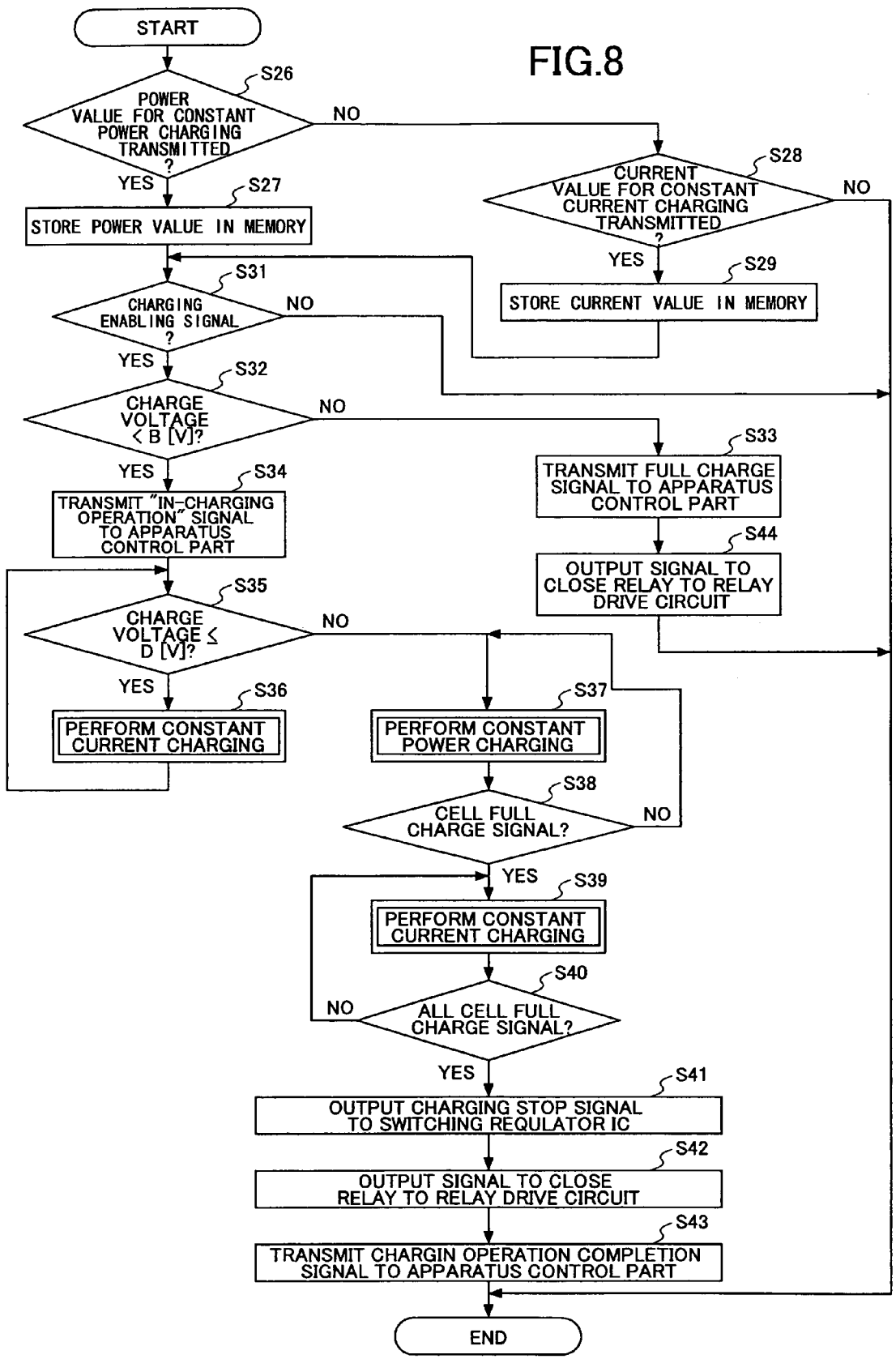
FIG. 8 is a flowchart showing the flow of the operation where a constant current/constant power charge voltage generation circuit controls a charging operation according to the first embodiment of the present invention.

If the image forming apparatus is not performing an image forming operation and the charge voltage is lower than a predetermined value, the constant current/constant power charge voltage generation circuit 7 charges the capacitor bank 9 with constant current or constant power. FIG. 8 is a flowchart showing the flow of the operation where the CPU 7a of the constant current/constant power charge voltage generation circuit 7 controls a charging operation. In this embodiment, a description is given of the case where the constant current/constant power charge voltage generation circuit 7 performs charging in response to the charging instruction signal of the engine control part 10.

In step S26, the constant current/constant power charge voltage generation circuit 7 determines whether a power value for performing constant power charging has been transmitted from the engine control part 10. If the power value for performing constant power charging has been transmitted (YES in step S26), in step S27, the constant current/constant power charge voltage generation circuit 7 stores the power value in the RAM (memory) of the power storage unit.

If the power value for performing constant power charging has not been transmitted (NO in step S26), in step S28, the constant current/constant power charge voltage generation circuit 7 determines whether a charging current value for performing constant current charging has been transmitted. If the charging current value for performing constant current charging has been transmitted (YES in step S28), in step S29, the constant current/constant power charge voltage generation circuit 7 stores the current value in the RAM of the power storage unit.

Next, in step S31, the constant current/constant power charge voltage generation circuit 7 determines whether a charging enabling signal has been input from the engine control part 10. The constant current/constant power charge voltage generation circuit 7 repeats the determination of step S31 until the charging enabling signal is input.

If the charging enabling signal has been input (YES in step S31), in step S32, the constant current/constant power charge voltage generation circuit 7 determines whether the charge voltage is lower than B [V] (full charge value). If the charge voltage is not lower than B [V] (NO in step S32), there is no need to perform charging. Accordingly, in step S33, the constant current/constant power charge voltage generation circuit 7 transmits the all cell full charge signal 45 to the engine control part 10. In this case, no charging is performed. Accordingly, in step S44, the make-and-break circuit 26 is closed. Then, the operation ends. The engine control part 10 transmits an all cell full charge signal to the control circuit 8 of the image forming apparatus.

If the charge voltage is lower than B [V] (YES in step S32), that is, the capacitor bank 9 is not fully charged, in step S34, the constant current/constant power charge voltage generation circuit 7 transmits an "in-charging operation" signal to the engine control part 10.

Then, in step S35, the constant current/constant power charge voltage generation circuit 7 determines whether the charge voltage is lower than or equal to a predetermined voltage (for example, D [V], which satisfies D<C<B).

If the charge voltage is lower than or equal to D [V] (YES in step S35), in step S36, the constant current/constant power charge voltage generation circuit 7 performs a charging operation to implement a constant current charging operation. The constant current/constant power charge voltage generation circuit 7 performs constant current charging until the charge voltage reaches D [V].

If the charge voltage is not lower than or equal to D [V] (NO in step S35), in step S37, the constant current/constant power charge voltage generation circuit 7 performs constant power charging. In step S38, the constant current/constant power charge voltage generation circuit 7 determines whether the single cell full charge signal 44 is detected while performing constant power charging, and performs constant power charging until the single cell full charge signal 44 is detected.

If the single cell full charge signal 44 of any of the capacitor cells 9a is detected (YES in step S38), in step S39, the constant current/constant power charge voltage generation circuit 7 performs constant current charging. In step S40, the constant current/constant power charge voltage generation circuit 7 determines whether the all cell full charge signal 45 is detected while performing constant current charging, and performs constant current charging until the all cell full charge signal 45 is detected.

When the all cell full charge signal 45 is detected (YES in step S40), in step S41, the constant current/constant power charge voltage generation circuit 7 turns OFF the FET 6 in order to stop charging. Then, in step S42, the constant current/constant power charge voltage generation circuit 7 closes the make-and-break circuit 26, and in step S43, transmits a charging operation completion signal to the engine control part 10. Then, the constant current/constant power charge voltage generation circuit 7 ends the operation. The engine control part 10 transmits a full charge signal to the control circuit 8 of the image forming apparatus.

As described above, according to this embodiment, the output of the DC/DC converter 12 is used as a power supply of the image forming apparatus when the output of the DC/DC converter 12 is necessary for an image forming operation, and the DC/DC converter 12 is used as a charger only in the case of a charging operation (for approximately a few to tens of seconds). As a result, it is possible to charge an auxiliary power supply without the need of a dedicated charger. Accordingly, it is possible to provide a power storage unit or an image forming apparatus including the same with reduced manufacturing cost and installation space.

In the power storage unit of this embodiment, the high-frequency transformer 3 is of an insulating type. Accordingly, the capacitor bank 9 side and the DC/DC converter 12 side are isolated from each other. The main body load 20 of the image forming apparatus operates with the voltage V1 generated by the DC/DC converter 12. Even if the capacitor bank 9 is discharged to a voltage lower than the voltage V1, a current is prevented from flowing from the DC/DC converter 12 into the capacitor bank 9 to reduce the voltage of the main body load 20.

Further, when the make-and-break circuit 26 is opened at the time of the energy saving mode, it is possible to cause current to flow from the DC/DC converter to the charging part 31. Therefore, it is possible to charge the capacitor bank 9 even at the time of the energy saving mode.

Second Embodiment

Figure 9:
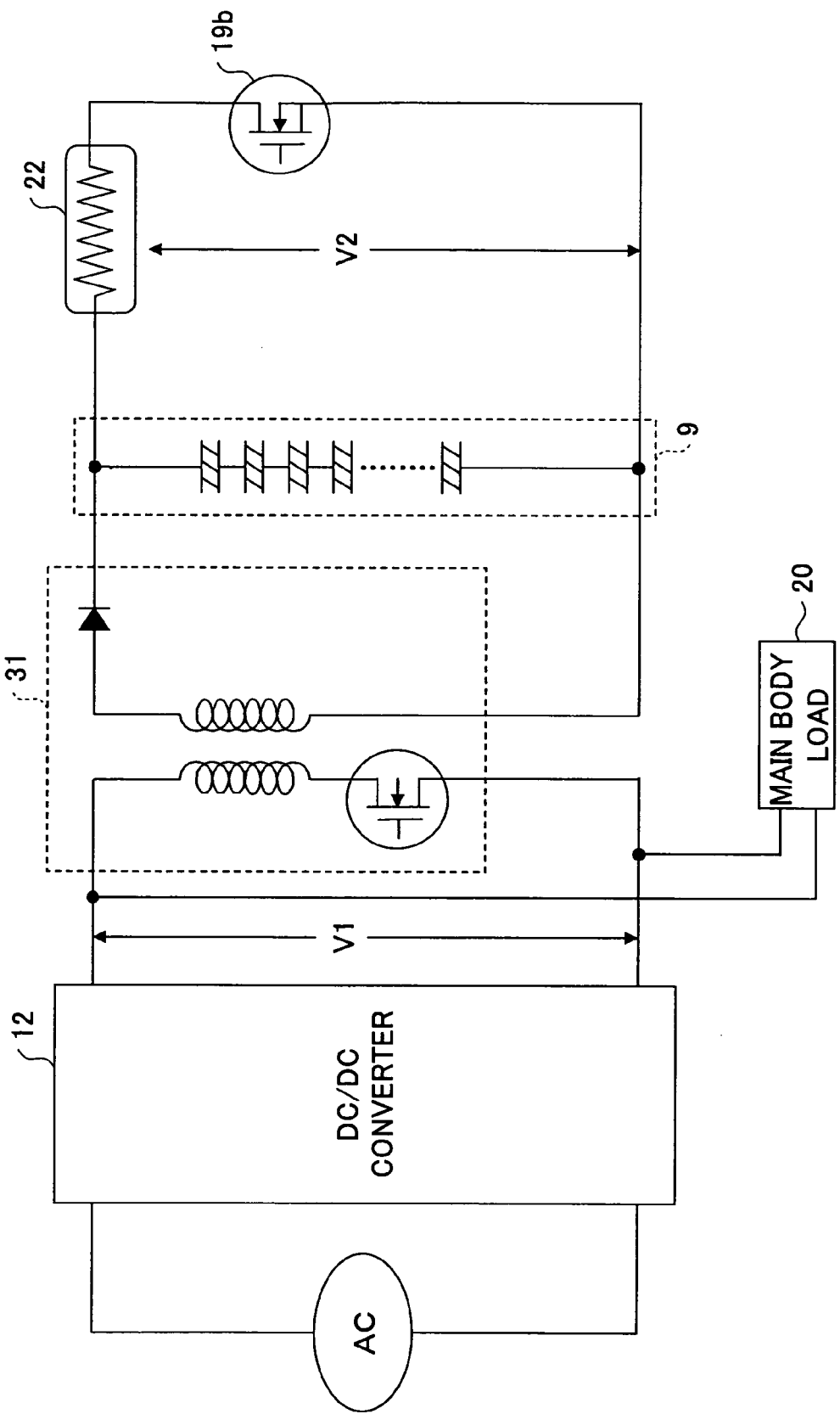
FIG. 9 is a schematic circuit diagram showing a power storage unit according to a second embodiment of the present invention.

FIG. 9 is a schematic circuit diagram showing a power storage unit according to a second embodiment. In FIG. 9, the same elements as those of FIG. 3 are referred to by the same reference numerals, and a description thereof is omitted. The power storage unit of this embodiment is different from that of the first embodiment in that power is supplied from the DC/DC converter 12 to the main body load 20 without going through the make-and-break circuit 26. In the case of performing an image forming operation, the main body load 20 performs the image formation using the power supplied from the DC/DC converter 12. At this point, if the temperature of the fixing heater 22 is lower than a predetermined value, the capacitor bank 9 is discharged so as to supply power to the fixing heater 22. Further, if no image forming operation is being performed, it is possible to charge the capacitor bank 9. A detailed description is given below, but a description of the same part as the first embodiment is omitted.

Figure 10:
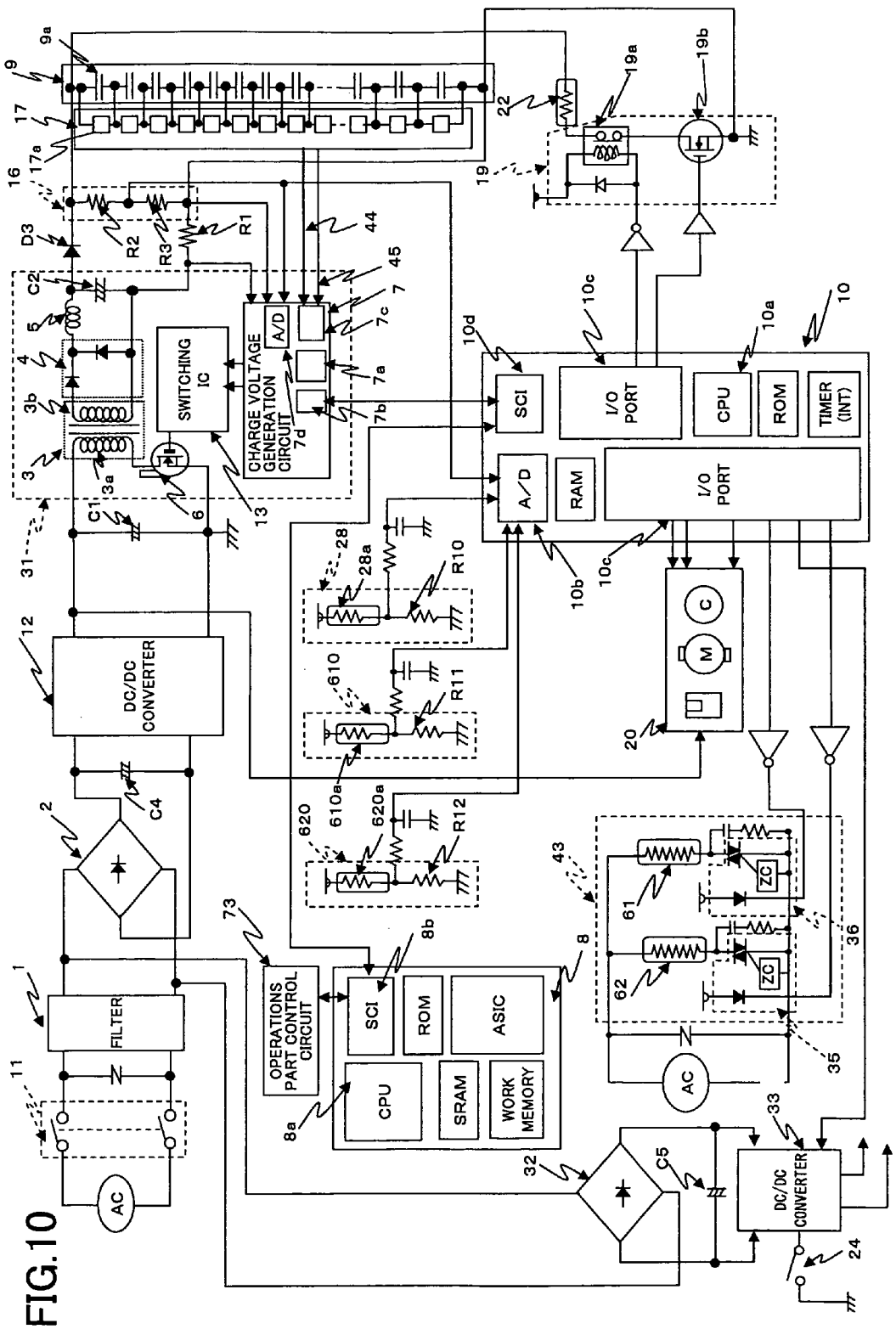
FIG. 10 is a circuit diagram showing the power storage unit and an image forming apparatus according to the embodiment of the present invention.

FIG. 10 is a circuit diagram showing the power storage unit and an image forming apparatus according to this embodiment. As shown in FIG. 9, the circuit diagram of FIG. 10 is different from that of FIG. 4 in not having the make-and-break circuit 26. The other parts of FIG. 10 are the same as those of FIG. 4, and accordingly, a description thereof is omitted.

In the case where the DC/DC converter 12 and the main body load 20 are always connected as shown in FIG. 10, power is supplied to the main body load 20 when the main power switch 11 is turned ON. If the main body load 20 performs no image forming operation, the charging part 31 can charge the capacitor bank 9 by increasing the output voltage of the DC/DC converter 12.

Figure 11:
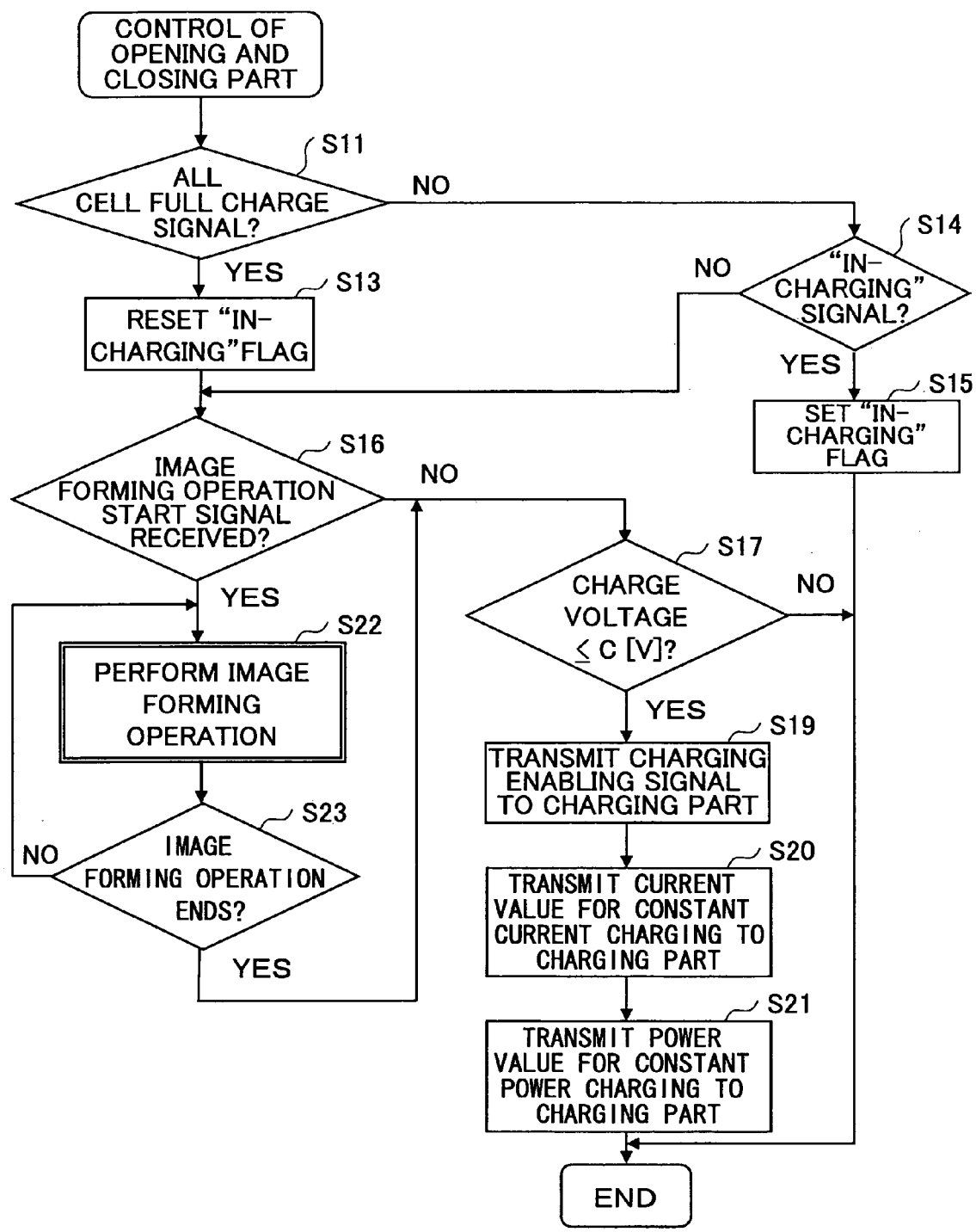
FIG. 11 is a flowchart of the operation where the engine control part performs charging control according to the second embodiment of the present invention.

A description is given, with reference to the flowchart of FIG. 11, of the operation where the engine control part 10 performs charging control using the above-described configuration. The flowchart of FIG. 11 is equal to that of FIG. 6 of the first embodiment except that controlling the opening and closing of the make-and-break circuit 26 is not included. The same steps as those of FIG. 6 are referred to by the same step numbers.

In step S11, the engine control part 10 determines whether the all cell full signal 45 has been transmitted periodically or with predetermined timing from the constant current/constant power charge voltage generation circuit 7.

For example, when the image forming apparatus enters an energy saving mode, the control circuit 8 of the image forming apparatus transmits an operation mode signal indicating an operation mode to the engine control part 10. Therefore, the engine control part 10 determines whether the all cell full charge signal 45 has been transmitted when the engine control part 10 receives the operation mode signal.

When the all cell full charge signal 45 has been transmitted (YES in step S11), in step S13, the engine control part 10 resets the "in-charging" flag because the capacitor bank 9 is not being charged.

In the case of not being fully charged (NO in step S11), in step S14, the engine control part 10 determines whether the charging part 31 is performing charging. Whether the charging part 31 is performing charging may be determined by either referring to the "in-charging" flag or communicating with the constant current/constant power charge voltage generation circuit 7.

If the charging part 31 is performing charging (YES in step S14), in step S15, the engine control part 10 sets the "in-charging" flag, and ends the operation. Although not graphically represented in the flowchart, the CPU 10a of the engine control part 10 inhibits an image forming operation and inhibits switching to the energy saving mode when the "in-charging" flag is set.

Next, in step S16, the engine control part 10 determines whether an image forming operation start signal has been received from the image forming apparatus. If the image forming operation start signal has been received (YES in step S16), in step S22, the engine control part 10 performs an image forming operation, and waits until the image forming operation ends (steps S22 and S23). If the temperature of the DC fixing heater 22 becomes so low as to generate an unfixed image during the image formation, the engine control part 10 turns ON the FET of the FET control buffer circuit 19b so as to supply power from the capacitor bank 9.

When the image forming operation ends (YES in step S23), in step S17, the engine control part 10 determines whether the charge voltage has lowered because of the image formation.

If the image forming apparatus is not performing an image forming operation (NO in step S16), or the image forming operation ends as described above, in step S17, the engine control part 10 determines whether the charge voltage of the capacitor bank 9 is lower than or equal to a predetermined value (for example, C [V], which satisfies C<B).

If the charge voltage is lower than or equal to C [V] (YES in step S17), in step S19, the engine control part 10 transmits a charging enabling signal to the constant current/constant power charge voltage generation circuit 7. As a result, the constant current/constant power charge voltage generation circuit 7 can perform charging.

Next, in step S20, the engine control part 10 transmits a current value for the charging part 31 to perform constant current charging to the constant current/constant power charge voltage generation circuit 7. Then, in step S21, the engine control part 10 transmits a power value for the charging part 31 to perform constant power charging to the charging part 31. If the current value for performing constant current charging and the power value for performing constant power charging have been transmitted from the engine control part 10, the charging part 31 performs constant current charging or constant power charging based on this current value or power value. On the other hand, if the current value for performing constant current charging and the power value for performing constant power charging are not transmitted, the charging part 31 performs constant current charging or constant power charging based on a preset value. The "in-charging" flag is set, and the operation ends.

The charging part 31 performs charging if charging is performable. Although not shown in the flowchart, when the charging part 31 starts charging, the charging part 31 transmits an "in-charging" signal to indicate that charging is being performed to the engine control part 10. When the "in-charging" signal has been transmitted from the charging part 31, the engine control part 10 inhibits an image forming operation. When the all cell full charge signal 45 is detected, the engine control part 10 authorizes an image forming operation to be started.

In the case of an operation mode that does not require the capacitor bank 9 to be charged, for example, in the case of making a few copies, the engine control part 10 authorizes an image forming operation even if the charge voltage is lower than or equal to C [V].

If the charge voltage is higher than C [V] (NO in step S17), the operation ends since there is no need to perform charging.

If a predetermined period of time passes after the end of the image formation in step S23, the image forming apparatus enters an energy saving mode in which the temperature of a fixing heater is managed by being gradually reduced and power supplied to a CPU and a display panel such as a liquid crystal display is reduced.

Figure 12:
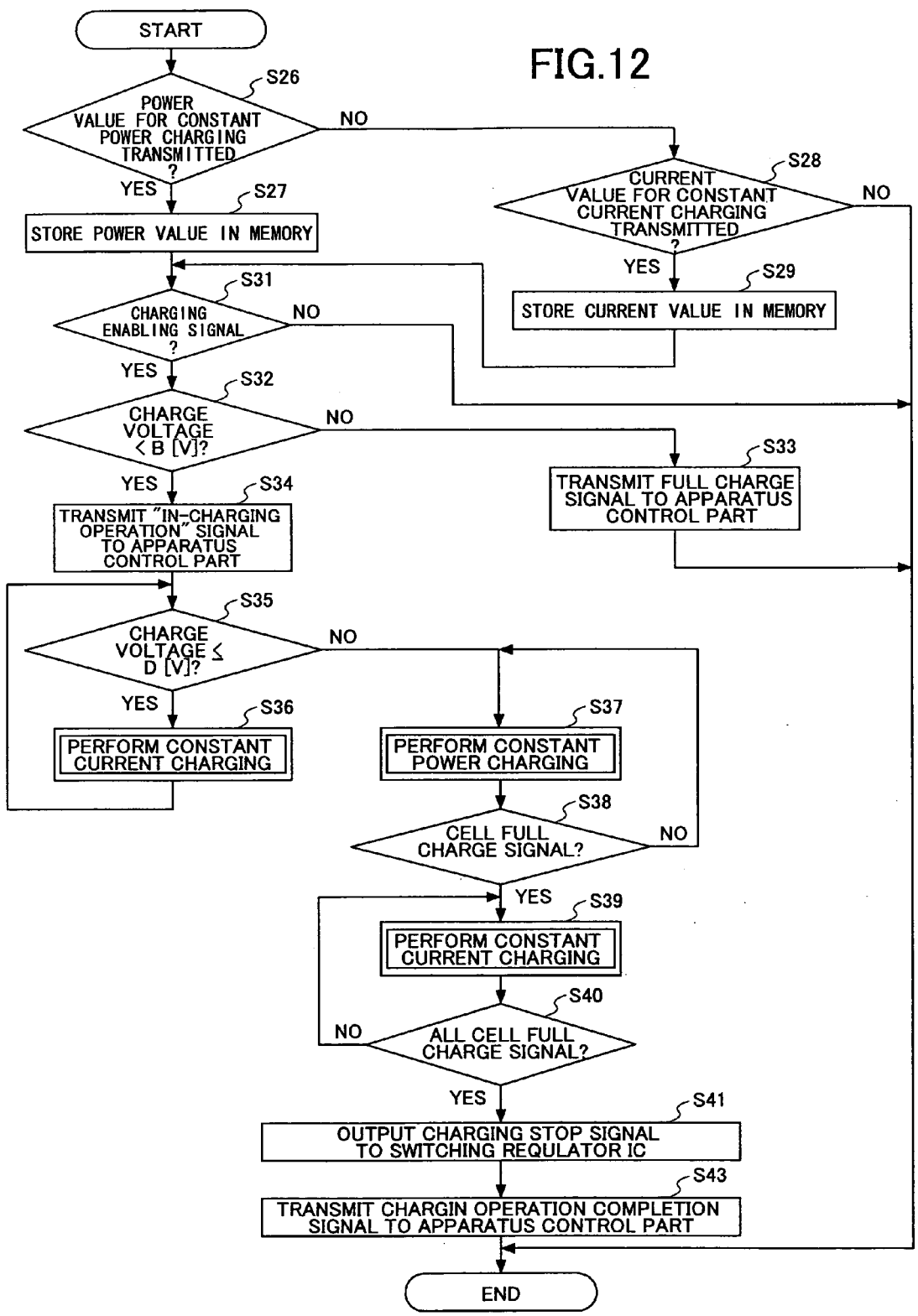
FIG. 12 is a flowchart showing the flow of the operation where the constant current/constant power charge voltage generation circuit controls a charging operation according to the second embodiment of the present invention.

Next, a description is given, with reference to the flowchart of FIG. 12, of the flow of the operation where the CPU 7a of the constant current/constant power charge voltage generation circuit 7 controls a charging operation. The operation of FIG. 12 is equal to the operation of FIG. 8 except that controlling the opening and closing of the make-and-break circuit 26 is not included.

In step S26, the constant current/constant power charge voltage generation circuit 7 determines whether a power value for performing constant power charging has been transmitted from the engine control part 10. If the power value for performing constant power charging has been transmitted (YES in step S26), in step S27, the constant current/constant power charge voltage generation circuit 7 stores the power value in the RAM (memory) of the power storage unit.

If the power value for performing constant power charging has not been transmitted (NO in step S26), in step S28, the constant current/constant power charge voltage generation circuit 7 determines whether a charging current value for performing constant current charging has been transmitted. If the charging current value for performing constant current charging has been transmitted (YES in step S28), in step S29, the constant current/constant power charge voltage generation circuit 7 stores the current value in the RAM of the power storage unit.

Next, in step S31, the constant current/constant power charge voltage generation circuit 7 determines whether a charging enabling signal has been input from the engine control part 10. The constant current/constant power charge voltage generation circuit 7 repeats the determination of step S31 until the charging enabling signal is input.

If the charging enabling signal has been input (YES in step S31), in step S32, the constant current/constant power charge voltage generation circuit 7 determines whether the charge voltage is lower than B [V] (full charge value). If the charge voltage is not lower than B [V] (NO in step S32), there is no need to perform charging. Accordingly, in step S33, the constant current/constant power charge voltage generation circuit 7 transmits the all cell full charge signal 45 to the engine control part 10, and the operation ends.

If the charge voltage is lower than B [V] (YES in step S32), that is, the capacitor bank 9 is not fully charged, in step S34, the constant current/constant power charge voltage generation circuit 7 transmits an "in-charging operation" signal to the engine control part 10.

Then, in step S35, the constant current/constant power charge voltage generation circuit 7 determines whether the charge voltage is lower than or equal to a predetermined voltage (for example, D [V], which satisfies D<C<B).

If the charge voltage is lower than or equal to D [V] (YES in step S35), in step S36, the constant current/constant power charge voltage generation circuit 7 performs a charging operation to implement a constant current charging operation.

The constant current/constant power charge voltage generation circuit 7 performs constant current charging until the charge voltage reaches D [V].

If the charge voltage is not lower than or equal to D [V] (NO in step S35), in step S37, the constant current/constant power charge voltage generation circuit 7 performs constant power charging. In step S38, the constant current/constant power charge voltage generation circuit 7 determines whether the single cell full charge signal 44 is detected while performing constant power charging, and performs constant power charging until the single cell full charge signal 44 is detected.

If the single cell full charge signal 44 of any of the capacitor cells 9a (YES in step S38), in step S39, the constant current/constant power charge voltage generation circuit 7 performs constant current charging. In step S40, the constant current/constant power charge voltage generation circuit 7 determines whether the all cell full charge signal 45 is detected while performing constant current charging, and performs constant current charging until the all cell full charge signal 45 is detected.

When the all cell full charge signal 45 is detected (YES in step S40), in step S41, the constant current/constant power charge voltage generation circuit 7 turns OFF the FET 6 in order to stop charging. Then, in step S43, the constant current/constant power charge voltage generation circuit 7 transmits a charging operation completion signal (or the all cell full charge signal 45) to the engine control part 10. Then, the constant current/constant power charge voltage generation circuit 7 ends the operation.

As described above, according to this embodiment, the output of the DC/DC converter 12 is used as a power supply of the image forming apparatus when the output of the DC/DC converter 12 is necessary for an image forming operation, and the DC/DC converter 12 is used as a charger in the case of a charging operation (for approximately a few to tens of seconds). As a result, it is possible to charge an auxiliary power supply without the need of a dedicated charger. Accordingly, it is possible to provide a power storage unit or an image forming apparatus including the same with reduced manufacturing cost and installation space.

In the power storage unit of this embodiment, the high-frequency transformer 3 is of an insulating type. Accordingly, the capacitor bank 9 side and the DC/DC converter 12 side are isolated from each other. The main body load 20 of the image forming apparatus operates with the voltage V1 generated by the DC/DC converter 12. Even if the capacitor bank 9 is discharged to a voltage lower than the voltage V1, a current is prevented from flowing from the DC/DC converter 12 into the capacitor bank 9 to reduce the voltage of the main body load 20.

Third Embodiment

Figure 13:
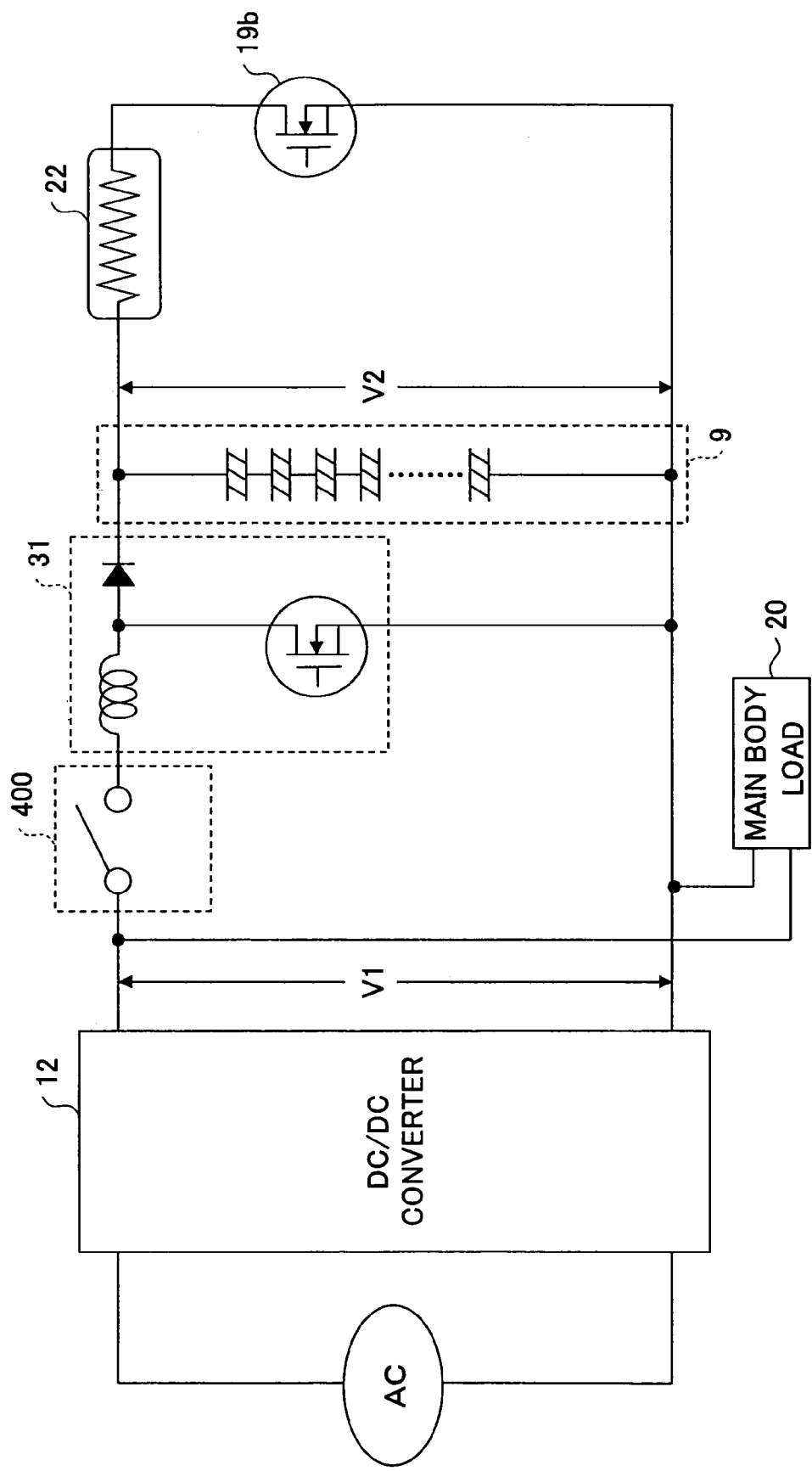
FIG. 13 is a schematic circuit diagram showing a power storage unit according to a third embodiment of the present invention.

FIG. 13 is a schematic circuit diagram showing a power storage unit according to a third embodiment. In FIG. 13, the same elements as those of FIG. 3 are referred to by the same reference numerals.

According to the power storage unit of FIG. 13, an AC commercial power supply is connected to the DC/DC converter 12 after being subjected to rectification, and the output of the DC/DC converter 12 is connected to the main body load 20. The DC/DC converter 12 and the charging part 31 are connected through a make-and-break (opening and closing) circuit 400.

Figure 14:
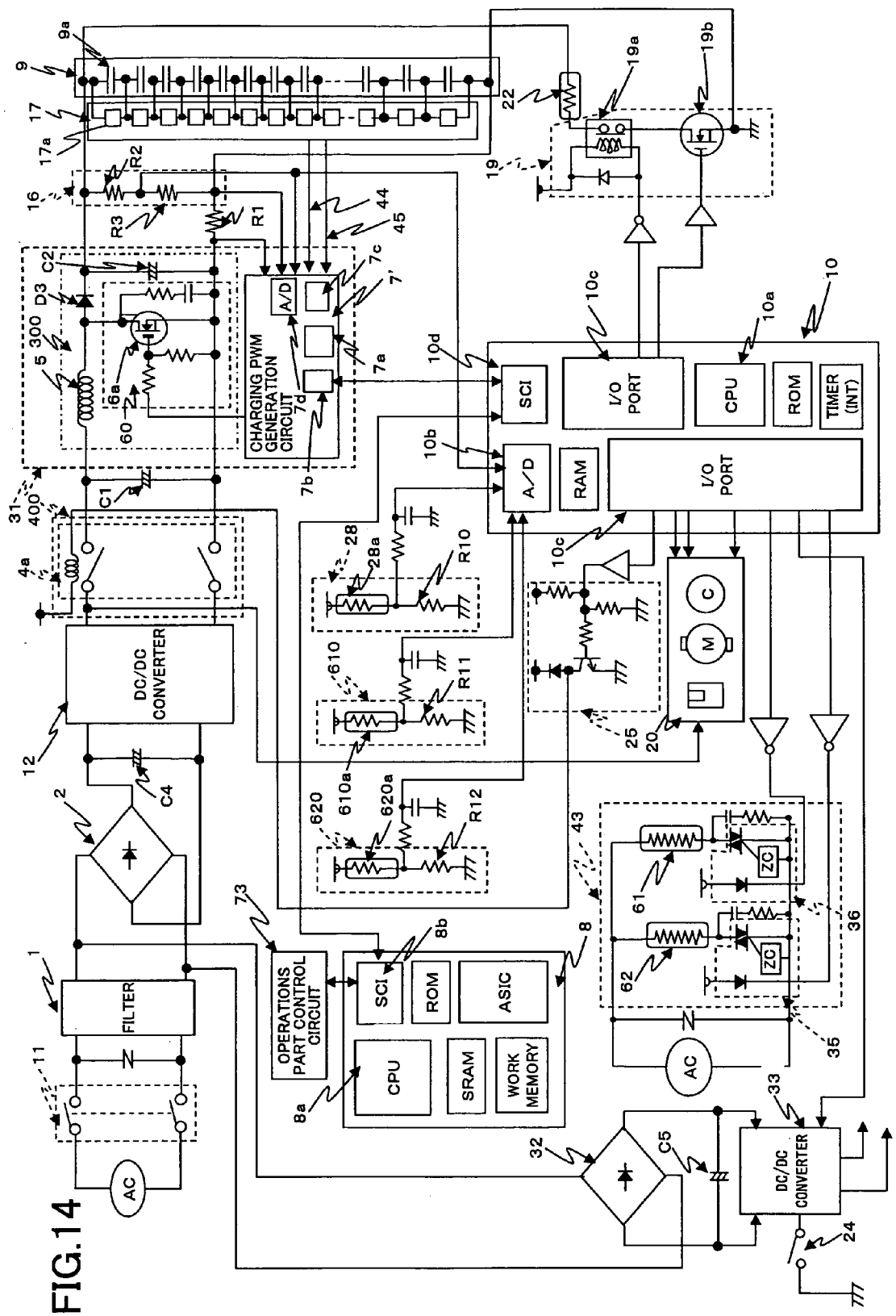
FIG. 14 is a circuit diagram showing the power storage unit and an image forming apparatus according to the third embodiment of the present invention.

The charging part 31 includes a boost chopper circuit 300 (FIG. 14). The charging part 31 increases the voltage V1 of the DC/DC converter 12 to a voltage V2, and charges the capacitor bank 9 with the voltage V2. The stored power (energy) is supplied to the fixing heater 22 by the temperature increase FET control buffer circuit 19b in accordance with the temperature of the DC fixing heater 22.

In the case of performing an image forming operation, the make-and-break circuit 400 is opened so that image formation is performed using all the power supplied from the DC/DC converter 12. At this point, if the temperature of the fixing heater 22 is lower than a predetermined temperature, the capacitor bank 9 is discharged so as to supply power to the fixing heater 22.

If no image forming operation is being performed, such control is performed that the make-and-break circuit 400 is closed to supply power to the charging part 31, so that the capacitor bank 9 can be charged. A detailed description is given below.

FIG. 14 is a circuit diagram showing the power storage unit and an image forming apparatus according to this embodiment. In FIG. 14, the same elements as those of FIG. 4 are referred to by the same reference numerals. The AC power supply is connected to the DC/DC converter 12 via the main power switch 11, the filter 1, and the full-wave rectification circuit 2. The DC/DC converter 12 is connected to the main body load 20.

The DC/DC converter 12 is connected to the charging part 31 via the make-and-break circuit 400. The charging part 31 is connected to the capacitor bank 9 via a charge voltage detection circuit 16 and an equalization circuit 17. The capacitor bank 9 is connected to the DC fixing heater 22 via a discharging circuit 19. Further, the AC power supply and the AC fixing heaters 61 and 62 are connected. The temperatures of the DC fixing heater 22 and the AC fixing heaters 61 and 62 are detected by the correspondingly disposed DC heater thermistor 28a and the AC heater thermistors 610a and 620a, respectively. The AC power supply is also connected to the DC/DC converter 33 via the full-wave rectification circuit 32, and is connected to a main body load that is not graphically illustrated. The DC/DC converter 33 is connected to the energy saving cancellation switch (SW) 24. The energy saving cancellation SW 24 is opened in the energy saving mode, and is closed in the case of canceling the energy saving mode.

Further, if more time passes after the end of an image forming operation, it is possible to reduce power consumption by opening the make-and-break circuit 400.

The power storage unit includes the engine control part 10 that controls the temperatures of the DC fixing heater 22 and the AC fixing heaters 61 and 62 and the opening and closing of the make-and-break circuit 400. The engine control part 10 is connected to the make-and-break circuit 400 via the constant current/constant power charge voltage generation circuit 7 of the charging part 31 and the relay drive circuit 25. Further, the engine control part 10 is connected to the charge voltage detection circuit 16, the discharging circuit 19, the DC fixing heater 22, the AC fixing heaters 61 and 62, the control circuit 8, the DC heater thermistor 28a, the AC heater thermistors 610a and 620a, and the main body load 20.

First, a brief description is given of the control circuit 8 that controls the entire image forming apparatus. The control circuit 8 includes the CPU 8a that controls the entire image forming apparatus, the serial controller (SCI) 8b connected to the CPU 8a, a ROM, a RAM, a work memory for image loading used for a printer, a frame memory for temporarily storing the image data of an image to be written, an ASIC having the function of controlling the periphery of the CPU 8a, and its interface circuit. Various programs for image forming are stored in the ROM. For example, the control circuit 8 communicates with the engine control part 10, and instructs the engine control part 10 to open or close the make-and-break circuit 400 and to perform switching of a switching circuit.

The operations part control circuit 73 and the engine control part 10 that controls the temperatures of the DC fixing heater 22 and the AC fixing heaters 61 and 62 are connected to the CPU 8a via the serial controller (SCI) 8b. The operations part control circuit 73 inputs system settings by detecting panel operations by a user, and displays the status of the system settings to a user. If a user operates a panel in order to perform image forming, the operations part control circuit 73 detects the contents of the operation, and transmits to the engine control part 10 an image forming operation start signal to instruct the engine control part 10 to perform image forming.

Next, a description is given of the operation where the capacitor bank 9 is charged from the AC power supply through the charging part 31. The AC power supply (commercial supply) and the full-wave rectification circuit 2 are connected via the main power switch 11. An alternating current from the AC power supply is subjected to full-wave rectification in the full-wave rectification circuit 2. The full-wave rectification circuit 2 is connected to the smoothing capacitor C4 and the DC/DC converter 12. The output of the full-wave rectification circuit 2 has ripple components thereof removed by the smoothing capacitor C4, and is input to the DC/DC converter 12.

The output of the DC/DC converter 12, which is stabilized to a predetermined voltage thereby, is supplied to the load 20 of the image forming apparatus, and is supplied to the display part and the control unit of the image forming apparatus. A description is given below of the load 20 of the image forming apparatus.

The DC/DC converter 12 is connected to the charging part 31 via the make-and-break circuit 400. The charging part 31 includes the boost chopper circuit 300, a switching circuit 60, and a constant current/constant power charging PWM generation circuit 7'. The boost chopper circuit 300 includes the boost choke coil 5 and the smoothing capacitor C2. The switching circuit 60 includes an FET 6a.

When the make-and-break circuit 400 is closed (ON), the DC/DC converter 12 is connected in series to the boost choke coil 5 and the boost rectification diode D3. The switching circuit 6 including the FET 6a, and the smoothing capacitor C2 are connected in parallel to the boost choke coil 5.

When the FET 6a is turned ON by a PWM signal output from the constant current/constant power charging PWM generation circuit 7' described below, a current flows through the boost choke coil 5 so as to store energy therein because of the output of the DC/DC converter 12 stabilized to a predetermined voltage, and when the FET 6a is turned OFF, the energy stored in the boost choke coil 5 during the ON period is output, being superposed on an input voltage. This current is stored in the smoothing capacitor C2 through the boost rectification diode D3. The voltage is increased by repeating this operation. This increased, smoothed voltage is supplied to the capacitor bank 9, so that each capacitor cell 9a of the capacitor bank 9 is charged.

The magnitude of the voltage increased in the boost choke coil 5 is determined by the output voltage (input voltage) of the DC/DC converter 12 and the ON/OFF duty ratio (the ratio of the ON period to the sum of the ON period and OFF period) of the PWM signal.

The charge voltage of the capacitor bank 9 is detected by the charge voltage detection circuit 16 in which voltage is divided by the resistor R2 and the resistor R3, and is fed back to the constant current/constant power charging PWM generation circuit 7'. The constant current/constant power charging PWM generation circuit 7' monitors the charge voltage, and controls the increased voltage by changing the ON-duty period or the duty ratio of the PWM signal.

The capacitor bank 9 of this embodiment includes the n capacitor cells 9a (electric double layer capacitors) that are connected in series. When each capacitor cell 9a is fully charged, the voltage across the capacitor cell 9a is A [V]. Therefore, when the n capacitor cells 9a are fully charged, a voltage (energy) of A×n [V] (hereinafter simply referred to as B [V]) is stored.

Each end of the capacitor bank 9 is connected to the charge voltage detection circuit 16. The output of the charge voltage detection circuit 16 is connected to each of the constant current/constant power charging PWM generation circuit 7' and the A/D converter 10b of the engine control part 10. The charge voltage detection circuit 16 includes the divider circuit formed of the resistor R2 and the resistor R3, and detects the voltage of the capacitor bank 9 by voltage division of the resistor R2 and the resistor R3.

The charge voltage detected by the charge voltage detection circuit 16 is input to the A/D converter 7c of the constant current/constant power charging PWM generation circuit 7' and to the A/D converter 10b of the engine control part 10.

The resistor R1 is connected in series between the smoothing capacitor C2 and the capacitor bank 9, so that the charging current of the capacitor bank 9 can be detected by monitoring the voltage across the resistor R1. The charging current is input to the charging current detection circuit 7d of the constant current/constant power charging PWM generation circuit 7'.

The capacitor bank 9 is connected to the equalization circuit 17. The equalization circuit 17 detects the full charge of each individual capacitor cell 9a to put a corresponding bypass circuit into operation, thereby equalizing the charge voltages of the capacitor cells 9a. When a first one of the capacitor cells 9a is fully charged to, for example, 2.5 V by the charging part 31, the equalization circuit 17a bypasses charging current to a second one of the capacitor cells 9a. The bypass circuit of the second one of the capacitor cells 9a operates in the same manner, so that the charge voltages of the capacitor cells 9a are equalized.

When the equalization circuit 17 detects the full charge of any one of the capacitor cells 9a (that any one of the capacitor cells 9a is fully charged) and puts a corresponding bypass circuit into operation, the equalization circuit 17 outputs the single cell full charge signal 44 to the constant current/constant power charging PWM generation circuit 7'. Further, when the equalization circuit 17 detects the full charges of all the capacitor cells 9a and puts all the bypass circuits into operation, the equalization circuit 17 outputs the all cell full charge signal 45 to the constant current/constant power charging PWM generation circuit 7'. Since the equalization circuit 17 is described above in detail in the first embodiment, a detailed description thereof is omitted.

A description is given of the constant current/constant power charging PWM generation circuit 7'. The constant current/constant power charging PWM generation circuit 7' controls the boost chopper circuit 300 that is a booster circuit based on the charge voltage and the charging current of the capacitor bank 9 so that the capacitor bank 9 is charged with constant current or constant power.

The constant current/constant power charging PWM generation circuit 7' detects the charge voltage and the charging current of the capacitor bank 9 and the operations of the bypass circuits, and generates a PWM signal for performing constant current charging and constant power charging on the capacitor bank 9.

The constant current/constant power charging PWM generation circuit 7' includes the CPU 7a, the serial controller (UART) 7b, the A/D converter 7c, the charging current detection circuit 7d, a ROM, a RAM, a timer, an interruption control circuit, and an I/O port.

The constant current/constant power charging PWM generation circuit 7' detects the voltage across the capacitor bank 9 by the output of the charge voltage detection circuit 16. If the voltage across the capacitor bank 9 is lower than a preset value, the constant current/constant power charging PWM generation circuit 7' outputs a PWM signal for performing preset constant current charging to the gate of the FET 6a of the switching circuit 60.

This PWM signal for performing the preset constant current charging may be determined using a prepared table defining the relationship between the voltage across the resistor R1 and the duty ratio of the PWM signal or be calculated by operations.

If the voltage across the capacitor bank 9 is higher than or equal to a preset value, in order to perform constant power charging, the constant current/constant power charging PWM generation circuit 7' detects the charging current of the capacitor bank 9 and the voltage across the capacitor bank 9, and outputs a PWM signal for performing preset constant power charging to the gate of the FET 6a of the switching circuit 60 based on the detected charging current and charge voltage as described above.

This PWM signal for performing the preset constant power charging output to the gate of the FET 6a is determined by detecting the charging current to the capacitor bank 9 and the voltage across the capacitor bank 9, and performing operation based on the detected charging current and charge voltage.

When the constant current/constant power charging PWM generation circuit 7' detects the single cell full charge signal 44, the constant current/constant power charging PWM generation circuit 7' outputs the PWM signal for performing the preset constant current charging to the gate of the FET 6a of the switching circuit 60. When the constant current/constant power charging PWM generation circuit 7' detects the all cell full charge signal 45, the constant current/constant power charging PWM generation circuit 7' outputs a signal to stop a charging operation to the gate of the FET 6a of the switching circuit 60.

The capacitor bank 9 is connected to the discharging circuit, and as described below, the power (energy) stored in the capacitor bank 9 is supplied to the DC fixing heater 22 under the control of the engine control part 10.

Next, a description is given of the engine control part 10. The engine control part 10 includes a charging control part that controls charging of the capacitor bank 9 or discharging of the capacitor bank 9.

The engine control part 10 includes the CPU 10a, the serial controller (SCI) 10d connected to the CPU 10a, the input/output (I/O) port 10c, the A/D converter 10b, a ROM, a RAM, and a timer (an interruption control circuit [INT]). A program for causing the engine control part 10 to function as a charging control part is contained in the ROM. When the main power switch 11 is turned ON, the program is read into the RAM and is executed by the CPU 10a.

The temperature detection circuits 28, 610, and 620 that detect the surface temperatures (fixing temperatures) of the fixing (heating) roller 111 of the fixing unit 112 are connected to the A/D converter 10b.

The temperature detection circuit 28 includes the DC heater thermistor 28a and the resistor R10 connected in series thereto, and detects the temperature of the measurement area corresponding to the DC fixing heater 22. The temperature detection circuit 610 includes the AC heater thermistor 610a and the resistor R11 connected in series thereto, and detects the temperature of the measurement area corresponding to the AC fixing heater 61. The temperature detection circuit 620 includes the AC heater thermistor 620a and the resistor R12 connected in series thereto, and detects the temperature of the measurement area corresponding to the AC fixing heater 62.

The power supplied to the AC fixing heater 61 and the AC fixing heater 62 is controlled by the AC heater control circuit 43. The power supplied to the DC fixing heater 22 is controlled by the discharging circuit 19.

The AC heater control circuit 43 that supplies power to the AC fixing heaters 61 and 62 and the discharging circuit 19 that supplies power to the DC fixing heater 22 are connected to the I/O port 10c. Further, the load 20 including one or more of a motor, a solenoid, a clutch, etc., necessary to perform an image forming operation is connected to the I/O port 10c. The relay drive circuit 25 that drives a relay 4a of the make-and-break circuit 400 is connected to the I/O port 10c.

The engine control part 10 communicates with the constant current/constant power charging PWM generation circuit 7' through the serial controller (SCI) 10d. The engine control part 10 detects the voltage across the capacitor bank 9 by the charge voltage detection circuit 16, and determines whether the capacitor bank 9 is capable of discharging (releasing stored energy). Further, the engine control part 10 outputs a charging instruction signal or a charging authorization signal, or a charging enabling signal to the constant current/constant power charging PWM generation circuit 7' when no discharging is being performed, in a standby period, or at the time of an energy saving mode.

Next, first, a description is given of the AC heater control circuit 43. At the time of the main power supply being ON and at the time of a regular copying operation, the engine control part 10 supplies power to the AC fixing heater 61 and the AC fixing heater 62 in order to fix toner.

When the temperature detection circuit 610 or the temperature detection circuit 620 detects a temperature lower than or equal to a preset temperature, the engine control part 10 outputs a signal to turn ON the phototriac drive circuit 35 or 36 to the phototriac drive circuit 35 or 36. As a result, power is supplied to the AC fixing heater 61 or 62.

When the temperature detection circuit 610 or the temperature detection circuit 620 detects a temperature higher than or equal to a preset temperature, the engine control part 10 outputs a signal to turn OFF the phototriac drive circuit 35 or 36 to the phototriac drive circuit 35 or 36. As a result, supplying power to the AC fixing heater 61 or 62 is stopped.

Next, a description is given of supplying power to the DC fixing heater 22. When the main power supply is turned ON or when the temperature detection circuit 28 detects a temperature at which an unfixed image is generated during successive copying, the engine control part 10 opens the make-and-break circuit 400 so that only the main body load 20 is connected to the DC/DC converter 12.

Further, the engine control part 10 outputs a signal for discharging the capacitor bank 9 from the I/O port 10c to the FET control buffer circuit 19b and the relay driving circuit 19a. The FET control buffer circuit 19b turns ON an FET, and the relay driving circuit 19a closes a relay, so that power is supplied from the capacitor bank 9 to the DC fixing heater 22.

When the temperature detection circuit 28 detects a temperature higher than or equal to a preset temperature, the engine control part 10 outputs a signal for stopping discharging of the capacitor bank 9 from the I/O port 10c to the FET control buffer circuit 19b and the relay driving circuit 19a. The FET control buffer circuit 19b turns OFF the FET, and the relay driving circuit 19a opens the relay, so that supplying power to the DC fixing heater 22 is stopped.

The image forming apparatus enters an energy saving mode after passage of a certain period of time since the end of an image forming operation. Therefore, the engine control part 10 outputs a partial power supply output stop signal from the I/O port 10c to the DC/DC converter 33. By closing the energy saving cancellation SW 24 (a press cover opening SW, the original detection SW of an ADF, etc.), the DC/DC converter 33 returns to a normal operation, and the energy saving mode is canceled.

The engine control part 10 has an "in-charging" flag that is set when the charging part 31 starts charging. The engine control part 10 resets the "in-charging" flag when receiving the all cell full charge signal 45 output from the equalization circuit 17, and sets the "in-charging" flag when not receiving the all cell full charge signal 45.

Figure 15:
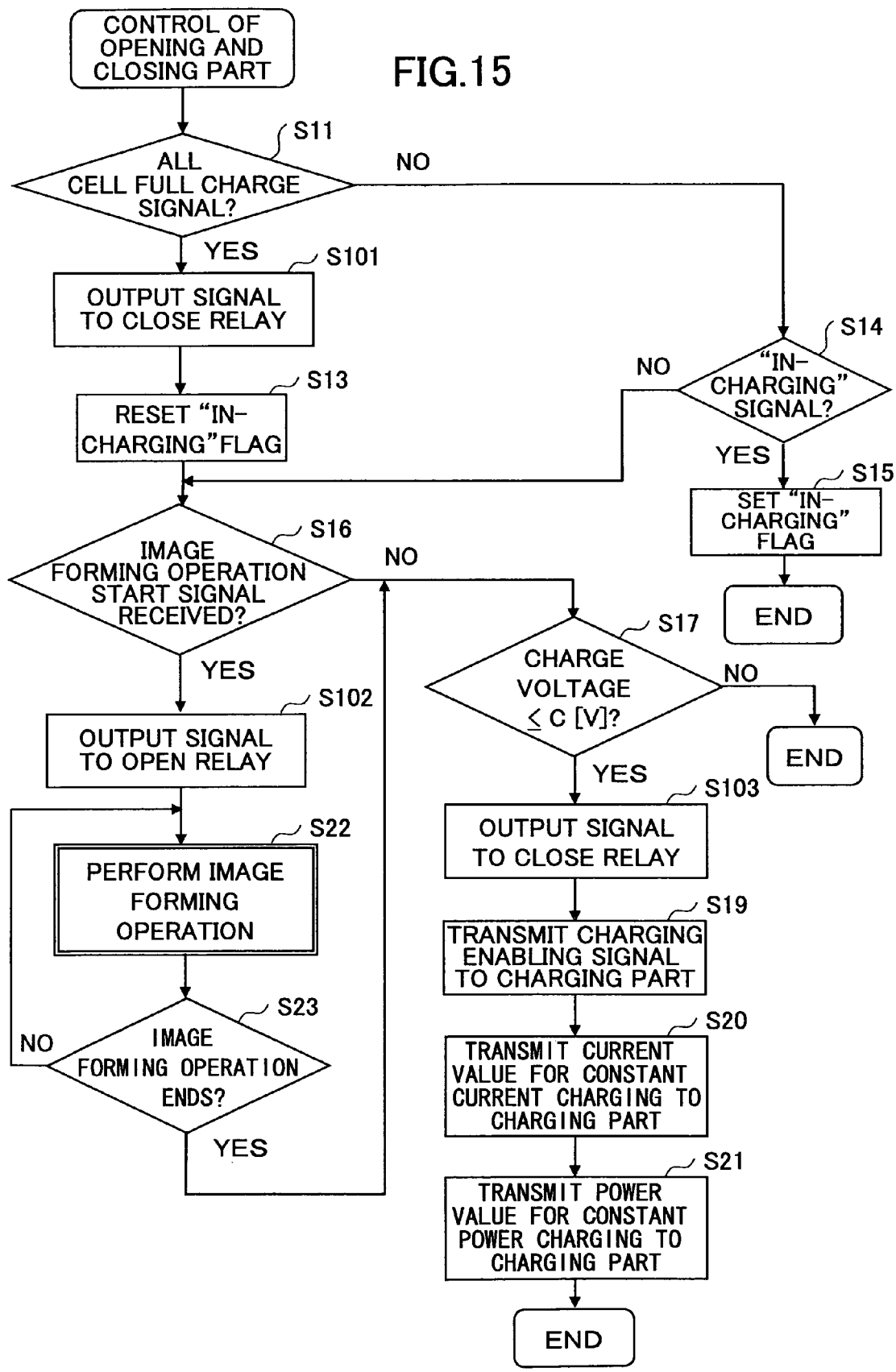
FIG. 15 is a flowchart of the operation where the engine control part controls the opening and closing of a make-and-break circuit and controls charging according to the third embodiment of the present invention.

A description is given, with reference to the flowchart of FIG. 15, of the operation where the CPU 10a of the engine control part 10 controls the opening and closing of the make-and-break circuit 400 and controls charging using the above-described configuration. In FIG. 15, the same steps as those of FIG. 6 are referred to by the same step numbers.

In step S11, the engine control part 10 determines whether the all cell full signal 45 has been transmitted periodically or with predetermined timing from the constant current/constant power charging PWM generation circuit 7'.

For example, when the image forming apparatus enters an energy saving mode, the control circuit 8 of the image forming apparatus transmits an operation mode signal indicating an operation mode to the engine control part 10. Therefore, the engine control part 10 determines whether the all cell full charge signal 45 has been transmitted when the engine control part 10 receives the operation mode signal. As a result, it is possible to control the opening and closing of the make-and-break circuit 400 in accordance with the operation mode.

When the all cell full charge signal 45 has been transmitted (YES in step S11), there is no need to charge the capacitor bank 9. Accordingly, in step S101, the engine control part 10 outputs a signal to close the make-and-break circuit 400 from the I/O port 10c to the relay drive circuit 25. As a result, the output of the DC/DC converter 12 is supplied to the main body load 20 side. In step S13, the engine control part 10 resets the "in-charging" flag because the capacitor bank 9 is not being charged.

In the case of not being fully charged (NO in step S11), in step S14, the engine control part 10 determines whether the charging part 31 is performing charging. Whether the charging part 31 is performing charging may be determined by either referring to the "in-charging" flag or communicating with the constant current/constant power charging PWM generation circuit 7'. If the charging part 31 is performing charging (YES in step S14), in step S15, the engine control part 10 sets the "in-charging" flag, and ends the operation. Although not graphically represented in the flowchart, the CPU 10a of the engine control part 10 inhibits an image forming operation and inhibits switching to the energy saving mode when the "in-charging" flag is set.

Next, in step S16, the engine control part 10 determines whether an image forming operation start signal (an image forming operation start instruction signal) has been output from the operations part control circuit 73 of the image forming apparatus. If the image forming operation start signal has been output (YES in step S16), in step S102, the engine control part 10 outputs a signal to open the make-and-break circuit 400 from the I/O port 10c to the relay drive circuit 25. As a result, it is possible to supply all the output of the DC/DC converter 12 to the main body load 20.

In step S22, the engine control part 10 performs an image forming operation, and waits until the image forming operation ends (steps S22 and S23). If the temperature of the DC fixing heater 22 becomes so low as to generate an unfixed image during the image formation, the engine control part 10 turns ON the FET of the FET control buffer circuit 19b so as to supply power from the capacitor bank 9.

When the image forming operation ends (YES in step S23), in step S17, the engine control part 10 determines whether the charge voltage has lowered because of the image formation.

If the image forming apparatus is not performing an image forming operation (NO in step S16), or the image forming operation ends as described above, in step S17, the engine control part 10 determines whether the charge voltage of the capacitor bank 9 is lower than or equal to a predetermined value (for example, C [V], which satisfies C<B).

If the charge voltage is lower than or equal to C [V] (YES in step S17), in step S103, the engine control part 10 outputs a signal to open the make-and-break circuit 400 from the I/O port 10c to the relay drive circuit 25. As a result, all the output of the DC/DC converter 12 can be supplied to the charging part 31 side.

Further, in step S19, the engine control part 10 transmits a charging enabling signal to the constant current/constant power charging PWM generation circuit 7'. As a result, the constant current/constant power charging PWM generation circuit 7' can perform charging.

Next, in step S20, the engine control part 10 transmits a current value for the charging part 31 to perform constant current charging to the constant current/constant power charge voltage generation circuit 7. Then, in step S21, the engine control part 10 transmits a power value for the charging part 31 to perform constant power charging to the charging part 31. If the current value for performing constant current charging and the power value for performing constant power charging have been transmitted from the engine control part 10, the charging part 31 performs constant current charging or constant power charging based on this current value or power value. On the other hand, if the current value for performing constant current charging and the power value for performing constant power charging are not transmitted, the charging part 31 performs constant current charging or constant power charging based on a preset value. The "in-charging" flag is set, and the operation ends.

The charging part 31 performs charging if charging is performable. Although not shown in the flowchart, when the charging part 31 starts charging, the charging part 31 transmits an "in-charging" signal to indicate that charging is being performed to the engine control part 10. When the "in-charging" signal has been transmitted from the charging part 31, the engine control part 10 inhibits an image forming operation. When the all cell full charge signal 45 is detected, the engine control part 10 authorizes an image forming operation to be started.

In the case of an operation mode that does not require the capacitor bank 9 to be charged, for example, in the case of making a few copies, the engine control part 10 authorizes an image forming operation even if the charge voltage is lower than or equal to C [V].

If the charge voltage is higher than C [V] (NO in step S17), the operation ends since there is no need to perform charging.

If a predetermined period of time passes after the end of the image formation in step S23, the image forming apparatus enters an energy saving mode in which the temperature of a fixing heater is managed by being gradually reduced and power supplied to a CPU and a display panel such as a liquid crystal display is reduced.

Figure 7:
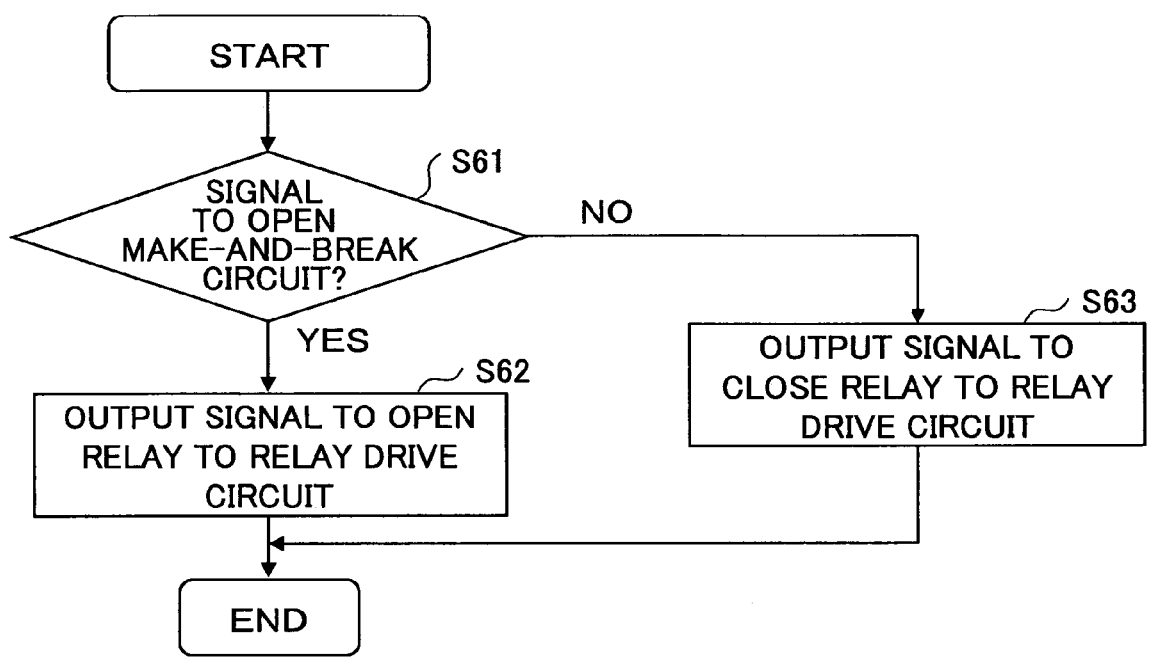
FIG. 7 is a flowchart of the operation where the engine control part controls the make-and-break circuit based on an opening/closing instruction signal according to the first embodiment of the present invention.

In the case of performing or ending image formation, the image forming apparatus transmits a switching instruction signal to give an instruction to switch the make-and-break circuit 400 to the engine control part 10. The engine control part 10 controls the make-and-break circuit 400 based on the switching instruction signal. A description is given of this control operation, of which flowchart is omitted because the flow is the same as that of FIG. 7 if the make-and-break circuit 26 in the operation of FIG. 7 is replaced with the make-and-break circuit 400.

When the control circuit 8 of the image forming apparatus transmits an opening/closing instruction signal to the engine control part 10, in step S61, the engine control part 10 determines whether the opening/closing instruction signal is a signal to open the make-and-break circuit 400.

If the opening/closing instruction signal is a signal to open the make-and-break circuit 26 (YES in step S61), in step S62, the engine control part 10 opens the make-and-break circuit 400. As a result, it is possible to perform charging using all the output of the DC/DC converter 12.

If the opening/closing instruction signal is not a signal to open the make-and-break circuit 26 (NO in step S61), in step S63, the engine control part 10 closes the make-and-break circuit 400, and ends the operation.

Figure 16:
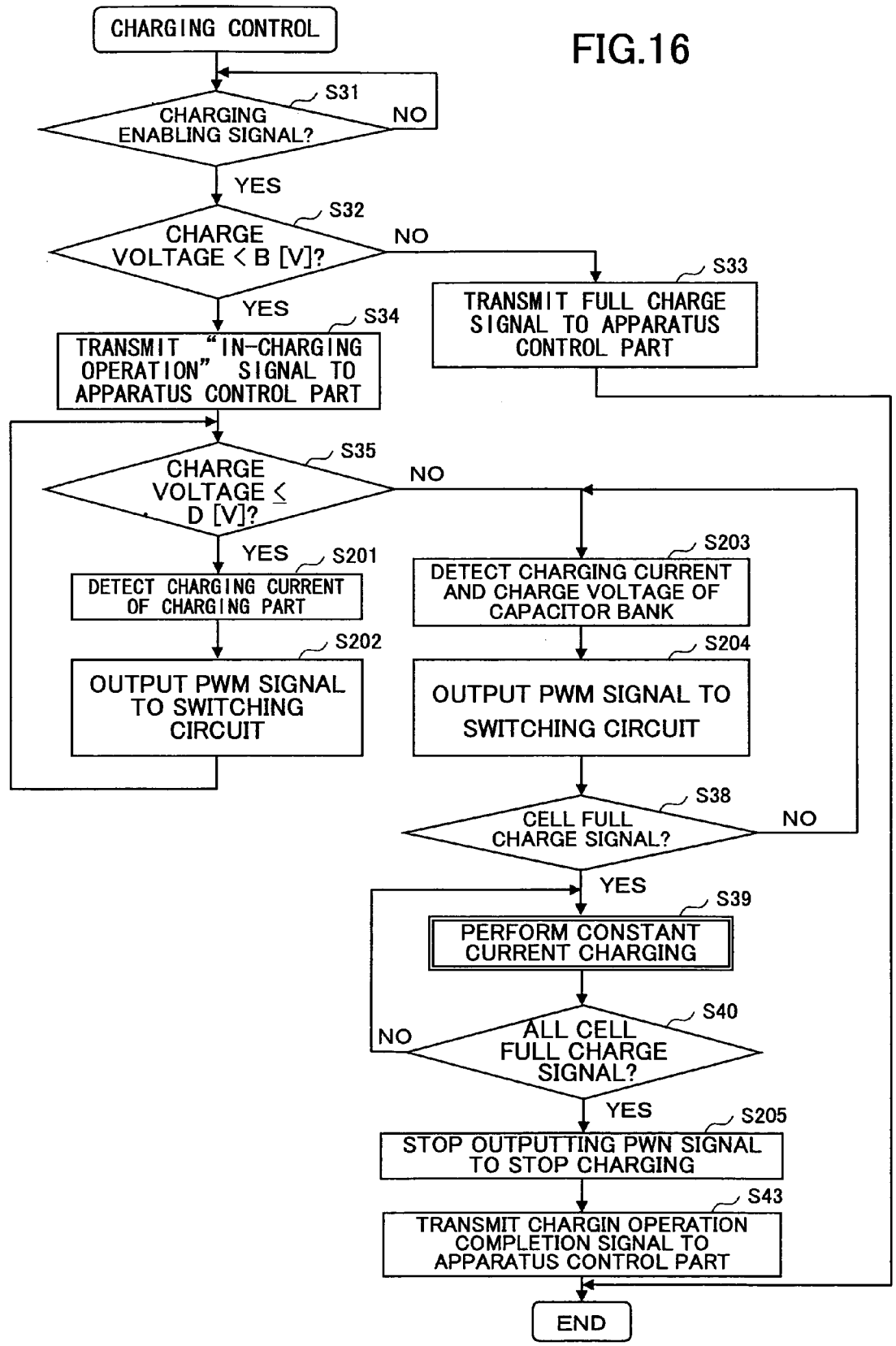
FIG. 16 is a flowchart showing the flow of the operation where a constant current/constant power charging PWM generation circuit controls a charging operation according to the third embodiment of the present invention.

If the image forming apparatus is not performing an image forming operation and the charge voltage is lower than a predetermined value, the constant current/constant power charging PWM generation circuit 7' charges the capacitor bank 9 with constant current or constant power. FIG. 16 is a flowchart showing the flow of the operation where the CPU 7a of the constant current/constant power charging PWM generation circuit 7' controls a charging operation.

In step S31, the constant current/constant power charging PWM generation circuit 7' determines whether a charging enabling signal has been input from the engine control part 10. The constant current/constant power charging PWM generation circuit 7' repeats the determination of step S31 until the charging enabling signal is input.

If the charging enabling signal has been input (YES in step S31), in step S32, the constant current/constant power charging PWM generation circuit 7' determines whether the charge voltage is lower than B [V] (full charge value). If the charge voltage is not lower than B [V] (NO in step S32), there is no need to perform charging. Accordingly, in step S33, the constant current/constant power charging PWM generation circuit 7' transmits the all cell full charge signal 45 to the engine control part 10, and the operation ends. In this case, no charging is performed. Accordingly, the make-and-break circuit 400 is opened.

If the charge voltage is lower than B [V] (YES in step S32), that is, the capacitor bank 9 is not fully charged, in step S34, the constant current/constant power charging PWM generation circuit 7' transmits an "in-charging operation" signal to the engine control part 10.

Then, in step S35, the constant current/constant power charging PWM generation circuit 7' determines whether the charge voltage is lower than or equal to a predetermined voltage (for example, D [V], which satisfies D<C<B).

If the charge voltage is lower than or equal to D [V] (YES in step S35), in step S201, the constant current/constant power charging PWM generation circuit 7' detects the charging current of the charging part 31 in order to perform a constant current charging operation.

Next, in step S202, the constant current/constant power charging PWM generation circuit 7' outputs a PWM signal corresponding to the detected charging current to the gate of the FET 6a of the switching circuit 60. As a result, the capacitor bank 9 is charged with constant current.

The constant current/constant power charging PWM generation circuit 7' continues the constant current charging until the charge voltage is higher than D [V] (steps S35, S201, and S202).

If the charge voltage is not lower than or equal to D [V] (NO in step S35), in step S203, the constant current/constant power charging PWM generation circuit 7' detects the charging current and the charge voltage of the capacitor bank 9 in order to perform a constant power charging operation.

Then, in step S204, the constant current/constant power charging PWM generation circuit 7' outputs a PWM signal for performing constant power charging to the gate of the FET 6a of the switching circuit 60 based on the detected charging current and charge voltage.

In step S38, the constant current/constant power charging PWM generation circuit 7' determines whether the single cell full charge signal 44 is detected while performing constant power charging, and performs constant power charging until the single cell full charge signal 44 is detected.

If the single cell full charge signal 44 of any of the capacitor cells 9a is detected (YES in step S38), in step S39, the constant current/constant power charging PWM generation circuit 7' performs constant current charging. In step S40, the constant current/constant power charging PWM generation circuit 7' determines whether the all cell full charge signal 45 is detected while performing constant current charging, and performs constant current charging until the all cell full charge signal 45 is detected.

When the all cell full charge signal 45 is detected (YES in step S40), in step S205, the constant current/constant power charging PWM generation circuit 7' stops outputting the PWM signal in order to stop the charging. Then, in step S43, the constant current/constant power charging PWM generation circuit 7' transmits a charging operation completion signal (or the all cell full charge signal 45) to the engine control part 10, and ends the operation.

As described above, according to this embodiment, the output of the DC/DC converter 12 is used as a power supply of the image forming apparatus when the output of the DC/DC converter 12 is necessary for an image forming operation, and the DC/DC converter 12 is used as a charger only in the case of a charging operation (for approximately a few to tens of seconds). As a result, it is possible to charge an auxiliary power supply without the need of a dedicated charger. Accordingly, it is possible to provide a power storage unit or an image forming apparatus including the same with reduced manufacturing cost and installation space.

The main body load 20 of the image forming apparatus operates with the voltage V1 generated by the DC/DC converter 12. Even if the capacitor bank 9 is discharged to a voltage lower than the voltage V1, a current is prevented from flowing from the DC/DC converter 12 into the capacitor bank 9 to reduce the voltage of the main body load 20.

Fourth Embodiment

Figure 17:
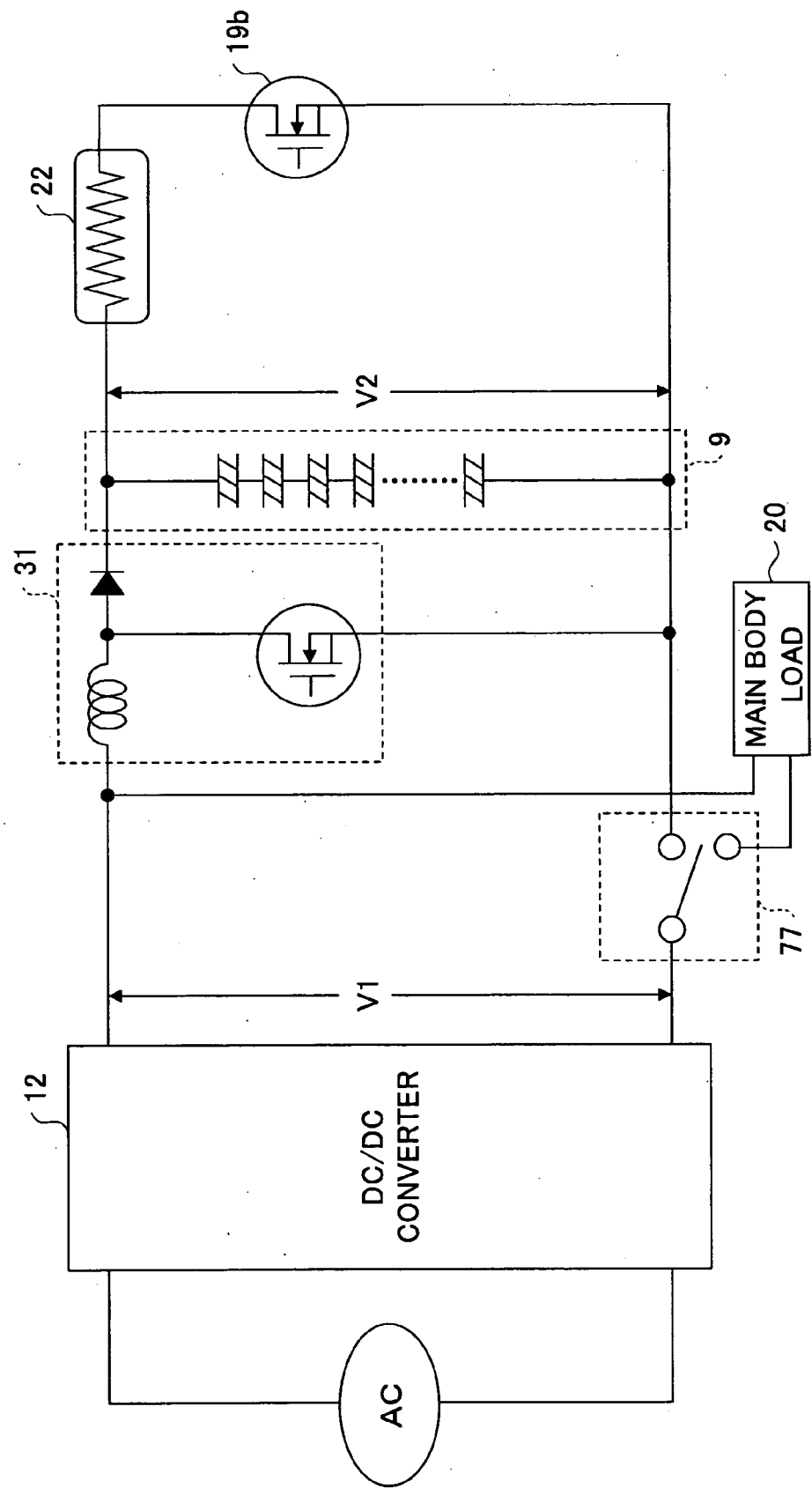
FIG. 17 is a schematic circuit diagram showing a power storage unit according to a fourth embodiment of the present invention.

FIG. 17 is a schematic circuit diagram showing a power storage unit according to a fourth embodiment. In FIG. 17, the same elements as those of FIG. 13 are referred to by the same reference numerals.

According to the power storage unit of FIG. 17, an AC commercial power supply is connected to the DC/DC converter 12 after being subjected to rectification, and the output of the DC/DC converter 12 is connected to the main body load 20 of an image forming apparatus and the charging part 31 through a switching circuit 77.

Figure 18:
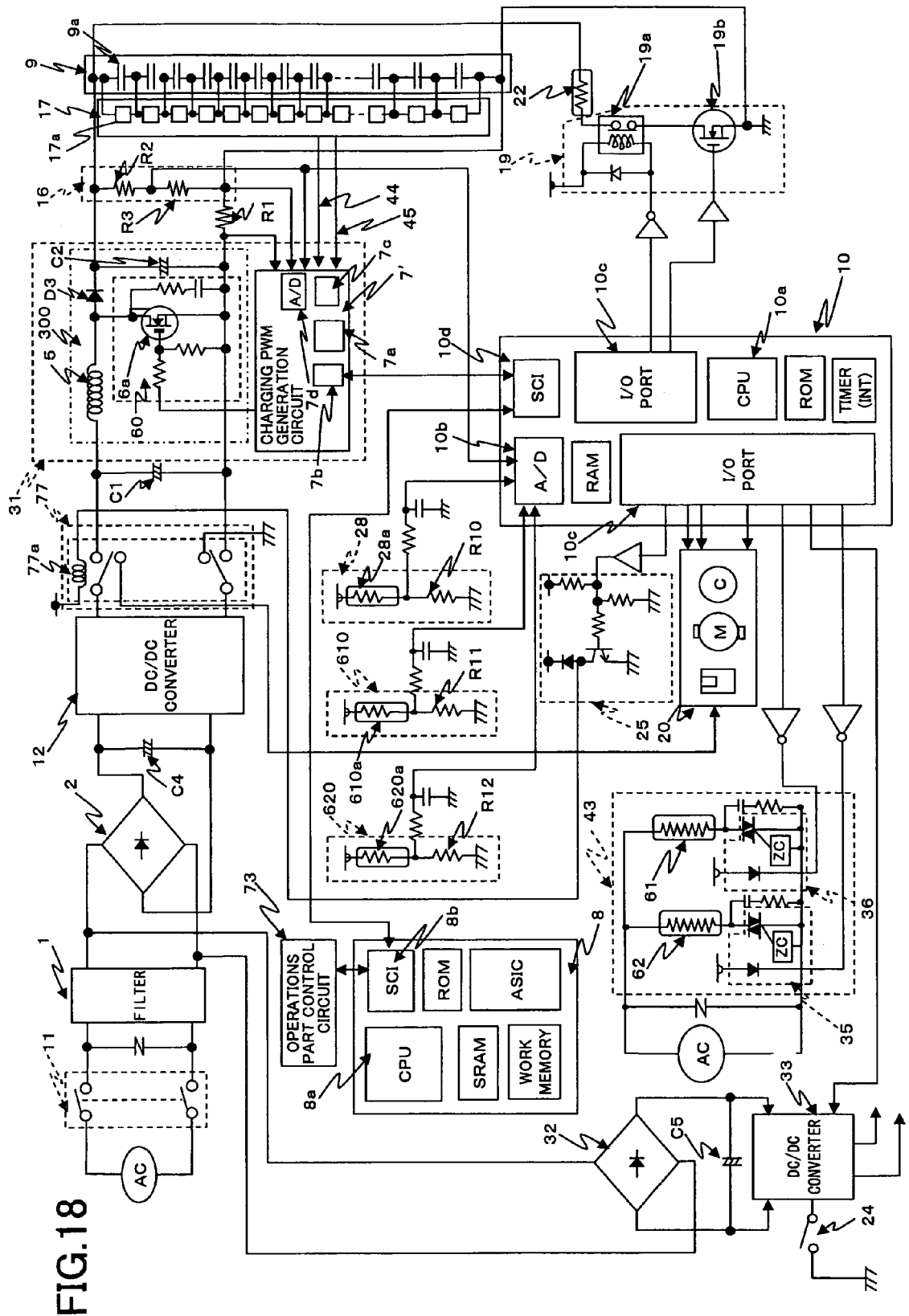
FIG. 18 is a circuit diagram showing the power storage unit and an image forming apparatus according to the fourth embodiment of the present invention.

The charging part 31 includes the boost chopper circuit 300 (FIG. 18). The charging part 31 increases the voltage V1 of the DC/DC converter 12 to a voltage V2, and charges the capacitor bank 9 with the voltage V2. The stored power (energy) is supplied to the fixing heater 22 by the temperature increase FET control buffer circuit 19b in accordance with the temperature of the DC fixing heater 22.

The switching circuit 77 switches the destination of the output of the DC/DC converter 12 between the main body load 20 and the charging part 31. In the case of performing an image forming operation, the switching circuit 77 switches to the main body load 20 side, so that the main body load 20 performs image formation using all the power supplied from the DC/DC converter 12. At this point, if the temperature of the fixing heater 22 is lower than a predetermined temperature, the capacitor bank 9 is discharged so as to supply power to the fixing heater 22.

Further, if no image forming operation is being performed, the switching circuit 77 switches to the charging part 31 side so that the capacitor bank 9 can be charged. A detailed description is given below, but a description of the same parts as the third embodiment is omitted.

FIG. 18 is a circuit diagram showing the power storage unit and the image forming apparatus according to this embodiment. In FIG. 18, the same elements as those of FIG. 14 are referred to by the same reference numerals. As described above, the charging part 31 of this embodiment is different from that of the third embodiment in that the switching circuit 77 replaces the make-and-break circuit 400 of FIG. 14.

The switching circuit 77 includes a relay 77a. The connection destination of the switching circuit 77 is switched between the charging part 31 and the main body load 20 through the relay drive circuit 25 by the engine control part 10.

Therefore, according to FIG. 14 of the third embodiment, when the make-and-break circuit 400 is closed, the DC/DC converter 12 is connected to each of the main body load 20 and the charging part 31. On the other hand, according to this embodiment, the connection destination of the DC/DC converter 12 can be switched to one of the main body load 20 and the charging part 31.

According to this configuration, the engine control part 10 switches the switching circuit 77 to the main body load 20 side in the case of receiving an image forming operation start signal, and switches the switching circuit 77 to the charging part 31 side in the case of charging the capacitor bank 9.

Figure 19:
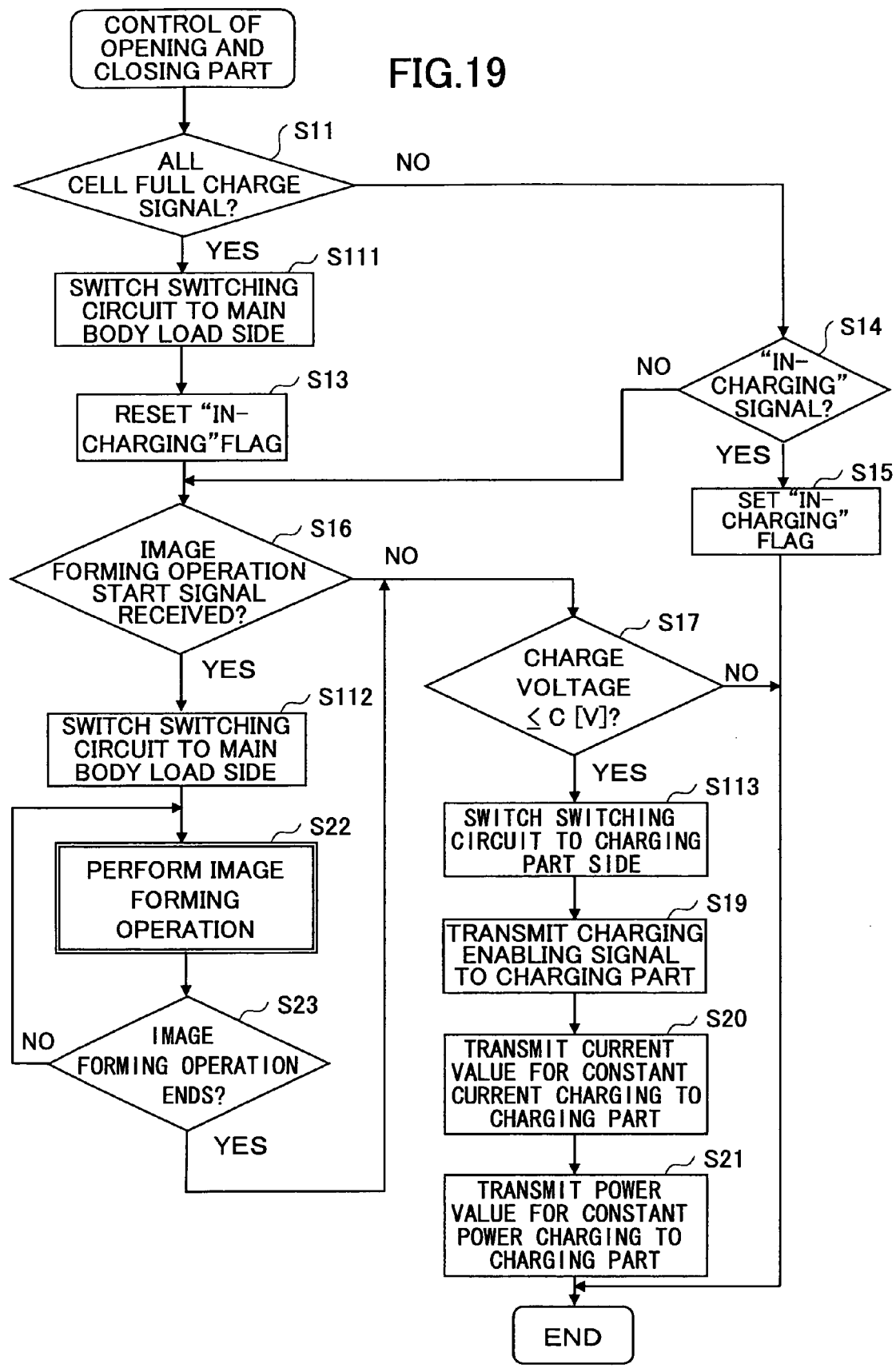
FIG. 19 is a flowchart of the operation where the engine control part controls the opening and closing of a switching circuit and controls charging according to the fourth embodiment of the present invention.

A description is given, with reference to the flowchart of FIG. 19, of the operation where the CPU 10a of the engine control part 10 controls the opening and closing of the switching circuit 77 and controls charging using the above-described configuration. In FIG. 19, the same steps as those of FIG. 15 are referred to by the same step numbers.

In step S11, the engine control part 10 determines whether the all cell full signal 45 has been transmitted periodically or with predetermined timing from the constant current/constant power charging PWM generation circuit 7'.

When the all cell full charge signal 45 has been transmitted (YES in step S11), there is no need to charge the capacitor bank 9. Accordingly, in step S111 the engine control part 10 outputs a signal to switch the switching circuit 44 to the main body load 20 side from the I/O port 10c to the relay drive circuit 25. As a result, the output of the DC/DC converter 12 is supplied to the main body load 20 side. In step S13, the engine control part 10 resets the "in-charging" flag because the capacitor bank 9 is not being charged.

In the case of not being fully charged (NO in step S11), in step S14, the engine control part 10 determines whether the charging part 31 is performing charging. If the charging part 31 is performing charging (YES in step S14), in step S15, the engine control part 10 sets the "in-charging" flag, and ends the operation. The CPU 10a of the engine control part 10 inhibits an image forming operation and inhibits switching to the energy saving mode when the "in-charging" flag is set.

Next, in step S16, the engine control part 10 determines whether an image forming operation start signal (an image forming operation start instruction signal) has been output from the operations part control circuit 73 of the image forming apparatus. If the image forming operation start signal has been output (YES in step S16), in step S112, the engine control part 10 outputs a signal to switch the switching circuit 77 to the main body load 20 side from the I/O port 10c to the relay drive circuit 25. As a result, it is possible to supply all the output of the DC/DC converter 12 to the main body load 20.

In step S22, the engine control part 10 performs an image forming operation, and waits until the image forming operation ends (steps S22 and S23). If the temperature of the DC fixing heater 22 becomes so low as to generate an unfixed image during the image formation, the engine control part 10 turns ON the FET of the FET control buffer circuit 19b so as to supply power from the capacitor bank 9.

When the image forming operation ends (YES in step S23), in step S17, the engine control part 10 determines whether the charge voltage has lowered because of the image formation.

If the image forming apparatus is not performing an image forming operation (NO in step S16), or the image forming operation ends as described above, in step S17, the engine control part 10 determines whether the charge voltage of the capacitor bank 9 is lower than or equal to a predetermined value (for example, C [V], which satisfies C<B).

If the charge voltage is lower than or equal to C [V] (YES in step S17), in step S113, the engine control part 10 outputs a signal to switch the switching circuit 77 to the charging part 31 side from the I/O port 10c to the relay drive circuit 25. As a result, all the output of the DC/DC converter 12 can be supplied to the charging part 31 side.

Further, in step S19, the engine control part 10 transmits a charging enabling signal to the constant current/constant power charging PWM generation circuit 7'. As a result, the constant current/constant power charging PWM generation circuit 7' can perform charging.

Next, in step S20, the engine control part 10 transmits a current value for the charging part 31 to perform constant current charging to the constant current/constant power charge voltage generation circuit 7. Then, in step S21, the engine control part 10 transmits a power value for the charging part 31 to perform constant power charging to the charging part 31. If the current value for performing constant current charging and the power value for performing constant power charging have been transmitted from the engine control part 10, the charging part 31 performs constant current charging or constant power charging based on this current value or power value. On the other hand, if the current value for performing constant current charging and the power value for performing constant power charging are not transmitted, the charging part 31 performs constant current charging or constant power charging based on a preset value. The "in-charging" flag is set, and the operation ends.

The charging part 31 performs charging if charging is performable. Although not shown in the flowchart, when the charging part 31 starts charging, the charging part 31 transmits an "in-charging" signal to indicate that charging is being performed to the engine control part 10. When the "in-charging" signal has been transmitted from the charging part 31, the engine control part 10 inhibits an image forming operation. When the all cell full charge signal 45 is detected, the engine control part 10 authorizes an image forming operation to be started.

In the case of an operation mode that does not require the capacitor bank 9 to be charged, for example, in the case of making a few copies, the engine control part 10 authorizes an image forming operation even if the charge voltage is lower than or equal to C [V].

If the charge voltage is higher than C [V] (NO in step S17), the operation ends since there is no need to perform charging.

If a predetermined period of time passes after the end of the image formation in step S23, the image forming apparatus enters an energy saving mode in which the temperature of a fixing heater is managed by being gradually reduced and power supplied to a CPU and a display panel such as a liquid crystal display is reduced. The power storage unit of this embodiment can charge the capacitor bank 9 even if the switching circuit 77 is switched to the charging part 31 side so as to supply no power to the main body load 20 at the time of the energy saving mode if the charge voltage is lower than or equal to C [V].

In the case of performing or ending image formation, the image forming apparatus transmits a switching instruction signal to give an instruction to switch the switching circuit 77 to the engine control part 10. The engine control part 10 controls the switching circuit 77 based on the switching instruction signal. A description of this operation is the same as in the third embodiment, and accordingly is omitted.

Figure 20:
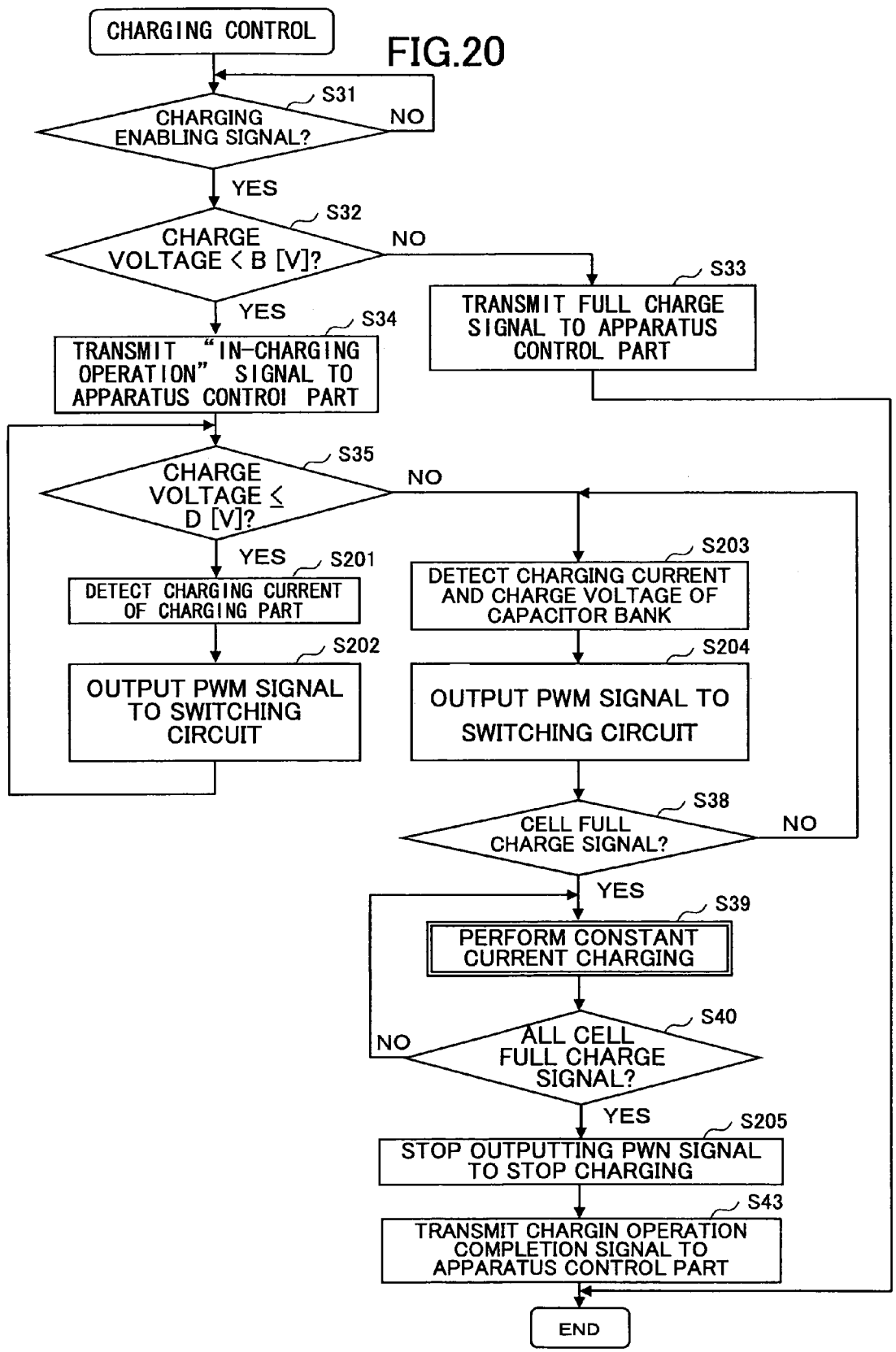
FIG. 20 is a flowchart showing the flow of the operation where the constant current/constant power charging PWM generation circuit controls a charging operation according to the fourth embodiment of the present invention.

Next, a description is given, with reference to the flowchart of FIG. 20, of the flow of the operation where the CPU 7a of the constant current/constant power charging PWM generation circuit 7' controls a charging operation. The operation of FIG. 20 is the same as that of FIG. 16.

In step S31, the constant current/constant power charging PWM generation circuit 7' determines whether a charging enabling signal has been input from the engine control part 10. The constant current/constant power charging PWM generation circuit 7' repeats the determination of step S31 until the charging enabling signal is input.

If the charging enabling signal has been input (YES in step S31), in step S32, the constant current/constant power charging PWM generation circuit 7' determines whether the charge voltage is lower than B [V] (full charge value). If the charge voltage is not lower than B [V] (NO in step S32), there is no need to perform charging. Accordingly, in step S33, the constant current/constant power charging PWM generation circuit 7' transmits the all cell full charge signal 45 to the engine control part 10, and the operation ends.

If the charge voltage is lower than B [V] (YES in step S32), that is, the capacitor bank 9 is not fully charged, in step S34, the constant current/constant power charging PWM generation circuit 7' transmits an "in-charging operation" signal to the engine control part 10.

Then, in step S35, the constant current/constant power charging PWM generation circuit 7' determines whether the charge voltage is lower than or equal to a predetermined voltage (for example, D [V], which satisfies D<C<B).

If the charge voltage is lower than or equal to D [V] (YES in step S35), in step S201, the constant current/constant power charging PWM generation circuit 7' detects the charging current of the charging part 31 in order to perform a constant current charging operation.

Next, in step S202, the constant current/constant power charging PWM generation circuit 7' outputs a PWM signal corresponding to the detected charging current to the gate of the FET 6a of the switching circuit 60. As a result, the capacitor bank 9 is charged with constant current.

The constant current/constant power charging PWM generation circuit 7' continues the constant current charging until the charge voltage is higher than D [V] (steps S35, S201, and S202).

If the charge voltage is not lower than or equal to D [V] (NO in step S35), in step S203, the constant current/constant power charging PWM generation circuit 7' detects the charging current and the charge voltage of the capacitor bank 9 in order to perform a constant power charging operation.

Then, in step S204, the constant current/constant power charging PWM generation circuit 7' outputs a PWM signal for performing constant power charging to the gate of the FET 6a of the switching circuit 60 based on the detected charging current and charge voltage.

In step S38, the constant current/constant power charging PWM generation circuit 7' determines whether the single cell full charge signal 44 is detected while performing constant power charging, and performs constant power charging until the single cell full charge signal 44 is detected.

If the single cell full charge signal 44 of any of the capacitor cells 9a is detected (YES in step S38), in step S39, the constant current/constant power charging PWM generation circuit 7' performs constant current charging. In step S40, the constant current/constant power charging PWM generation circuit 7' determines whether the all cell full charge signal 45 is detected while performing constant current charging, and performs constant current charging until the all cell full charge signal 45 is detected.

When the all cell full charge signal 45 is detected (YES in step S40), in step S205, the constant current/constant power charging PWM generation circuit 7' stops outputting the PWM signal in order to stop the charging. Then, in step S43, the constant current/constant power charging PWM generation circuit 7' transmits a charging operation completion signal (or the all cell full charge signal 45) to the engine control part 10, and ends the operation.

As described above, according to this embodiment, the output of the DC/DC converter 12 is used as a power supply of the image forming apparatus when the output of the DC/DC converter 12 is necessary for an image forming operation, and the DC/DC converter 12 is used as a charger only in the case of a charging operation (for approximately a few to tens of seconds). As a result, it is possible to charge an auxiliary power supply without the need of a dedicated charger. Accordingly, it is possible to provide a power storage unit or an image forming apparatus including the same with reduced manufacturing cost and installation space.

The main body load 20 of the image forming apparatus operates with the voltage V1 generated by the DC/DC converter 12. Even if the capacitor bank 9 is discharged to a voltage lower than the voltage V1, a current is prevented from flowing from the DC/DC converter 12 into the capacitor bank 9 to reduce the voltage of the main body load 20 since the switching circuit 77 is switched to the main body load 20 side at the time of discharging.

Further, at the time of the energy saving mode, it is possible to charge the capacitor bank 9 because it is possible to switch the switching circuit 77 to the charging part 31 side at the time of the energy saving mode.

Fifth Embodiment

Figure 21:
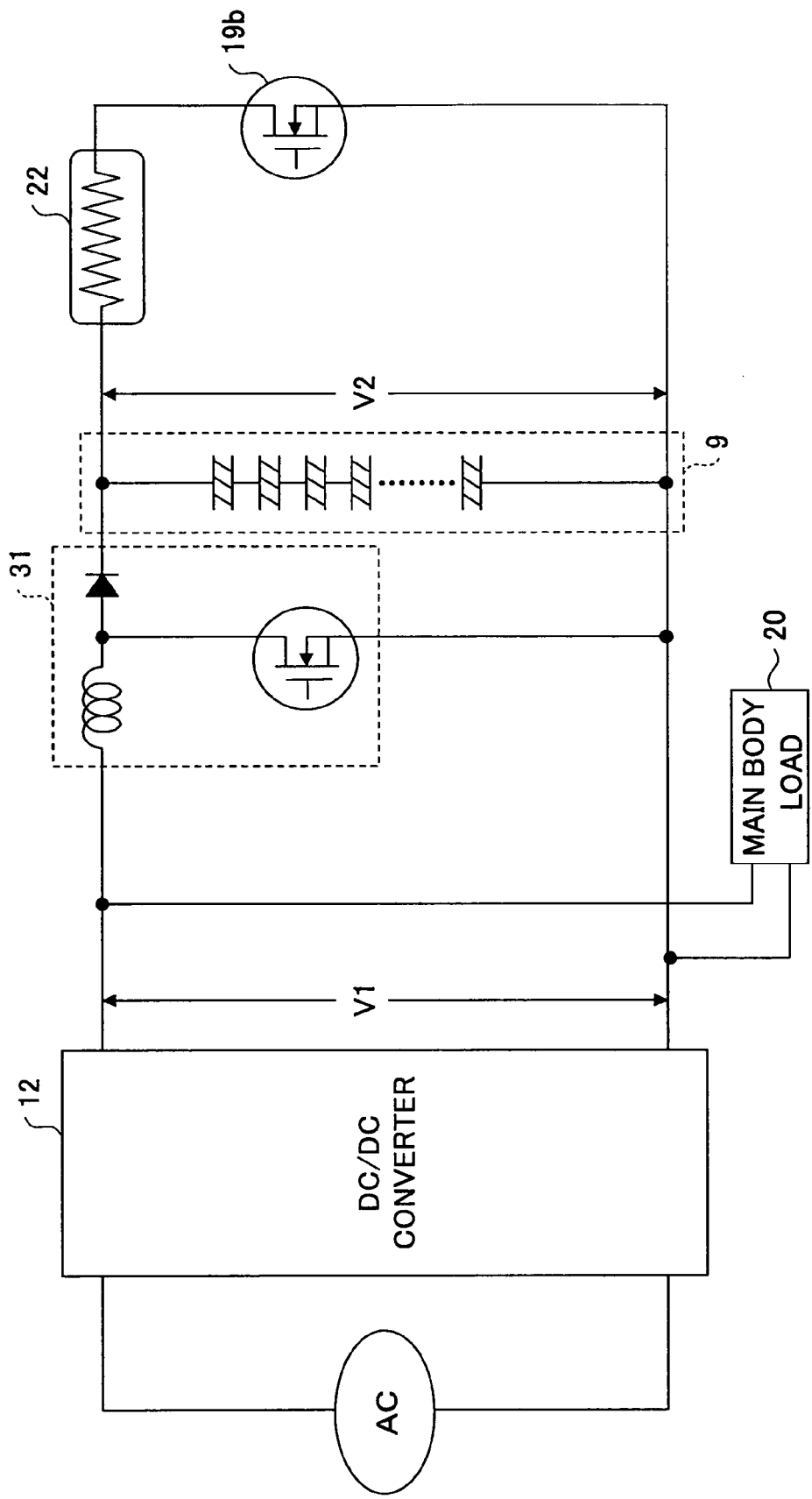
FIG. 21 is a schematic circuit diagram showing a power storage unit according to a fifth embodiment of the present invention.

FIG. 21 is a schematic circuit diagram showing a power storage unit according to a fifth embodiment. In FIG. 21, the same elements as those of FIG. 13 are referred to by the same reference numerals.

According to the power storage unit of FIG. 21, an AC commercial power supply is connected to the DC/DC converter 12 after being subjected to rectification. The power storage unit of FIG. 21 is different from that of FIG. 13 in that the output of the DC/DC converter 12 is connected to the main body load 20 of an image forming apparatus and the charging part 31 without going through the switching circuit 4.

Figure 22:
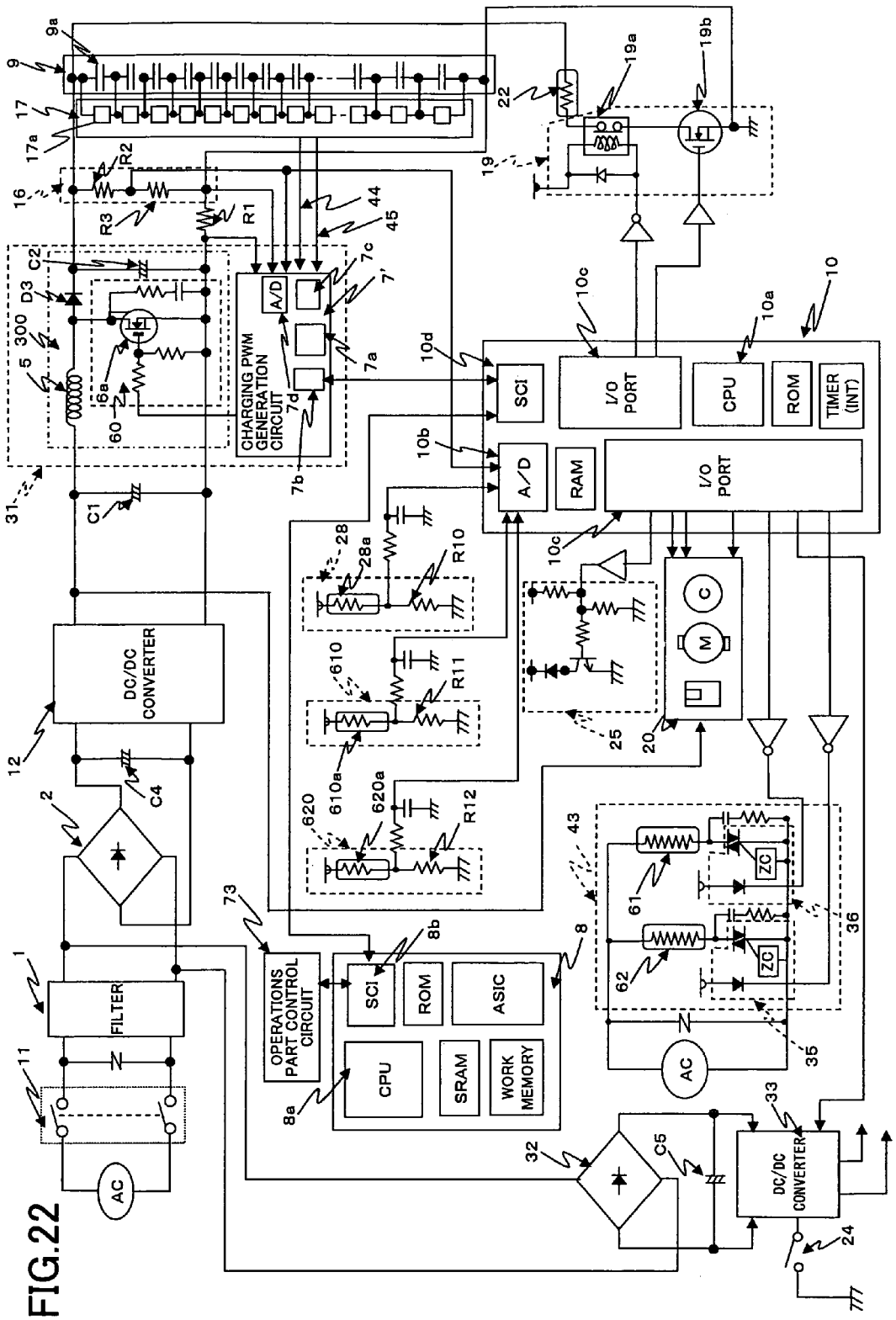
FIG. 22 is a circuit diagram showing the power storage unit and an image forming apparatus according to the fifth embodiment of the present invention.

The charging part 31 includes the boost chopper circuit 300 (FIG. 22). The charging part 31 increases the voltage V1 of the DC/DC converter 12 to a voltage V2, and charges the capacitor bank 9 with the voltage V2. The stored power (energy) is supplied to the fixing heater 22 by the temperature increase FET control buffer circuit 19b in accordance with the temperature of the DC fixing heater 22.

In the case of performing an image forming operation, the main body load 20 performs image formation using the power supplied from the DC/DC converter 12. At this point, if the temperature of the fixing heater 22 is lower than a predetermined temperature, the capacitor bank 9 is discharged so as to supply power to the fixing heater 22.

Further, if no image forming operation is being performed, it is possible to charge the capacitor bank 9. Since no make-and-break circuit is provided in this embodiment, power is supplied to the main body load 20 while the capacitor bank 9 is being charged. A detailed description is given below, but a description of the same parts as the third embodiment is omitted.

FIG. 22 is a circuit diagram showing the power storage unit and the image forming apparatus according to this embodiment. In FIG. 22, the same elements as those of FIG. 14 are referred to by the same reference numerals. As described above, the charging part 31 of this embodiment is different from that of the third embodiment in that the make-and-break circuit 400 of FIG. 14 is omitted and that the DC/DC converter 12 is always connected to the charging part 31 and the main body load 20.

Therefore, according to this embodiment, it is possible to perform an image forming operation using the power supplied from the DC/DC converter 12 without controlling a make-and-break circuit, and it is possible to charge the capacitor bank 9 with the output of the DC/DC converter 12 in the case of performing no image forming operation.

Figure 23:
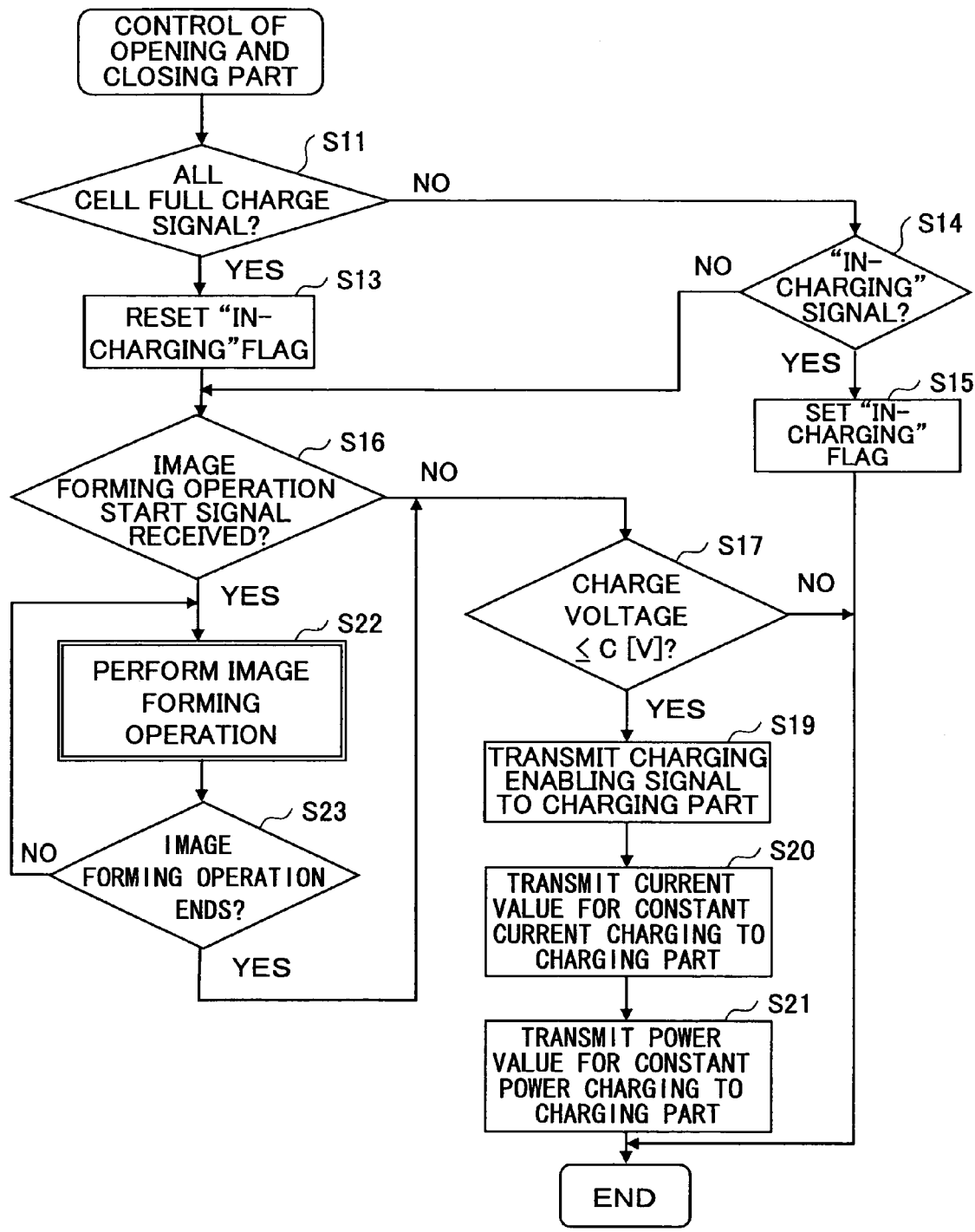
FIG. 23 is a flowchart of the operation where the engine control part controls charging according to the fifth embodiment of the present invention.

A description is given, with reference to the flowchart of FIG. 23, of the operation where the CPU 10a of the engine control part 10 controls charging using the above-described configuration.

In step S11, the engine control part 10 determines whether the all cell full signal 45 has been transmitted periodically or with predetermined timing from the constant current/constant power charging PMW generation circuit 7'.

When the all cell full charge signal 45 has been transmitted (YES in step S11), in step S13, the engine control part 10 resets the "in-charging" flag because the capacitor bank 9 is not being charged.

In the case of not being fully charged (NO in step S1), in step S14, the engine control part 10 determines whether the charging part 31 is performing charging. Whether the charging part 31 is performing charging may be determined by either referring to the "in-charging" flag or communicating with the constant current/constant power charging PWM generation circuit 7'. If the charging part 31 is performing charging (YES in step S14), in step S15, the engine control part 10 sets the "in-charging" flag, and ends the operation. Although not graphically represented in the flowchart, the CPU 10a of the engine control part 10 inhibits an image forming operation and inhibits switching to the energy saving mode when the "in-charging" flag is set.

Next, in step S16, the engine control part 10 determines whether an image forming operation start signal (an image forming operation start instruction signal) has been output from the operations part control circuit 73 of the image forming apparatus. If the image forming operation start signal has been output (YES in step S16), in step S22, the engine control part 10 performs an image forming operation, and waits until the image forming operation ends (steps S22 and S23). If the temperature of the DC fixing heater 22 becomes so low as to generate an unfixed image during the image formation, the engine control part 10 turns ON the FET of the FET control buffer circuit 19b so as to supply power from the capacitor bank 9.

If power is supplied to the DC fixing heater 22 from the capacitor bank 9 that has been charged to the charge voltage of V2>V1, so that the charge voltage of the capacitor bank 9 becomes lower than V1 (V2<V1), this is not preferable because a current flows from the DC/DC converter 12 into the capacitor bank 9. Accordingly, the charging part 31 of this embodiment transmits a signal to the engine control part 10 so as to cause the engine control part 10 to stop discharging if the charge voltage of the capacitor bank 9 is lower than or equal to V1.

When the image forming operation ends (YES in step S23), in step S17, the engine control part 10 determines whether the charge voltage has lowered because of the image formation.

If the image forming apparatus is not performing an image forming operation (NO in step S16), or the image forming operation ends as described above, in step S17, the engine control part 10 determines whether the charge voltage of the capacitor bank 9 is lower than or equal to a predetermined value (for example, C [V], which satisfies C<B).

If the charge voltage is lower than or equal to C [V] (YES in step S17), in step S19, the engine control part 10 transmits a charging enabling signal to the constant current/constant power charging PWM generation circuit 7'. As a result, the constant current/constant power charging PWM generation circuit 7' can perform charging.

Next, in step S20, the engine control part 10 transmits a current value for the charging part 31 to perform constant current charging to the constant current/constant power charge voltage generation circuit 7. Then, in step S21, the engine control part 10 transmits a power value for the charging part 31 to perform constant power charging to the charging part 31. If the current value for performing constant current charging and the power value for performing constant power charging have been transmitted from the engine control part 10, the charging part 31 performs constant current charging or constant power charging based on this current value or power value. On the other hand, if the current value for performing constant current charging and the power value for performing constant power charging are not transmitted, the charging part 31 performs constant current charging or constant power charging based on a preset value. The "in-charging" flag is set, and the operation ends.

The charging part 31 performs charging if charging is performable. Although not shown in the flowchart, when the charging part 31 starts charging, the charging part 31 transmits an "in-charging" signal to indicate that charging is being performed to the engine control part 10. When the "in-charging" signal has been transmitted from the charging part 31, the engine control part 10 inhibits an image forming operation. When the all cell full charge signal 45 is detected, the engine control part 10 authorizes an image forming operation to be started.

In the case of an operation mode that does not require the capacitor bank 9 to be charged, for example, in the case of making a few copies, the engine control part 10 authorizes an image forming operation even if the charge voltage is lower than or equal to C [V].

If the charge voltage is higher than C [V] (NO in step S17), the operation ends since there is no need to perform charging.

Figure 24:
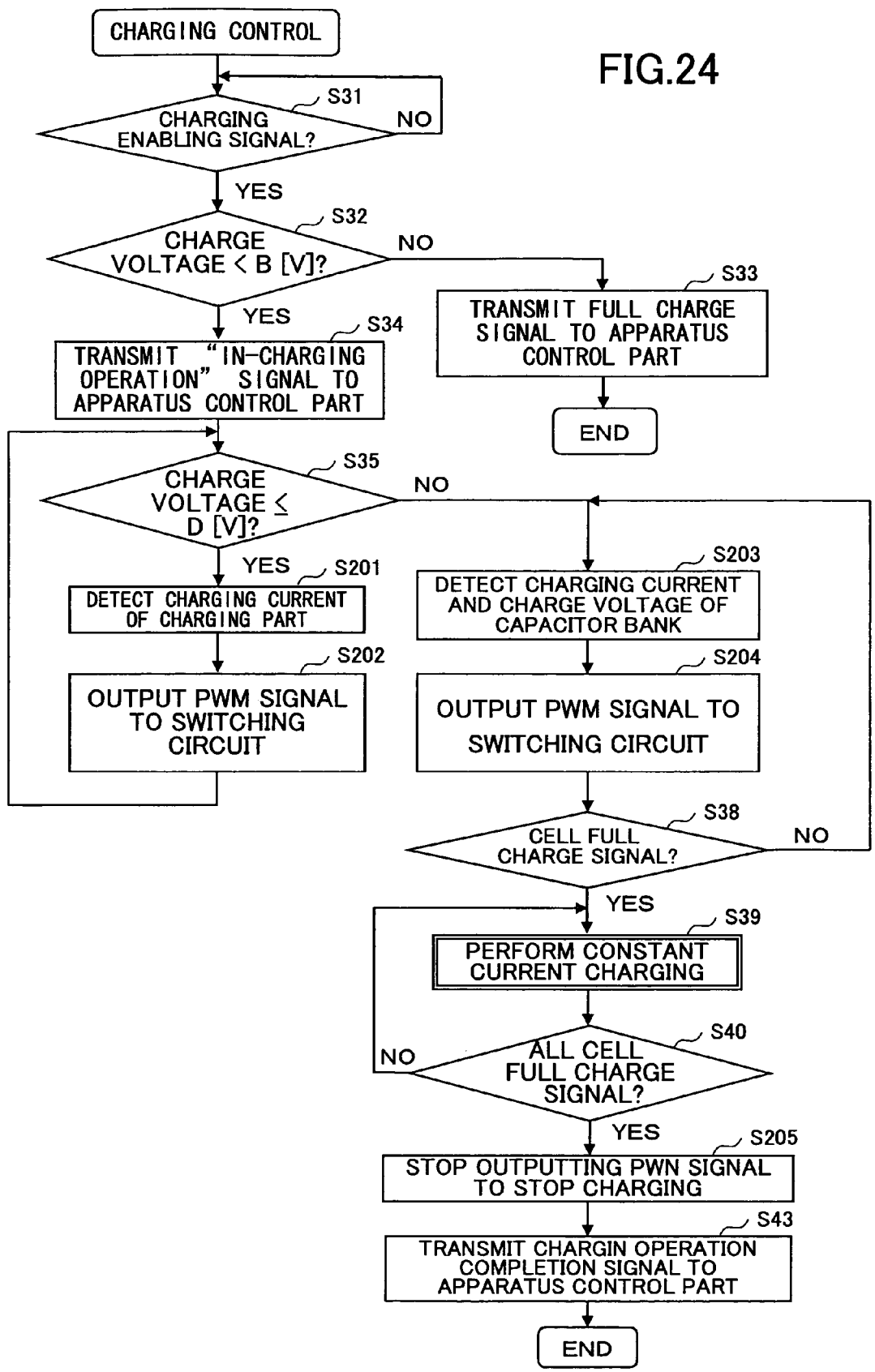
FIG. 24 is a flowchart showing the flow of the operation where the constant current/constant power charging PWM generation circuit 7' controls a charging operation according to the fifth embodiment of the present invention.

Next, a description is given, with reference to the flowchart of FIG. 24, of the flow of the operation where the CPU 7*a* of the constant current/constant power charging PWM generation circuit 7' controls a charging operation. The operation of FIG. 24 is the same as the operation of FIG. 16, that is, the same as the case of including the make-and-break circuit 26.

In step S31, the constant current/constant power charging PWM generation circuit 7' determines whether a charging enabling signal has been input from the engine control part 10. The constant current/constant power charging PWM generation circuit 7' repeats the determination of step S31 until the charging enabling signal is input.

If the charging enabling signal has been input (YES in step S31), in step S32, the constant current/constant power charging PWM generation circuit 7' determines whether the charge voltage is lower than B [V] (full charge value). If the charge voltage is not lower than B [V] (NO in step S32), there is no need to perform charging. Accordingly, in step S33, the constant current/constant power charging PWM generation circuit 7' transmits the all cell full charge signal 45 to the engine control part 10, and the operation ends.

If the charge voltage is lower than B [V] (YES in step S32), that is, the capacitor bank 9 is not fully charged, in step S34, the constant current/constant power charging PWM generation circuit 7' transmits an "in-charging operation" signal to the engine control part 10.

Then, in step S35, the constant current/constant power charging PWM generation circuit 7' determines whether the charge voltage is lower than or equal to a predetermined voltage (for example, D [V], which satisfies D<C<B).

If the charge voltage is lower than or equal to D [V] (YES in step S35), in step S201, the constant current/constant power charging PWM generation circuit 7' detects the charging current of the charging part 31 in order to perform a constant current charging operation.

Next, in step S202, the constant current/constant power charging PWM generation circuit 7' outputs a PWM signal corresponding to the detected charging current to the gate of the FET 6*a* of the switching circuit 60. As a result, the capacitor bank 9 is charged with constant current.

The constant current/constant power charging PWM generation circuit 7' continues the constant current charging until the charge voltage is higher than D [V] (steps S35, S201, and S202).

If the charge voltage is not lower than or equal to D [V] (NO in step S35), in step S203, the constant current/constant power charging PWM generation circuit 7' detects the charging current and the charge voltage of the capacitor bank 9 in order to perform a constant power charging operation.

Then, in step S204, the constant current/constant power charging PWM generation circuit 7' outputs a PWM signal for performing constant power charging to the gate of the FET 6*a* of the switching circuit 60 based on the detected charging current and charge voltage.

In step S38, the constant current/constant power charging PWM generation circuit 7' determines whether the single cell full charge signal 44 is detected while performing constant power charging, and performs constant power charging until the single cell full charge signal 44 is detected.

If the single cell full charge signal 44 of any of the capacitor cells 9*a* is detected (YES in step S38), in step S39, the constant current/constant power charging PWM generation circuit 7' performs constant current charging. In step S40, the constant current/constant power charging PWM generation circuit 7' determines whether the all cell full charge signal 45 is detected while performing constant current charging, and performs constant current charging until the all cell full charge signal 45 is detected.

When the all cell full charge signal 45 is detected (YES in step S40), in step S205, the constant current/constant power charging PWM generation circuit 7' stops outputting the PWM signal in order to stop the charging. Then, in step S43, the constant current/constant power charging PWM generation circuit 7' transmits a charging operation completion signal (or the all cell full charge signal 45) to the engine control part 10, and ends the operation.

As described above, according to this embodiment, the output of the DC/DC converter 12 is used as a power supply of the image forming apparatus when the output of the DC/DC converter 12 is necessary for an image forming operation, and the DC/DC converter 12 is used as a charger only in the case of a charging operation (for approximately a few to tens of seconds). As a result, it is possible to charge an auxiliary power supply without the need of a dedicated charger. Accordingly, it is possible to provide a power storage unit or an image forming apparatus including the same with reduced manufacturing cost and installation space.

Sixth Embodiment

In the first through fifth embodiments, AC power supply is subjected to full-wave rectification, and boosted, stabilized power is subjected to voltage increasing in the charging part 31. On the other hand, according to a sixth embodiment, AC power supply is subjected to full-wave rectification, and the voltage before stabilization is reduced. By controlling this reduced voltage, the charging part 31 is caused to perform constant current charging or constant power charging. This simplifies a charging circuit configuration, so that it is possible to reduce the manufacturing cost of an image forming apparatus.

Figure 25:
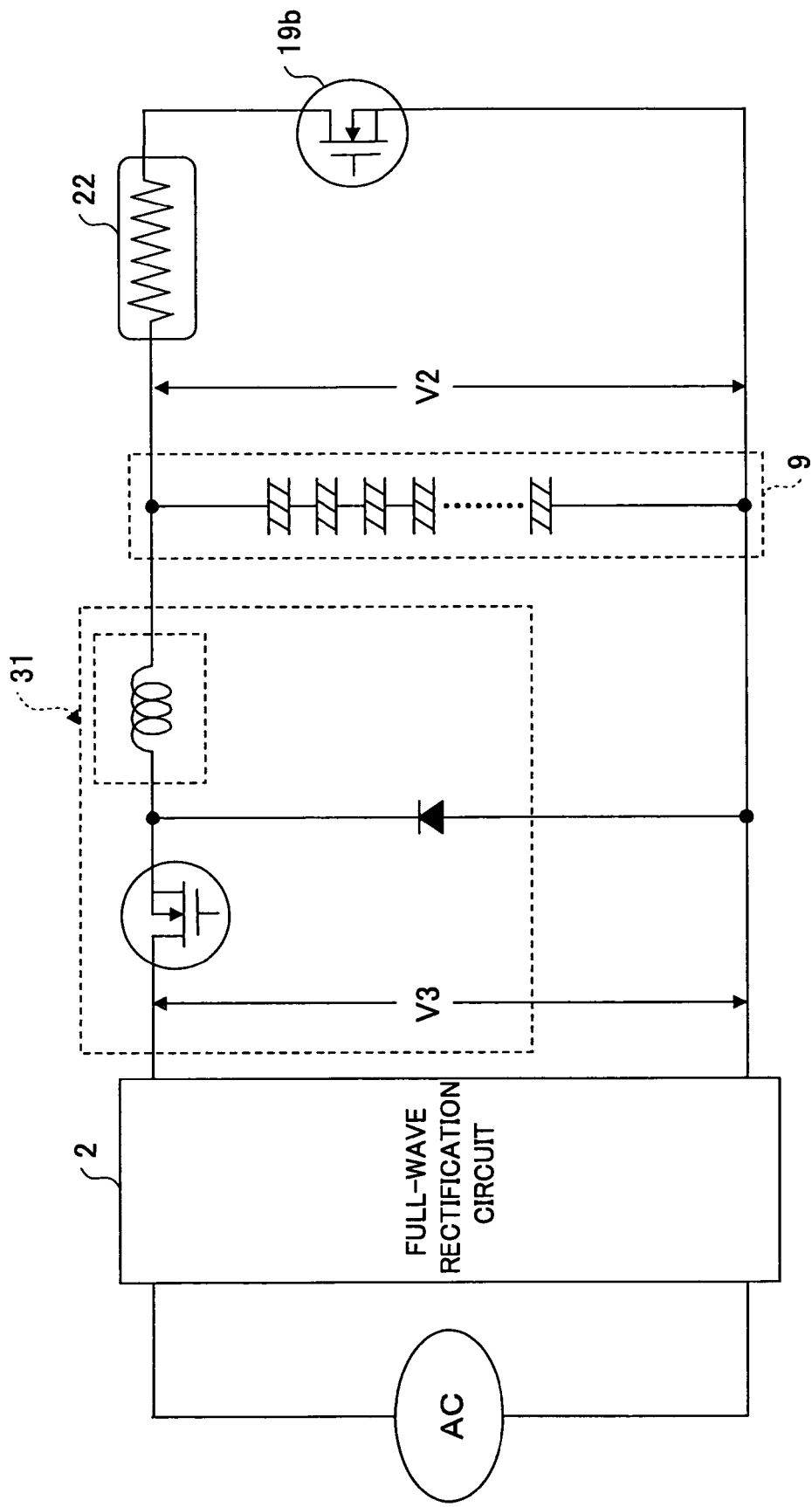
FIG. 25 is a schematic circuit diagram showing a power storage unit according to a sixth embodiment of the present invention.

FIG. 25 is a schematic circuit diagram showing a power storage unit according to the sixth embodiment. In FIG. 25, the same elements as those of FIG. 3 are referred to by the same numerals. Referring to FIG. 25, power supplied from an AC power supply is connected to the charging part 31 via the full-wave rectification circuit 2. The charging part 31, which includes the choke coil 5 for reducing voltage, reduces the output voltage of the full-wave rectification circuit 2 and charges the capacitor bank 9 of a voltage V2. The stored power (energy) is supplied to the DC fixing heater 22 by the temperature increase FET control buffer circuit 19*b* in accordance with the temperature of the DC fixing heater 22.

Figure 26:
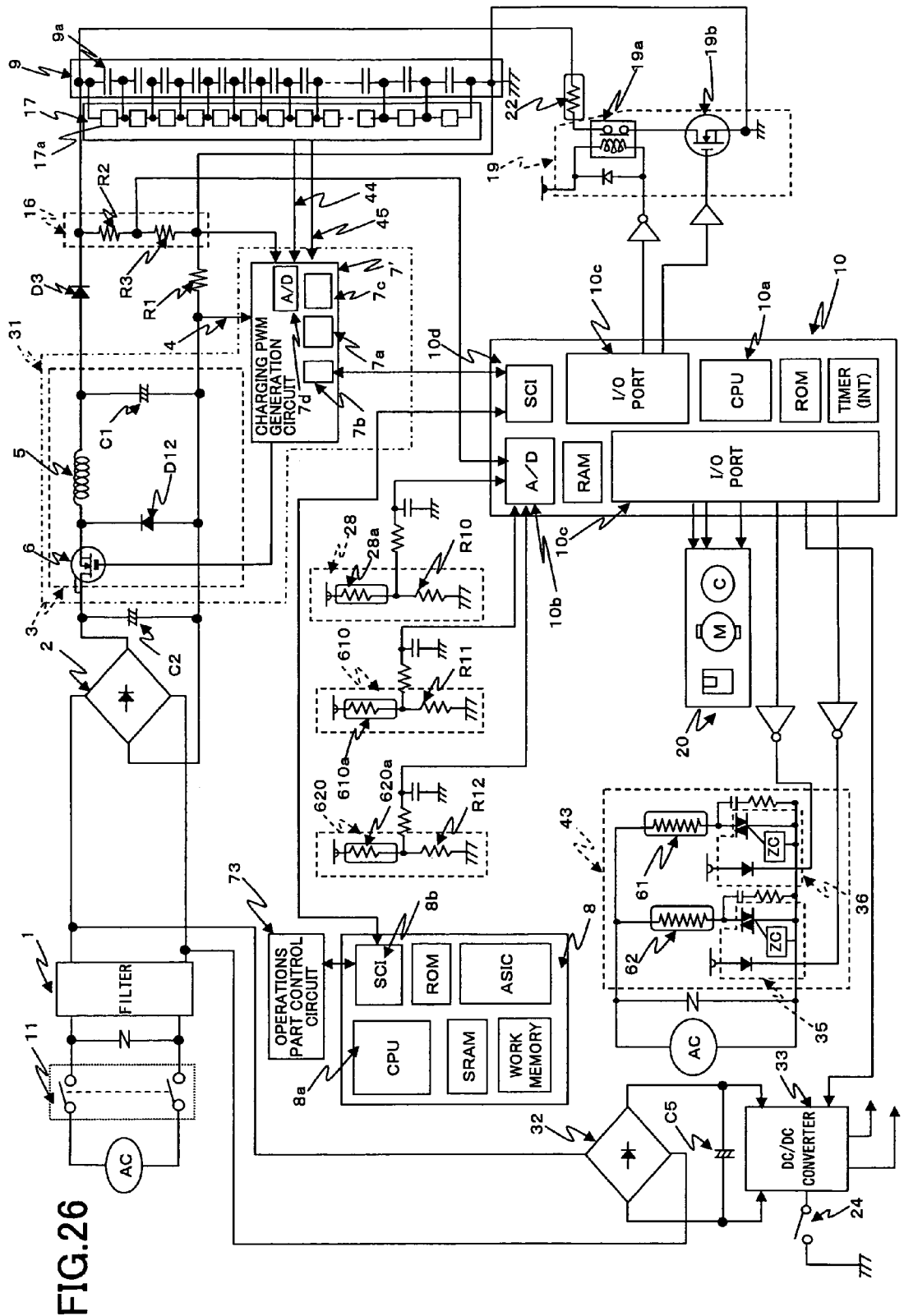
FIG. 26 is a circuit diagram showing the power storage unit and an image forming apparatus according to the sixth embodiment of the present invention.

FIG. 26 is a circuit diagram showing the power storage unit and an image forming apparatus according to the sixth embodiment. In FIG. 26, the same elements as those of FIG. 4 are referred to by the same reference numerals, and a description thereof is omitted.

First, a brief description is given of the control circuit 8 that controls the entire image forming apparatus. The control circuit 8 includes the CPU 8*a* that controls the entire image forming apparatus, the serial controller (SCI) 8*b* connected to the CPU 8*a*, a ROM, a RAM, a work memory for image loading used for a printer, a frame memory for temporarily storing the image data of an image to be written, an ASIC having the function of controlling the periphery of the CPU 8a, and its interface circuit. Various programs for image forming are stored in the ROM. For example, the control circuit 8 communicates with the engine control part 10, and instructs the engine control part 10 to open or close a make-and-break circuit and to perform switching of a switching circuit.

The operations part control circuit 73 and the engine control part 10 that controls the temperatures of the DC fixing heater 22 and the AC fixing heaters 61 and 62 are connected to the CPU 8a via the serial controller (SCI) 8b. The operations part control circuit 73 inputs system settings by detecting panel operations by a user, and displays the status of the system settings to a user. If a user operates a panel in order to perform image forming, the operations part control circuit 73 detects the contents of the operation, and transmits to the engine control part 10 an image forming operation start signal to instruct the engine control part 10 to perform image forming.

The AC power supply is connected to the charging part 31 via the main power switch 11, the filter 1, and the full-wave rectification circuit 2. The charging part 31 is connected to the capacitor bank 9 via the charge voltage detection circuit 16 and the equalization circuit 17. The capacitor bank 9 is connected to the DC fixing heater 22 via the discharging circuit 19. Further, the AC power supply and the AC fixing heaters 61 and 62 are connected. The temperatures of the DC fixing heater 22 and the AC fixing heaters 61 and 62 are detected by the correspondingly disposed DC heater thermistor 28a and the AC heater thermistors 610a and 620a, respectively. The AC power supply is also connected to the DC/DC converter 33 via the full-wave rectification circuit 32, and is connected to a main body load that is not graphically illustrated. The DC/DC converter 33 is connected to the energy saving cancellation SW 24. The energy saving cancellation SW 24 is opened in the energy saving mode, and is closed in the case of canceling the energy saving mode.

Accordingly, the power storage unit of this embodiment is different from those of the first through fifth embodiments in not including the DC/DC converter 12 and in that power is not supplied from the DC/DC converter 12 to the main body load 20. A power supply (DC/DC converter) that is not graphically illustrated supplies power to the main body load 20.

The power storage unit includes the engine control part 10 that controls the temperatures of the DC fixing heater 22 and the AC fixing heaters 61 and 62 and charging of the capacitor bank 9. The engine control part 10 is connected to the constant current/constant power charging PWM generation circuit 7' of the charging part 31. Further, the engine control part 10 is connected to the charge voltage detection circuit 16, the discharging circuit 19, the DC fixing heater 22, the AC fixing heaters 61 and 62, the control circuit 8, the DC heater thermistor 28a, the AC heater thermistors 610a and 620a, and the main body load 20.

The AC power supply (commercial supply) and the full-wave rectification circuit 2 are connected via the main power switch 11 and the filter 1. An alternating current from the AC power supply is subjected to full-wave rectification in the full-wave rectification circuit 2. The full-wave rectification circuit 2 is connected to the smoothing capacitor C2. The output of the full-wave rectification circuit 2 has ripple components thereof removed by the smoothing capacitor C2.

The DC output of the full-wave rectification circuit 2 is connected to the charging part 31. The charging part 31 includes the FET 6, a diode for current feedback D12, the choke coil 5, the capacitor C1, and the constant current/constant power charging PWM generation circuit 7'.

The DC output of the full-wave rectification circuit 2 is connected to the drain of the FET 6 provided on the input side of the choke coil 5. The current feedback diode D12 is connected between the FET 6 and the choke coil 5 connected to the output (source) side of the FET 6. The smoothing capacitor C1 is connected to the output side of the choke coil 5. The smoothing capacitor C1 and the capacitor bank 9 are connected in parallel.

When a PWM signal output from the below-described constant current/constant power charging PWM generation circuit 7' turns ON the FET 6, a current flows through the choke coil 5, and part of this input power is stored in the choke coil 5. When the FET 6 is turned OFF, the power stored in the choke coil 5 during the ON period is released through the current feedback diode D12.

This operation is repeated so that voltage reduction is performed. This reduced voltage is smoothed by the smoothing capacitor C1 to be supplied to the capacitor bank 9 so as to charge each capacitor cell 9a of the capacitor bank 9.

The output of the choke coil 5 is determined by the duty ratio D/T (the ratio of the ON period to the sum of the ON period and the OFF period) of the FET 6 and the voltage input to the choke coil 5. If the duty ratio D/T is 100%, the output voltage is equal to the input voltage. If the duty ratio D/T is 50%, the output voltage is 50% of the input voltage. By controlling the duty ratio (PWM) of the FET 6, it is possible to control the output voltage of the charging part 31.

The capacitor bank 9 of this embodiment includes the n capacitor cells 9a (electric double layer capacitors) that are connected in series. When each capacitor cell 9a is fully charged, the voltage across the capacitor cell 9a is A [V]. Therefore, when the n capacitor cells 9a are fully charged, a voltage (energy) of A×n [V] (hereinafter simply referred to as B [V]) is stored.

Each end of the capacitor bank 9 is connected to the charge voltage detection circuit 16. The output of the charge voltage detection circuit 16 is connected to each of the constant current/constant power charging PWM generation circuit 7' and the A/D converter 10b of the engine control part 10. The charge voltage detection circuit 16 includes the divider circuit formed of the resistor R2 and the resistor R3, and detects the voltage of the capacitor bank 9 by voltage division of the resistor R2 and the resistor R3. The detected voltage is fed back to the constant current/constant power charging PWM generation circuit 7'.

The reduced and smoothed voltage is monitored by the constant current/constant power charging PWM generation circuit 7', and is controlled by changing the duty ratio of the PWM signal.

The resistor R1 is connected in series between the smoothing capacitor C1 and the capacitor bank 9, so that the charging current of the capacitor bank 9 can be detected by monitoring the voltage across the resistor R1. The voltage across the resistor R1 is input to the constant current/constant power charging PWM generation circuit 7'.

The capacitor bank 9 is connected to the equalization circuit 17. The equalization circuit 17 detects the full charge of each individual capacitor cell 9a to put a corresponding bypass circuit into operation, thereby equalizing the charge voltages of the capacitor cells 9a. When a first one of the capacitor cells 9a is fully charged to, for example, 2.5 V by the charging part 31, the equalization circuit 17a bypasses charging current to a second one of the capacitor cells 9a. The bypass circuit of the second one of the capacitor cells 9a operates in the same manner, so that the charge voltages of the capacitor cells 9a are equalized.

When the equalization circuit 17 detects the full charge of any one of the capacitor cells 9a (that any one of the capacitor cells 9a is fully charged) and puts a corresponding bypass circuit into operation, the equalization circuit 17 outputs the single cell full charge signal 44 to the constant current/constant power charging PWM generation circuit 7'. Further, when the equalization circuit 17 detects the full charges of all the capacitor cells 9a and puts all the bypass circuits into operation, the equalization circuit 17 outputs the all cell full charge signal 45 to the constant current/constant power charging PWM generation circuit 7'. Since the equalization circuit 17 is described above in detail in the first embodiment, a detailed description thereof is omitted.

A description is given of the constant current/constant power charging PWM generation circuit 7'. The constant current/constant power charging PWM generation circuit 7' controls the choke coil 5' that serves as a buck (step-down) circuit based on the charge voltage and the charging current of the capacitor bank 9 so that the capacitor bank 9 is charged with constant current or constant power.

The constant current/constant power charging PWM generation circuit 7' detects the charge voltage and the charging current of the capacitor bank 9 and the operation of the equalization circuit 17, causes a voltage for performing constant current charging and constant power charging on the capacitor bank 9 to be generated, and generates and outputs a PWM signal to the gate of the FET 6.

The constant current/constant power charging PWM generation circuit 7' includes the CPU 7a, the serial controller (SIC) 7b, the A/D converter 7c, the charging current detection circuit 7d, a ROM, a RAM, a timer, an interruption control circuit, and an I/O port.

The constant current/constant power charging PWM generation circuit 7' detects the voltage across the capacitor bank 9 by the output of the charge voltage detection circuit 16. If the voltage across the capacitor bank 9 is lower than a preset value, the constant current/constant power charging PWM generation circuit 7' outputs a PWM signal for performing preset constant current charging to the gate of the FET 6.

This PWM signal for performing the preset constant current charging may be determined using a prepared table defining the relationship between the voltage across the resistor R1 and the duty ratio of the PWM signal or be calculated by operations.

If the voltage across the capacitor bank 9 is higher than or equal to a preset value, in order to perform constant power charging, the constant current/constant power charging PWM generation circuit 7' detects the charging current of the capacitor bank 9 and the voltage across the capacitor bank 9, and outputs a PWM signal for performing preset constant power charging to the gate of the FET 6 based on the detected charging current and charge voltage as described above.

The PWM signal may be controlled to be a preset charging current, referring only to the charging current. Alternatively, if the capacitor bank 9 is uncharged, the PWM signal may be output so that the reduced voltage may be low first and be gradually increased in order to prevent a large inrush current from flowing into the capacitor bank 9.

This PWM signal for performing the preset constant power charging output to the gate of the FET 6 is determined by detecting the charging current to the capacitor bank 9 and the voltage across the capacitor bank 9, and performing operation based on the detected charging current and charge voltage.

When the constant current/constant power charging PWM generation circuit 7' detects the single cell full charge signal 44, the constant current/constant power charging PWM generation circuit 7' outputs the PWM signal for performing the preset constant current charging to the gate of the FET 6. When the constant current/constant power charging PWM generation circuit 7' detects the all cell full charge signal 45, the constant current/constant power charging PWM generation circuit 7' outputs a signal to stop a charging operation to the gate of the FET 6.

Next, a description is given of the engine control part 10. The engine control part 10 includes a charging control part that controls charging of the capacitor bank 9 or discharging of the capacitor bank 9.

The engine control part 10 includes the CPU 10a, the serial controller (SCI) 10d connected to the CPU 10a, the input/output (I/O) port 10c, the A/D converter 10b, a ROM, a RAM, and a timer (an interruption control circuit [INT]). A program for causing the engine control part 10 to function as a charging control part is contained in the ROM. When the main power switch 11 is turned ON, the program is read into the RAM and is executed by the CPU 10a.

The temperature detection circuits 28, 610, and 620 that detect the surface temperatures (fixing temperatures) of the fixing (heating) roller 111 of the fixing unit 112 are connected to the A/D converter 10b.

The temperature detection circuit 28 includes the DC heater thermistor 28a and the resistor R10 connected in series thereto, and detects the temperature of the measurement area corresponding to the DC fixing heater 22. The temperature detection circuit 610 includes the AC heater thermistor 610a and the resistor R11 connected in series thereto, and detects the temperature of the measurement area corresponding to the AC fixing heater 61. The temperature detection circuit 620 includes the AC heater thermistor 620a and the resistor R12 connected in series thereto, and detects the temperature of the measurement area corresponding to the AC fixing heater 62.

The power supplied to the AC fixing heater 61 and the AC fixing heater 62 is controlled by the AC heater control circuit 43. The power supplied to the DC fixing heater 22 is controlled by the discharging circuit 19.

The AC heater control circuit 43 that supplies power to the AC fixing heaters 61 and 62 and the discharging circuit 19 that supplies power to the DC fixing heater 22 are connected to the I/O port 10c. Further, the load 20 including one or more of a motor, a solenoid, a clutch, etc., necessary to perform an image forming operation is connected to the I/O port 10c.

The engine control part 10 communicates with the constant current/constant power charging PWM generation circuit 7' through the serial controller (SCI) 10d. The engine control part 10 detects the voltage across the capacitor bank 9 by the charge voltage detection circuit 16, and determines whether the capacitor bank 9 is capable of discharging (releasing stored energy). Further, the engine control part 10 outputs a charging instruction signal or a charging authorization signal, or a charging enabling signal to the constant current/constant power charging PWM generation circuit 7' when no discharging is being performed, in a standby period, or at the time of an energy saving mode.

Next, first, a description is given of the AC heater control circuit 43. At the time of the main power supply being ON and at the time of a regular copying operation, the engine control part 10 supplies power to the AC fixing heater 61 and the AC fixing heater 62 in order to fix toner.

When the temperature detection circuit 610 or the temperature detection circuit 620 detects a temperature lower than or equal to a preset temperature, the engine control part 10 outputs a signal to turn ON the phototriac drive circuit 35 or 36 to the phototriac drive circuit 35 or 36. As a result, power is supplied to the AC fixing heater 61 or 62.

When the temperature detection circuit 610 or the temperature detection circuit 620 detects a temperature higher than or equal to a preset temperature, the engine control part 10 outputs a signal to turn OFF the phototriac drive circuit 35 or 36 to the phototriac drive circuit 35 or 36. As a result, supplying power to the AC fixing heater 61 or 62 is stopped.

Next, a description is given of supplying power to the DC fixing heater 22. The engine control part 10 outputs a signal for discharging the capacitor bank 9 from the I/O port 10c to the FET control buffer circuit 19b and the relay driving circuit 19a. The FET control buffer circuit 19b turns ON an FET, and the relay driving circuit 19a closes a relay, so that power is supplied from the capacitor bank 9 to the DC fixing heater 22.

When the temperature detection circuit 28 detects a temperature higher than or equal to a preset temperature, the engine control part 10 outputs a signal for stopping discharging of the capacitor bank 9 from the I/O port 10c to the FET control buffer circuit 19b and the relay driving circuit 19a. The FET control buffer circuit 19b turns OFF the FET, and the relay driving circuit 19a opens the relay, so that supplying power to the DC fixing heater 22 is stopped.

The image forming apparatus enters an energy saving mode after passage of a certain period of time since the end of an image forming operation. Therefore, the engine control part 10 outputs a partial power supply output stop signal from the I/O port 10c to the DC/DC converter 33. By closing the energy saving cancellation SW 24 (a press cover opening SW, the original detection SW of an ADF, etc.), the DC/DC converter 33 returns to a normal operation, and the energy saving mode is canceled.

The engine control part 10 has an "in-charging" flag that is set when the charging part 31 starts charging. The engine control part 10 resets the "in-charging" flag when receiving the all cell full charge signal 45 output from the equalization circuit 17, and sets the "in-charging" flag when not receiving the all cell full charge signal 45.

Figure 27:
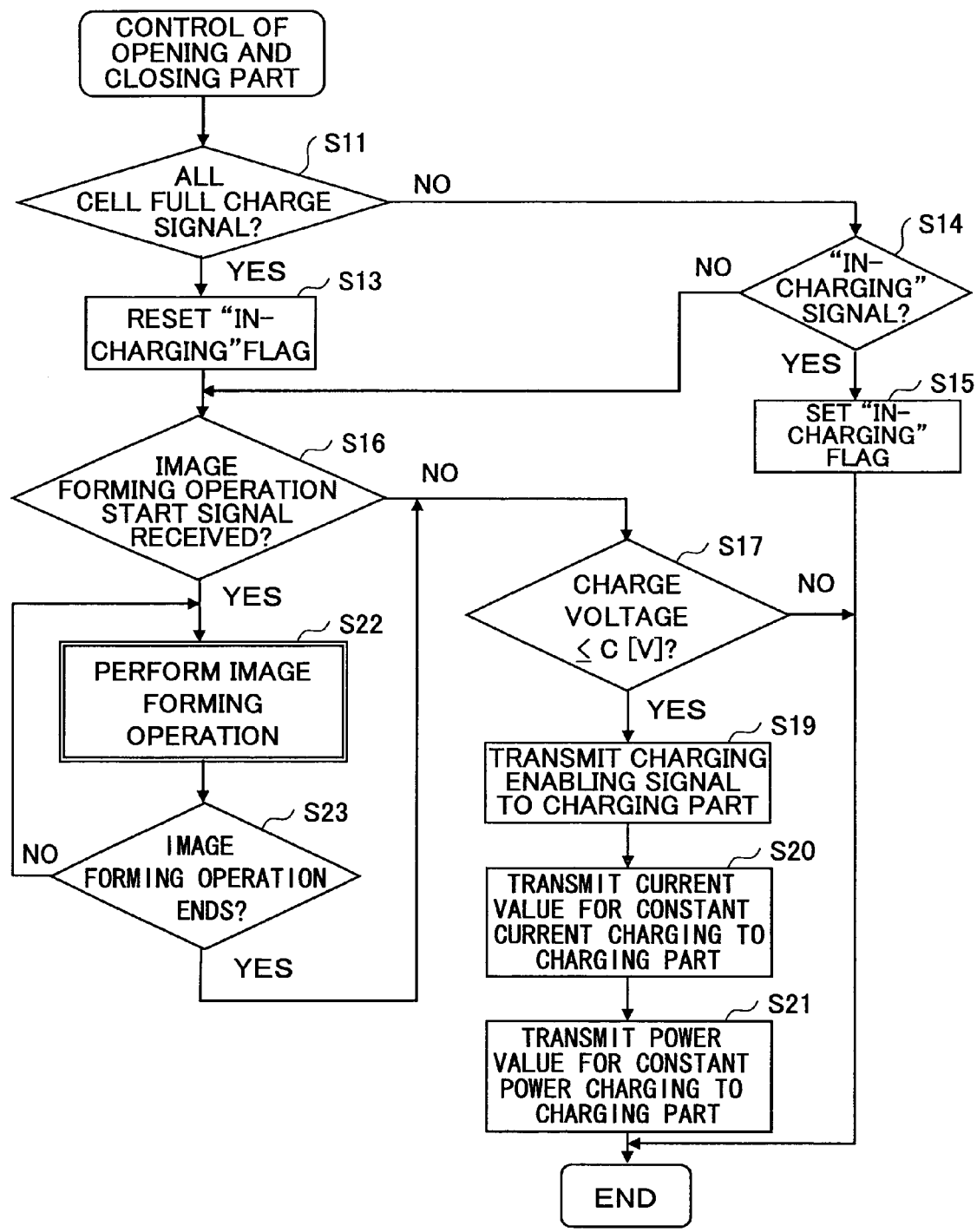
FIG. 27 is a flowchart of the operation where the engine control part controls charging according to the sixth embodiment of the present invention.

A description is given, with reference to the flowchart of FIG. 27, of the operation where the CPU 10a of the engine control part 10 controls charging using the above-described configuration.

In step S11, the engine control part 10 determines whether the all cell full signal 45 has been transmitted periodically or with predetermined timing from the constant current/constant power charging PWM generation circuit 7'.

When the all cell full charge signal 45 has been transmitted (YES in step S11), in step S13, the engine control part 10 resets the "in-charging" flag because the capacitor bank 9 is not being charged.

In the case of not being fully charged (NO in step S11), in step S14, the engine control part 10 determines whether the charging part 31 is performing charging. Whether the charging part 31 is performing charging may be determined by either referring to the "in-charging" flag or communicating with the constant current/constant power charging PWM generation circuit 7'. If the charging part 31 is performing charging (YES in step S14), in step S15, the engine control part 10 sets the "in-charging" flag, and ends the operation. Although not graphically represented in the flowchart, the CPU 10a of the engine control part 10 inhibits an image forming operation and inhibits switching to the energy saving mode when the "in-charging" flag is set.

Next, in step S16, the engine control part 10 determines whether an image forming operation start signal (an image forming operation start instruction signal) has been output from the operations part control circuit 73 of the image forming apparatus. If the image forming operation start signal has been output (YES in step S16), in step S22, the engine control part 10 performs an image forming operation, and waits until the image forming operation ends (steps S22 and S23). If the temperature of the DC fixing heater 22 becomes so low as to generate an unfixed image during the image formation, the engine control part 10 turns ON the FET of the FET control buffer circuit 19b so as to supply power from the capacitor bank 9.

Next, when the image forming operation ends (YES in step S23), in step S17, the engine control part 10 determines whether the charge voltage has lowered because of the image formation.

If the image forming apparatus is not performing an image forming operation (NO in step S16), or the image forming operation ends as described above, in step S17, the engine control part 10 determines whether the charge voltage of the capacitor bank 9 is lower than or equal to a predetermined value (for example, C [V], which satisfies C<B).

If the charge voltage is lower than or equal to C [V] (YES in step S17), in step S19, the engine control part 10 transmits a charging enabling signal to the constant current/constant power charging PWM generation circuit 7'. As a result, the constant current/constant power charging PWM generation circuit 7' can perform charging.

Next, in step S20, the engine control part 10 transmits a current value for the charging part 31 to perform constant current charging to the constant current/constant power charge voltage generation circuit 7. Then, in step S21, the engine control part 10 transmits a power value for the charging part 31 to perform constant power charging to the charging part 31. If the current value for performing constant current charging and the power value for performing constant power charging have been transmitted from the engine control part 10, the charging part 31 performs constant current charging or constant power charging based on this current value or power value. On the other hand, if the current value for performing constant current charging and the power value for performing constant power charging are not transmitted, the charging part 31 performs constant current charging or constant power charging based on a preset value. The "in-charging" flag is set, and the operation ends.

The charging part 31 performs charging if charging is performable. Although not shown in the flowchart, when the charging part 31 starts charging, the charging part 31 transmits an "in-charging" signal to indicate that charging is being performed to the engine control part 10. When the "in-charging" signal has been transmitted from the charging part 31, the engine control part 10 inhibits an image forming operation. When the all cell full charge signal 45 is detected, the engine control part 10 authorizes an image forming operation to be started.

In the case of an operation mode that does not require the capacitor bank 9 to be charged, for example, in the case of making a few copies, the engine control part 10 authorizes an image forming operation even if the charge voltage is lower than or equal to C [V].

If the charge voltage is higher than C [V] (NO in step S17), the operation ends since there is no need to perform charging.

If a predetermined period of time passes after the end of the image formation in step S23, the image forming apparatus enters an energy saving mode in which the temperature of a fixing heater is managed by being gradually reduced and power supplied to a CPU and a display panel such as a liquid crystal display is reduced. The power storage unit of this embodiment is provided separately from the power supply for the main body load 20. Accordingly, even at the time of the energy saving mode, it is possible to charge the capacitor bank 9 if the charge voltage is lower than or equal to C [V].

Figure 28:
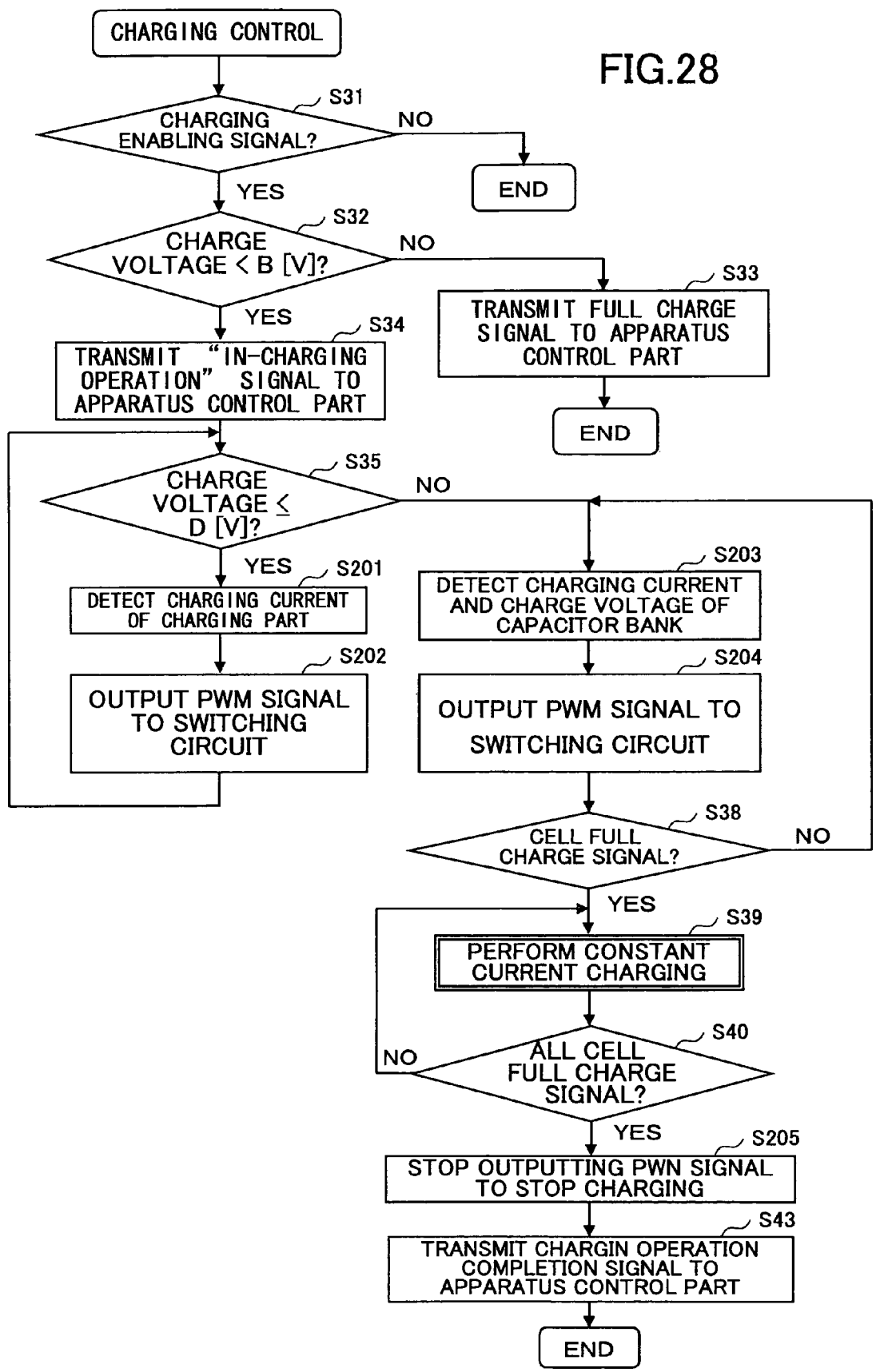
FIG. 28 is a flowchart showing the flow of the operation where the constant current/constant power charging PWM generation circuit controls a charging operation according to the sixth embodiment of the present invention.

Next, a description is given, with reference to the flowchart of FIG. 28, of the flow of the operation where the CPU 7*a* of the constant current/constant power charging PWM generation circuit 7' controls a charging operation.

In step S31, the constant current/constant power charging PWM generation circuit 7' determines whether a charging enabling signal has been input from the engine control part 10. The constant current/constant power charging PWM generation circuit 7' repeats the determination of step S31 until the charging enabling signal is input.

If the charging enabling signal has been input (YES in step S31), in step S32, the constant current/constant power charging PWM generation circuit 7' determines whether the charge voltage is lower than B [V] (full charge value). If the charge voltage is not lower than B [V] (NO in step S32), there is no need to perform charging. Accordingly, in step S33, the constant current/constant power charging PWM generation circuit 7' transmits the all cell full charge signal 45 to the engine control part 10, and the operation ends.

If the charge voltage is lower than B [V] (YES in step S32), that is, the capacitor bank 9 is not fully charged, in step S34, the constant current/constant power charging PWM generation circuit 7' transmits an "in-charging operation" signal to the engine control part 10.

Then, in step S35, the constant current/constant power charging PWM generation circuit 7' determines whether the charge voltage is lower than or equal to a predetermined voltage (for example, D [V], which satisfies D<C<B).

If the charge voltage is lower than or equal to D [V] (YES in step S35), in step S201, the constant current/constant power charging PWM generation circuit 7' detects the charging current of the charging part 31 in order to perform a constant current charging operation.

Next, in step S202, the constant current/constant power charging PWM generation circuit 7' outputs a PWM signal corresponding to the detected charging current to the gate of the FET 6. As a result, the capacitor bank 9 is charged with constant current.

The constant current/constant power charging PWM generation circuit 7' continues the constant current charging until the charge voltage is higher than D [V] (steps S35, S201, and S202).

If the charge voltage is not lower than or equal to D [V] (NO in step S35), in step S203, the constant current/constant power charging PWM generation circuit 7' detects the charging current and the charge voltage of the capacitor bank 9 in order to perform a constant power charging operation.

Then, in step S204, the constant current/constant power charging PWM generation circuit 7' outputs a PWM signal for performing constant power charging to the gate of the FET 6*a* of the switching circuit 60 based on the detected charging current and charge voltage.

In step S38, the constant current/constant power charging PWM generation circuit 7' determines whether the single cell full charge signal 44 is detected while performing constant power charging, and performs constant power charging until the single cell full charge signal 44 is detected.

If the single cell full charge signal 44 of any of the capacitor cells 9*a* is detected (YES in step S38), in step S39, the constant current/constant power charging PWM generation circuit 7' performs constant current charging. In step S40, the constant current/constant power charging PWM generation circuit 7' determines whether the all cell full charge signal 45 is detected while performing constant current charging, and performs constant current charging until the all cell full charge signal 45 is detected.

When the all cell full charge signal 45 is detected (YES in step S40), in step S205, the constant current/constant power charging PWM generation circuit 7' stops outputting the PWM signal in order to stop the charging. Then, in step S43, the constant current/constant power charging PWM generation circuit 7' transmits a charging operation completion signal (or the all cell full charge signal 45) to the engine control part 10, and ends the operation.

As described above, according to this embodiment, an auxiliary power supply can be charged without the need for a dedicated charger by subjecting AC power supply to full-wave rectification and then to voltage reduction, and controlling this reduced voltage. Accordingly, it is possible to provide a power storage unit or an image forming apparatus including the same with reduced manufacturing cost and installation space.

Further, since the power storage unit of this embodiment is not connected to the main body load 20, it is possible to charge the capacitor bank 9 even when the image forming apparatus enters an energy saving mode or is performing an image forming operation.

Seventh Embodiment

According to a seventh embodiment, the same as in the sixth embodiment, AC power supply is subjected to full-wave rectification, the voltage before stabilization is reduced, and this reduced voltage is controlled, thereby causing the charging part 31 to perform constant current charging or constant power charging. This simplifies a charging circuit configuration, so that it is possible to reduce the manufacturing cost of an image forming apparatus.

Figure 29:
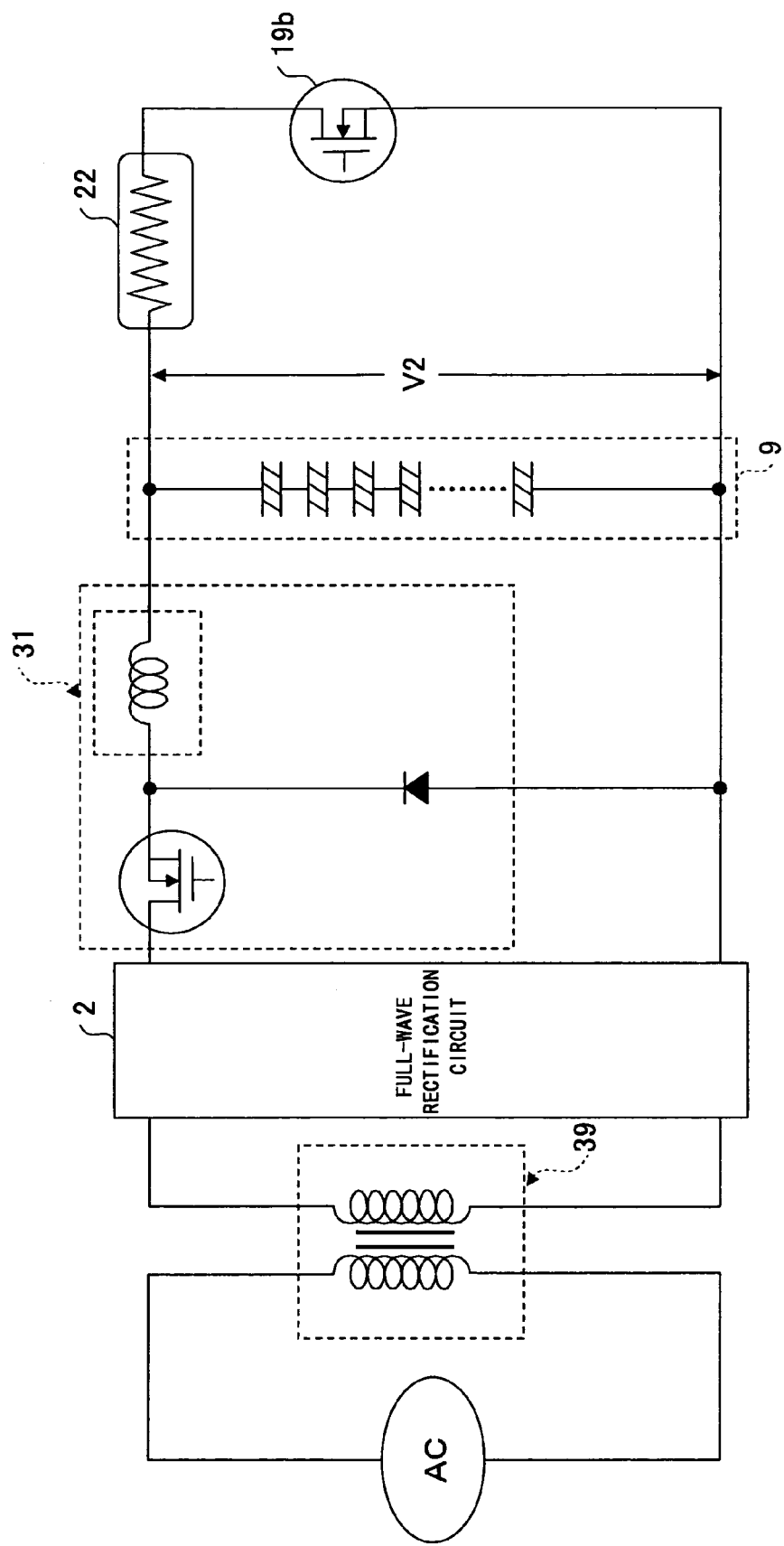
FIG. 29 is a schematic circuit diagram showing a power storage unit according to the seventh embodiment of the present invention.

FIG. 29 is a schematic circuit diagram showing a power storage unit according to this embodiment. In FIG. 29, the same elements as those of FIG. 25 are referred to by the same numerals, and a description thereof is omitted. The power storage unit of FIG. 29 is different from that of FIG. 25 in having an isolation transformer 39 provided between an AC power supply and the charging part 31. As a result, it is possible to separate the primary side and the secondary side so that it is possible to increase the charge voltage of the capacitor bank 9 more easily than in the sixth embodiment. Power is supplied from the AC power supply to the full-wave rectification circuit 2 through the isolation transformer 39. FIG. 29 is equal to FIG. 25 in the rest of the configuration.

Figure 30:
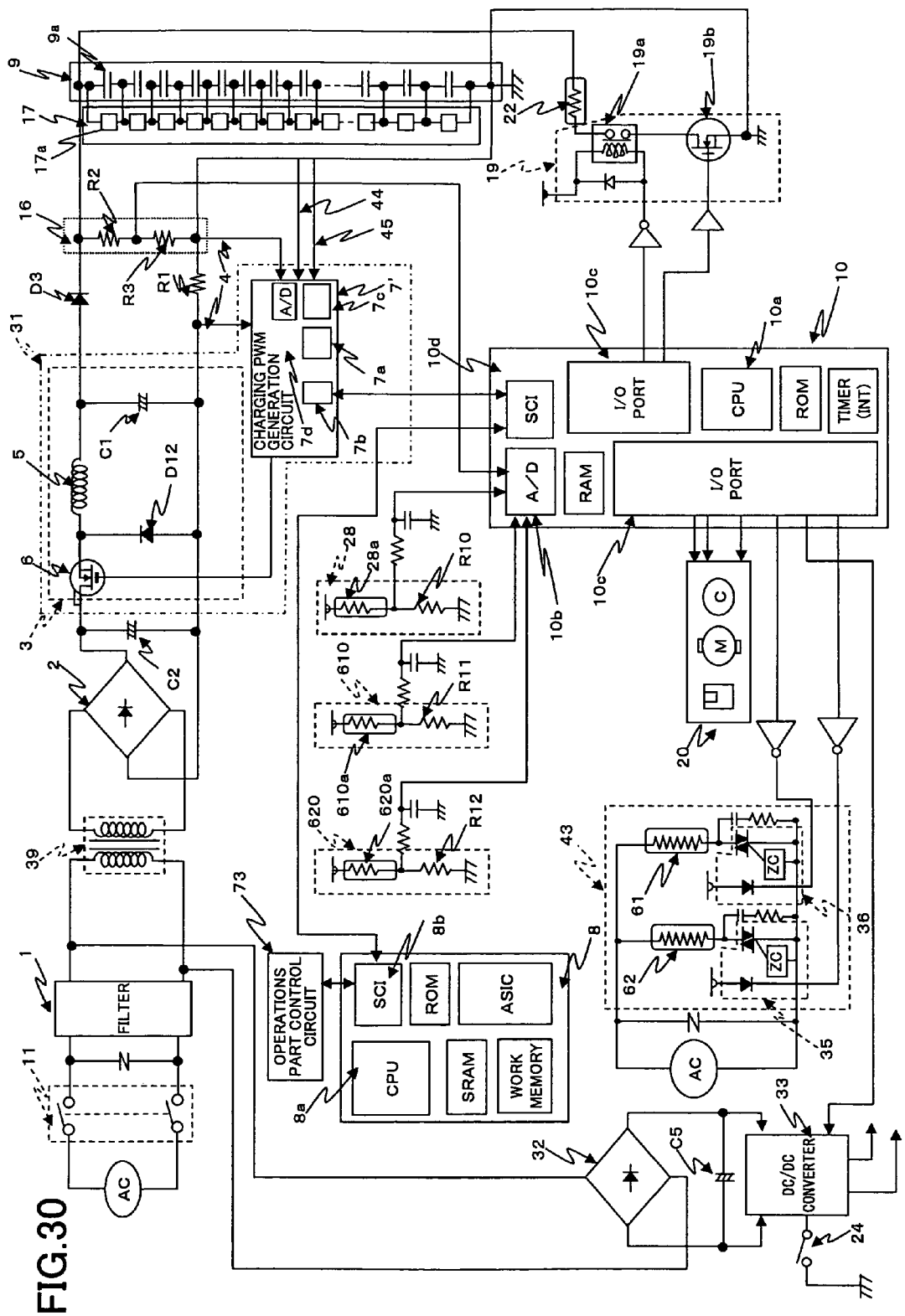
FIG. 30 is a circuit diagram showing the power storage unit and an image forming apparatus according to the seventh embodiment of the present invention.

FIG. 30 is a circuit diagram showing the power storage unit and an image forming apparatus according to this embodiment. In FIG. 30, the same elements as those of FIG. 26 are referred to by the same numerals, and a description thereof is omitted. The AC power supply is connected to the charging part 31 via the main power switch 11, the filter 1, the isolation transformer 39, and the full-wave rectification circuit 2. The charging part 31 is connected to the capacitor bank 9 via the charge voltage detection circuit 16 and the equalization circuit 17. The capacitor bank 9 is connected to the DC fixing heater 22 via the discharging circuit 19.

Further, the AC power supply and the AC fixing heaters 61 and 62 are connected. The temperatures of the DC fixing heater 22 and the AC fixing heaters 61 and 62 are detected by the correspondingly disposed DC heater thermistor 28*a* and the AC heater thermistors 610*a* and 620*a*, respectively. The AC power supply is also connected to the DC/DC converter 33 via the full-wave rectification circuit 32, and is connected to a main body load that is not graphically illustrated. The DC/DC converter 33 is connected to the energy saving cancellation SW 24. The energy saving cancellation SW 24 is opened in the energy saving mode, and is closed in the case of canceling the energy saving mode. A power supply (DC/DC converter) that is not graphically illustrated supplies power to the main body load 20.

Accordingly, in the power storage unit of this embodiment, the AC power supply and the capacitor bank 9 are isolated from each other by the isolation transformer 39. The subsequent configuration is the same as in FIG. 26.

When the main power switch 11 is turned ON, a current from the AC power supply (commercial power supply) passes through the filter 1 to be supplied to the primary side of the isolation transformer 39, and causes an electromotive force due to electromagnetic induction in the secondary coil, so that power is output to the full-wave rectification circuit 2. The current subjected to full-wave rectification in the full-wave rectification circuit 2 is connected to the charging part 31. The configuration and operations of those after the charging part 31 are the same as in the sixth embodiment, and a description thereof is omitted.

The charging and discharging control operation of the CPU 10a of the engine control part 10 is the same as shown in the flowchart of FIG. 27, and the charging control operation of the CPU 7a of the constant current/constant power charging PWM generation circuit 7 is the same as shown in the flowchart of FIG. 28. Accordingly, a description thereof is omitted.

According to this embodiment, an auxiliary power supply can be charged without the need for a dedicated charger by subjecting AC power supply to full-wave rectification and then to voltage reduction, and controlling this reduced voltage. Accordingly, it is possible to provide a power storage unit or an image forming apparatus including the same with reduced manufacturing cost and installation space.

Further, since the isolation transformer 39 is provided between the AC power supply and the charging part 31, it is possible to increase the charge voltage of the capacitor bank 9 with ease.

Further, since the power storage unit of this embodiment is not connected to the main body load 20, it is possible to charge the capacitor bank 9 even when the image forming apparatus enters an energy saving mode or is performing an image forming operation.

Eighth Embodiment

Figure 31:
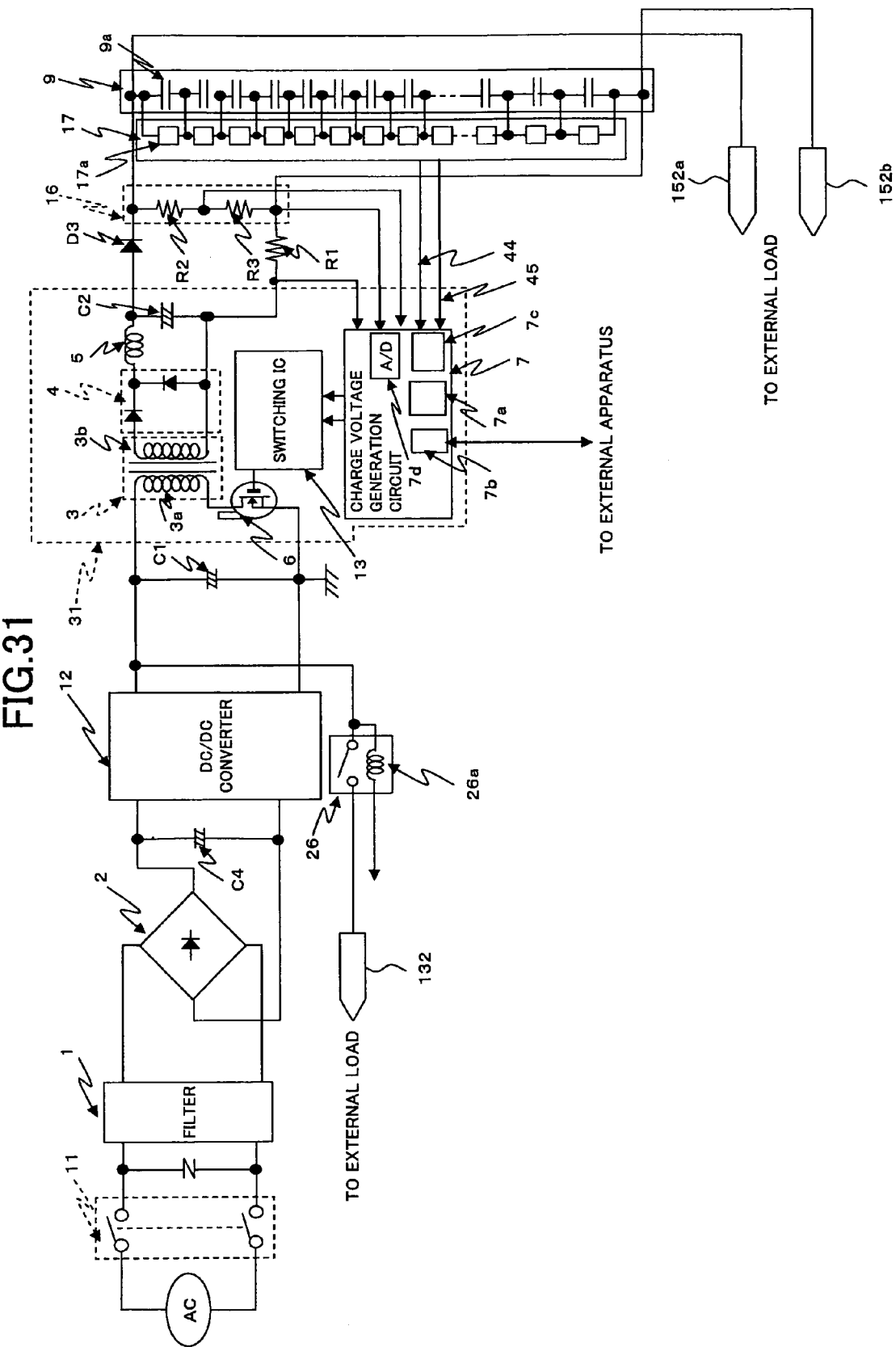
FIG. 31 is a circuit diagram showing a power storage unit according to an eighth embodiment of the present invention.
Figure 32:
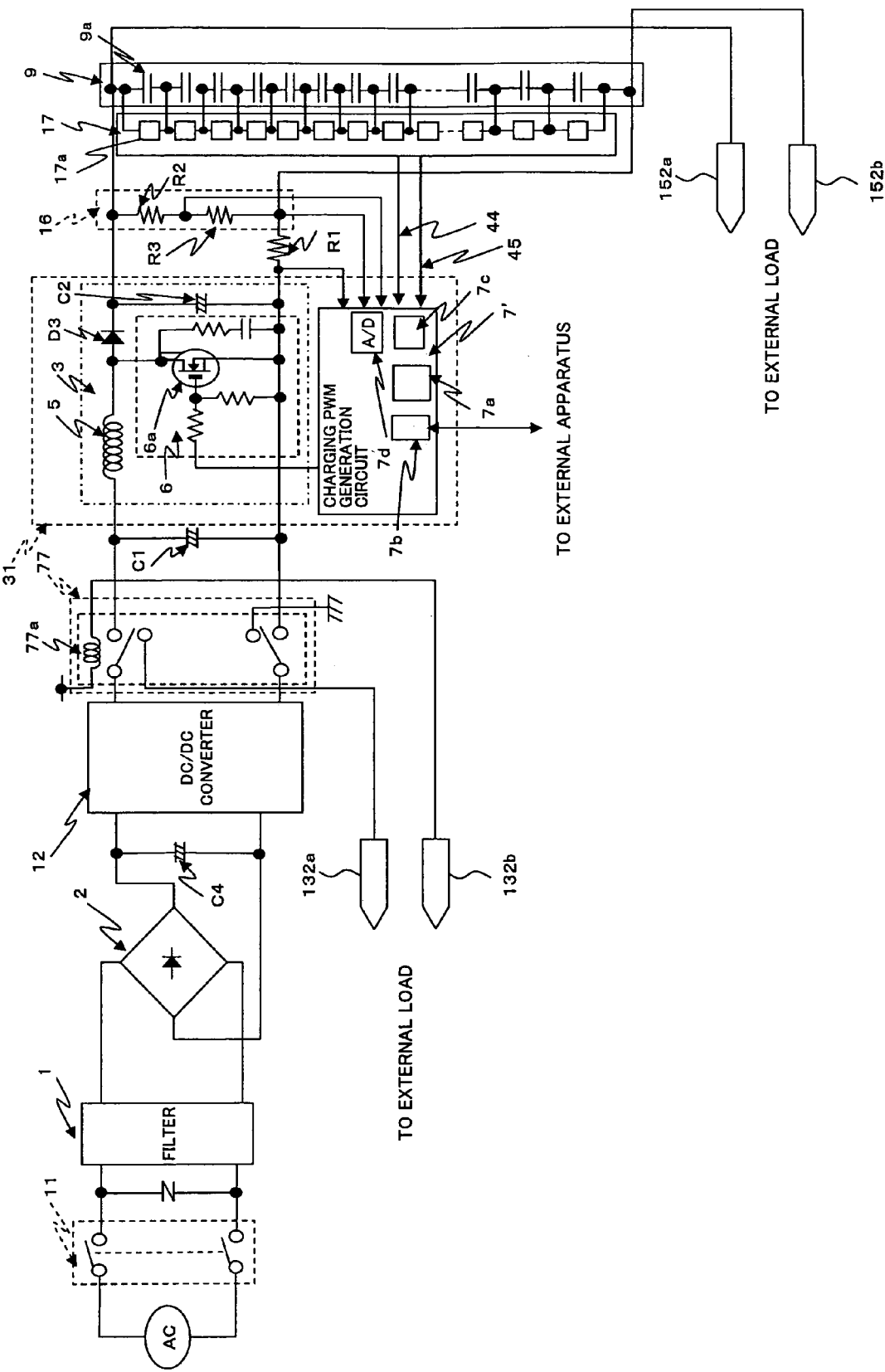
FIG. 32 is a circuit diagram showing another power storage unit according to the eighth embodiment of the present invention.

A description is given of power storage units according to an eighth embodiment of the present invention. FIG. 31 is a circuit diagram showing a power storage unit having the high-frequency transformer 3 in the charging part 31. FIG. 32 is a circuit diagram showing a power storage unit having the boost choke coil 5 in the charging part 31. In FIG. 31, the same elements as those of FIG. 4 are referred to by the same reference numerals, and a description thereof is omitted. In FIG. 32, the same elements as those of FIG. 18 are referred to by the same reference numerals, and a description thereof is omitted.

FIG. 31 shows a power storage unit having the make-and-break circuit 26, and FIG. 32 shows a power storage unit having the switching circuit 77. However, these are examples, and may be any of the power storage units of the first through seventh embodiments.

The output of the DC/DC converter 12 may be connected to an external apparatus through a terminal 132 (FIG. 31) and terminals 132a and 131b (FIG. 32). The make-and-break circuit 26 is provided between an external load and the terminal 151 (FIG. 31), and the switching circuit 77 is provided between an external load and the terminals 132a and 132b (FIG. 32). The make-and-break circuit 26 is opened or closed and the switching circuit 77 is switched by a signal fed from the external apparatus (the image forming apparatus in the first through seventh embodiments).

Output parts 152a and 152b that outputs the stored power (energy) of the capacitor bank 9 are connected to the capacitor bank 9. The output parts 152a and 152b can be connected to loads such as the heating part of a fixing unit, a hard disk drive, and a stapler. Further, the output parts 152a and 152b may be connected not only to loads used in the image forming apparatus but also to a unit externally attached to the image forming apparatus so as to supply the stored power (energy) of the capacitor bank 9 thereto. The image forming apparatus is not the only external load to the power storage units of FIGS. 31 and 32, which may also be applied to a load or an apparatus to be charged by switching the output of the DC/DC converter 12.

[Second Mode of Implementation]

According to a power storage unit according to this mode of implementation, a dedicated charger for charging a capacitor is not used. Commercial power supply is converted into direct current (DC), and the output of a power supply generation circuit (DC/DC converter) that stabilizes output voltage is supplied for an image forming operation when necessary, and in the other times, is used to charge a capacitor bank. The configuration of a power supply circuit is simplified by using the DC/DC converter used for a main body load also for charging the capacitor bank without using a dedicated charger. As a result it is possible to reduce the manufacturing cost and the installation space of the image forming apparatus. The image forming apparatus to which the power storage unit is applied is the same as that of the first mode of implementation, and accordingly, a description thereof is omitted.

A description is given below of embodiments of the power storage unit that supplies power to the DC fixing heater 22. In the following embodiments, an increased voltage is detected in the capacitor bank 9 or a boost (step-up) part 80. By way of example, the voltage is expressed using $A<B$ $(<N)<C<D<E$ (unit: [V]).

Ninth Embodiment

Figure 33:
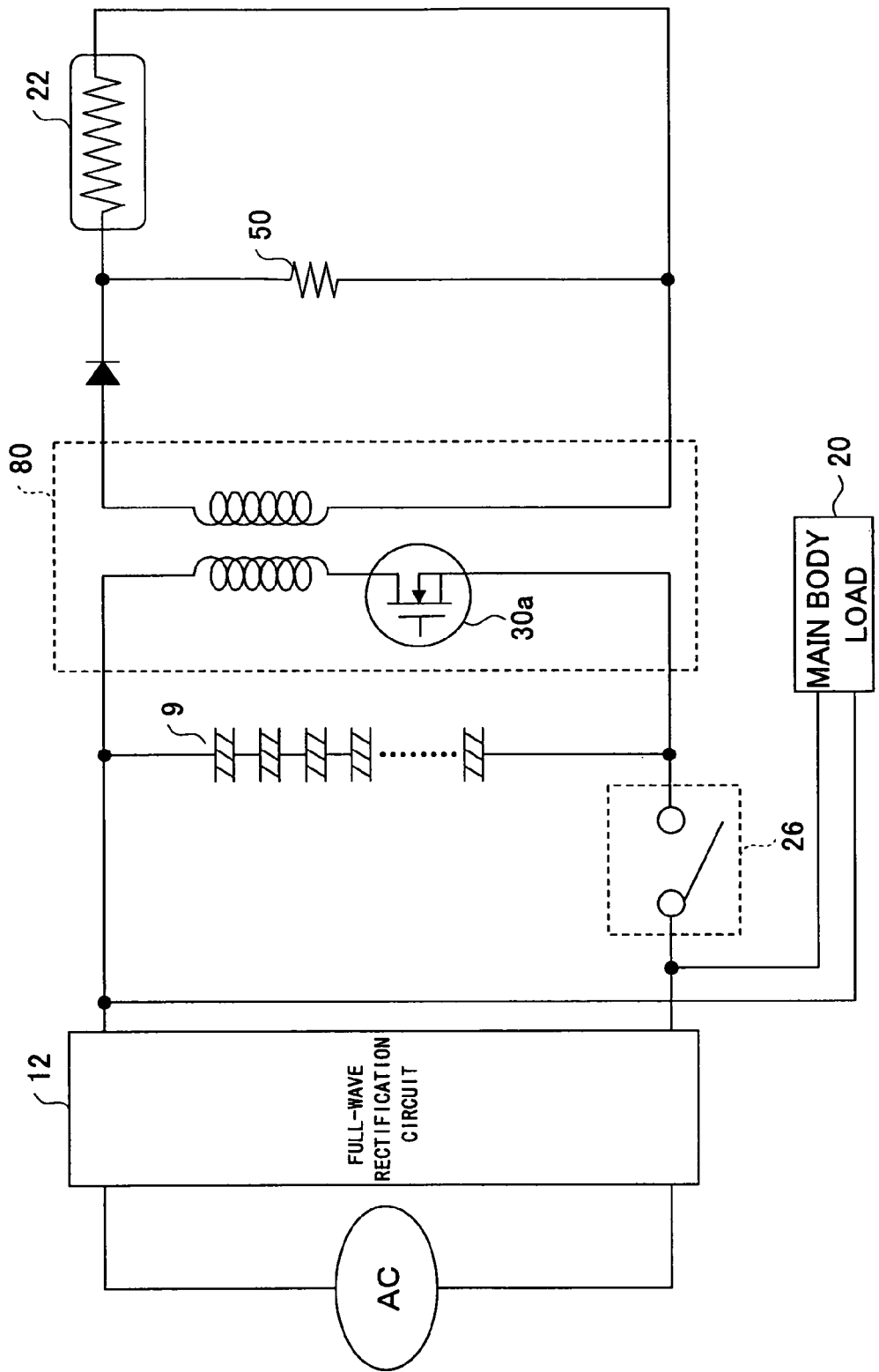
FIG. 33 is a schematic circuit diagram showing a power storage unit according to a ninth embodiment of the present invention.

FIG. 33 is a schematic circuit diagram showing a power storage unit according to this embodiment. According to the power storage unit of FIG. 33, AC commercial power supply is connected to the power supply generation circuit (DC/DC converter) 12 after being subjected to rectification. The power subjected to voltage increasing by the power supply generation circuit 12 is connected to the capacitor bank 9 through the normal-open make-and-break circuit 26, and to the main body load 20 of an image forming apparatus. The capacitor bank 9 is connected to the boost part 80. The boost part 80 is connected to an increased voltage detection circuit 50 that detects the value of the increased voltage and to the DC fixing heater 22.

In the case of performing an image forming operation, the make-and-break circuit 26 is open so that the main body load 20 performs image formation using the power supplied from the power supply generation circuit 12. At this point, if the temperature of the DC fixing heater 22 is lower than a predetermined value, the power released from the capacitor bank 9 and subjected to voltage increasing by the boost part 80 is supplied to the DC fixing heater 22. The boost part 80 includes a high-frequency transformer. The boost part 80 increases the voltage V1 of the power (energy) stored in the capacitor bank 9 to a voltage V2, and supplies the power to the DC fixing heater 22. If the voltage of the capacitor bank 9 is lower than a predetermined value when no image forming operation is being performed, the make-and-break circuit 26 is closed so that the capacitor bank 9 is charged. A detailed description is given below.

Figure 34:
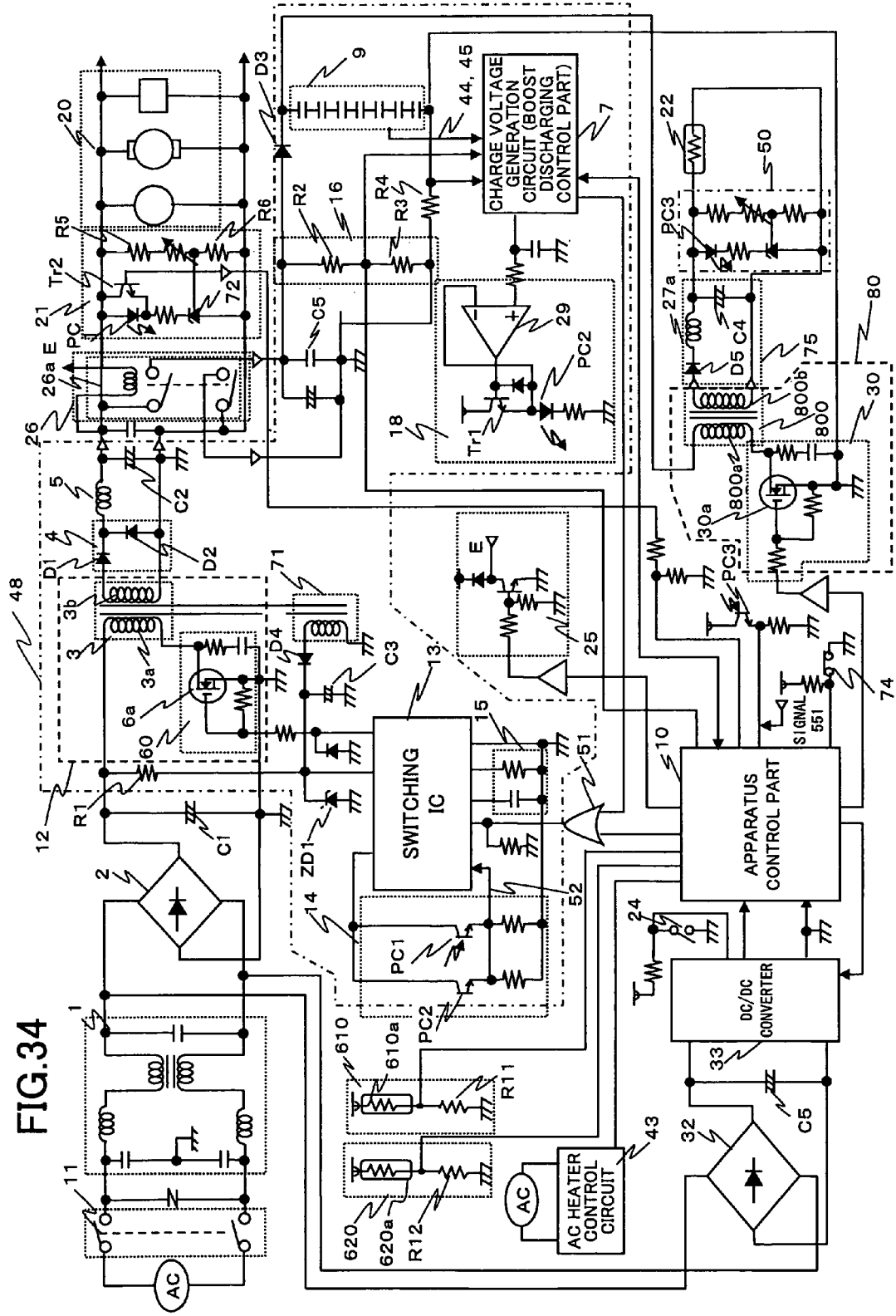
FIG. 34 is a circuit diagram showing an image forming apparatus to which the power storage unit is applied according to the ninth embodiment of the present invention.

FIG. 34 is a circuit diagram showing an image forming apparatus to which the power storage unit is applied. In FIG. 34, the same elements as those of FIG. 33 are referred to by the same numerals. The AC power supply is connected to the power supply generation circuit 12 via the main power switch 11, the filter 1, and the full-wave rectification circuit 2. The power supply generation circuit 12 is connected to a constant voltage detection circuit 21, the main body load 20, and the make-and-break circuit 26 through the rectification circuit 4 and the choke coil 5. If the make-and-break circuit 26 is closed, the power supply generation circuit 12 is connected to the charge voltage detection circuit 16 and the capacitor bank 9. The charge voltage detection circuit 16 includes an equalization circuit that is not graphically illustrated. Further, the capacitor bank 9 and the charge voltage detection circuit 16 are connected to the constant current/constant power charge voltage generation circuit 7, which may correspond to a circuit control part that controls charging of the capacitor bank 9. The capacitor bank 9 is connected to the DC fixing heater 22 via the boost part 80, a rectification and smoothing circuit 75, and the increased voltage detection circuit 50. Further, the constant current/constant power charge voltage generation circuit 7 is connected to a voltage-to-current conversion circuit 18, the boost part 80, and the image forming apparatus control part (apparatus control part) 10. Since the image forming apparatus control part 10 integrates the control circuit 8 and the engine control part 10, the image forming apparatus control part 10 is referred to by the same reference numeral as the engine control part 10.

Returning to the AC power supply, the filter 1 is connected to the DC/DC converter 33 via the full-wave rectification circuit 32. The DC/DC converter 33 is connected to the apparatus control part 10 and the energy saving cancellation SW 24.

The apparatus control part 10 is connected to the AC heater control circuit 43 and the temperature detection circuits 610 and 620. Further, the apparatus control part 10 is connected to the switching regulator IC 13 via an OR circuit 51. The other input terminal of the OR circuit 51 is connected to the constant current/constant power charge voltage generation circuit 7. The apparatus control part 10 is connected to the relay drive circuit 25, the charge voltage detection circuit 16, the constant voltage detection circuit 21, and the boost part 80.

The switching regulator IC 13 is connected to the power supply generation circuit 12, a circuit 15, and a feedback voltage detection circuit 14. Light emitted from a photocoupler PC1 of the feedback voltage detection circuit 14 and light emitted from a photocoupler PC2 of the voltage-to-current conversion circuit 18 are input to the feedback voltage detection circuit 14.

The power supply generation circuit 12 that generates power supply to be stored in the capacitor bank 9 is enclosed by a broken line.

Next, a description is given of an operation of the power storage unit of FIG. 34. When the main power switch 11 is turned ON, an alternative current from the AC power supply (commercial power supply) passes through the filter 1 to be subjected to full-wave rectification in the full-wave rectification circuit 2. The output of the full-wave rectification circuit 2 has ripple components thereof removed by a smoothing capacitor C1, and is input to the power supply generation circuit 12.

The primary coil 3a of the high-frequency transformer 3 is connected to the DC output side of the full-wave rectification circuit 2 in parallel with the smoothing capacitor C1. The FET 6a is connected as a switching part in series to the primary coil 3a. The switching circuit 60 having the FET 6a is switched (ON and OFF) by a PWM signal output from the switching regulator IC 13, so that a switching current flows into the primary coil 3a. The switching current on the primary side induces a switching voltage in the secondary coil 3b of the transformer 3. Accordingly, it is possible to control output voltage by changing the conduction period of the switching frequency.

A diode D1 and a diode D2 are connected as the rectification circuit 4 to the secondary coil 3b of the transformer 3. The switching voltage is rectified by this rectification circuit 4 and smoothed by the choke coil 5 and a capacitor C2 to be converted into DC output. This DC output is supplied as power for the main body load 20 including one or more of a clutch, a solenoid, a motor, a sensor, etc., necessary for the image forming operation of the image forming apparatus.

The DC output of the choke coil 5 and the capacitor C2 is connected to the relay 26a of the make-and-break circuit 26. When the relay 26a is energized, the make-and-break circuit 26 is closed so as to supply power to the capacitor bank 9.

Figure 35:
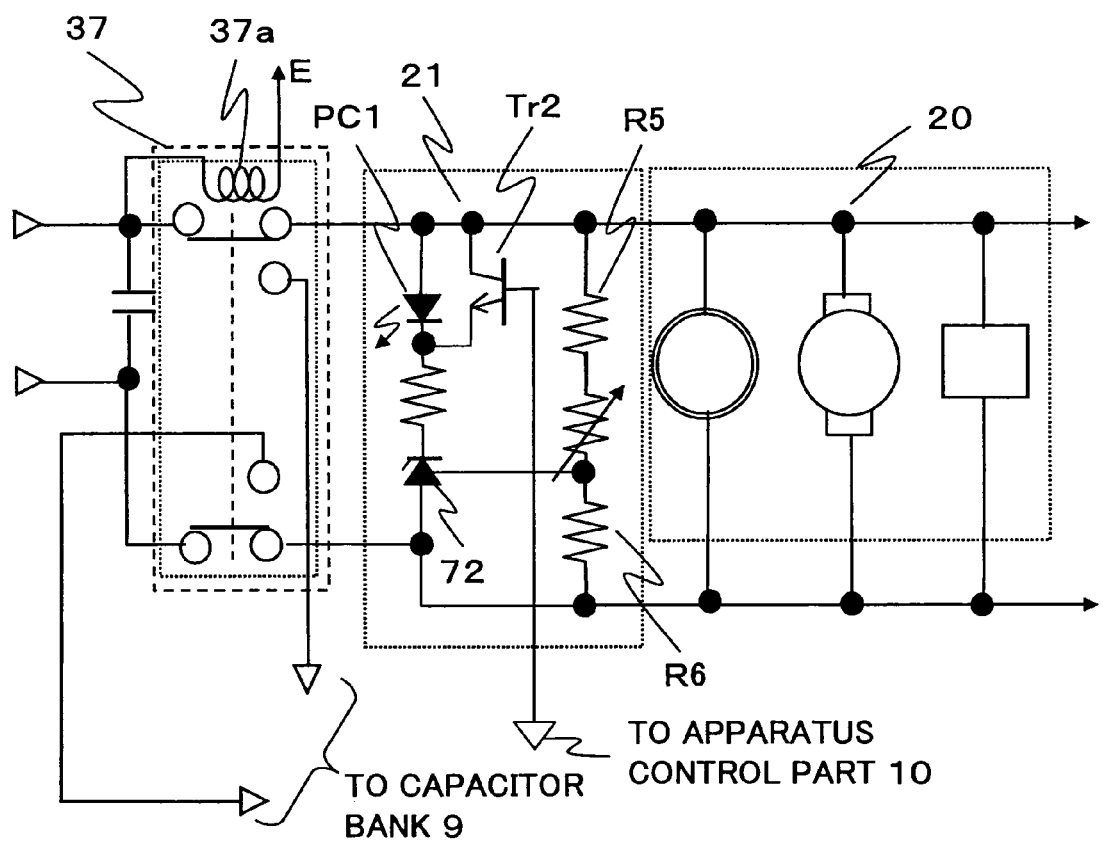
FIG. 35 is a circuit diagram showing a switching circuit that replaces the make-and-break circuit according to the ninth embodiment of the present invention.

The make-and-break circuit 26 may be replaced by another configuration. FIG. 35 is a circuit diagram showing a switching circuit 37 that replaces the make-and-break circuit 26. The switching circuit 37 is connected to the main body load side in its normal-closed state (when a relay 37a thereof is not energized). In the case of charging the capacitor bank 9, the relay 37a is energized by a relay drive circuit, so that the switching circuit 37 switches to the capacitor bank 9 side. A description is given below of an operation of the make-and-break circuit 26 or the switching circuit 37.

The voltage supplied to the main body load 20 is a constant voltage. This voltage is detected by the constant voltage detection circuit 21. The voltage by the constant voltage detection circuit 21 is detected using the voltage divided by a volume connected in series to a resistor R5 and a resistor R6, and the output is input to the reference terminal of a shunt regulator IC 72. The diode current of a photocoupler PC1 is determined by the voltage input to the reference terminal, is fed back to the feedback voltage detection circuit 14.

When the make-and-break circuit 26 is closed, the DC output is connected to a diode D3, and its output is supplied to the capacitor bank 9 having capacitor cells connected in series.

The capacitor bank 9 of this embodiment includes the n capacitor cells (electric double layer capacitors) that are connected in series. When each capacitor cell is fully charged, the voltage across the capacitor cell is M [V]. Therefore, when the n capacitor cells are fully charged, a voltage (energy) of M×n [V] (hereinafter simply referred to as N [V]) is stored.

Each end of the capacitor bank 9 is connected to the charge voltage detection circuit 16. The output of the charge voltage detection circuit 16 is connected to the constant current/constant power charge voltage generation circuit 7. The charge voltage detection circuit 16 includes a divider circuit formed of a resistor R2 and a resistor R3, and detects the voltage of the capacitor bank 9 by voltage division of the resistor R2 and the resistor R3.

A resistor R4 is connected in series between a smoothing capacitor C5 and the capacitor bank 9, so that the charging current of the capacitor bank 9 can be detected by monitoring the voltage across the resistor R4. The voltage across the resistor R4 is input to the constant current/constant power charge voltage generation circuit 7.

The capacitor bank 9 is connected to the equalization circuit (not graphically illustrated). The equalization circuit detects the full charge of each individual capacitor cell to put a corresponding bypass circuit into operation, thereby equalizing the charge voltages of the capacitor cells. When a first one of the capacitor cells is fully charged to N [V], the equalization circuit bypasses charging current to a second one of the capacitor cells. The bypass circuit of the second one of the capacitor cells operates in the same manner, so that the charge voltages of the capacitor cells are equalized.

When the equalization circuit detects the full charge of any one of the capacitor cells (that any one of the capacitor cells is fully charged) and puts a corresponding bypass circuit into operation, the equalization circuit outputs the single cell full charge signal 44 to the constant current/constant power charge voltage generation circuit 7. Further, when the equalization circuit detects the full charges of all the capacitor cells and puts all the bypass circuits into operation, the equalization circuit outputs the all cell full charge signal 45 to the constant current/constant power charge voltage generation circuit 7. A detailed description is given below of the equalization circuit. In response to this all cell full charge signal 45, the constant current/constant power charge voltage generation circuit 7 stops charging, and outputs this all cell full charge signal to the apparatus control part 10.

Next, a description is given of an operation of the switching regulator IC 13 that generates a PWM signal. The DC output of the full-wave rectification circuit 2 is supplied to the switching regulator IC 13 via a circuit made up of a resistor R1, a capacitor C3, and a Zener diode ZD1. This causes the switching regulator IC 13 to start operation, and the switching regulator IC 13 continues the operation with an auxiliary power supply made up of an auxiliary coil 71 and a diode D4.

The frequency of the PWM signal is determined by the resistance and the capacitance of the circuit 15 made up of a resistor and a capacitor. A feedback voltage 52 of the output voltage of the photocoupler PC1 or PC2 of the feedback voltage detection circuit 14 is input to the switching regulator IC 13. The switching regulator IC 13 includes a voltage-pulse width conversion circuit that modulates the pulse width of the PWM signal in accordance with the feedback voltage 52.

The pulse width of the PWM signal changes in accordance with the feedback voltage 52. The PWM signal is input to the gate of the FET 6a, causing the FET 6a to switch the primary coil 3a of the transformer 3. This makes it possible to cause different output voltages to be generated in the secondary coil 3b of the transformer 3.

The voltage generated by the constant current/constant power charge voltage generation circuit 7 is supplied to the base of a transistor Tr1 of the voltage-to-current conversion circuit 18 that converts voltage into current, and is fed back to the feedback voltage detection circuit 14 by the photocoupler PC2 connected to the emitter of the transistor Tr1.

Next, a description is given of the operation in which the current/constant power charge voltage generation circuit 7 detects the operation of a bypass circuit based on detection of the charge voltage and the charging current of the capacitor bank 9, and performs constant current charging and constant power charging.

When detecting the single cell full charge signal 44 that indicates that the bypass circuit of one of the capacitor cells has operated, the current/constant power charge voltage generation circuit 7 performs a constant current charging operation in order to perform preset constant current charging.

Further, when receiving the all cell full charge signal 45 indicating that all the bypass circuits have operated, the current/constant power charge voltage generation circuit 7 outputs a signal to stop a charging operation to the apparatus control part 10.

The current/constant power charge voltage generation circuit 7 includes a CPU, a ROM, a RAM, a timer, an interruption control circuit, an A/D converter, a serial controller (UART), a D/A converter, and an I/O port that are not graphically illustrated. The ROM contains a program that causes the current/constant power charge voltage generation circuit 7 to function as a circuit control part. When the main power switch 11 is turned ON, the program is read into the RAM and executed by the CPU.

The serial controller transmits a signal to report charging of a capacitor cell to the apparatus control part 10 through serial communications.

If the voltage across the capacitor bank 9 is lower than a preset value, the current/constant power charge voltage generation circuit 7 outputs a voltage for performing preset constant current charging to an operational amplifier 29 of the voltage-to-current conversion circuit 18 from the D/A terminal of the current/constant power charge voltage generation circuit 7.

A current for performing constant current charging on the capacitor bank 9 is detected by the voltage across the resistor R4 connected in series to the capacitor bank 9. The constant current/constant power charge voltage generation circuit 7 successively detects the voltage across the resistor R4, and outputs the voltage for performing the preset constant current charging to the operational amplifier 29 of the voltage-to-current conversion circuit 18 from the D/A terminal of the current/constant power charge voltage generation circuit 7.

When the voltage across the capacitor bank 9 is higher than or equal to the preset value, the constant current/constant power charge voltage generation circuit 7 detects the charging current of the capacitor bank 9 and the voltage across the capacitor bank 9 as described above in order to perform constant power charging, and calculates and determines a voltage for performing preset constant power charging from the detected charging current and charge voltage.

The analog voltage output from the D/A terminal of the current/constant power charge voltage generation circuit 7 may be determined using a table that records an analog voltage to be output in correlation to a corresponding voltage across the capacitor bank 9.

A current corresponding to the analog voltage input to the operational amplifier 29 of the voltage-to-current conversion circuit 18 flows from the transistor Tr1 to the diode of the photocoupler PC2 so as to be fed back to the feedback voltage detection circuit 14. This feedback voltage controls the signal width of the output PWM signal of the switching regulator IC 13, and a PWM signal for performing constant current charging is output to the gate of the FET 6a from the switching regulator IC 13.

Next, a description is given of the boost part 80. A primary coil 800a of an isolation transformer 800 and an FET 30a connected in series thereto are connected in parallel to the capacitor bank 9 between its terminals. The FET 30a switches the primary coil 800a for voltage increasing.

As described below, the output PWM signal of the apparatus control part 10 is input to a switching circuit 30 having the FET 30a. When the FET 30a is switched (ON and OFF), a switching current flows through the primary coil 800a. This switching current of the primary coil 800a induces a switching voltage in a secondary coil 800b of the transformer 800. It is possible to control the increased voltage by changing the conduction period of the switching frequency.

The switching voltage of the secondary coil 800*b* of the isolation transformer 800 is connected to the rectification and smoothing circuit 75 that performs rectification and smoothing using a diode D5, a choke coil 27*a*, and a capacitor C4. The smoothed output of the rectification and smoothing circuit 75 is connected to the DC fixing heater 22. The smoothed voltage is fed back to the apparatus control part 10 by a photocoupler PC3 of the increased voltage detection circuit 50.

Figure 36:
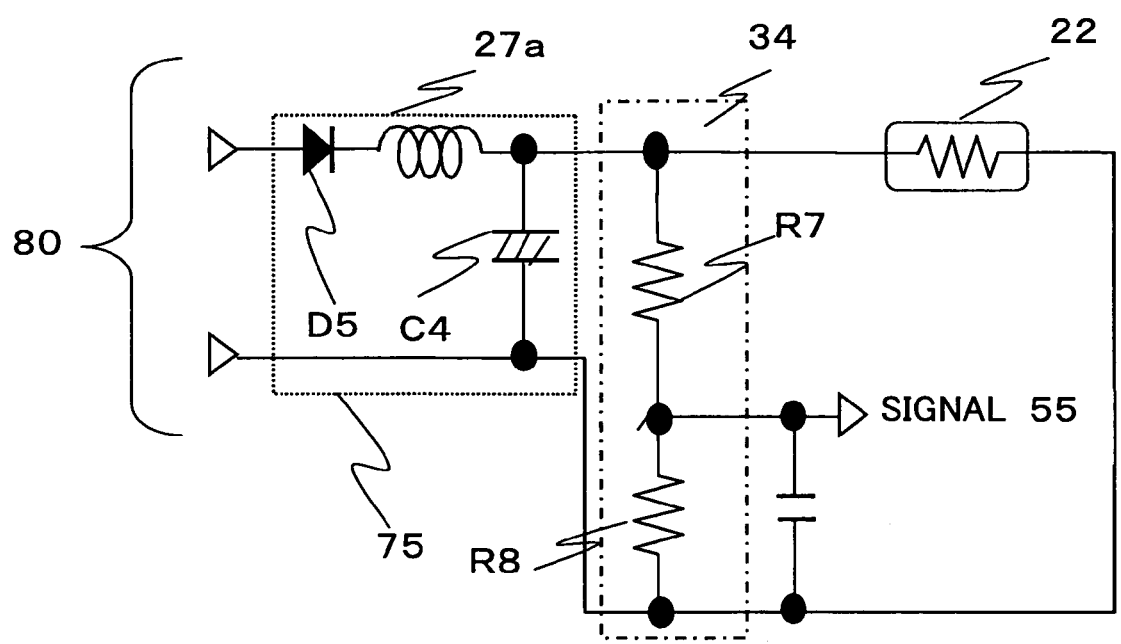
FIG. 36 is a circuit diagram showing another configuration of an increased voltage detection circuit according to the ninth embodiment of the present invention.

The increased voltage detection circuit 50 may have another configuration. FIG. 36 is a circuit diagram showing another configuration of the increased voltage detection circuit 50. In FIG. 36, the same elements as those of FIG. 34 are referred to by the same numerals, and a description thereof is omitted. Referring to FIG. 36, the output voltage of the rectification and smoothing circuit 75 is divided between a resistor R7 and a resistor R8, and a signal 55 of a divided voltage is input to an A/D port of the image forming apparatus. In the case of the increased voltage detection circuit 50 of FIG. 36, the output of the photocoupler PC3 is not input to the apparatus control part 10.

Next, a description is given of an operation of the apparatus control part 10. The apparatus control part 10 includes a CPU, a ROM, a RAM, a timer, an interruption control circuit, an A/D converter, a serial controller (UART), and an I/O port, which are not graphically illustrated. The ROM contains a program that causes the CPU to function as an image forming apparatus control part. When the main power switch 11 is turned ON, the program is read into the RAM and executed by the CPU. Further, the apparatus control part 10 communicates with the constant current/constant power charge voltage generation circuit 7 through the serial controller.

The temperature detection circuits 610 and 620 are connected to the apparatus control part 10. The temperature detection circuit 620 detects the temperature of a DC heater heating part with a voltage divided between the thermistor 620*a* and the resistor R12. The temperature detection circuit 610 detects the temperature of an AC heater heating part with a voltage divided between the thermistor 610*a* and the resistor R11. The voltages detected by the temperature detection circuits 610 and 620 are connected to A/D ports of the apparatus control part 10. The apparatus control part 10 controls PWM signals output to the AC heater control circuit 43 and the boost part 80 in accordance with the results of the temperature detection.

The temperature detection circuit 610 detects the temperature of the measurement area corresponding to the AC fixing heater 61. The temperature detection circuit 620 detects the temperature of the measurement area corresponding to the AC fixing heater 62. The power supplied to the AC fixing heater 61 and the AC fixing heater 62 is controlled by the AC heater control circuit 43. The power supplied to the DC fixing heater 22 is controlled by the apparatus control part 10.

The apparatus control part 10 is also connected to the relay drive circuit 25 that drives the relay 26*a* of the make-and-break circuit 26, a door switch 74, a circuit PC3 that feeds back the output voltage of the rectification and smoothing circuit 75, and the charge voltage detection circuit 16 that detects the charge voltage of the capacitor bank 9.

Further, the apparatus control part 10 starts the constant current/constant power charge voltage generation circuit 7. In the case of charging the capacitor bank 9, the apparatus control part 10 detects a feedback voltage for controlling the voltage of the main body load 20 to a constant voltage, and controls a transistor Tr2 connecting the anode and the cathode of the photocoupler PC1. Further, in the case of entering an energy saving mode, the apparatus control part 10 stops part of the power supply output of the DC/DC converter 33.

The DC/DC converter 33 supplies power to the image forming apparatus and the apparatus control part 10. The DC/DC converter 33 stops part of its power supply output in response to an energy saving mode signal fed from the image forming apparatus. When the energy saving mode is canceled, the opening and closing of the energy saving cancellation SW 24 is controlled so that the DC/DC converter 33 resupplies power to the image forming apparatus and the apparatus control part 10.

A description is given of power supply to the AC fixing heaters 61 and 62 and the DC fixing heater 22. It is assumed that the fixing unit has a configuration as shown in FIG. 2A or 2B. The apparatus control part 10 detects the voltage across the capacitor bank 9 with the charge voltage detection circuit 16, and determines whether the capacitor bank 9 is dischargeable (whether the capacitor bank 9 is at or above a predetermined voltage). Further, in a standby period or at the time of the energy saving mode, the apparatus control part 10 outputs a charging instruction signal or a charging enabling signal to the constant current/constant power charge voltage generation circuit 7 if the voltage of the capacitor bank 9 is lower than or equal to a predetermined value.

At the time of the main power supply being ON and at the time of a regular copying operation, the apparatus control part 10 supplies power to the AC fixing heater 61 and the AC fixing heater 62 through the AC heater control circuit 43 in order to fix toner. When the temperature detection circuit 610 or the temperature detection circuit 620 detects a temperature lower than or equal to a preset temperature, the apparatus control part 10 supplies power to the AC fixing heater 61 or 62. When the temperature detection circuit 610 or the temperature detection circuit 620 detects a temperature higher than or equal to a preset temperature, the apparatus control part 10 stops supplying power to the AC fixing heater 61 or 62.

When the main power supply is turned ON or when the temperature detection circuit 28 detects a temperature at which an unfixed image is generated during successive copying, the apparatus control part 10 increases the voltage of the capacitor bank 9, and supplies the power (energy) stored in the capacitor bank 9. That is, at a warm-up time of the fixing unit 112 or at a time when the temperature of the fixing roller 111 is below a target temperature at the time of image forming, the voltage of the capacitor bank 9 is increased, and the power (energy) stored in the capacitor bank 9 is supplied to the DC fixing heater 22, thereby heating the fixing roller 111.

Figure 37:
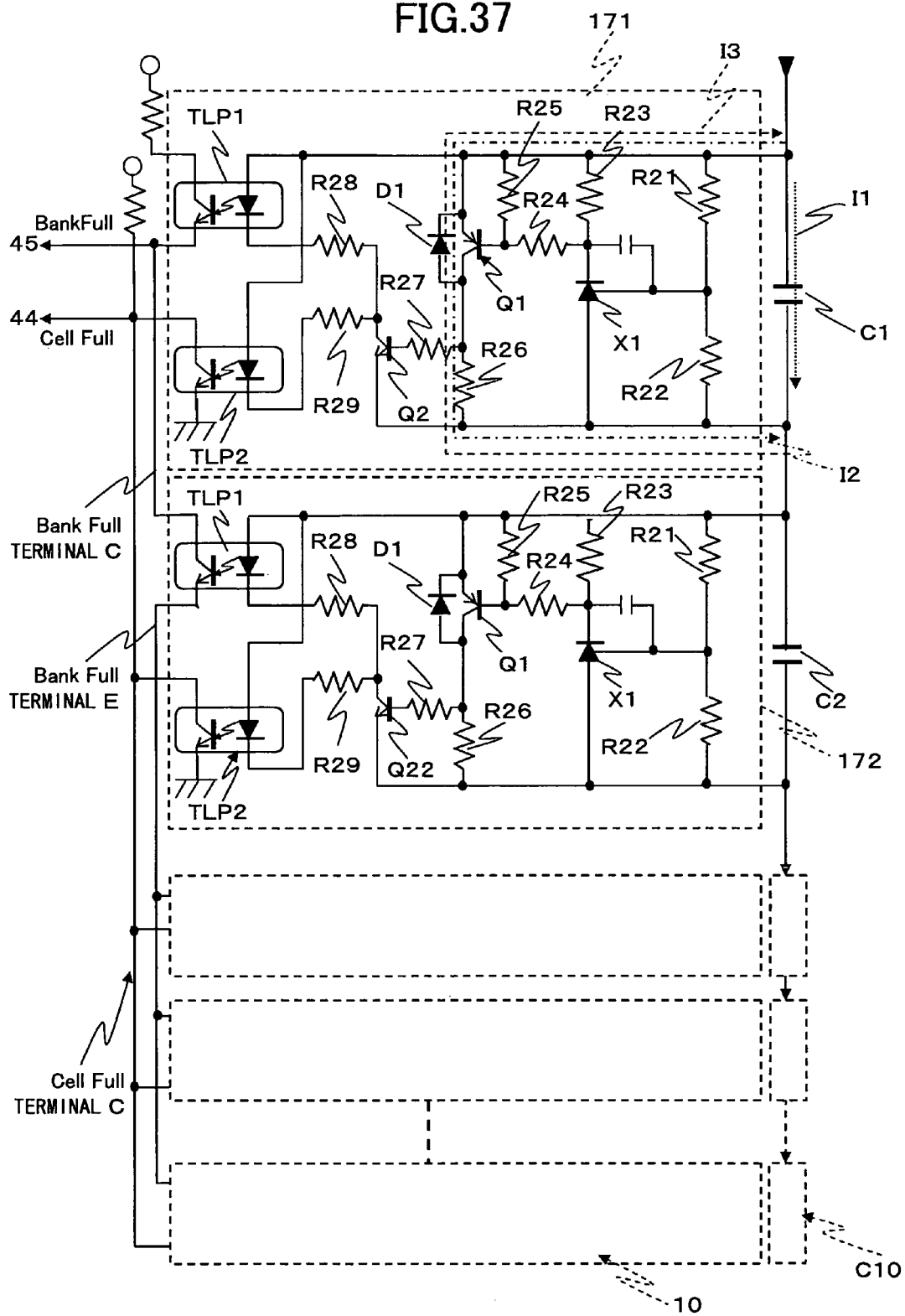
FIG. 37 is a circuit diagram showing an equalization circuit according to the ninth embodiment of the present invention.

Next, a detailed description is given of the equalization circuit. FIG. 37 is a circuit diagram showing the equalization circuit. The equalization circuit is connected in parallel to each of the capacitor cells of the capacitor bank 9, which are shown as C1 through C10 in FIG. 37, for example. Accordingly, 10 balance circuits connected in series are connected in parallel to the 10 capacitor cells C1 through C10. In FIG. 37, the capacitor cells C3 through C10 are omitted for convenience of graphical representation.

The capacitor cells C1 through C10 are electric double layer capacitors connected in series in order to store power (energy).

The balance circuit 171 is connected in parallel between the terminals of the capacitor cell C1. The balance circuit 171 includes the shunt regulator X1, the resistors R21 through R29, the transistor Q1, and the diode D1.

The voltage across the capacitor cell C1 is detected by the shunt regulator X1 and a voltage divider circuit formed of the resistors R21 and R22. A divided voltage generated by the voltage divider circuit of the resistors R21 and R22 is input to the control terminal of the shunt regulator X1. When the capacitor cell C1 is charged so that the voltage across the capacitor cell C1 reaches a predetermined voltage, the shunt regulator X1 is turned ON.

When the shunt regulator X1 is turned ON, a base current flows to the transistor Q1 through the resistor R23 so as to turn ON the transistor Q1. When the transistor Q1 is turned ON, the charging current of the capacitor cell C1 is bypassed through the channel I2 to the capacitor cell C2 by a current determined by the resistance of the resistor R25.

Further, when the transistor Q1 is turned ON, the transistor Q2 is also turned ON, so that current flows through the resistors R27 and R28 to the light emitting diodes of the photocouplers TLP1 and TLP2. The photocoupler TLP2 is connected to a Cell Full terminal, and outputs the single cell full charge signal 44 when each of the capacitor cells C1 through C10 is charged. The photocoupler TLP1 is connected to a Bank Full terminal, and is connected in series to the other balance circuits. Accordingly, the photocoupler TLP1 outputs the all cell full charge signal 45 when all the capacitor cells C1 through C10 are charged to a predetermined voltage, and all the balance circuits are in operation.

The all cell full charge signal 45 causes the constant current/constant power charge voltage generation circuit 7 to stop charging, and outputs a full charge signal to the apparatus control part 10. This signal causes the apparatus control part 10 to stop charging the capacitor bank 9.

The all cell full charge signal 45 causes the apparatus control part 10 to open the relay 26a of the make-and-break circuit 26 or switch the switching circuit 37 (FIG. 35) to the main body load 20 side.

Figure 38:
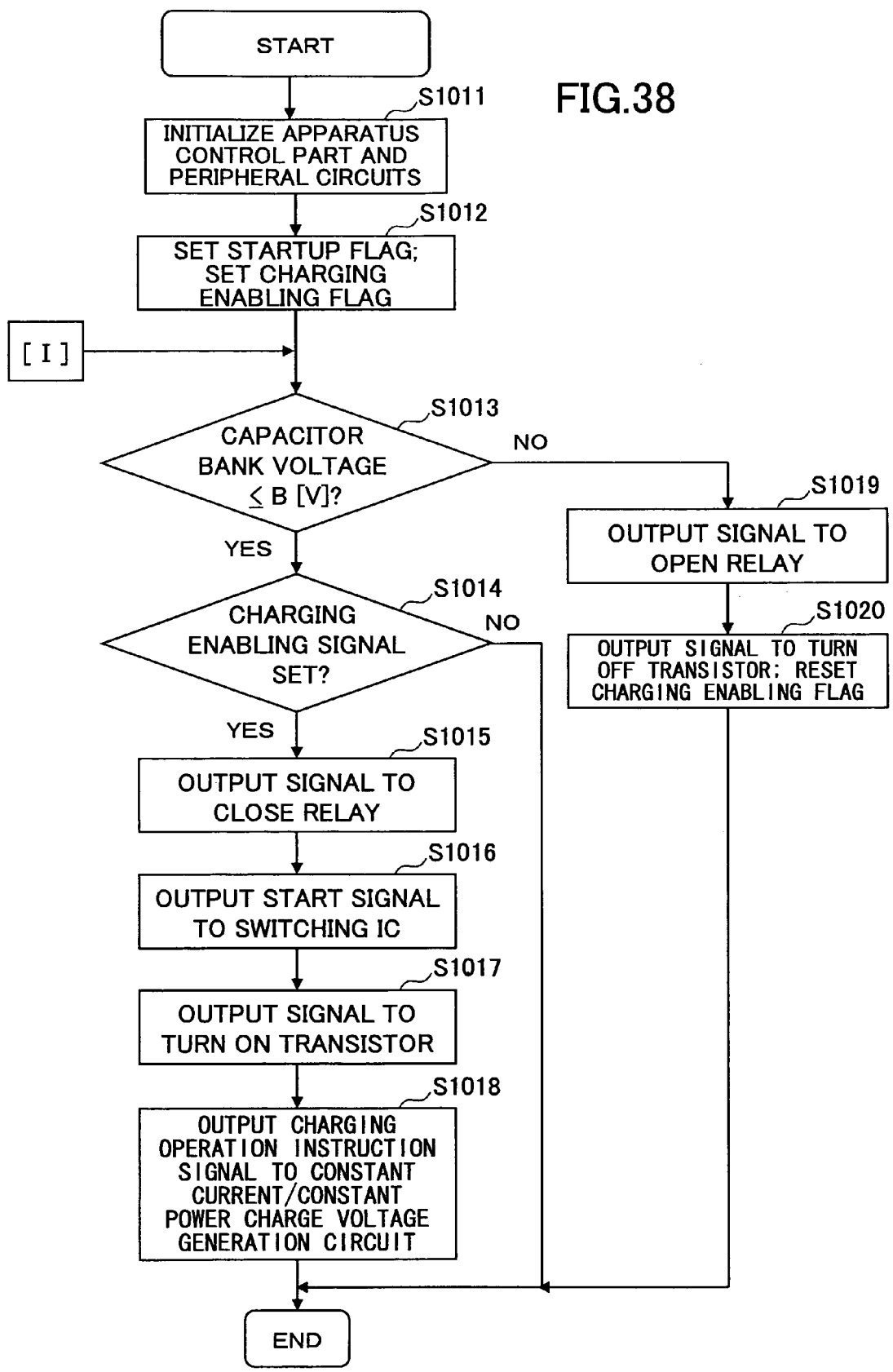
FIG. 38 is a flowchart of the operation where an apparatus control part controls charging of a capacitor bank according to the ninth embodiment of the present invention.

A description is given, with reference to the flowchart of FIG. 38, of the operation where the apparatus control part 10 controls charging of the capacitor bank 9 using the above-described configuration. The following description is based on the circuit diagram of FIG. 34.

In step S1011, when the main power switch 11 is turned ON so that the apparatus control part 10 receives power supplied from the DC/DC converter 33, the apparatus control part 10 initializes the apparatus control part 10 and its peripheral circuits.

In step S1012, the apparatus control part 10 sets a startup flag that is set when the main power switch 11 is turned ON or the energy saving mode is canceled. This flag is referred to in the case of increasing the fixing temperature of the image forming apparatus as described below. It is not possible to perform an image forming operation immediately after the main power switch 11 is turned ON. Accordingly, next, the apparatus control part 10 sets a charging enabling flag.

Arrow [I] after step S1012 indicates a procedure from a below-described flowchart.

Next, in step S1013, the apparatus control part 10 obtains the charge voltage of the capacitor bank 9 through the charge voltage detection circuit 16, and determines whether the charge voltage of the capacitor bank 9 is lower than or equal to B (slightly lower than N) [V]. If the charge voltage of the capacitor bank 9 is lower than or equal to preset B [V] (YES in step S1013), in step S1014, the apparatus control part 10 determines whether a charging enabling flag is set.

If no charging enabling flag is set (NO in step S1014), it is necessary to supply power to the main body load 20 side. Accordingly, this flow ends without performing a charging operation.

If the charge voltage of the capacitor bank 9 is not lower than or equal to preset B [V] (NO in step S1013), the capacitor bank 9 is in a charged state. Accordingly, in step S1019, the apparatus control part 10 outputs a signal to open the relay 26a to the relay drive circuit 25. As a result, the output of the power supply generation circuit is supplied to the main body load 20. If the switching circuit 37 of FIG. 35 is used in place of the make-and-break circuit 26, the apparatus control part 10 may output a signal to close the relay 37a to the relay drive circuit 25.

Next, in step S1020, the apparatus control part 10 outputs a signal to turn OFF the transistor Tr2. As a result, the power supply generation circuit 12 can perform a constant voltage operation. There is no need to perform charging if the charge voltage of the capacitor bank 9 is higher than B [V]. Accordingly, the apparatus control part 10 resets the charging enabling flag, and the control of FIG. 38 ends.

If a charging enabling signal is set (YES in step S1014), in step S1015, the apparatus control part 10 outputs a signal to close the relay 26a to the relay drive circuit 25.

Next, in step S1016, the apparatus control part 10 outputs a start signal to the switching regulator IC 13 through the OR circuit 51. Further, in step S1017, the apparatus control part 10 outputs a signal to turn ON the transistor Tr2 to the transistor Tr2, which connects the anode and the cathode of the photocoupler PC1 of the constant voltage detection circuit 21 that feeds back a voltage value in order for the power supply generation circuit 12 to output a constant voltage. The transistor Tr2 is turned ON to enable the feedback signal of the constant current/constant power charge voltage generation circuit 7.

Next, in step S1018, the apparatus control part 10 outputs a charging operation instruction signal to the constant current/constant power charge voltage generation circuit 7. By the above-described control, the capacitor bank 9 is charged. As described above, the constant current/constant power charge voltage generation circuit 7 detects the charge voltage and the charging current of the capacitor bank 9 and the operations of the bypass circuits, and performs constant current charging or constant power charging.

Figure 39:
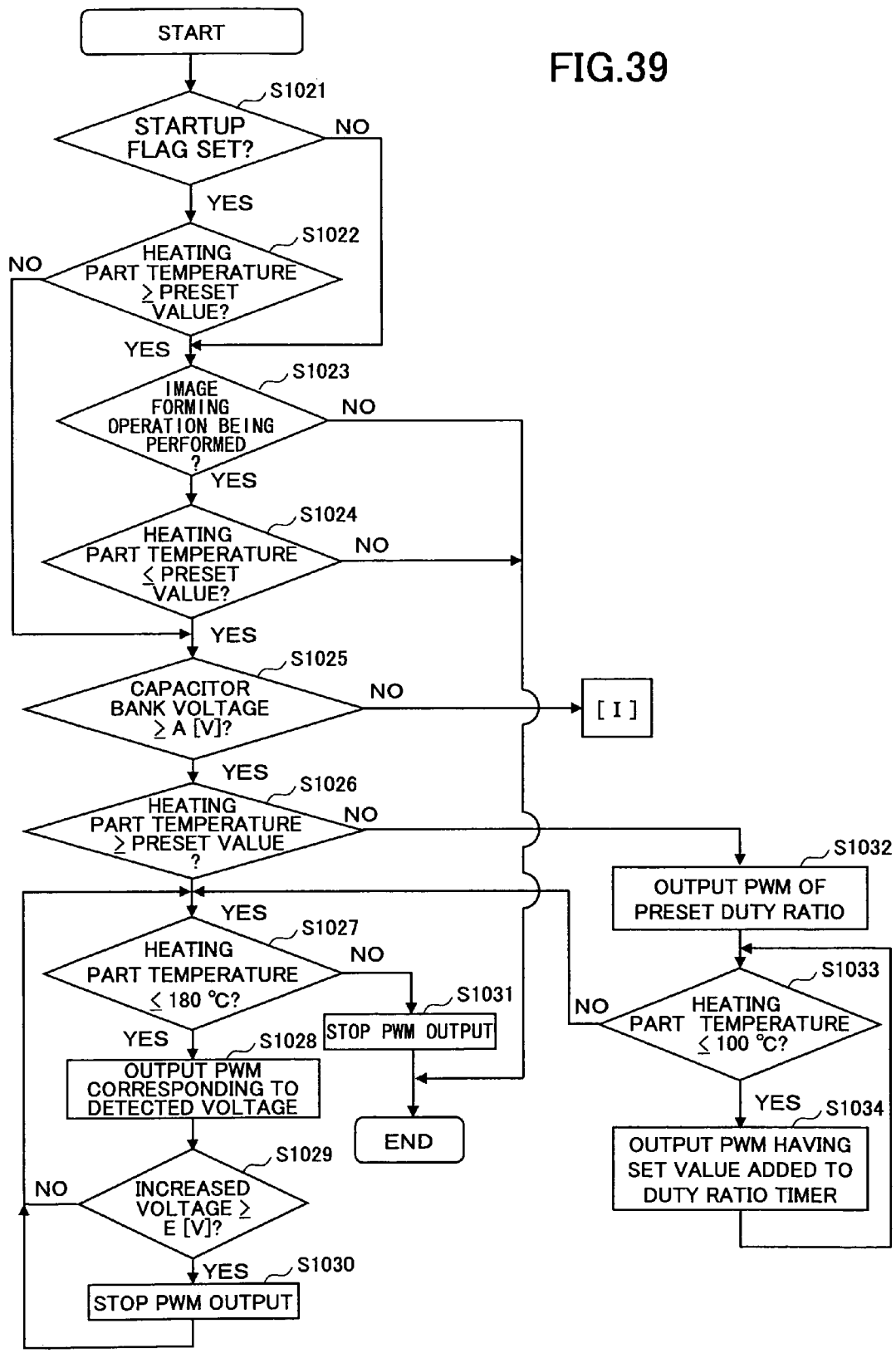
FIG. 39 is a flowchart showing the control operation of supplying power from a boost part to the heating part of a fixing unit when power is turned ON, an energy saving mode is canceled, or an image forming operation is being performed according to the ninth embodiment of the present invention.

Next, a description is given, with reference to the flowchart of FIG. 39, of the control operation of supplying power from the boost part 80 to the heating part of the fixing unit 112 when power is turned ON, the energy saving mode is canceled, or an image forming operation is being performed.

In step S1021, the apparatus control part 10 determines whether a startup flag that is set when the main power switch 11 is turned ON or the energy saving mode is canceled is set.

When the startup flag is set (YES in step S1021), in step S1022, the apparatus control part 10 obtains the output of the temperature detection circuit 610 that detects the temperature of the AC heater heating part, and determines whether the temperature of the AC heater heating part is higher than or equal to a preset temperature.

If the temperature of the AC heater heating part is higher than or equal to the preset temperature (for example, higher than or equal to 130° C.) (YES in step S1022), in step S1023, the apparatus control part 10 determines whether the image forming apparatus is performing an image forming operation. If the image forming apparatus is not performing an image forming operation (NO in step S1023), there is no need to supply power from the boost part 80 to the DC fixing heater 22. Accordingly, the control of the flowchart of FIG. 39 ends.

If the image forming apparatus is performing an image forming operation (YES in step S1023), in step S1024, the apparatus control part 10 determines whether the temperature of the AC heater heating part is lower than or equal to a preset temperature. If the temperature of the AC heater heating part is not lower than or equal to the preset temperature (NO in step S1024), there is no need to supply power from the boost part 80 to the DC fixing heater 22. Accordingly, the control of the flowchart of FIG. 39 ends.

If the temperature of the AC heater heating part is lower than or equal to the preset temperature (for example, lower than or equal to 155° C.) (YES in step S1024), there may be a copy of an unfixed image. Accordingly, in step S1025, in order to supply power from the boost part 80 to the DC fixing heater 22, the apparatus control part 10 obtains the charge voltage of the capacitor bank 9 through the charge voltage detection circuit 16, and determines whether the charge voltage of the capacitor bank 9 is higher than or equal to a predetermined voltage A [V].

If the charge voltage of the capacitor bank 9 is not higher than or equal to a predetermined voltage A [V] (NO in step S1025), the stored power (energy) is not sufficient. Accordingly, the apparatus control part 10 performs the operation after [I] of FIG. 38 in order to perform a control flow to charge the capacitor bank 9.

If the charge voltage of the capacitor bank 9 is higher than or equal to A [V] (YES in step S1025), in step S1026, the apparatus control part 10 determines whether the temperature of the AC heater heating part is higher than or equal to a preset temperature (for example, higher than or equal to 20° C.).

If the temperature of the AC heater heating part is not higher than or equal to the preset temperature (NO in step S1026), the temperature of the AC heating part of the fixing unit 112 is extremely lower than a fixing temperature. Accordingly, in step S1032, the apparatus control part 10 outputs for a predetermined period of time a PWM signal of a duty ratio for a voltage lower than a preset increased voltage in order to reduce inrush current.

Next, in step S1033, the apparatus control part 10 determines whether the temperature of the AC heating part is lower than or equal to a predetermined temperature (for example, lower than or equal to 100° C.). If the temperature of the AC heating part is lower than or equal to 100° C. (YES in step S1033), in step S1034, the apparatus control part 10 outputs a PWM signal having a set value added to a timer determining the duty ratio.

Then, again in step S1033, the apparatus control part 10 determines whether the temperature of the AC heating part is lower than or equal to the preset temperature. If the temperature of the AC heating part is lower than or equal to the preset temperature, the operation of step S1034 is repeated. By this operation, it is possible to gradually increase the duty ratio of PWM (soft start). Accordingly, it is possible to reduce inrush current.

If the temperature of the AC heating part is higher than or equal to the preset temperature (YES in step S1026), or if the temperature of the AC heating part is not lower than or equal to the preset temperature (NO in step S1033), in step S1027, the apparatus control part 10 determines whether the temperature of the AC heater heating part is lower than or equal to a preset temperature (for example, 180° C.).

If the temperature of the AC heater heating part is lower than or equal to the preset temperature (YES in step S1027), in step S1028, the apparatus control part 10 obtains the output of the increased voltage detection circuit 50, and outputs a PWM signal whose duty ratio is determined in correspondence to this increased voltage to the FET 30a of the switching circuit 30. This duty ratio is higher when the increased voltage is low, and is lower when the increased voltage is high. The frequency of the PWM signal is generated by a timer (not graphically illustrated) of the apparatus control part 10, and the modulation of the pulse width can be changed by controlling an internal timer for modulation (not graphically illustrated). The value of the internal timer for modulation may be determined from a preset table in which the value of the internal timer for modulation is correlated with the temperature of the AC heating part or the output of the increased voltage detection circuit 50, or be calculated by operations.

Next, in step S1029, the apparatus control part 10 determines whether the increased voltage detected by the increased voltage detection circuit 50 is higher than or equal to E [V]. If the increased voltage is not higher than or equal to E [V] (NO in step S1029), again in step S1027, the apparatus control part 10 determines whether the temperature of the AC heater heating part is lower than or equal to the preset temperature. If the temperature of the AC heater heating part is lower than or equal to the preset temperature, in step S1028, the apparatus control part 10 obtains the output of the increased voltage detection circuit 50, and outputs a PWM signal whose duty ratio is determined in correspondence to this increased voltage to the FET 30a of the switching circuit 30.

If the increased voltage is higher than or equal to E [V] (YES in step S1029), in step S1030, the apparatus control part 10 stops outputting the PWM signal. Then, again in step S1027, the apparatus control part 10 determines whether the temperature of the AC heater heating part is lower than or equal to the preset temperature, and repeats the same operation thereafter.

If the temperature of the AC heater heating part is not lower than or equal to the preset temperature (NO in step S1027), there is no need to supply power from the boost part 80 to the DC fixing heater 22. Accordingly, in step S1031, the apparatus control part 10 stops outputting the PWM signal. By the above-described operation, the temperature of the fixing unit 112 is controlled.

In the case of FIG. 39, the signal width of the PWM signal on duty is determined based on the voltage detected by the increased voltage detection circuit 50. Alternatively, the signal width of the PWM signal may be determined in accordance with the temperature of the AC heating part.

Figure 40:
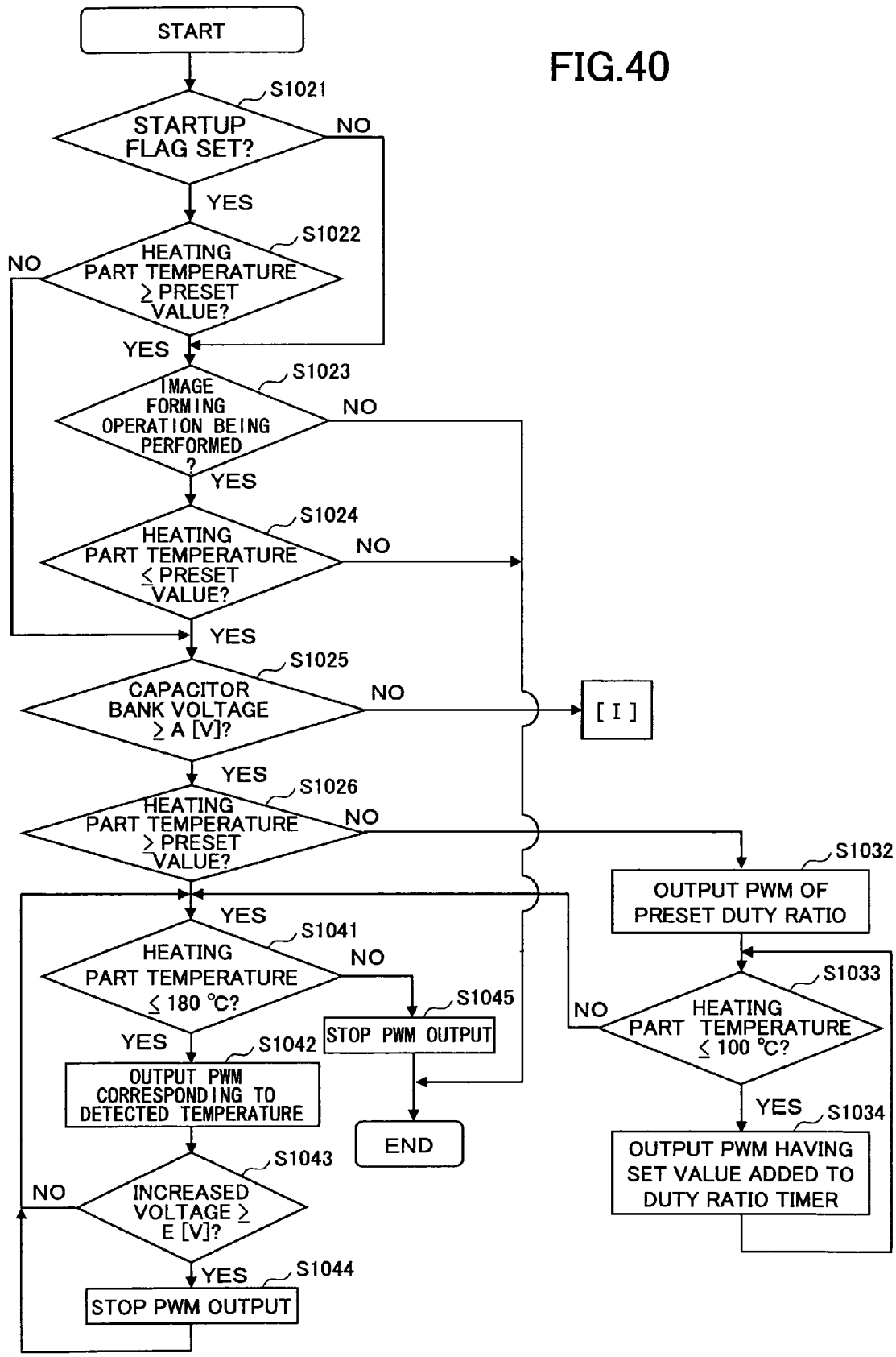
FIG. 40 is a flowchart of the control operation of outputting a PWM signal on duty in accordance with the temperature of an AC heating part according to the ninth embodiment of the present invention.

FIG. 40 is a flowchart of the control operation of outputting a PWM signal on duty in accordance with the temperature of the AC heating part. In FIG. 40, the control of steps S21 through S26 is equal to that of FIG. 39, and accordingly, a description thereof is omitted.

First, in step S1041, the apparatus control part 10 determines whether the temperature of the AC heater heating part is lower than or equal to a preset temperature (for example, 180° C.). If the temperature of the AC heater heating part is lower than or equal to the preset temperature (YES in step S1041), in step S1042, the apparatus control part 10 detects the temperature of the AC heating part, and outputs a PWM signal whose duty ratio is determined in accordance with this detected temperature. This duty ratio is higher when the increased voltage is low, and is lower when the increased voltage is high.

Next, in step S1043, the apparatus control part 10 determines whether the increased voltage is higher than or equal to E [V]. If the increased voltage is not higher than or equal to E [V] (NO in step S1043), again in step S1041, the apparatus control part 10 determines whether the temperature of the AC heater heating part is lower than or equal to the preset temperature. If the temperature of the AC heater heating part is lower than or equal to the preset temperature, in step S1042, the apparatus control part 10 outputs a PWM signal whose duty ratio is determined in accordance with the temperature of the AC heating part.

If the increased voltage is higher than or equal to E [V] (YES in step S1043), in step S1044, the apparatus control part 10 stops outputting the PWM signal. Then, again in step S1041, the apparatus control part 10 determines whether the temperature of the AC heating part is lower than or equal to the preset temperature, and repeats the same operation thereafter.

If the temperature of the AC heating part is not lower than or equal to the preset temperature (NO in step S1041), there is no need to supply power from the boost part 80 to the DC fixing heater 22. Accordingly, in step S1045, the apparatus control part 10 stops outputting the PWM signal. Thereby, the control of FIG. 40 ends.

The signal width of the PWM signal may be preset by the constant current/constant power charge voltage generation circuit 7.

Figure 41:
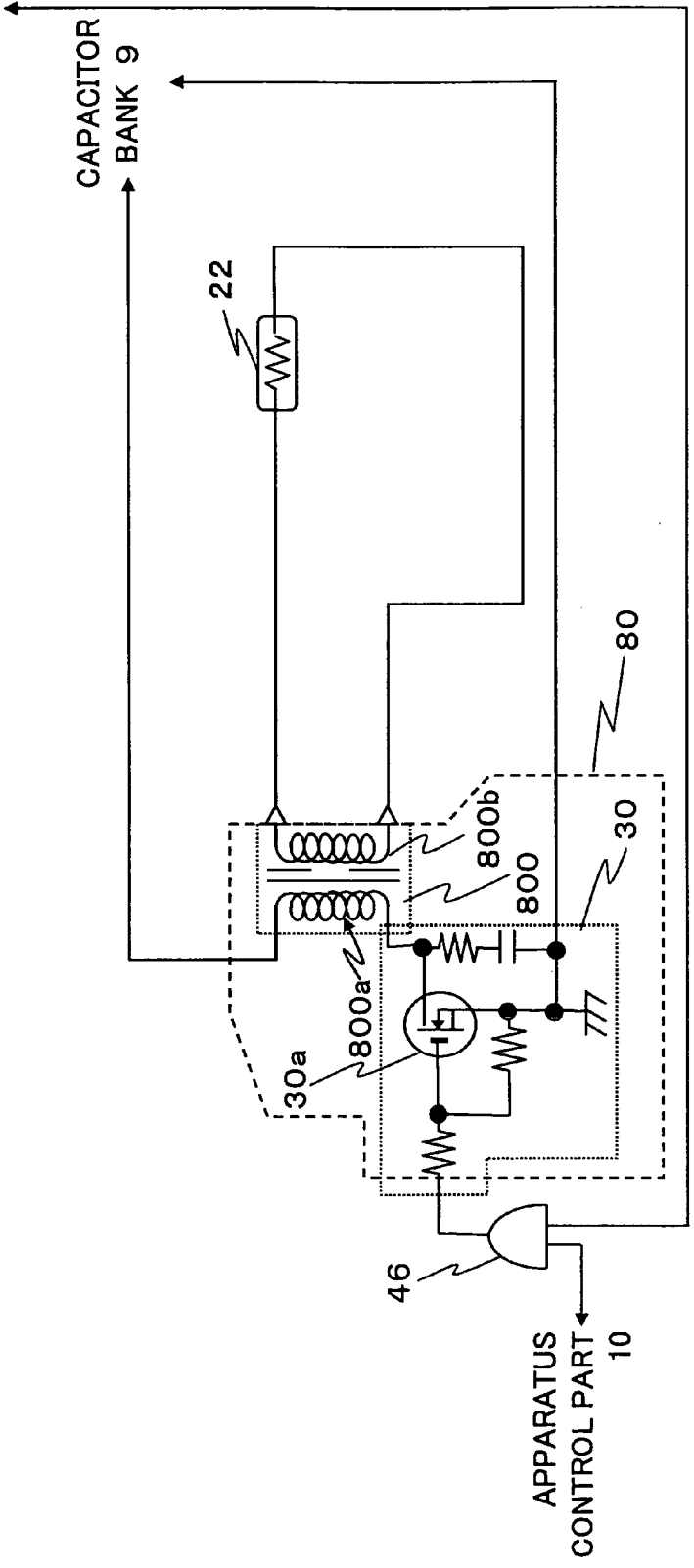
FIG. 41 is a circuit diagram of the boost part in the case of providing a circuit that generates a PWM signal in the constant current/constant power charge voltage generation circuit according to the ninth embodiment of the present invention.

The PWM signal may be generated by the constant current/constant power charge voltage generation circuit 7. FIG. 41 is a circuit diagram of the boost part 80 in the case of providing a circuit that generates a PWM signal in the constant current/constant power charge voltage generation circuit 7.

The constant current/constant power charge voltage generation circuit 7 includes a timer (not graphically illustrated) that determines the frequency of a PWM signal and an internal timer (not graphically illustrated) for pulse width modulation that determines the duty ratio of the PWM signal. According to the configuration of FIG. 41, the constant current/constant power charge voltage generation circuit 7 constantly generates a PWM signal. The PWM signal is input to an AND circuit 46, and the apparatus control part 10 outputs a signal to the AND circuit 46 in accordance with the result of detecting the temperature of the AC heating part, thereby outputting a PWM signal to the FET 30a of the switching circuit 30.

Figure 42:
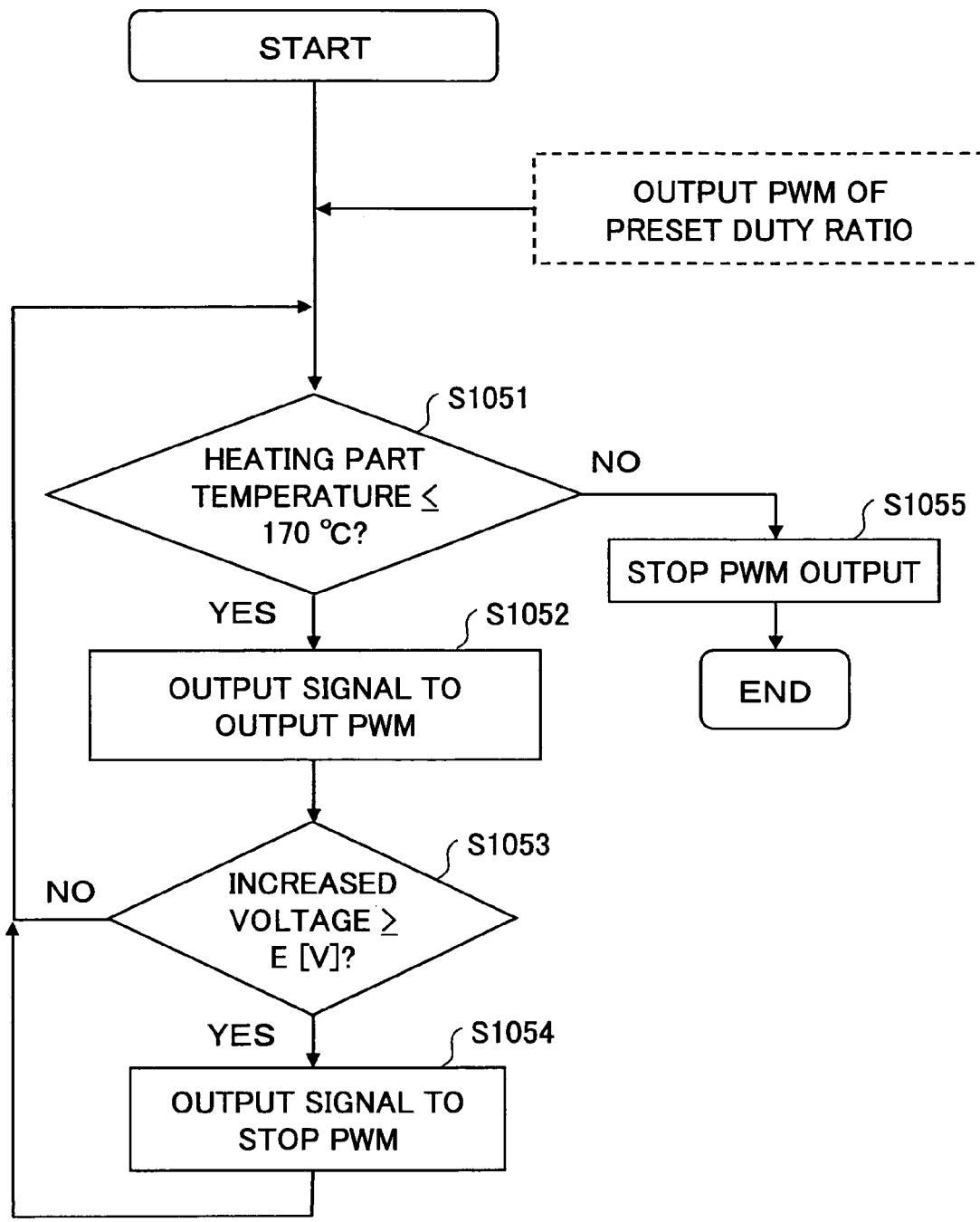
FIG. 42 is a flowchart showing the control operation of supplying power to the heating part of the fixing unit by causing the constant current/constant power charge voltage generation circuit to generate a preset PWM signal and performing ON/OFF control of the PWM signal based on the temperature of the AC heating part and an increased voltage according to the ninth embodiment of the present invention.

FIG. 42 is a flowchart showing the control operation of supplying power to the heating part of the fixing unit 112 by causing the constant current/constant power charge voltage generation circuit 7 to generate a preset PWM signal and performing ON/OFF control of the PWM signal based on the temperature of the AC heating part and the increased voltage.

In step S1051, the apparatus control part 10 determines whether the temperature of the AC heating part of the fixing unit 112 is lower than or equal to a preset temperature (for example, 170° C.). If the temperature of the AC heating part is lower than or equal to the preset temperature (YES in step S1051), in step S1052, the apparatus control part 10 outputs a PWM signal to the FET 30a of the switching circuit 30. This PWM signal causes the boost part 80 to increase voltage and causes power to be supplied to the DC fixing heater 22.

Next, in step S1053, the increased voltage detection circuit 50 detects the increased voltage, and the apparatus control part 10 determines whether the detected increased voltage is higher than or equal to preset E [V]. If the increased voltage is higher than or equal to preset E [V] (YES in step S1053), in step S1054, the apparatus control part 10 stops outputting the PWM signal, and again in step S1051, the apparatus control part 10 determines whether the temperature of the AC heating part of the fixing unit 112 is lower than or equal to the preset temperature.

If the temperature of the AC heating part exceeds the preset temperature (NO in step S1051), there is no need to supply power from the boost part 80. Accordingly, in step S1055, the apparatus control part 10 stops outputting the PWM signal, and this control flow ends.

Figure 43:
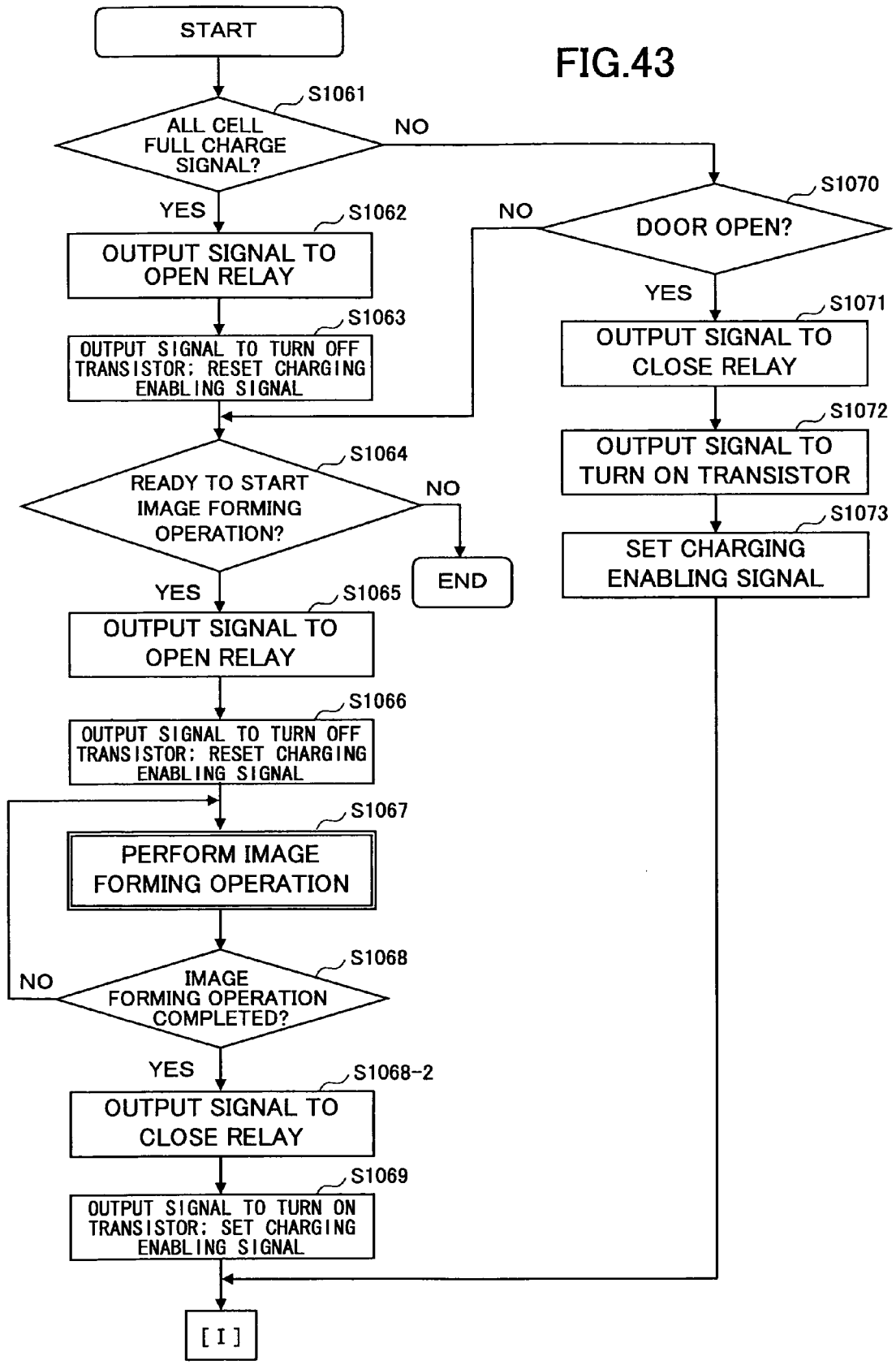
FIG. 43 is a flowchart of the control operation of opening and closing the make-and-break circuit in accordance with the operation mode of the image forming apparatus according to the ninth embodiment of the present invention.

Next, a description is given, with reference to the flowchart of FIG. 43, of the control operation of opening and closing the relay 26a of the make-and-break circuit 26 in accordance with the operation mode of the image forming apparatus.

First, in step S1061, the apparatus control part 10 determines whether the all cell full charge signal 45 has been output from the constant current/constant power charge voltage generation circuit 7. If the all cell full charge signal 45 has been output (YES in step S1061), the charging of the capacitor bank 9 is completed. Accordingly, in step S1062, the apparatus control part 10 transmits a signal to open the relay 26a to the relay drive circuit 25.

Next, in step S1063, the apparatus control part 10 outputs to the transistor Tr2 a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets a charging enabling flag.

Next, in step S1064, the apparatus control part 10 determines whether the image forming apparatus is ready to start an image forming operation. If the image forming apparatus starts an image forming operation (YES in step S1064), it is necessary to supply power to the main body load 20. Accordingly, in step S1065, the apparatus control part 10 outputs a signal to open the relay 26a to the relay drive circuit 25.

Next, in step S1066, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets the charging enabling flag.

After turning OFF the transistor Tr2 and resetting the charging enabling flag, in step S1067, the image forming apparatus performs an image forming operation.

In step S1068, the apparatus control part 10 determines whether the image forming operation is completed. The apparatus control part 10 repeats this determination during the image forming operation. If the image forming operation is completed (YES in step S1068), it is possible to charge the capacitor bank 9. Accordingly, in step S1068-2, the apparatus control part 10 outputs a signal to close the relay 26a to the relay drive circuit 25.

Next, in step S1069, the apparatus control part 10 outputs to the transistor Tr2 a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

When the image forming operation is completed, it may be necessary to charge the capacitor bank 9. Accordingly, after setting the charging enabling flag, the apparatus control part 10 proceeds to arrow [I] of FIG. 38, and performs control to charge the capacitor bank 9.

Returning to step S1061, if the all cell full charge signal 45 has not been output from the capacitor bank 9 (NO in step S1061), in step S1070, the apparatus control part 10 determines whether the image forming apparatus is capable of performing image formation (for example, whether the door of the image forming apparatus is open or whether the image forming apparatus has run out of paper). For example, in this case, the apparatus control part 10 determines whether the door of the image forming apparatus is open.

If the door is not open (NO in step S1070), it is possible to perform image formation without the all cell full charge signal 45. Accordingly, the apparatus control part 10 proceeds to step S1064 to determine whether the image forming apparatus is ready to start an image forming operation.

If the door is open (YES in step S1070), it is not possible to perform an image forming operation. Accordingly, it is possible to charge the capacitor bank 9.

In step S1071, the apparatus control part 10 outputs a signal to close the relay 26a to the relay drive circuit 25. Then, in step S1072, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Then, in step S1073, the apparatus control part 10 sets the charging enabling signal, and thereafter, proceeds to arrow [I] of FIG. 38 to perform control to charge the capacitor bank 9.

Figure 44:
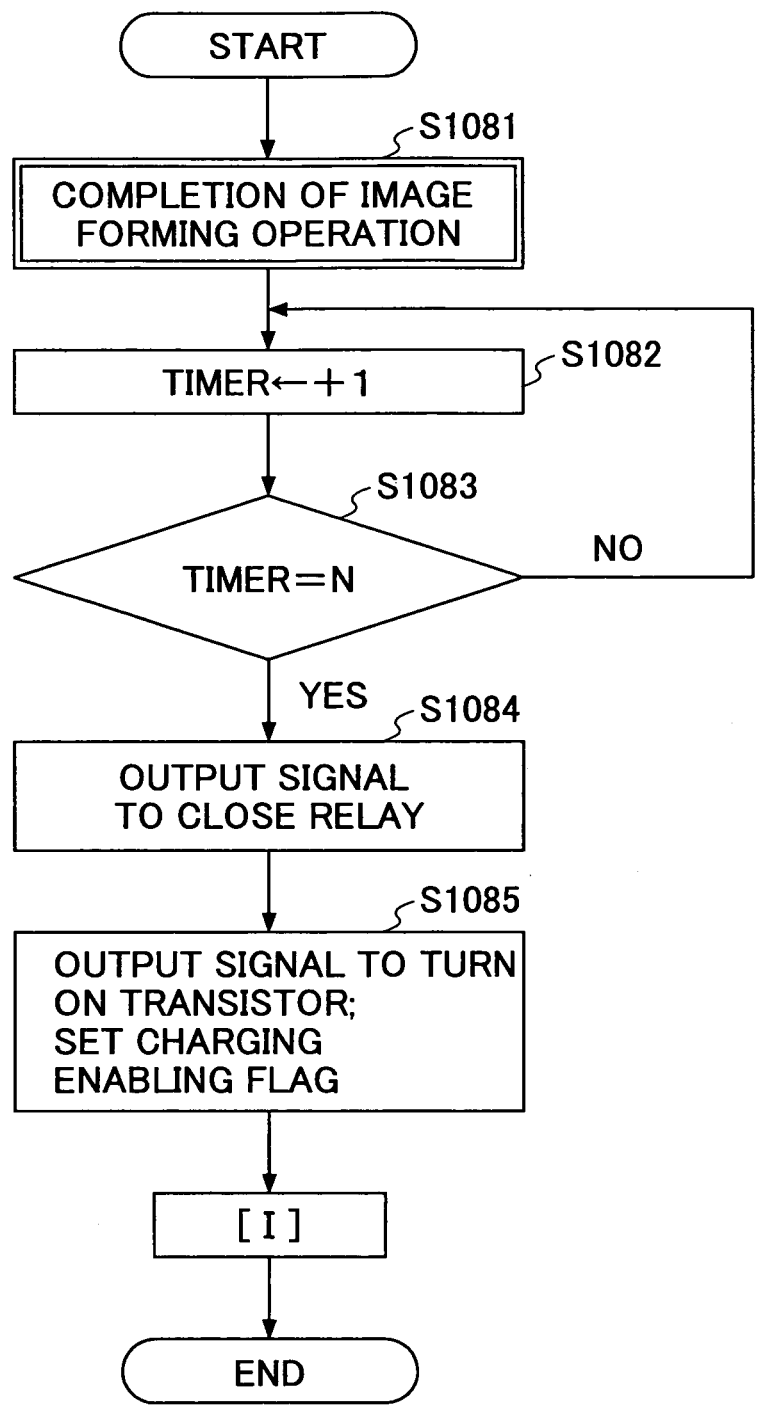
FIG. 44 is a flowchart of a control operation in the case where the image forming apparatus enters the energy saving mode according to the ninth embodiment of the present invention.

Next, a description is given, with reference to the flowchart of FIG. 44, of a control operation in the case where the image forming apparatus enters an energy saving mode.

The image forming apparatus enters an energy saving mode after passage of a certain period of time since completion of an image forming apparatus (step S1081). According to the flowchart of FIG. 44, in step S1082, counting is repeated with a timer, and in step S1083, it is determined whether the counted timer value is a predetermined value N. If the counted timer value is N (YES in step S1083), the image forming apparatus enters an energy saving mode.

In the case of entering an energy saving mode, there is no need to supply power to the main body load 20, and it is possible to charge the capacitor bank 9. Accordingly, in step S1084, the apparatus control part 10 outputs a signal to close the relay 26a to the relay drive circuit 25.

Next, in step S1085, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled. Further, the apparatus control part 10 sets a charging enabling flag. Thereafter, the apparatus control part 10 proceeds to arrow [I] of FIG. 38, and performs control to charge the capacitor bank 9. Thus, it is possible to charge the capacitor bank 9 in the case of entering an energy saving mode.

The apparatus control part 10 does not enter an energy saving mode while charging the capacitor bank 9. When detecting the all cell full charge signal 45 from the constant current/constant power charge voltage generation circuit 7, the apparatus control part 10 outputs to the DC/DC converter 33 a signal to stop part of its power supply output to the image forming apparatus.

Figure 45:
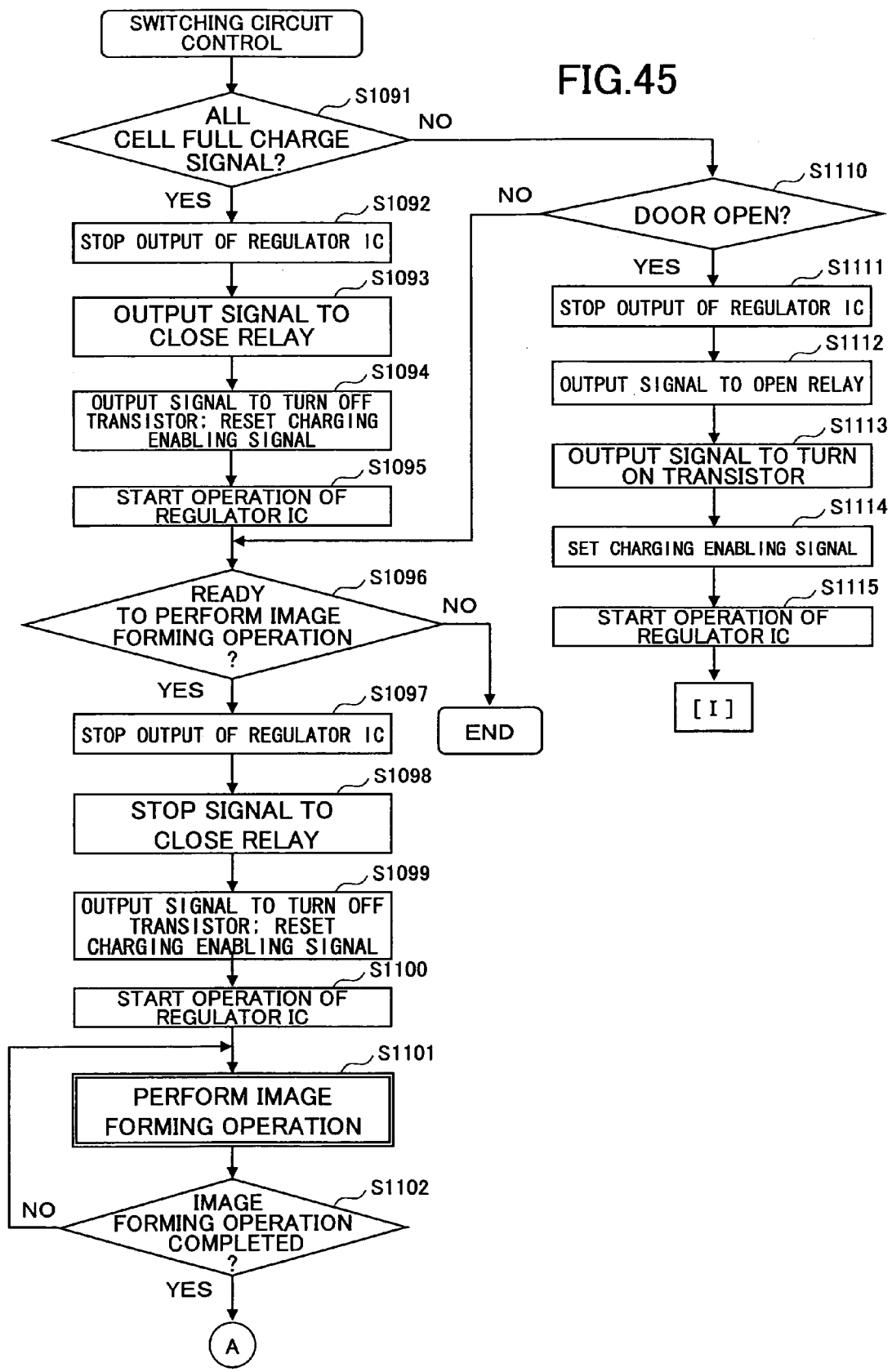
FIG. 45 is a flowchart of the operation of controlling switching of the switching circuit in accordance with the operation mode of the image forming apparatus according to the ninth embodiment of the present invention.
Figure 46:
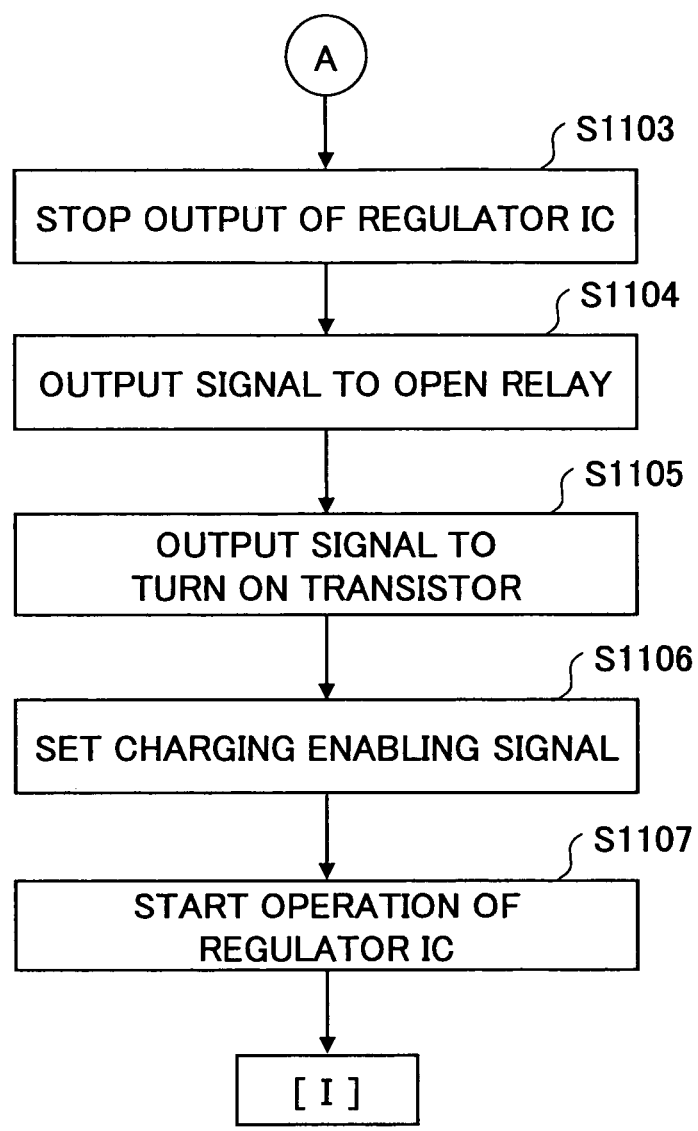
FIG. 46 is a flowchart of the operation of controlling switching of the switching circuit in accordance with the operation mode of the image forming apparatus according to the ninth embodiment of the present invention.

As shown in FIG. 35, the make-and-break circuit 26 may be replaced by the switching circuit 37. A description is given next, with reference to the flowcharts of FIGS. 45 and 46, of the operation of controlling switching of the relay 37a of the switching circuit 37 in accordance with the operation mode of the image forming apparatus. FIGS. 45 and 46 show the operation of controlling switching of the relay 37a of the switching circuit 37 in accordance with the operation mode of the image forming apparatus.

First, in step S1091, the apparatus control part 10 determines whether the all cell full charge signal 45 has been output from the constant current/constant power charge voltage generation circuit 7. If the all cell full charge signal 45 has been output (YES in step S1091), the capacitor bank 9 is charged. Accordingly, in step S1092, the apparatus control part 10 outputs a signal to stop a PWM signal to the switching regulator IC 13.

Next, since the charging of the capacitor bank 9 is completed, in step S1093, the apparatus control part 10 transmits a signal to close the relay 37a to the relay drive circuit 25. Thereby, power is supplied to the main body load 20 side.

Next, in step S1094, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets the charging enabling flag.

Next, in step S1095, the apparatus control part 10 outputs to the switching regulator IC 13 a start signal to cause the switching regulator IC 13 to output a PWM signal.

Next, in step S1096, the apparatus control part 10 determines whether the image forming apparatus is ready to start an image forming operation. If the image forming apparatus starts an image forming operation (YES in step S1096), in step S1097, the apparatus control part 10 outputs a signal to cause the switching regulator IC 13 to stop the PWM signal to the switching regulator IC 13. In the case of performing image formation, it is necessary to supply power to the main body load 20. Accordingly, in step S1098, the apparatus control part 10 outputs a signal to close the relay 37a to the relay drive circuit 25.

Next, in step S1099, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Since the charging of the capacitor bank 9 is completed, the apparatus control part 10 resets a charging enabling flag.

Next, in step S1100, the apparatus control part 10 outputs from a port to the switching regulator IC 13 a start signal to cause the switching regulator IC 13 to output a PWM signal.

Since the image forming apparatus has started the image forming operation in step S1096 (step S1101), in step S1102, the apparatus control part 10 determines whether the image forming operation is completed.

If the image forming operation is completed (YES in step S1102), in step S1103 of FIG. 46, the apparatus control part 10 outputs to the switching regulator IC 13 a signal to cause the switching regulator IC 13 to stop the PWM signal. Further, since a charging operation is performable, in step S1104, the apparatus control part 10 outputs a signal to open the relay 37a to the relay drive circuit 25.

Next, in step S1105, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Next, in step S1106, the apparatus control part 10 sets the charging enabling signal. Further, in step S1107, the apparatus control part outputs to the switching regulator IC 13 a signal to cause the switching regulator IC 13 to output a PWM signal. Since the image forming operation is completed, the apparatus control part 10 proceeds to arrow [I] of the flowchart of FIG. 38, and performs control to charge the capacitor bank 9.

Returning to step S1091, if the all cell full charge signal 45 has not been output (NO in step S1091), in step S1110, the apparatus control part 10 determines whether the image forming apparatus is capable of performing image formation (for example, whether the door of the image forming apparatus is open or whether the image forming apparatus has run out of paper). For example, in this case, the apparatus control part 10 determines whether the door of the image forming apparatus is open.

If the door is not open (NO in step S1110), it is possible to perform image formation without the all cell full charge signal 45. Accordingly, the apparatus control part 10 proceeds to step S1096 to determine whether the image forming apparatus is ready to start an image forming operation.

If the door is open (YES in step S1110), it is not possible to perform an image forming operation. Accordingly, it is possible to charge the capacitor bank 9. In step S1111, the apparatus control part 10 outputs to the switching regulator IC 13 a signal to cause the switching regulator IC 13 to stop a PWM signal.

In step S1112, the apparatus control part 10 outputs a signal to open the relay 37a to the relay drive circuit 25. Then, in step S1113, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Then, in step S1114, the apparatus control part 10 sets the charging enabling signal, and in step S1115, the apparatus control part 10 outputs to the switching regulator IC 13 a start signal to cause the switching regulator IC 13 to output a PWM signal. Then, the apparatus control part 10 proceeds to arrow [I] of FIG. 38, and performs control to charge the capacitor bank 9. Thus, even if the make-and-break circuit 26 is replaced by the switching circuit 37, it is possible to switch the destination of the output of the power supply generation circuit 12 between the main body load 20 and the capacitor bank 9 in accordance with an image forming operation.

Figure 47:
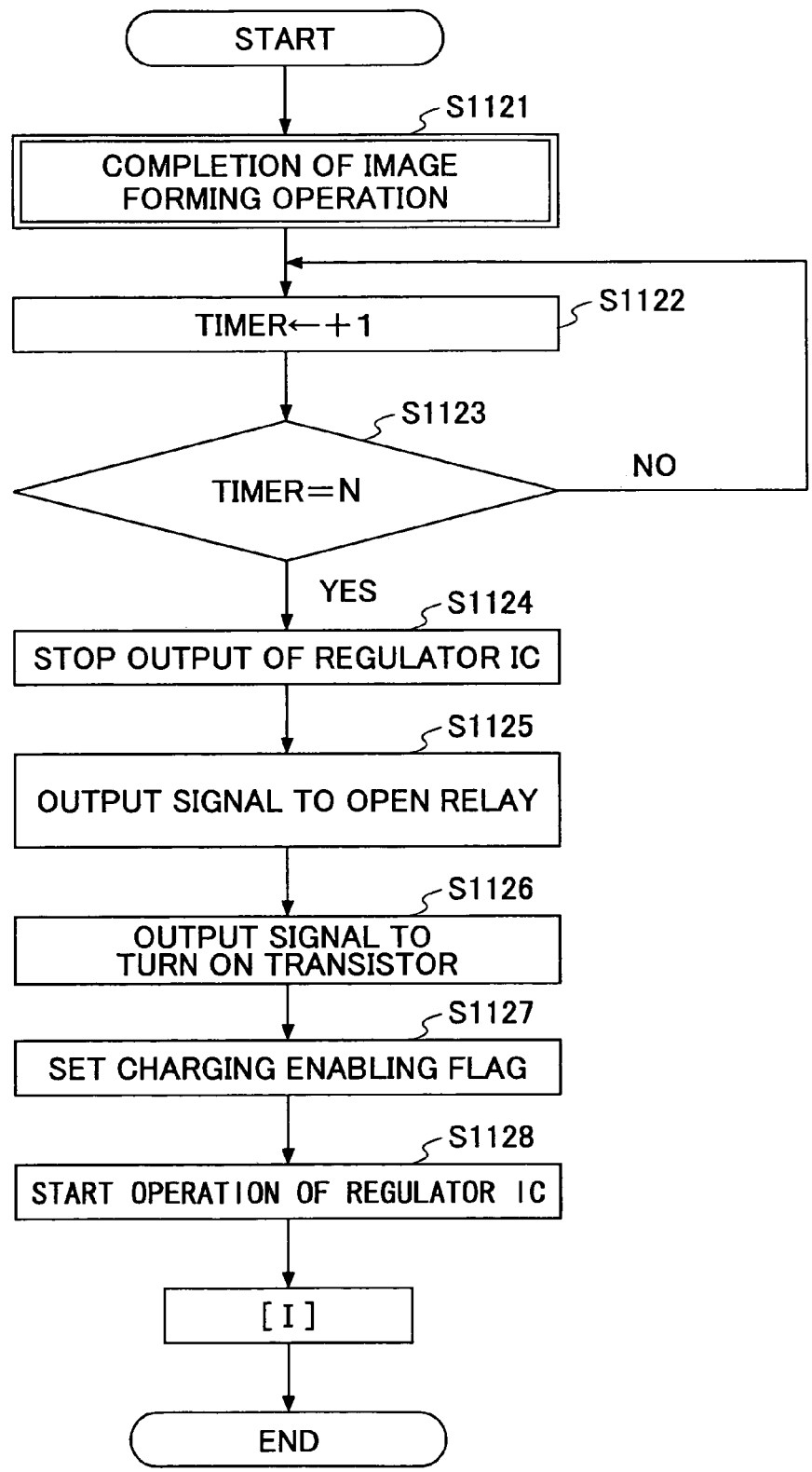
FIG. 47 is a flowchart of a control operation in the case of the image forming apparatus entering the energy saving mode when the switching circuit is employed according to the ninth embodiment of the present invention.

Next, a description is given, with reference to the flowchart of FIG. 47, of a control operation in the case of the image forming apparatus entering an energy saving mode when the switching circuit 37 of FIG. 35 is employed.

The image forming apparatus enters an energy saving mode after passage of a certain period of time since completion of an image forming apparatus (step S1121). According to the flowchart of FIG. 47, in step S1122, counting is repeated with a timer, and in step S1123, it is determined whether the counted timer value is a predetermined value N. If the counted timer value is N (YES in step S1123), the image forming apparatus enters an energy saving mode.

In the case of entering the energy saving mode, there is no need to supply power to the main body load 20, and it is possible to charge the capacitor bank 9. Accordingly, in step S1124, the apparatus control part 10 outputs to the switching regulator IC 13 a signal to cause the switching regulator IC 13 to stop a PWM signal.

Next, since it is possible to charge the capacitor bank 9, in step S1125, the apparatus control part 10 outputs a signal to open the relay 37a to the relay drive circuit 25. Further, in step S1126, the apparatus control part 10 outputs a signal to turn ON the transistor Tr2. By turning ON the transistor Tr2, the feedback signal of the constant current/constant power charge voltage generation circuit 7 is enabled.

Then, in step S1127, the apparatus control part 10 sets a charging enabling flag, and in step S1128, the apparatus control part 10 outputs to the switching regulator IC 13 a start signal to cause the switching regulator IC 13 to output a PWM signal. Then, the apparatus control part 10 proceeds to arrow [I] of FIG. 38, and performs control to charge the capacitor bank 9.

The image forming apparatus does not enter the energy saving mode during a charging operation. When detecting the all cell full charge signal 45 from the constant current/constant power charge voltage generation circuit 7, the apparatus control part 10 outputs to the DC/DC converter 33 a signal to stop part of its power supply output to the image forming apparatus.

As described above, according to the image forming apparatus of this embodiment, the output of the power supply generation circuit 12 can be used as the power supply of the image forming apparatus when required for an image forming operation, and the power supply generation circuit 12 can be used a charger at the time of a charging operation. Accordingly, it is possible to charge the capacitor bank 9 without the need for a dedicated charger, so that it is possible to reduce the cost and the size of the apparatus.

Since time required for charging is approximately a few to tens of seconds, the image forming operation of the image forming apparatus is prevented from being delayed.

Further, power is stored in the capacitor bank 9 after increasing its voltage to substantially the same as the operating voltage of the main body load 20, and the voltage is increased by the boost part 80 when it is necessary to supply the power to the fixing heater 22. Therefore, compared with storing power after increasing its voltage to a voltage to be supplied to the fixing heater 22, it is possible to reduce the capacitor bank 9 in size and charging (power storing) time. Further, even if the temperature of a fixing unit is extremely lower than a preset temperature, it is possible to prevent inrush current because the duty ratio of PWM can be gradually increased (soft start).

Further, at the time of the energy saving mode, it is possible to cause current to flow from the power supply generation circuit 12 to the capacitor bank 9 by closing the make-and-break circuit 26 (or switching the switching circuit 37 to the capacitor bank 9 side). Accordingly, it is possible to charge the capacitor bank 9 even at the time of the energy saving mode.

Tenth Embodiment

Figure 48:
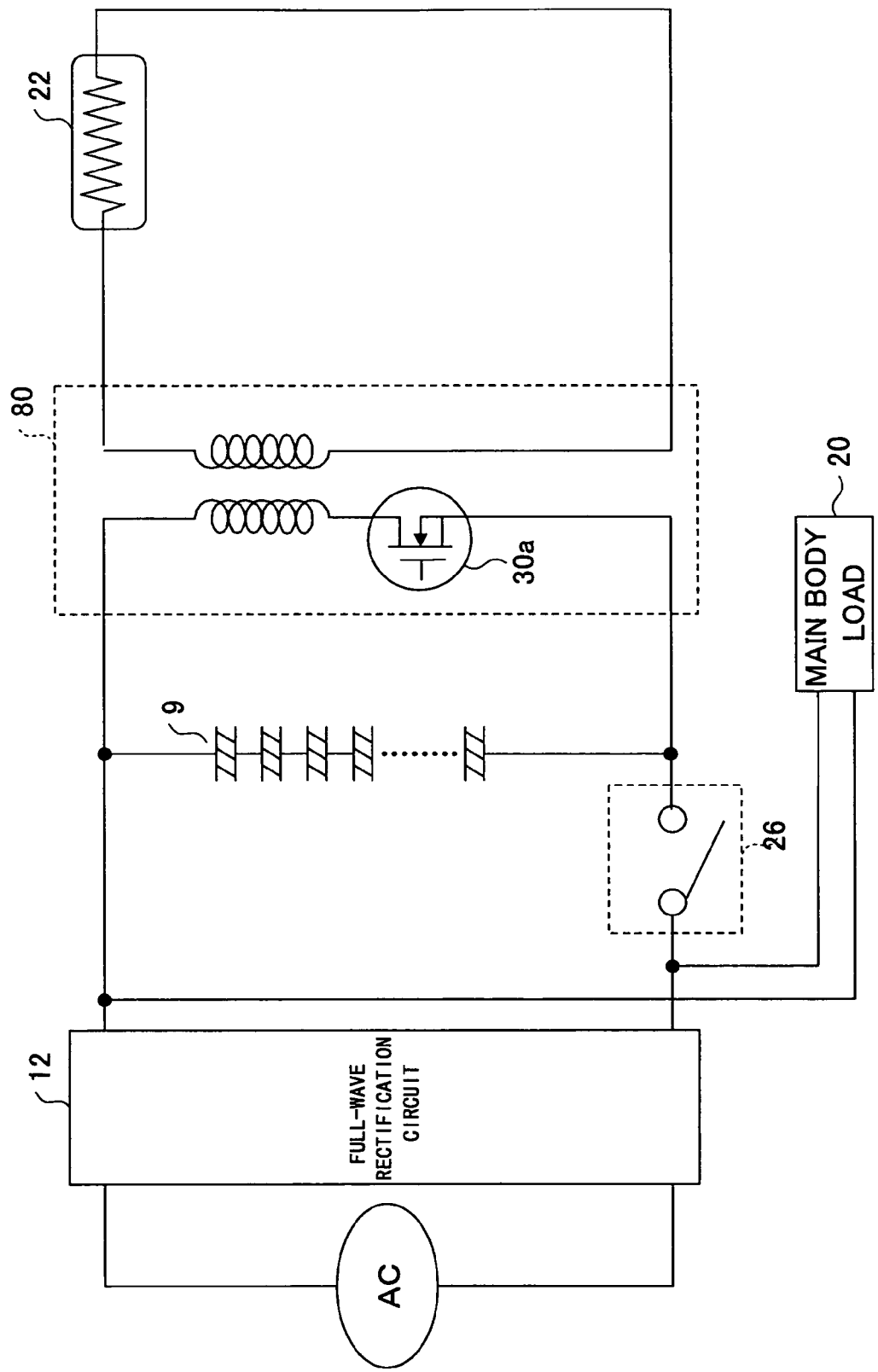
FIG. 48 is a schematic circuit diagram showing a power storage unit according to a tenth embodiment of the present invention.

In a tenth embodiment, a description is given of a power storage unit or an image forming apparatus without the increased voltage detection circuit 50. FIG. 48 is a schematic circuit diagram showing a power storage unit according to this embodiment. In FIG. 48, the same elements as those of FIG. 33 are referred to by the same reference numerals, and a description thereof is omitted.

Figure 49:
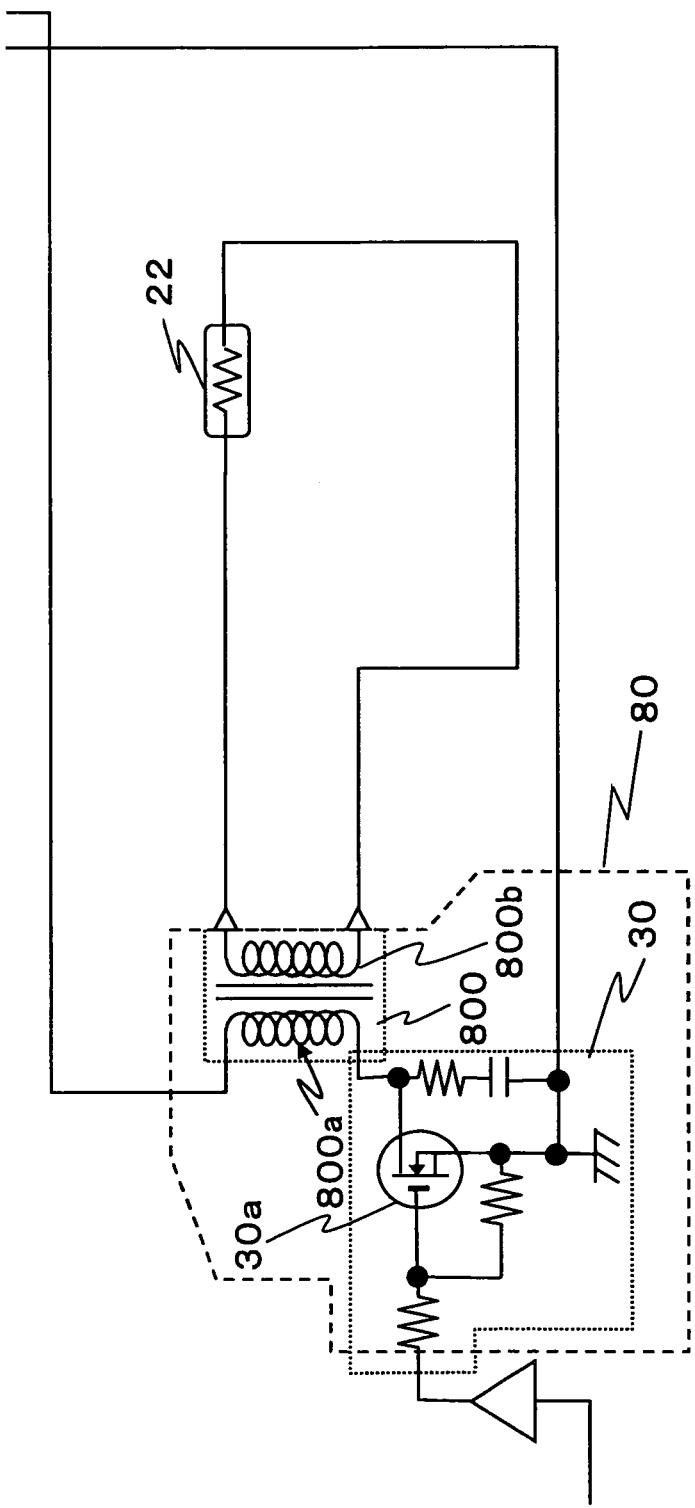
FIG. 49 is a circuit diagram showing the boost part and a DC fixing heater according to the tenth embodiment of the present invention.

In FIG. 48, the increased voltage detection circuit 50 is not provided. The output of the boost part 80 is supplied only to the DC fixing heater 22. FIG. 49 is a circuit diagram showing the boost part 80 and the DC fixing heater 22 according to this embodiment. Since the circuit configuration of this embodiment is the same as that of FIG. 34 except for the increased voltage detection circuit 50. Accordingly, only the circuit diagram including the boost part 80 is shown, and a detailed circuit diagram is omitted.

Figure 50:
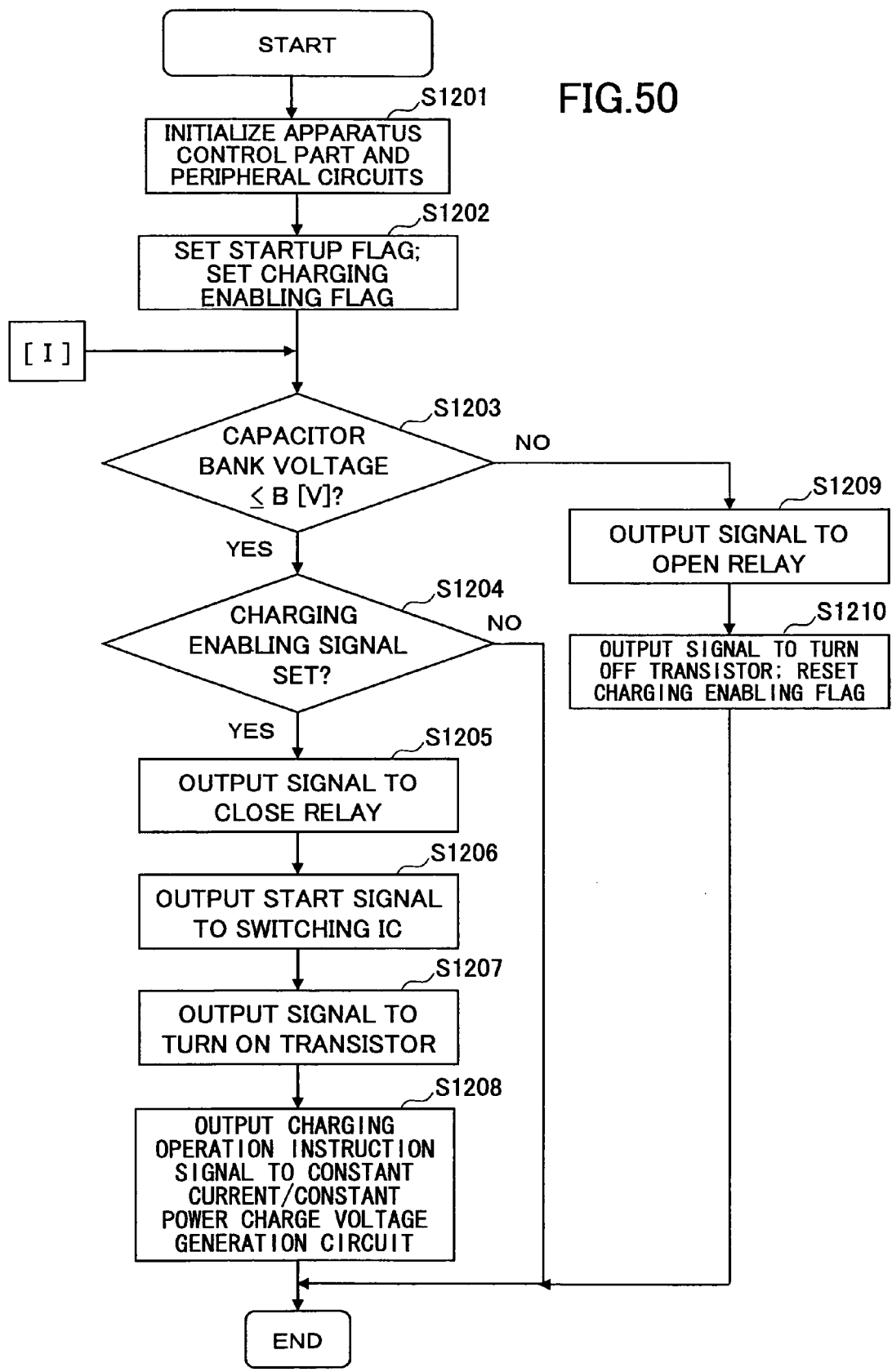
FIG. 50 is a flowchart of a charging control operation performed by the apparatus control part according to the tenth embodiment of the present invention.

A description is given, with reference to the flowchart of FIG. 50, of the charging control operation that the apparatus control part 10 performs using the configuration of FIG. 48.

When the main power switch 11 is turned ON and the apparatus control part 10 receives power supplied from the DC/DC converter 33, in step S1201, the apparatus control part 10 initializes the apparatus control part 10 and its peripheral circuits.

In step S1012, the apparatus control part 10 sets a startup flag that is set when the main power switch 11 is turned ON or the energy saving mode is canceled. This flag is referred to in the case of increasing the fixing temperature of the image forming apparatus as described below. It is not possible to perform an image forming operation immediately after the main power switch 11 is turned ON. Accordingly, next, the apparatus control part 10 sets a charging enabling flag.

Arrow [I] after step S1202 indicates a procedure from a below-described flowchart.

Next, in step S1203, the apparatus control part 10 obtains the charge voltage of the capacitor bank 9 through the charge voltage detection circuit 16, and determines whether the charge voltage of the capacitor bank 9 is lower than or equal to B [V]. If the charge voltage of the capacitor bank 9 is lower than or equal to preset B [V] (YES in step S1203), in step S1204, the apparatus control part 10 determines whether a charging enabling flag is set.

If no charging enabling flag is set (NO in step S1204), it is necessary to supply power to the main body load 20 side. Accordingly, this flow ends without performing a charging operation.

If the charge voltage of the capacitor bank 9 is not lower than or equal to preset B [V] (NO in step S1203), the capacitor bank 9 is in a charged state. Accordingly, in step S1209, the apparatus control part 10 outputs a signal to open the relay 26a to the relay drive circuit 25. As a result, the output of the power supply generation circuit is supplied to the main body load 20. If the switching circuit 37 of FIG. 35 is used in place of the make-and-break circuit 26, the apparatus control part 10 may output a signal to close the relay 37a to the relay drive circuit 25.

Next, in step S1210, the apparatus control part 10 outputs a signal to turn OFF the transistor Tr2. As a result, the power supply generation circuit 12 can perform a constant voltage operation. There is no need to perform charging if the charge voltage of the capacitor bank 9 is higher than B [V]. Accordingly, the apparatus control part 10 resets the charging enabling flag, and the control of FIG. 50 ends.

If a charging enabling signal is set (YES in step S1204), in step S1205, the apparatus control part 10 outputs a signal to close the relay 26a to the relay drive circuit 25.

Next, in step S1206, the apparatus control part 10 outputs a start signal to the switching regulator IC 13 through the OR circuit 51. Further, in step S1207, the apparatus control part 10 outputs a signal to turn ON the transistor Tr2 to the transistor Tr2, which connects the anode and the cathode of the photocoupler PC1 of the constant voltage detection circuit 21 that feeds back a voltage value in order for the power supply generation circuit 12 to output a constant voltage. The transistor Tr2 is turned ON to enable the feedback signal of the constant current/constant power charge voltage generation circuit 7.

Next, in step S1208, the apparatus control part 10 outputs a charging operation instruction signal to the constant current/constant power charge voltage generation circuit 7. By the above-described control, the capacitor bank 9 is charged. As described above, the constant current/constant power charge voltage generation circuit 7 detects the charge voltage and the charging current of the capacitor bank 9 and the operations of the bypass circuits, and performs constant current charging or constant power charging.

Figure 51:
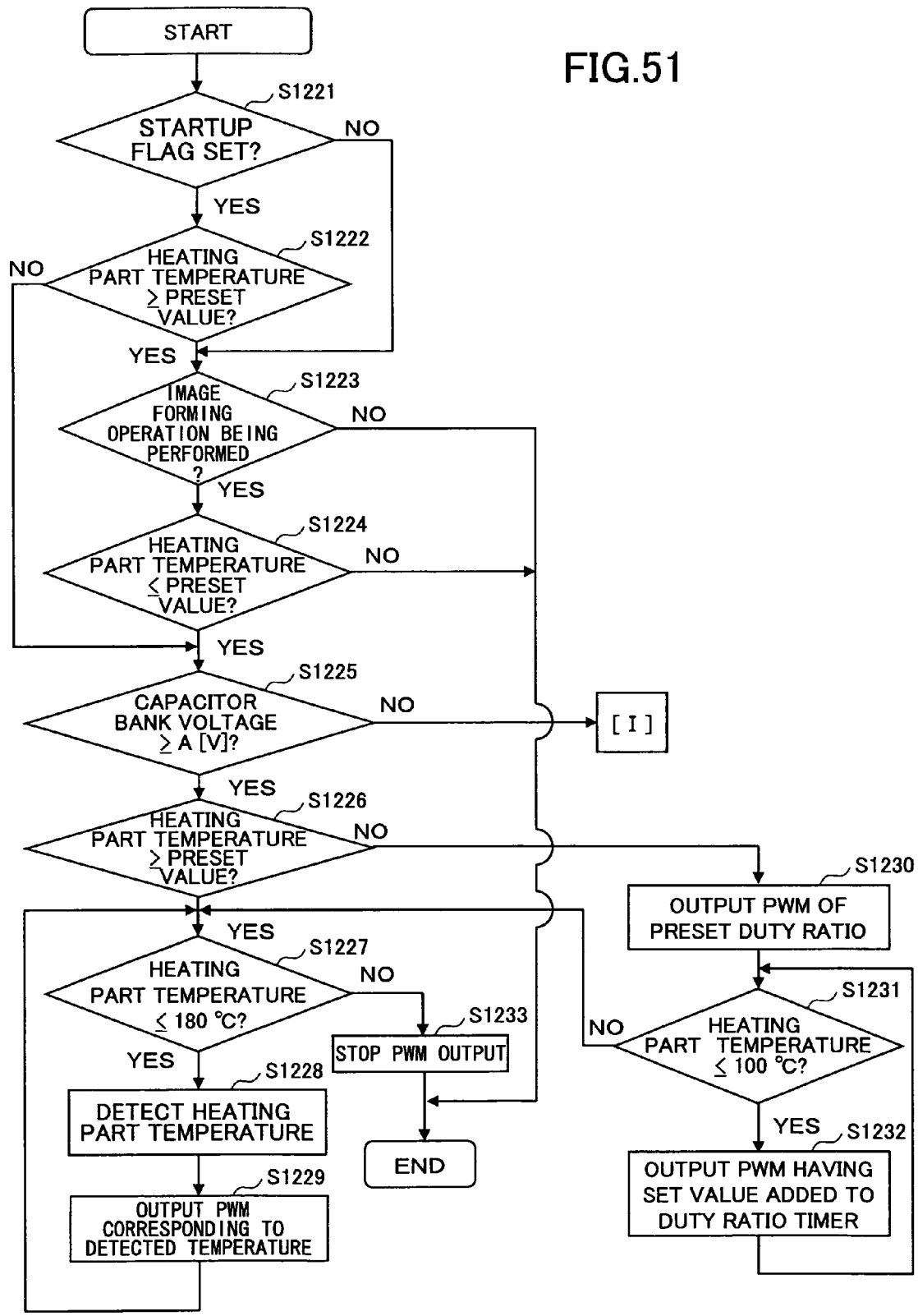
FIG. 51 is a flowchart showing the control operation of supplying power from the boost part to the heating part of the fixing unit when power is turned ON, the energy saving mode is canceled, or an image forming operation is being performed according to the tenth embodiment of the present invention.

Next, a description is given, with reference to the flowchart of FIG. 51, of the control operation of supplying power from the boost part 80 to the heating part of the fixing unit 112 when power is turned ON, the energy saving mode is canceled, or an image forming operation is being performed.

In step S1221, the apparatus control part 10 determines whether a startup flag that is set when the main power switch 11 is turned ON or the energy saving mode is canceled is set.

When the startup flag is set (YES in step S1221), in step S1222, the apparatus control part 10 obtains the output of the temperature detection circuit 610 that detects the temperature of the AC heater heating part, and determines whether the temperature of the AC heater heating part is higher than or equal to a preset temperature.

If the temperature of the AC heater heating part is higher than or equal to the preset temperature (for example, higher than or equal to 130° C.) (YES in step S1222), in step S1223, the apparatus control part 10 determines whether the image forming apparatus is performing an image forming operation. If the image forming apparatus is not performing an image forming operation (NO in step S1223), there is no need to supply power from the boost part 80 to the DC fixing heater 22. Accordingly, the control of the flowchart of FIG. 51 ends.

If the image forming apparatus is performing an image forming operation (YES in step S1223), in step S1224, the apparatus control part 10 determines whether the temperature of the AC heater heating part is lower than or equal to a preset temperature. If the temperature of the AC heater heating part is not lower than or equal to the preset temperature (NO in step S1224), there is no need to supply power from the boost part 80 to the DC fixing heater 22. Accordingly, the control of the flowchart of FIG. 51 ends.

If the temperature of the AC heater heating part is lower than or equal to the preset temperature (for example, lower than or equal to 155° C.) (YES in step S1224), there may be a copy of an unfixed image. Accordingly, in step S1225, in order to supply power from the boost part 80 to the DC fixing heater 22, the apparatus control part 10 obtains the charge voltage of the capacitor bank 9 through the charge voltage detection circuit 16, and determines whether the charge voltage of the capacitor bank 9 is higher than or equal to a predetermined voltage A [V].

If the charge voltage of the capacitor bank 9 is not higher than or equal to a predetermined voltage A [V] (NO in step S1225), the stored power (energy) is not sufficient. Accordingly, the apparatus control part 10 performs the operation after [I] of FIG. 50 in order to perform a control flow to charge the capacitor bank 9.

If the charge voltage of the capacitor bank 9 is higher than or equal to A [V] (YES in step S1225), in step S1226, the apparatus control part 10 determines whether the temperature of the AC heater heating part is higher than or equal to a preset temperature (for example, higher than or equal to 20° C.).

If the temperature of the AC heater heating part is not higher than or equal to the preset temperature (NO in step S1226), the temperature of the AC heating part of the fixing unit 112 is extremely lower than a fixing temperature. Accordingly, in step S1230, the apparatus control part 10 outputs for a predetermined period of time a PWM signal of a duty ratio for a voltage lower than a preset increased voltage in order to reduce inrush current.

Next, in step S1231, the apparatus control part 10 determines whether the temperature of the AC heating part is lower than or equal to a predetermined temperature (for example, lower than or equal to 100° C.). If the temperature of the AC heating part is lower than or equal to 100° C. (YES in step S1231), in step S1232, the apparatus control part 10 outputs a PWM signal having a set value added to a timer determining the duty ratio.

Then, again in step S1231, the apparatus control part 10 determines whether the temperature of the AC heating part is lower than or equal to the preset temperature. If the temperature of the AC heating part is lower than or equal to the preset temperature, the operation of step S1232 is repeated. By this operation, it is possible to gradually increase the duty ratio of PWM (soft start). Accordingly, it is possible to reduce inrush current.

If the temperature of the AC heating part is higher than or equal to the preset temperature (YES in step S1226), or if the temperature of the AC heating part is not lower than or equal to the preset temperature (NO in step S1231), in step S1227, the apparatus control part 10 determines whether the temperature of the AC heater heating part is lower than or equal to a preset temperature (for example, 180° C.).

If the temperature of the AC heater heating part is lower than or equal to the preset temperature (YES in step S1227), in step S1228, the apparatus control part 10 detects the temperature of the AC heating part, and in step S1229, the apparatus control part 10 outputs a PWM signal corresponding to the detected temperature to the FET 30a of the switching circuit 30. The duty ratio of the PWM signal is higher when the temperature is low, and is lower when the temperature is high.

The frequency of the PWM signal is generated by a timer (not graphically illustrated) of the apparatus control part 10, and the modulation of the pulse width can be changed by controlling an internal timer for modulation (not graphically illustrated). The value of the internal timer for modulation may be determined from a preset table in which the value of the internal timer for modulation is correlated with the temperature of the AC heating part, or be calculated by operations.

If the temperature of the AC heater heating part is not lower than or equal to the preset temperature (NO in step S1227), there is no need to supply power from the boost part 80 to the DC fixing heater 22. Accordingly, in step S1233, the apparatus control part 10 stops outputting the PWM signal. By the above-described operation, the temperature of the fixing unit 112 is controlled. In this embodiment, the increased voltage detection circuit 50 is not provided. However, it is possible to control the temperature of the DC fixing heater 22 in accordance with the temperature of the AC heating part.

Figure 52:
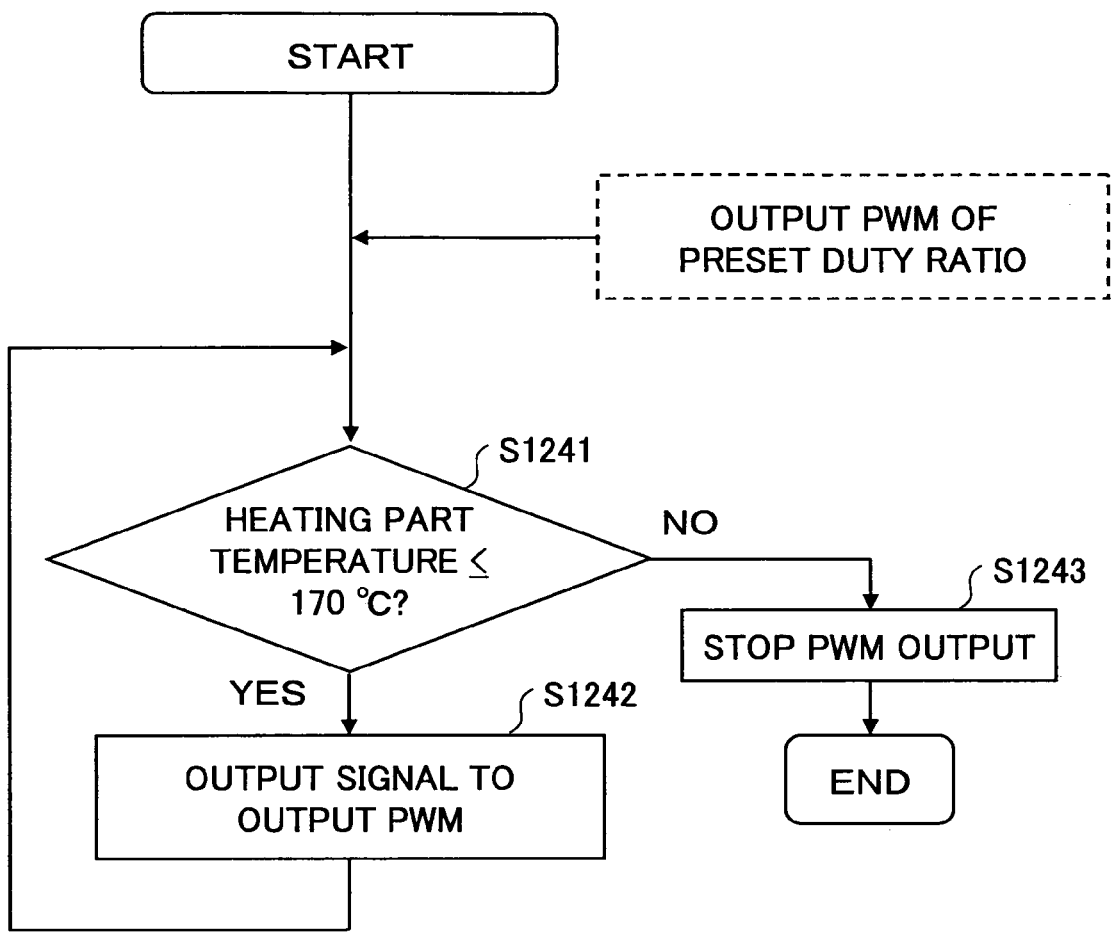
FIG. 52 is a flowchart of the control operation of supplying power to the heating part of the fixing unit by generating a preset PWM signal according to the tenth embodiment of the present invention.

Next, a description is given, with reference to the flowchart of FIG. 52, of the control operation of supplying power to the heating part of the fixing unit 112 by the constant current/constant power charge voltage generation circuit 7 generating a preset PWM signal by detecting the temperature of the heating part and performing ON/OFF control. Since the configuration of the boost part 80 is the same as that of FIG. 41, and accordingly, a description thereof is omitted.

First, in step S1241, the apparatus control part 10 determines whether the temperature of the AC heating part of the fixing unit 112 is lower than or equal to a preset temperature (for example, 170° C.). If the temperature of the AC heating part is lower than or equal to the preset temperature (YES in step S1241), in step S1242, the apparatus control part 10 outputs a signal to the AND circuit 46 in accordance with the temperature of AC the heating part, thereby outputting a PWM signal to the FET 30a of the switching circuit 30. This PWM signal causes the boost part 80 to increase voltage and causes power to be supplied to the heating part of the fixing unit 112.

If the temperature of the AC heating part is not lower than or equal to the preset temperature (NO in step S1241), there is no need to supply power from the boost part 80 to the DC fixing heater 22. Accordingly, in step S1243, the apparatus control part 10 stops outputting the PWM signal, and the control of FIG. 52 ends.

Figure 53:
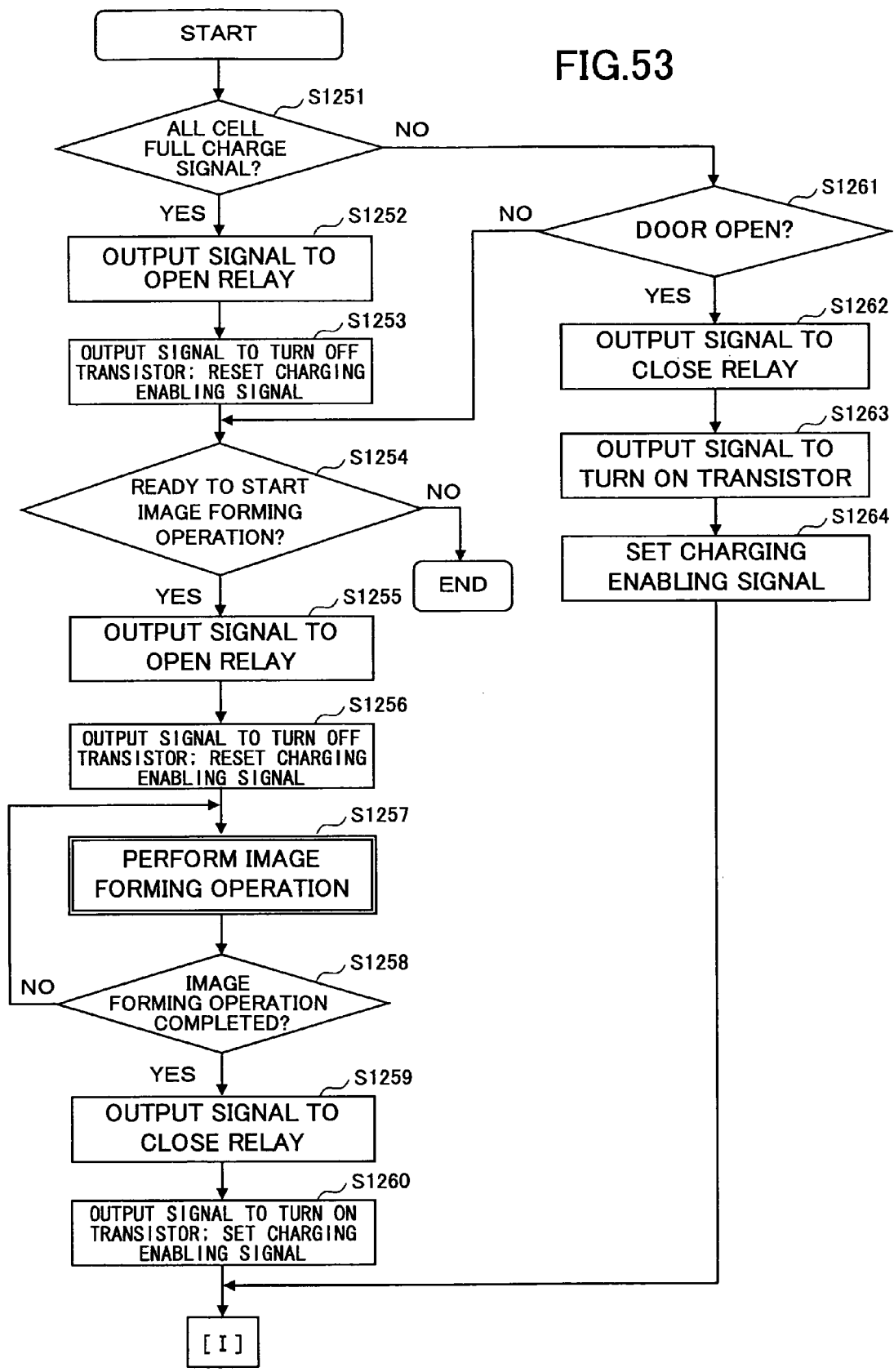
FIG. 53 is a flowchart of the control operation of opening and closing the make-and-break circuit in accordance with the operation mode of the image forming apparatus according to the tenth embodiment of the present invention.

Next, a description is given, with reference to the flowchart of FIG. 53, of the control operation of opening and closing the relay 26a of the make-and-break circuit 26 in accordance with the operation mode of the image forming apparatus.

First, in step S1251, the apparatus control part 10 determines whether the all cell full charge signal 45 has been output from the constant current/constant power charge voltage generation circuit 7. If the all cell full charge signal 45 has been output (YES in step S1251), the charging of the capacitor bank 9 is completed. Accordingly, in step S1252, the apparatus control part 10 transmits a signal to open the relay 26a to the relay drive circuit 25.

Next, in step S1253, the apparatus control part 10 outputs to the transistor Tr2 a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets a charging enabling flag.

Next, in step S1254, the apparatus control part 10 determines whether the image forming apparatus is ready to start an image forming operation. If the image forming apparatus starts an image forming operation (YES in step S1254), it is necessary to supply power to the main body load 20. Accordingly, in step S1255, the apparatus control part 10 outputs a signal to open the relay 26a to the relay drive circuit 25.

Next, in step S1256, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets the charging enabling flag.

After turning OFF the transistor Tr2 and resetting the charging enabling flag, in step S1257, the image forming apparatus performs an image forming operation.

In step S1258, the apparatus control part 10 determines whether the image forming operation is completed. The apparatus control part 10 repeats this determination during the image forming operation. If the image forming operation is completed (YES in step S1258), it is possible to charge the capacitor bank 9. Accordingly, in step S1259, the apparatus control part 10 outputs a signal to close the relay 26a to the relay drive circuit 25.

Next, in step S1260, the apparatus control part 10 outputs to the transistor Tr2 a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

When the image forming operation is completed, it may be necessary to charge the capacitor bank 9. Accordingly, after setting the charging enabling flag, the apparatus control part 10 proceeds to arrow [I] of FIG. 50, and performs control to charge the capacitor bank 9.

Returning to step S1251, if the all cell full charge signal 45 has not been output from the capacitor bank 9 (NO in step S1251), in step S1261, the apparatus control part 10 determines whether the image forming apparatus is capable of performing image formation (for example, whether the door of the image forming apparatus is open or whether the image forming apparatus has run out of paper). For example, in this case, the apparatus control part 10 determines whether the door of the image forming apparatus is open.

If the door is not open (NO in step S1261), it is possible to perform image formation without the all cell full charge signal 45. Accordingly, the apparatus control part 10 proceeds to step S1254 to determine whether the image forming apparatus is ready to start an image forming operation.

If the door is open (YES in step S1261), it is not possible to perform an image forming operation. Accordingly, it is possible to charge the capacitor bank 9.

In step S1262, the apparatus control part 10 outputs a signal to close the relay 26*a* to the relay drive circuit 25. Then, in step S1263, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Then, in step S1264, the apparatus control part 10 sets the charging enabling signal, and thereafter, proceeds to arrow [I] of FIG. 50 to perform control to charge the capacitor bank 9.

Figure 54:
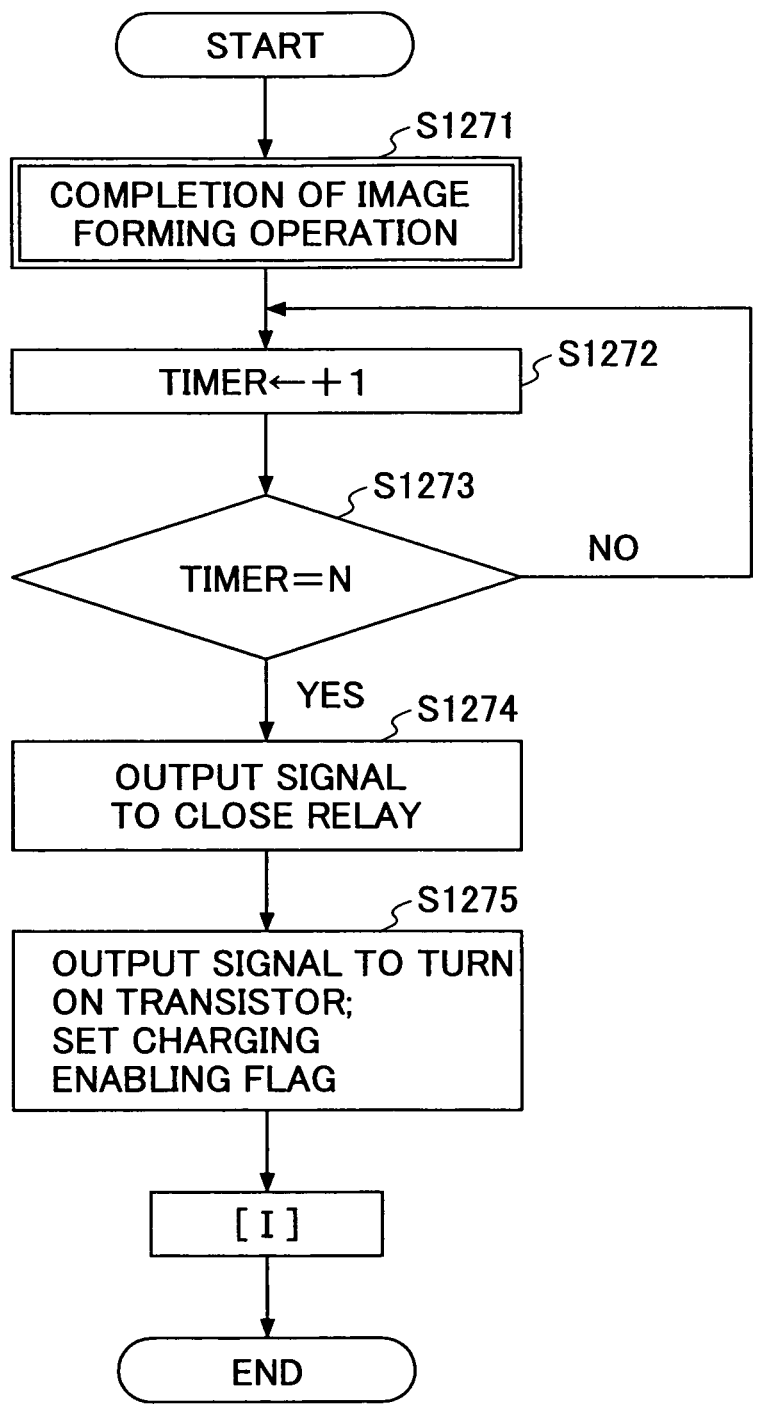
FIG. 54 is a flowchart showing a control operation in the case where the image forming apparatus enters the energy saving mode according to the tenth embodiment of the present invention.

Next, a description is given, with reference to the flowchart of FIG. 54, of a control operation in the case where the image forming apparatus enters an energy saving mode.

The image forming apparatus enters an energy saving mode after passage of a certain period of time since completion of an image forming apparatus (step S1271). According to the flowchart of FIG. 54, in step S1272, counting is repeated with a timer, and in step S1273, it is determined whether the counted timer value is a predetermined value N. If the counted timer value is N (YES in step S1273), the image forming apparatus enters an energy saving mode.

In the case of entering an energy saving mode, there is no need to supply power to the main body load 20, and it is possible to charge the capacitor bank 9. Accordingly, in step S1274, the apparatus control part 10 outputs a signal to close the relay 26*a* to the relay drive circuit 25.

Next, in step S1275, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled. Further, the apparatus control part 10 sets a charging enabling flag. Thereafter, the apparatus control part 10 proceeds to arrow [I] of FIG. 50, and performs control to charge the capacitor bank 9. Thus, it is possible to charge the capacitor bank 9 in the case of entering an energy saving mode.

The apparatus control part 10 does not enter an energy saving mode while charging the capacitor bank 9. When detecting the all cell full charge signal 45 from the constant current/constant power charge voltage generation circuit 7, the apparatus control part 10 outputs to the DC/DC converter 33 a signal to stop part of its power supply output to the image forming apparatus.

Figure 55:
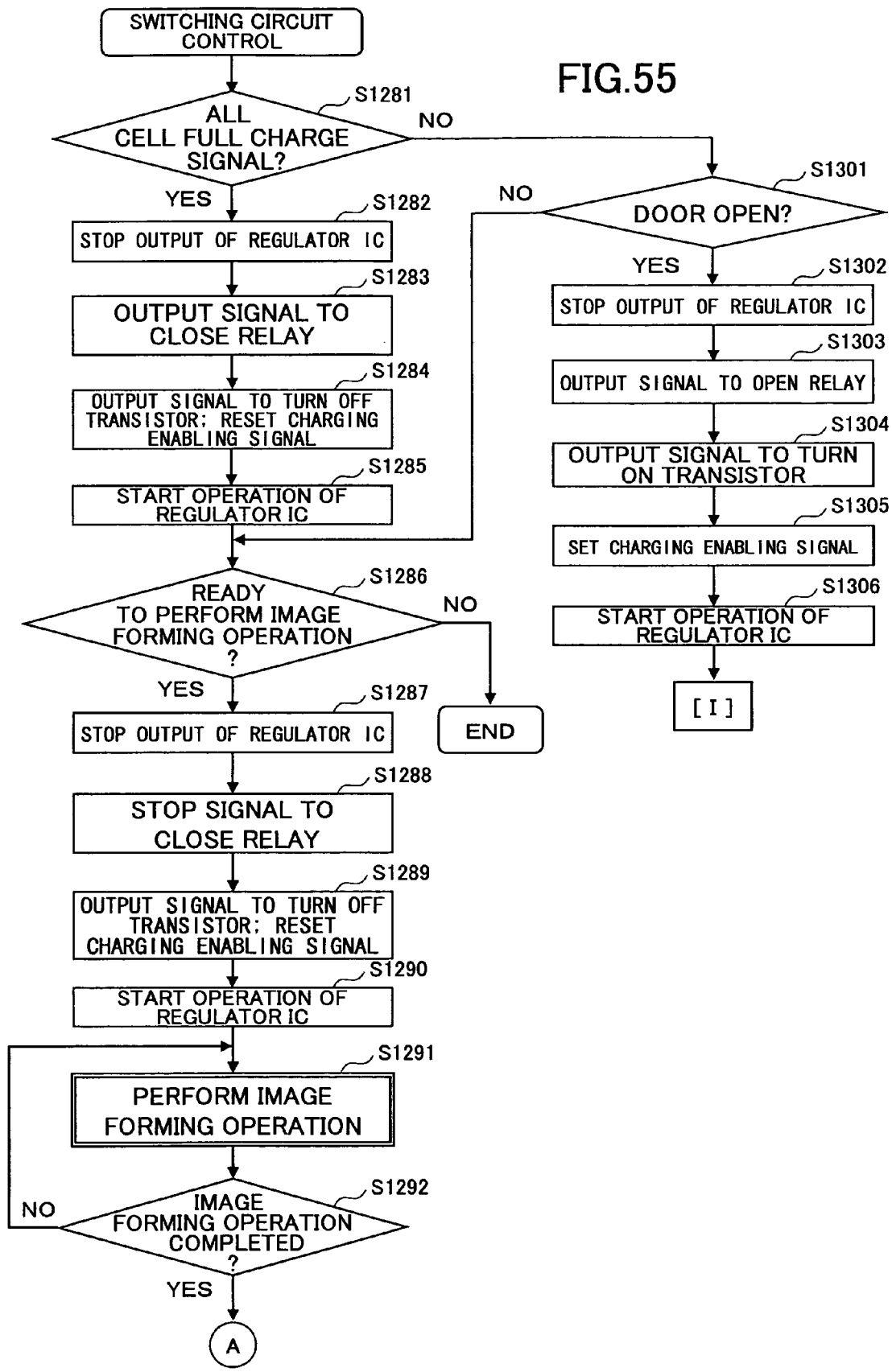
FIG. 55 is a flowchart of the operation of controlling switching of the switching circuit in accordance with the operation mode of the image forming apparatus according to the tenth embodiment of the present invention.
Figure 56:
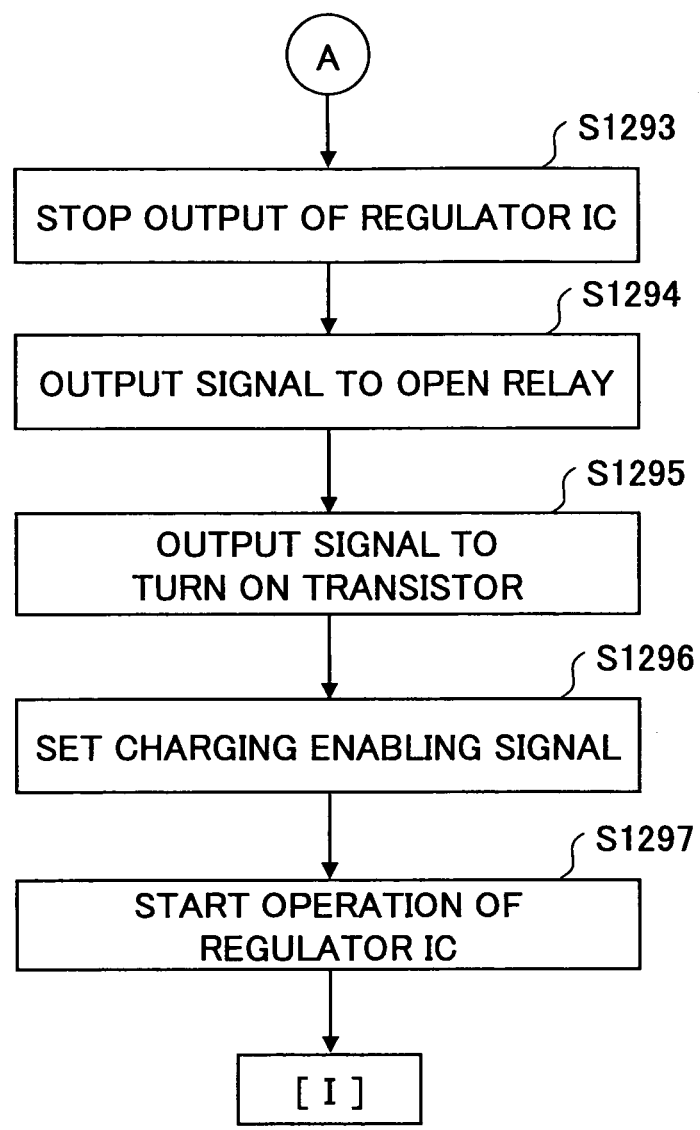
FIG. 56 is a flowchart of the operation of controlling switching of the switching circuit in accordance with the operation mode of the image forming apparatus according to the tenth embodiment of the present invention.

According to this embodiment, the make-and-break circuit 26 may be replaced by the switching circuit 37. A description is given next, with reference to the flowcharts of FIGS. 55 and 56, of the operation of controlling switching of the relay 37*a* of the switching circuit 37 in accordance with the operation mode of the image forming apparatus. FIGS. 55 and 56 show the operation of controlling switching of the relay 37*a* of the switching circuit 37 in accordance with the operation mode of the image forming apparatus.

First, in step S1281, the apparatus control part 10 determines whether the all cell full charge signal 45 has been output from the constant current/constant power charge voltage generation circuit 7. If the all cell full charge signal 45 has been output (YES in step S1281), the capacitor bank 9 is charged. Accordingly, in step S1282, the apparatus control part 10 outputs a signal to stop a PWM signal to the switching regulator IC 13.

Next, since the charging of the capacitor bank 9 is completed, in step S1283, the apparatus control part 10 transmits a signal to close the relay 37*a* to the relay drive circuit 25. Thereby, power is supplied to the main body load 20 side.

Next, in step S1284, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets the charging enabling flag.

Next, in step S1285, the apparatus control part 10 outputs to the switching regulator IC 13 a start signal to cause the switching regulator IC 13 to output a PWM signal.

Next, in step S1286, the apparatus control part 10 determines whether the image forming apparatus is ready to start an image forming operation. If the image forming apparatus starts an image forming operation (YES in step S1286), in step S1287, the apparatus control part 10 outputs a signal to cause the switching regulator IC 13 to stop the PWM signal to the switching regulator IC 13. In the case of performing image formation, it is necessary to supply power to the main body load 20. Accordingly, in step S1288, the apparatus control part 10 outputs a signal to close the relay 37*a* to the relay drive circuit 25.

Next, in step S1289, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Since the charging of the capacitor bank 9 is completed, the apparatus control part 10 resets a charging enabling flag.

Next, in step S1290, the apparatus control part 10 outputs from a port to the switching regulator IC 13 a start signal to cause the switching regulator IC 13 to output a PWM signal.

Since the image forming apparatus has started the image forming operation in step S1286 (step S1291), in step S1292, the apparatus control part 10 determines whether the image forming operation is completed.

If the image forming operation is completed (YES in step S1292), in step S1293 of FIG. 56, the apparatus control part 10 outputs to the switching regulator IC 13 a signal to cause the switching regulator IC 13 to stop the PWM signal. Further, since a charging operation is performable, in step S1294, the apparatus control part 10 outputs a signal to open the relay 37*a* to the relay drive circuit 25.

Next, in step S1295, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Next, in step S1296, the apparatus control part 10 sets the charging enabling signal. Further, in step S1297, the apparatus control part outputs to the switching regulator IC 13 a signal to cause the switching regulator IC 13 to output a PWM signal. Since the image forming operation is completed, the apparatus control part 10 proceeds to arrow [I] of the flowchart of FIG. 50, and performs control to charge the capacitor bank 9.

Returning to step S1281, if the all cell full charge signal 45 has not been output (NO in step S1281), in step S1301, the apparatus control part 10 determines whether the image forming apparatus is capable of performing image formation (for example, whether the door of the image forming apparatus is open or whether the image forming apparatus has run out of paper). For example, in this case, the apparatus control part 10 determines whether the door of the image forming apparatus is open.

If the door is not open (NO in step S1301), it is possible to perform image formation without the all cell full charge signal 45. Accordingly, the apparatus control part 10 proceeds to step S1286 to determine whether the image forming apparatus is ready to start an image forming operation.

If the door is open (YES in step S1301), it is not possible to perform an image forming operation. Accordingly, it is possible to charge the capacitor bank 9. In step S1302, the apparatus control part 10 outputs to the switching regulator IC 13 a signal to cause the switching regulator IC 13 to stop a PWM signal.

In step S1303, the apparatus control part 10 outputs a signal to open the relay 37a to the relay drive circuit 25. Then, in step S1304, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Then, in step S1305, the apparatus control part 10 sets the charging enabling signal, and in step S1306, the apparatus control part 10 outputs to the switching regulator IC 13 a start signal to cause the switching regulator IC 13 to output a PWM signal. Then, the apparatus control part 10 proceeds to arrow [I] of FIG. 50, and performs control to charge the capacitor bank 9. Thus, even if the make-and-break circuit 26 is replaced by the switching circuit 37, it is possible to switch the destination of the output of the power supply generation circuit 12 between the main body load 20 and the capacitor bank 9 in accordance with an image forming operation.

Figure 57:
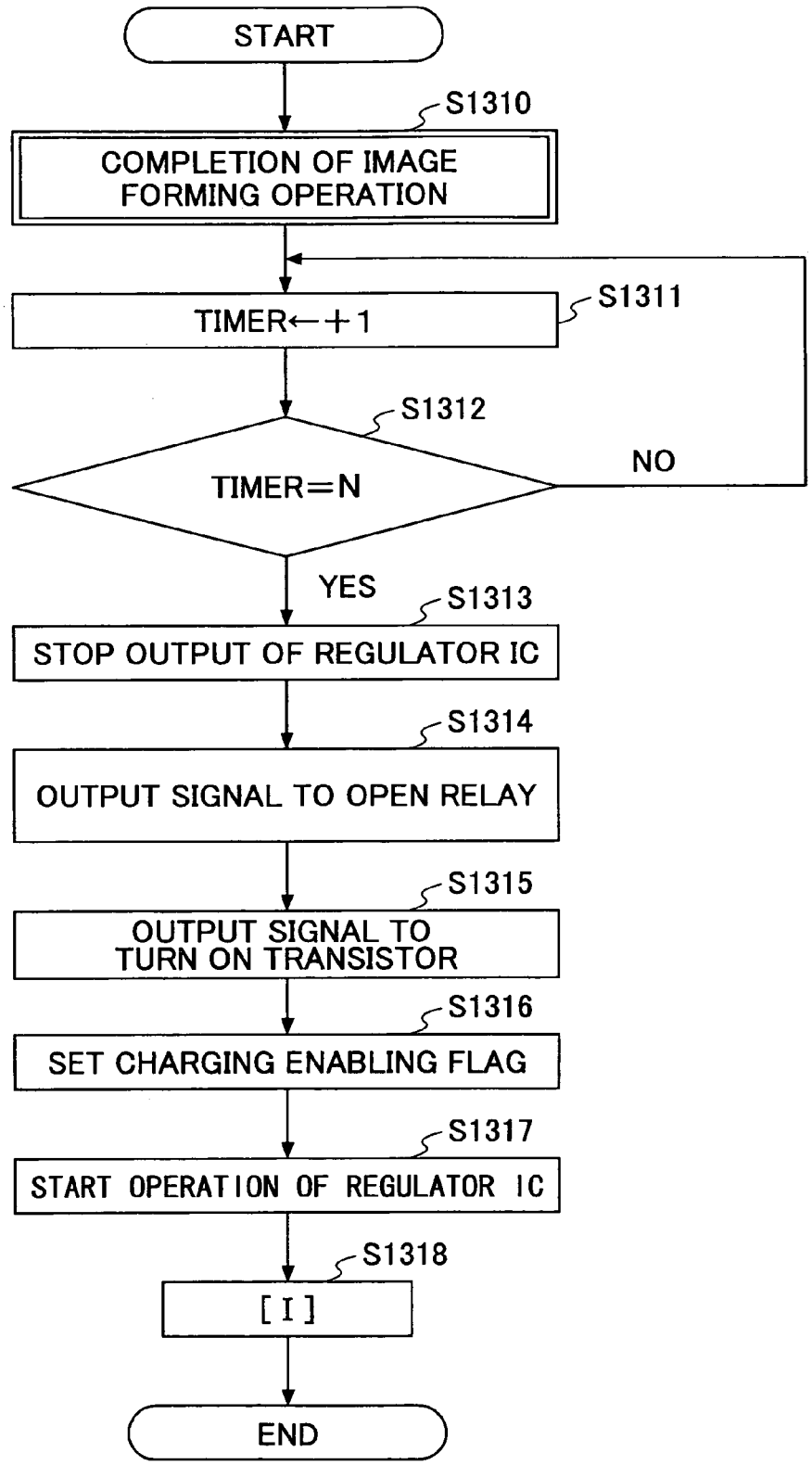
FIG. 57 is a flowchart of a control operation in the case of the image forming apparatus entering the energy saving mode when the switching circuit is employed according to the tenth embodiment of the present invention.

Next, a description is given, with reference to the flowchart of FIG. 57, of a control operation in the case of the image forming apparatus entering an energy saving mode when the switching circuit 37 of FIG. 35 is employed.

The image forming apparatus enters an energy saving mode after passage of a certain period of time since completion of an image forming apparatus (step S1310). According to the flowchart of FIG. 57, in step S1311, counting is repeated with a timer, and in step S1312, it is determined whether the counted timer value is a predetermined value N. If the counted timer value is N (YES in step S1312), the image forming apparatus enters an energy saving mode.

In the case of entering the energy saving mode, there is no need to supply power to the main body load 20, and it is possible to charge the capacitor bank 9. Accordingly, in step S1313, the apparatus control part 10 outputs to the switching regulator IC 13 a signal to cause the switching regulator IC 13 to stop a PWM signal.

Next, since it is possible to charge the capacitor bank 9, in step S1314, the apparatus control part 10 outputs a signal to open the relay 37a to the relay drive circuit 25. Further, in step S1315, the apparatus control part 10 outputs a signal to turn ON the transistor Tr2. By turning ON the transistor Tr2, the feedback signal of the constant current/constant power charge voltage generation circuit 7 is enabled.

Then, in step S1316, the apparatus control part 10 sets a charging enabling flag, and in step S1317, the apparatus control part 10 outputs to the switching regulator IC 13 a start signal to cause the switching regulator IC 13 to output a PWM signal. Then, the apparatus control part 10 proceeds to arrow [I] of FIG. 50, and performs control to charge the capacitor bank 9.

The image forming apparatus does not enter the energy saving mode during a charging operation. When detecting the all cell full charge signal 45 from the constant current/constant power charge voltage generation circuit 7, the apparatus control part 10 outputs to the DC/DC converter 33 a signal to stop part of its power supply output to the image forming apparatus.

As described above, according to the image forming apparatus of this embodiment, the output of the power supply generation circuit 12 can be used as the power supply of the image forming apparatus when required for an image forming operation, and the power supply generation circuit 12 can be used a charger at the time of a charging operation. Accordingly, it is possible to charge the capacitor bank 9 without the need for a dedicated charger, so that it is possible to reduce the cost and the size of the apparatus.

Since time required for charging is approximately a few to tens of seconds, the image forming operation of the image forming apparatus is prevented from being delayed.

Further, power is stored in the capacitor bank 9 after increasing its voltage to substantially the same as the operating voltage of the main body load 20, and the voltage is increased by the boost part 80 when it is necessary to supply the power to the fixing heater 22. Therefore, compared with storing power after increasing its voltage to a voltage to be supplied to the fixing heater 22, it is possible to reduce the capacitor bank 9 in size and charging (power storing) time. Further, even if the temperature of a fixing unit is extremely lower than a preset temperature, it is possible to prevent inrush current because the duty ratio of PWM can be gradually increased (soft start).

Further, at the time of the energy saving mode, it is possible to cause current to flow from the power supply generation circuit 12 to the capacitor bank 9 by closing the make-and-break circuit 26 (or switching the switching circuit 37 to the capacitor bank 9 side). Accordingly, it is possible to charge the capacitor bank 9 even at the time of the energy saving mode. Further, compared with the case of employing the increased voltage detection circuit 50, it is possible to reduce cost.

11th Embodiment

Figure 58:
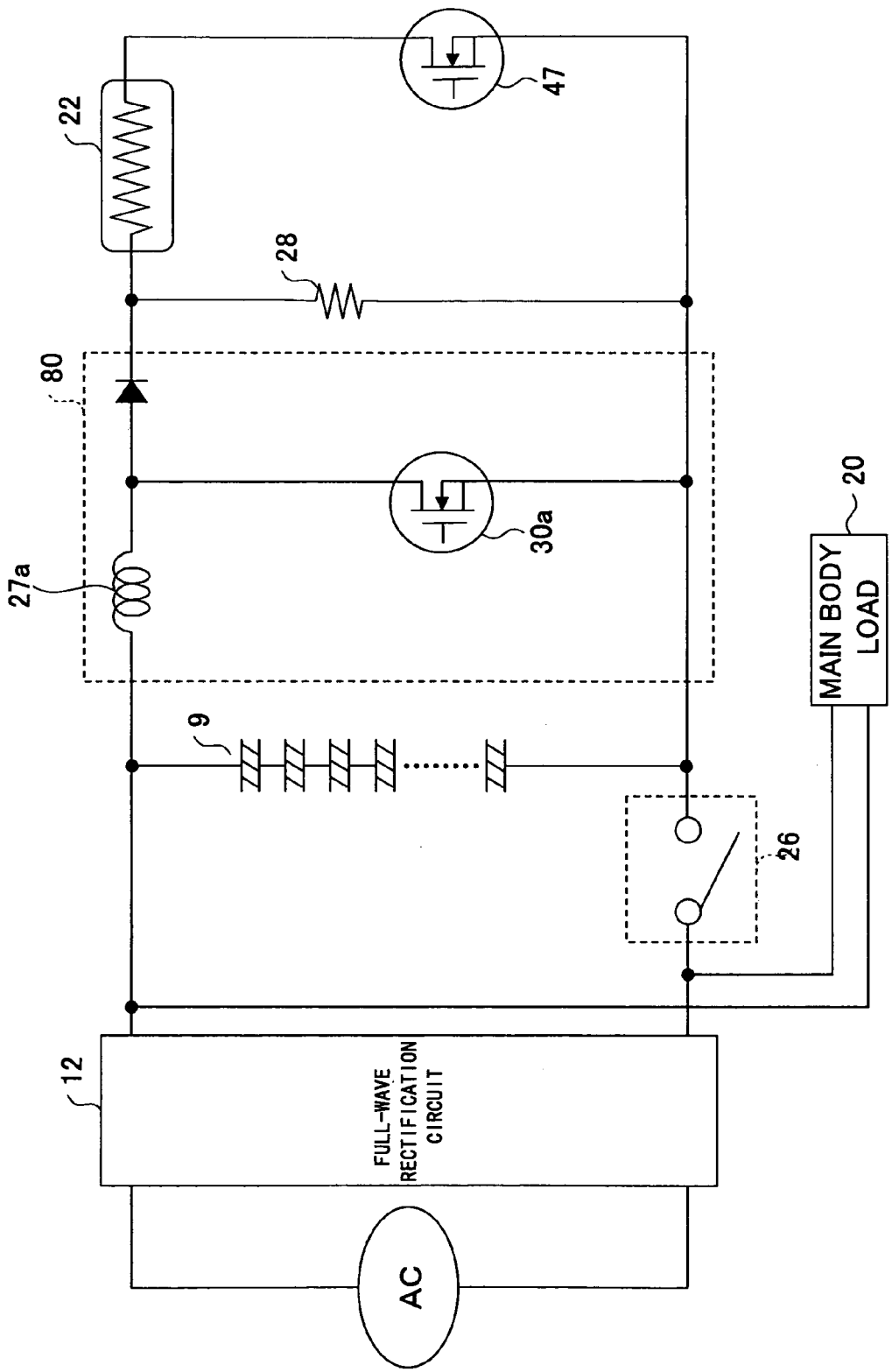
FIG. 58 is a schematic circuit diagram showing an image forming apparatus to which a power storage unit is applied according to an $11^{th}$ embodiment of the present invention.

In the ninth and tenth embodiments, an isolation transformer is used in the boost part 80, while in an 11th embodiment, a boost choke coil is employed in the boost part 80. FIG. 58 is a schematic circuit diagram showing an image forming apparatus to which a power storage unit is applied according to this embodiment. In FIG. 58, the same elements as those of FIG. 33 are referred to by the same reference numerals, and a description thereof is omitted. Referring to FIG. 58, the boost choke coil 27a is provided in the boost part 80, and an FET 47 is connected in series to the DC fixing heater 22. The FET 47 is OFF while no power is supplied from the capacitor bank 9 to the DC fixing heater 22. Accordingly, the FET 47 prevents the capacitor bank 9 from discharging.

Figure 59:
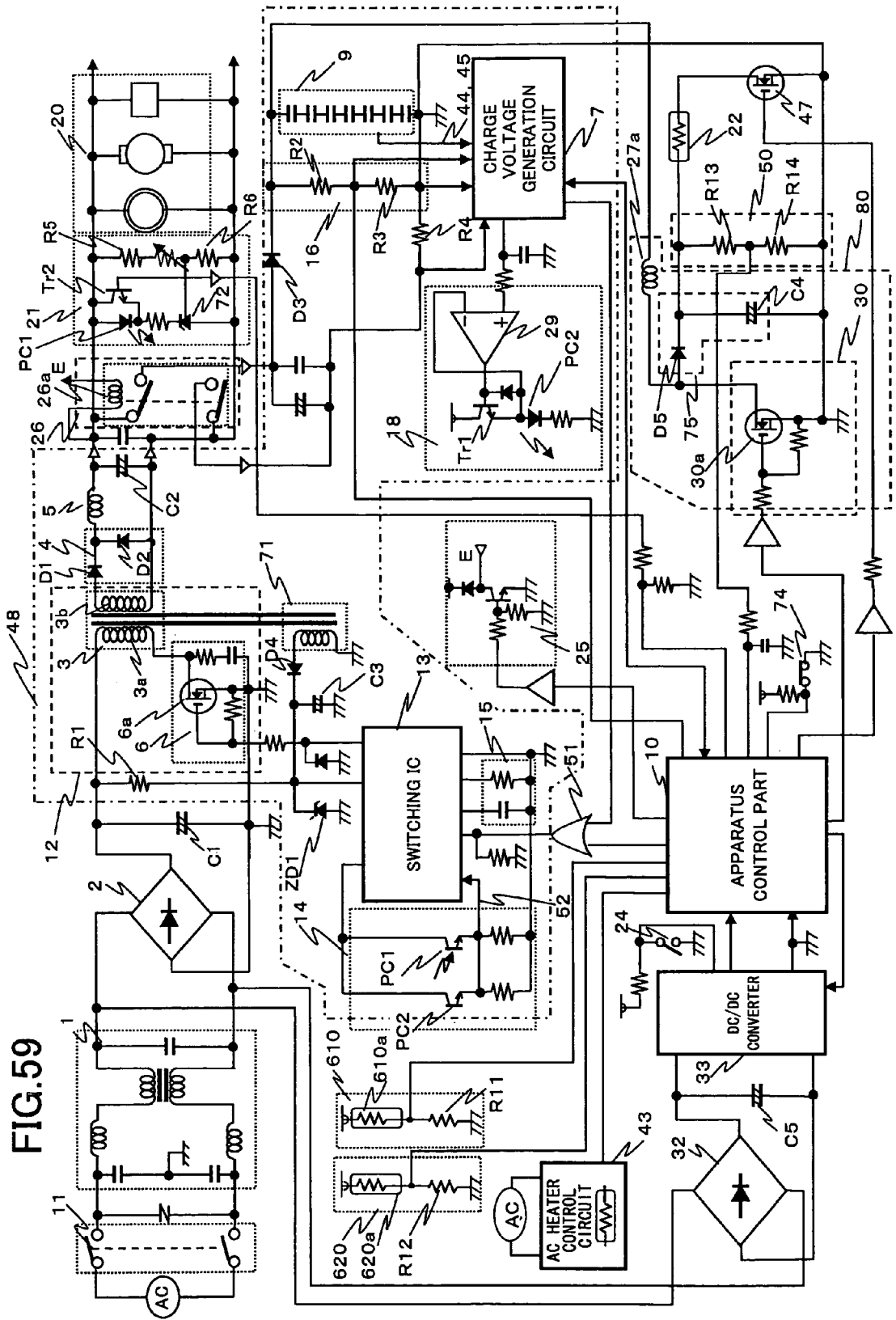
FIG. 59 is a circuit diagram showing the image forming apparatus according to the $11^{th}$ embodiment of the present invention.

FIG. 59 is a circuit diagram showing the image forming apparatus according to this embodiment. In FIG. 59, the same elements as those of FIG. 34 are referred to by the same reference numerals.

An AC power supply is connected to the power supply generation circuit 12 via the main power switch 11, the filter 1, and the full-wave rectification circuit 2. The power supply generation circuit 12 is connected to the constant voltage detection circuit 21, the main body load 20, and the make-and-break circuit 26 through the rectification circuit 4 and the choke coil 5. If the make-and-break circuit 26 is closed, the power supply generation circuit 12 is connected to the charge voltage detection circuit 16 and the capacitor bank 9. The charge voltage detection circuit 16 includes an equalization circuit that is not graphically illustrated. Further, the capacitor bank 9 and the charge voltage detection circuit 16 are connected to the constant current/constant power charge voltage generation circuit 7. The capacitor bank 9 is connected to the DC fixing heater 22 via the boost part 80, the rectification and smoothing circuit 75, and the increased voltage detection circuit 50. Further, the constant current/constant power charge voltage generation circuit 7 is connected to the apparatus control part 10.

Returning to the AC power supply, the filter 1 is connected to the DC/DC converter 33 via the full-wave rectification circuit 32. The DC/DC converter 33 is connected to the apparatus control part 10 and the energy saving cancellation SW 24.

The apparatus control part 10 is connected to the AC heater control circuit 43 and the temperature detection circuits 610 and 620. Further, the apparatus control part 10 is connected to the switching regulator IC 13 via the OR circuit 51. The other input terminal of the OR circuit 51 is connected to the constant current/constant power charge voltage generation circuit 7. The apparatus control part 10 is connected to the relay drive circuit 25, the charge voltage detection circuit 16, the constant voltage detection circuit 21, and the boost part 80.

The switching regulator IC 13 is connected to the power supply generation circuit 12, the circuit 15, and the feedback voltage detection circuit 14. Light emitted from a photocoupler PC1 of the feedback voltage detection circuit 14 and light emitted from a photocoupler PC2 of the voltage-to-current conversion circuit 18 are input to the feedback voltage detection circuit 14.

Next, a description is given of an operation of the power storage unit of FIG. 59. A description of the elements of FIG. 59 that are the same as those of FIG. 34 is omitted.

The boost part 80 includes the boost choke coil 27a on the side of the input from the capacitor bank 9. The output of the boost choke coil 27a and the output of the switching coil 30 are connected to the DC fixing heater 22 via the rectification and smoothing circuit 75 and the increased voltage detection circuit 50. The FET 30a of the switching circuit 30, and the boost rectification diode D5 and the smoothing capacitor C4 of the rectification and smoothing are connected in parallel between the terminals of the capacitor bank 9. The apparatus control part 10 is connected to the FET 47 provided on the output side of the DC fixing heater 22 and to the gate of the FET 47.

When the apparatus control part 10 outputs a PWM signal to the FET 30a, a current flows through the boost choke coil 27a so as to have energy stored therein because of the voltage stored in the capacitor bank 9. When the FET 30a is turned OFF, the energy stored in the boost choke coil 27a during the ON period is output, being superposed on an input voltage. This current is stored in the smoothing capacitor C4 through the boost rectification diode D5. The voltage is increased by repeating this operation, so that an increased, smoothed voltage is supplied to the DC fixing heater 22.

A voltage to be increased and smoothed (increased voltage) is determined by the voltage stored in the capacitor bank (input voltage) and the ON/OFF duty ratio (the ratio of the ON period to the sum of the ON period and OFF period) of the PWM signal. Further, the increased voltage is fed back to the apparatus control part 10 by the increased voltage detection circuit 50 having resistors R13 and R14 connected in series. The increased, smoothed voltage is controlled by changing the duty ratio of the PWM signal by monitoring the voltage of the increased voltage detection circuit 50.

Figure 60:
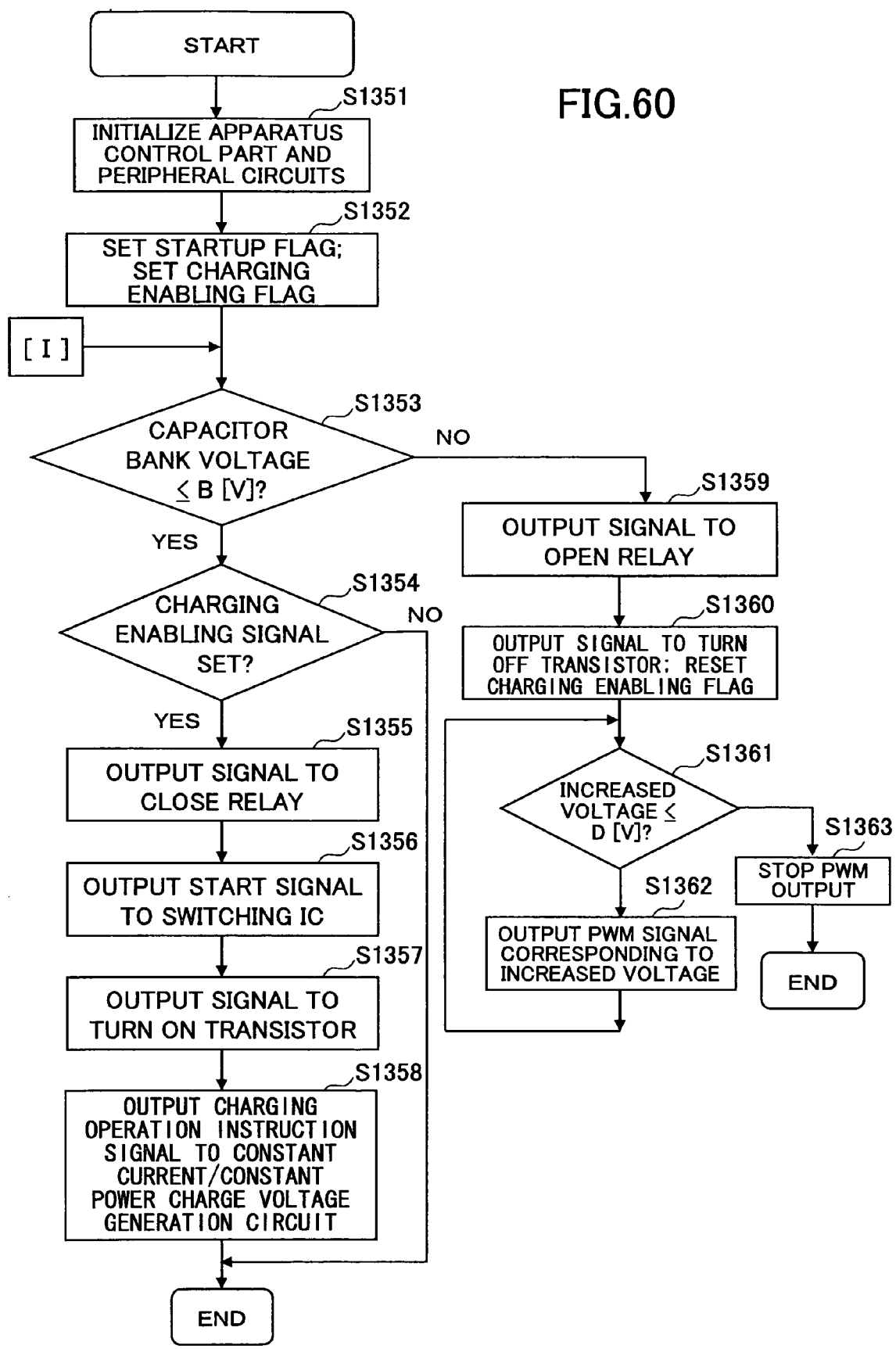
FIG. 60 is a flowchart showing the operation where the apparatus control part controls charging of the capacitor bank according to the $11^{th}$ embodiment of the present invention.

A description is given, with reference to the flowchart of FIG. 60, of the operation where the apparatus control part 10 controls charging of the capacitor bank 9 using the above-described configuration.

In step S1351, when the main power switch 11 is turned ON so that the apparatus control part 10 receives power supplied from the DC/DC converter 33, the apparatus control part 10 initializes the apparatus control part 10 and its peripheral circuits.

In step S1352, the apparatus control part 10 sets a startup flag that is set when the main power switch 11 is turned ON or the energy saving mode is canceled. This flag is referred to in the case of increasing the fixing temperature of the image forming apparatus as described below. It is not possible to perform an image forming operation immediately after the main power switch 11 is turned ON. Accordingly, next, the apparatus control part 10 sets a charging enabling flag.

Arrow [I] after step S1352 indicates a procedure from a below-described flowchart.

Next, in step S1353, the apparatus control part 10 obtains the charge voltage of the capacitor bank 9 through the charge voltage detection circuit 16, and determines whether the charge voltage of the capacitor bank 9 is lower than or equal to B [V]. If the charge voltage of the capacitor bank 9 is lower than or equal to preset B [V] (YES in step S1353), in step S1354, the apparatus control part 10 determines whether a charging enabling flag is set.

If no charging enabling flag is set (NO in step S1354), it is necessary to supply power to the main body load 20 side. Accordingly, this flow ends without performing a charging operation.

If the charge voltage of the capacitor bank 9 is not lower than or equal to preset B [V] (NO in step S1353), the capacitor bank 9 is in a charged state. Accordingly, in step S1359, the apparatus control part 10 outputs a signal to open the relay 26a to the relay drive circuit 25. As a result, the output of the power supply generation circuit is supplied to the main body load 20. If the switching circuit 37 of FIG. 35 is used in place of the make-and-break circuit 26, the apparatus control part 10 may output a signal to close the relay 37a to the relay drive circuit 25.

Next, in step S1360, the apparatus control part 10 outputs a signal to turn OFF the transistor Tr2. As a result, the power supply generation circuit 12 can perform a constant voltage operation.

Next, in step S1361, the apparatus control part 10 determines, based on the output of the increased voltage detection circuit 50, whether the increased voltage is lower than or equal to a preset voltage of D [V]. If the increased voltage is lower than or equal to D [V] (YES in step S1361), in step S1362, the apparatus control part 10 outputs a PWM signal to the FET 30a of the switching circuit 30 in accordance with the increased voltage detected from the increased voltage detection circuit 50.

The apparatus control part 10 repeats the determination of step S1361 and the PWM signal output of step S1362 until the increased voltage is higher than preset D [V].

When the increased voltage is higher than preset D [V] (NO in step S1361), the voltage is increased to a predetermined voltage. Accordingly, in step S1363, the apparatus control part 10 stops outputting the PWM signal.

The frequency of the PWM signal is generated by a timer (not graphically illustrated) of the apparatus control part 10, and the modulation of the pulse width is changed by controlling an internal timer for modulation (not graphically illustrated). The value of the internal timer for modulation may be determined from a preset table in which the value of the internal timer for modulation is correlated with the increased voltage output of the increased voltage detection circuit 50, or be calculated by operations. The duty ratio of the PWM signal is higher when the increased voltage is low, and is lower when the increased voltage is high.

If a charging enabling signal is set (YES in step S1354), in step S1355, the apparatus control part 10 outputs a signal to close the relay 26a to the relay drive circuit 25.

Next, in step S1356, the apparatus control part 10 outputs a start signal to the switching regulator IC 13 through the OR circuit 51. Further, in step S1357, the apparatus control part 10 outputs a signal to turn ON the transistor Tr2 to the transistor Tr2, which connects the anode and the cathode of the photocoupler PC1 of the constant voltage detection circuit 21 that feeds back a voltage value in order for the power supply generation circuit 12 to output a constant voltage. The transistor Tr2 is turned ON to enable the feedback signal of the constant current/constant power charge voltage generation circuit 7.

Next, in step S1358, the apparatus control part 10 outputs a charging operation instruction signal to the constant current/constant power charge voltage generation circuit 7. By the above-described control, the capacitor bank 9 is charged. As described above, the constant current/constant power charge voltage generation circuit 7 detects the charge voltage and the charging current of the capacitor bank 9 and the operations of the bypass circuits, and performs constant current charging or constant power charging.

Figure 61:
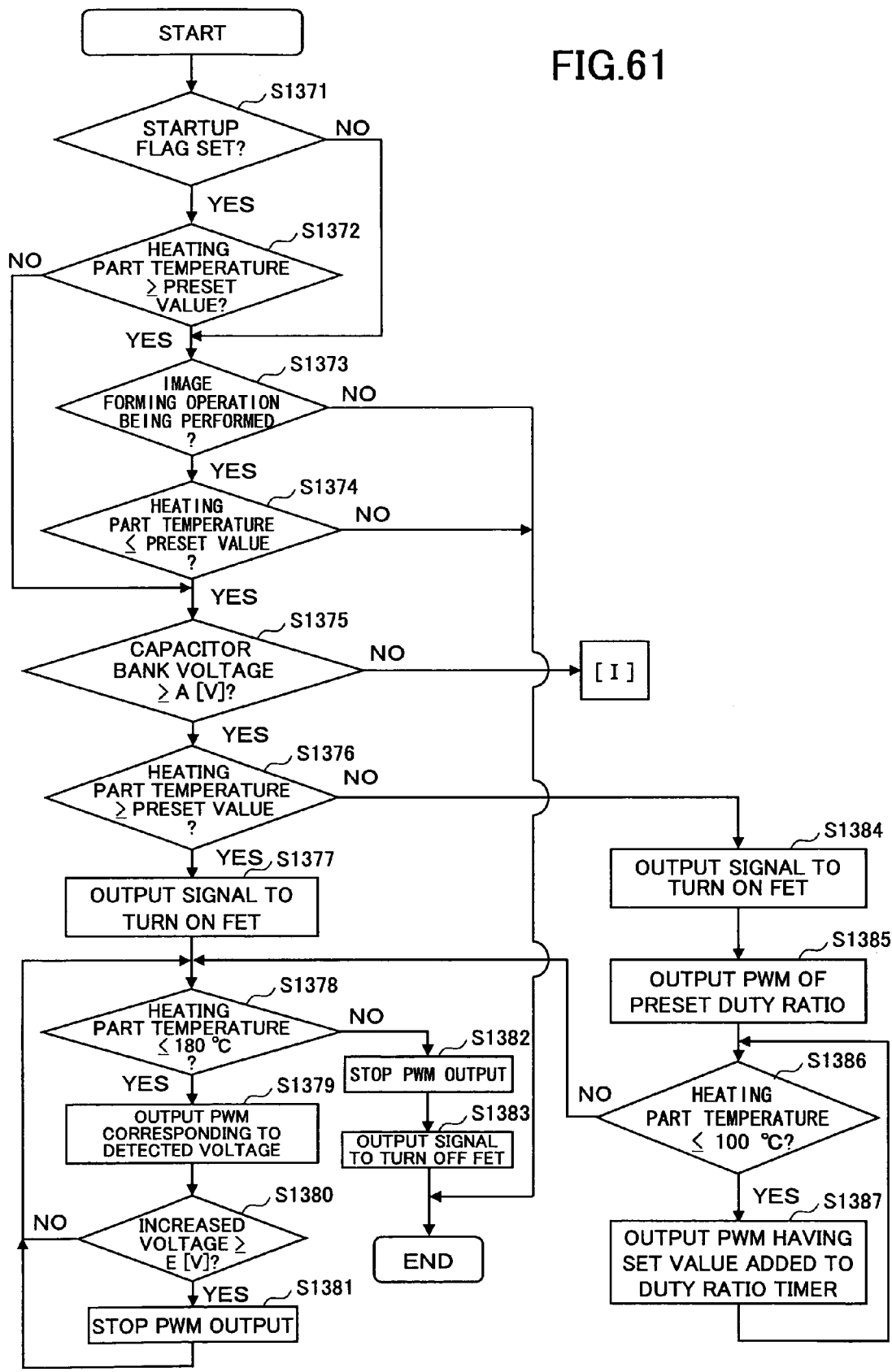
FIG. 61 is a flowchart of the control operation of supplying power from the boost part to the heating part of the fixing unit when power is turned ON, the energy saving mode is canceled, or an image forming operation is being performed according to the $11^{th}$ embodiment of the present invention.

Next, a description is given, with reference to the flowchart of FIG. 61, of the control operation of supplying power from the boost part 80 to the heating part of the fixing unit 112 when power is turned ON, the energy saving mode is canceled, or an image forming operation is being performed.

In step S1371, the apparatus control part 10 determines whether a startup flag that is set when the main power switch 11 is turned ON or the energy saving mode is canceled is set.

When the startup flag is set (YES in step S1371), in step S1372, the apparatus control part 10 obtains the output of the temperature detection circuit 610 that detects the temperature of the AC heater heating part, and determines whether the temperature of the AC heater heating part is higher than or equal to a preset temperature.

If the temperature of the AC heater heating part is higher than or equal to the preset temperature (for example, higher than or equal to 130° C.) (YES in step S1372), in step S1373, the apparatus control part 10 determines whether the image forming apparatus is performing an image forming operation. If the image forming apparatus is not performing an image forming operation (NO in step S1373), there is no need to supply power from the boost part 80 to the DC fixing heater 22. Accordingly, the control of the flowchart of FIG. 61 ends.

If the image forming apparatus is performing an image forming operation (YES in step S1373), in step S1374, the apparatus control part 10 determines whether the temperature of the AC heater heating part is lower than or equal to a preset temperature. If the temperature of the AC heater heating part is not lower than or equal to the preset temperature (NO in step S1374), there is no need to supply power from the boost part 80 to the DC fixing heater 22. Accordingly, the control of the flowchart of FIG. 61 ends.

If the temperature of the AC heater heating part is lower than or equal to the preset temperature (for example, lower than or equal to 155° C.) (YES in step S1374), there may be a copy of an unfixed image. Accordingly, in step S1375, in order to supply power from the boost part 80 to the DC fixing heater 22, the apparatus control part 10 obtains the charge voltage of the capacitor bank 9 through the charge voltage detection circuit 16, and determines whether the charge voltage of the capacitor bank 9 is higher than or equal to a predetermined voltage A [V].

If the charge voltage of the capacitor bank 9 is not higher than or equal to a predetermined voltage A [V] (NO in step S1375), the stored power (energy) is not sufficient. Accordingly, the apparatus control part 10 performs the operation after [I] of FIG. 60 in order to perform a control flow to charge the capacitor bank 9.

If the charge voltage of the capacitor bank 9 is higher than or equal to A [V] (YES in step S1375), in step S1376, the apparatus control part 10 determines whether the temperature of the AC heater heating part is higher than or equal to a preset temperature (for example, higher than or equal to 20° C.).

If the temperature of the heating part is higher than or equal to the preset temperature (YES in step S1376), in step S1377, the apparatus control part 10 outputs a signal to turn ON the FET 47 in order to supply power to the DC fixing heater 22.

Next, in step S1378, the apparatus control part 10 determines whether the temperature of the AC heating part is lower than or equal to a preset temperature. If the temperature of the heating part is lower than or equal to the preset temperature, for example, lower than or equal to 180° C. (YES in step S1378), in step S1379, the apparatus control part 10 reads the output of the increased voltage detection circuit 50 from an A/D port, and outputs a PWM signal whose duty ratio is determined in correspondence to this increased voltage to the FET 30a of the switching circuit 30. This duty ratio is higher when the increased voltage is low, and is lower when the increased voltage is high.

If the temperature of the AC heater heating part is not higher than or equal to the preset temperature (NO in step S1376), in step S1384, the apparatus control part 10 outputs a signal to turn ON the FET 47 in order to supply power to the DC fixing heater 22, thereby increasing the temperature.

Further, since the temperature of the AC heating part of the fixing unit 112 is extremely lower than a fixing temperature, in step S1385, the apparatus control part 10 outputs for a predetermined period of time a PWM signal on duty that lowers a preset increased voltage in order to reduce inrush current.

Next, in step S1386, the apparatus control part 10 determines whether the temperature of the AC heating part is lower than or equal to a predetermined temperature (for example, lower than or equal to 100° C.). If the temperature of the AC heating part is lower than or equal to 100° C. (YES in step S1386), in step S1387, the apparatus control part 10 outputs a PWM signal having a set value added to a timer determining the duty ratio.

Then, again in step S1386, the apparatus control part 10 determines whether the temperature of the AC heating part is lower than or equal to the preset temperature. If the temperature of the AC heating part is lower than or equal to the preset temperature, the operation of step S1387 is repeated. By this operation, it is possible to gradually increase the duty ratio of PWM (soft start). Accordingly, it is possible to reduce inrush current.

If the temperature of the AC heating part is higher than or equal to the preset temperature (YES in step S1376), or if the temperature of the AC heating part is not lower than or equal to the preset temperature (NO in step S1386), in step S1377, the apparatus control part 10 determines whether the temperature of the AC heater heating part is lower than or equal to the preset temperature (for example, 180° C.).

If the temperature of the AC heater heating part is lower than or equal to the preset temperature (YES in step S1378), in step S1379, the apparatus control part 10 obtains the output of the increased voltage detection circuit 50, and outputs a PWM signal whose duty ratio is determined in correspondence to this increased voltage to the FET 30a of the switching circuit 30.

This duty ratio is higher when the increased voltage is low, and is lower when the increased voltage is high. The frequency of the PWM signal is generated by a timer (not graphically illustrated) of the apparatus control part 10, and the modulation of the pulse width can be changed by controlling an internal timer for modulation (not graphically illustrated). The value of the internal timer for modulation may be determined from a preset table in which the value of the internal timer for modulation is correlated with the temperature of the AC heating part or the output of the increased voltage detection circuit 50, or be calculated by operations.

Next, in step S1380, the apparatus control part 10 determines whether the increased voltage detected by the increased voltage detection circuit 50 is higher than or equal to E [V]. If the increased voltage is not higher than or equal to E [V] (NO in step S1380), again in step S1378, the apparatus control part 10 determines whether the temperature of the AC heater heating part is lower than or equal to the preset temperature. If the temperature of the AC heater heating part is lower than or equal to the preset temperature, in step S1379, the apparatus control part 10 obtains the output of the increased voltage detection circuit 50, and outputs a PWM signal whose duty ratio is determined in correspondence to this increased voltage to the FET 30a of the switching circuit 30.

If the increased voltage is higher than or equal to E [V] (YES in step S1380), in step S1381, the apparatus control part 10 stops outputting the PWM signal. Then, again in step S1378, the apparatus control part 10 determines whether the temperature of the AC heater heating part is lower than or equal to the preset temperature, and repeats the same operation thereafter.

If the temperature of the AC heater heating part is not lower than or equal to the preset temperature (NO in step S1378), there is no need to supply power from the boost part 80 to the DC fixing heater 22. Accordingly, in step S1382, the apparatus control part 10 stops outputting the PWM signal. Further, in step S1383, the apparatus control part 10 outputs a signal to turn OFF the FET 47. By the above-described operation, the temperature of the fixing unit 112 is controlled.

In the case of FIG. 61, the signal width of the PWM signal on duty is determined based on the voltage detected by the increased voltage detection circuit 50. Alternatively, the signal width of the PWM signal may be determined in accordance with the temperature of the AC heating part.

Figure 62:
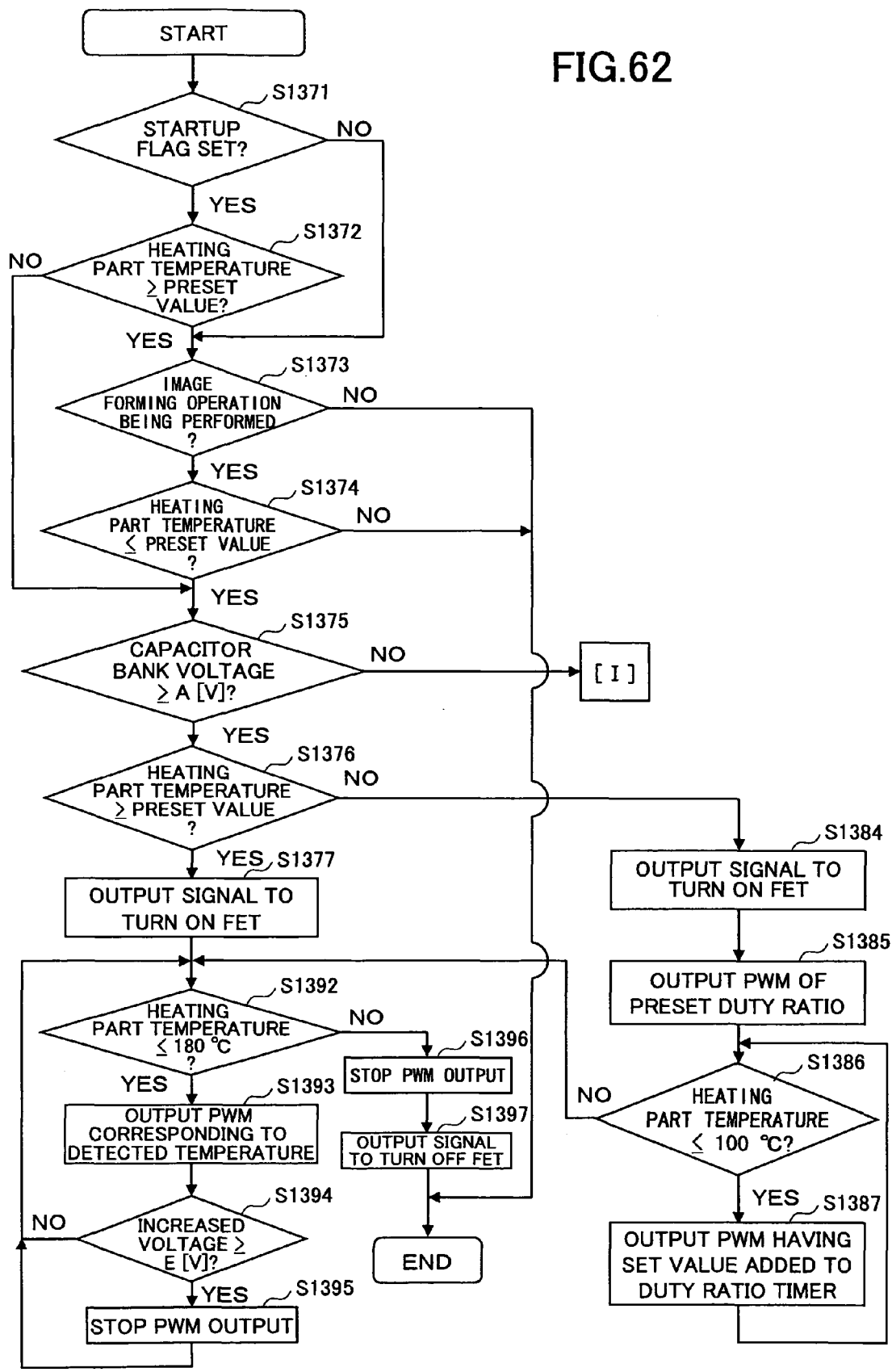
FIG. 62 is a flowchart of the control operation of outputting a PWM signal on duty in accordance with the temperature of the AC heating part according to the $11^{th}$ embodiment of the present invention.

FIG. 62 is a flowchart of the control operation of outputting a PWM signal on duty in accordance with the temperature of the AC heating part. In FIG. 62, the control of steps S1371 through S1377 is equal to that of FIG. 61, and accordingly, a description thereof is omitted.

First, in step S1392, the apparatus control part 10 determines whether the temperature of the AC heater heating part is lower than or equal to a preset temperature (for example, 180° C.). If the temperature of the AC heater heating part is lower than or equal to the preset temperature (YES in step S1392), in step S1393, the apparatus control part 10 detects the temperature of the AC heating part, and outputs a PWM signal whose duty ratio is determined in accordance with this detected temperature. This duty ratio is higher when the increased voltage is low, and is lower when the increased voltage is high.

Next, in step S1394, the apparatus control part 10 determines whether the increased voltage is higher than or equal to E [V]. If the increased voltage is not higher than or equal to E [V] (NO in step S1394), again in step S1392, the apparatus control part 10 determines whether the temperature of the AC heater heating part is lower than or equal to the preset temperature. If the temperature of the AC heater heating part is lower than or equal to the preset temperature, in step S1393, the apparatus control part 10 outputs a PWM signal whose duty ratio is determined in accordance with the temperature of the AC heating part.

If the increased voltage is higher than or equal to E [V] (YES in step S1394), in step S1395, the apparatus control part 10 stops outputting the PWM signal. Then, again in step S1392, the apparatus control part 10 determines whether the temperature of the AC heating part is lower than or equal to the preset temperature, and repeats the same operation thereafter.

If the temperature of the AC heating part is not lower than or equal to the preset temperature (NO in step S1392), there is no need to supply power from the boost part 80 to the DC fixing heater 22. Accordingly, in step S1396, the apparatus control part 10 stops outputting the PWM signal. Then, in step S1397, the apparatus control part 10 outputs a signal to turn OFF the FET 47. The signal width of the PWM signal may be preset by the constant current/constant power charge voltage generation circuit 7.

Figure 63:
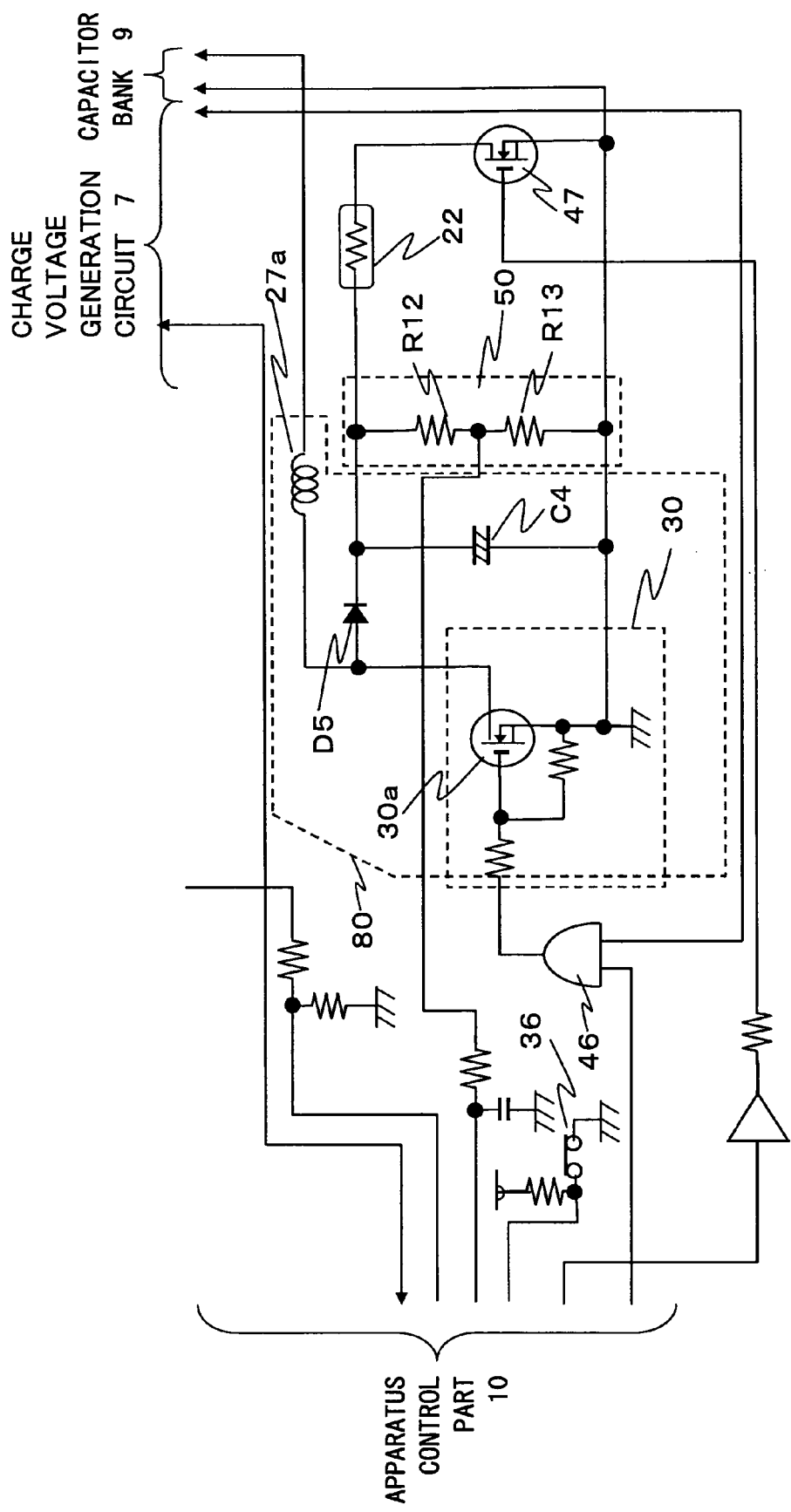
FIG. 63 is a diagram showing a circuit configuration where a circuit that generates a PWM signal is provided in the constant current/constant power charge voltage generation circuit and the PWM signal is input to the boost part according to the 11th embodiment of the present invention.

The PWM signal may be output by the constant current/constant power charge voltage generation circuit 7. FIG. 63 is a diagram showing a circuit configuration where a circuit that generates a PWM signal is provided in the constant current/constant power charge voltage generation circuit 7 and the PWM signal is input to the boost part 80.

The constant current/constant power charge voltage generation circuit 7 includes a timer (not graphically illustrated) that determines the frequency of a PWM signal and an internal timer (not graphically illustrated) for pulse width modulation that determines the duty ratio of the PWM signal. The constant current/constant power charge voltage generation circuit 7 constantly generates a PWM signal.

The PWM signal is input to the AND circuit 46, and the apparatus control part 10 outputs a signal to the AND circuit 46 in accordance with the result of detecting the temperature of the AC heating part, thereby outputting a PWM signal to the FET 30a of the switching circuit 30. The circuit diagram is the same as FIG. 59 in the other parts.

Figure 64:
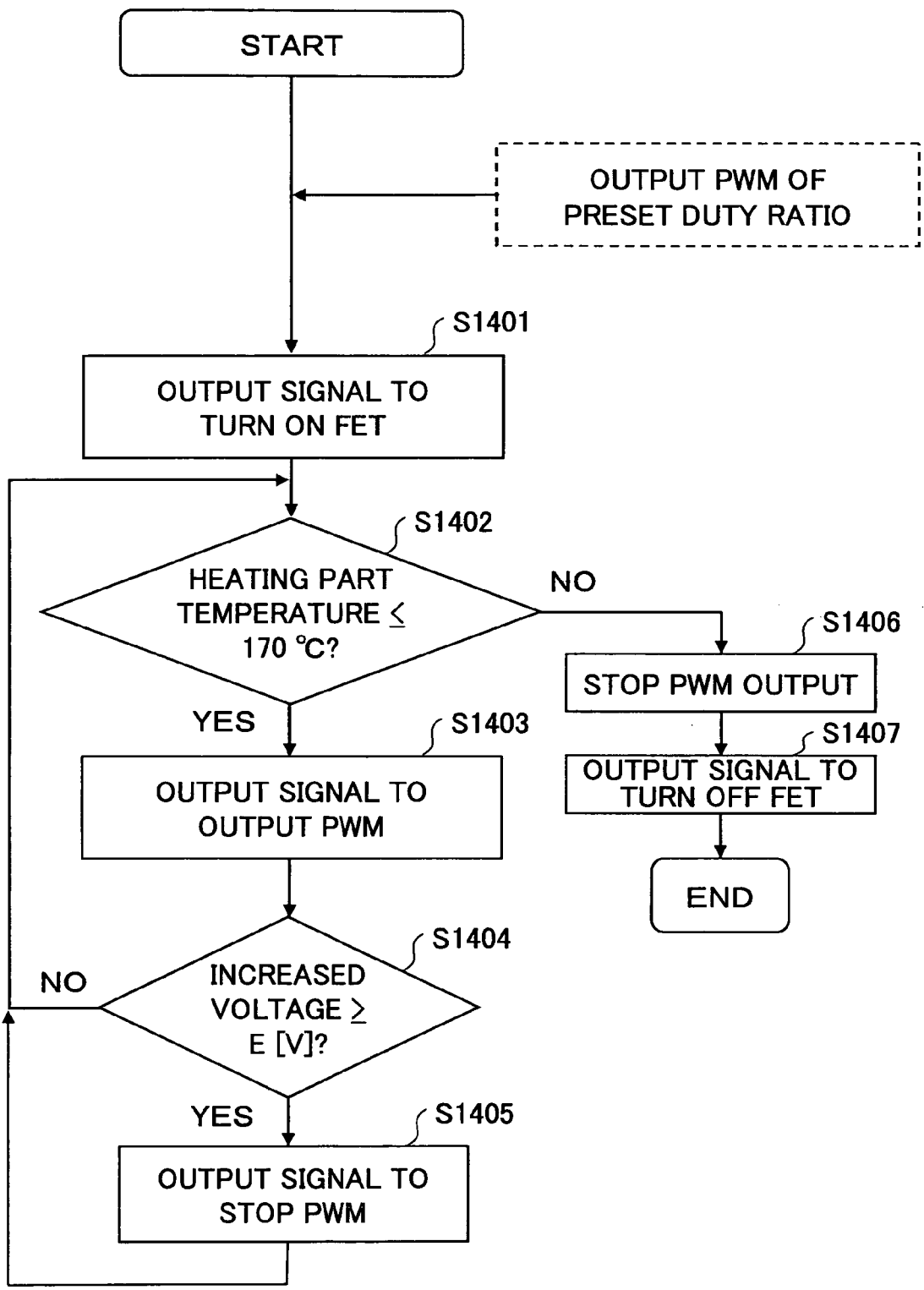
FIG. 64 is a flowchart of the operation of supplying power to the heating part of the fixing unit by causing a preset PWM signal to be generated and performing ON/OFF control of the PWM signal based on the temperature of the AC heating part and the increased voltage according to the 11th embodiment of the present invention.

FIG. 64 is a flowchart showing the control operation of supplying power to the heating part of the fixing unit 112 by causing the constant current/constant power charge voltage generation circuit 7 to generate a preset PWM signal and performing ON/OFF control of the PWM signal based on the temperature of the AC heating part and the increased voltage.

The constant current/constant power charge voltage generation circuit 7 has output a PWM signal of a preset duty ratio.

In step S1401, the apparatus control part 10 outputs a signal to turn ON the FET 47, thereby allowing power to be supplied to the DC fixing heater 22. In step S1402, the apparatus control part 10 determines whether the temperature of the AC heating part of the fixing unit 112 is lower than or equal to a preset temperature (for example, 170° C.). If the temperature of the AC heating part is lower than or equal to the preset temperature (YES in step S1402), in step S1403, the apparatus control part 10 outputs a PWM signal to the FET 30a of the switching circuit 30. This PWM signal causes the boost part 80 to increase voltage and causes power to be supplied to the DC fixing heater 22.

Next, in step S1404, the increased voltage detection circuit 50 detects the increased voltage, and the apparatus control part 10 determines whether the detected increased voltage is higher than or equal to preset E [V]. If the increased voltage is higher than or equal to preset E [V] (YES in step S1404), in step S1405, the apparatus control part 10 stops outputting the PWM signal, and again in step S1402, the apparatus control part 10 determines whether the temperature of the AC heating part of the fixing unit 112 is lower than or equal to the preset temperature.

If the temperature of the AC heating part exceeds the preset temperature (NO in step S1402), there is no need to supply power from the boost part 80. Accordingly, in step S1406, the apparatus control part 10 stops outputting the PWM signal, and in step S1407, the apparatus control part 10 outputs a signal to turn OFF the FET 47. Thereby, the control operation of FIG. 64 ends.

Figure 65:
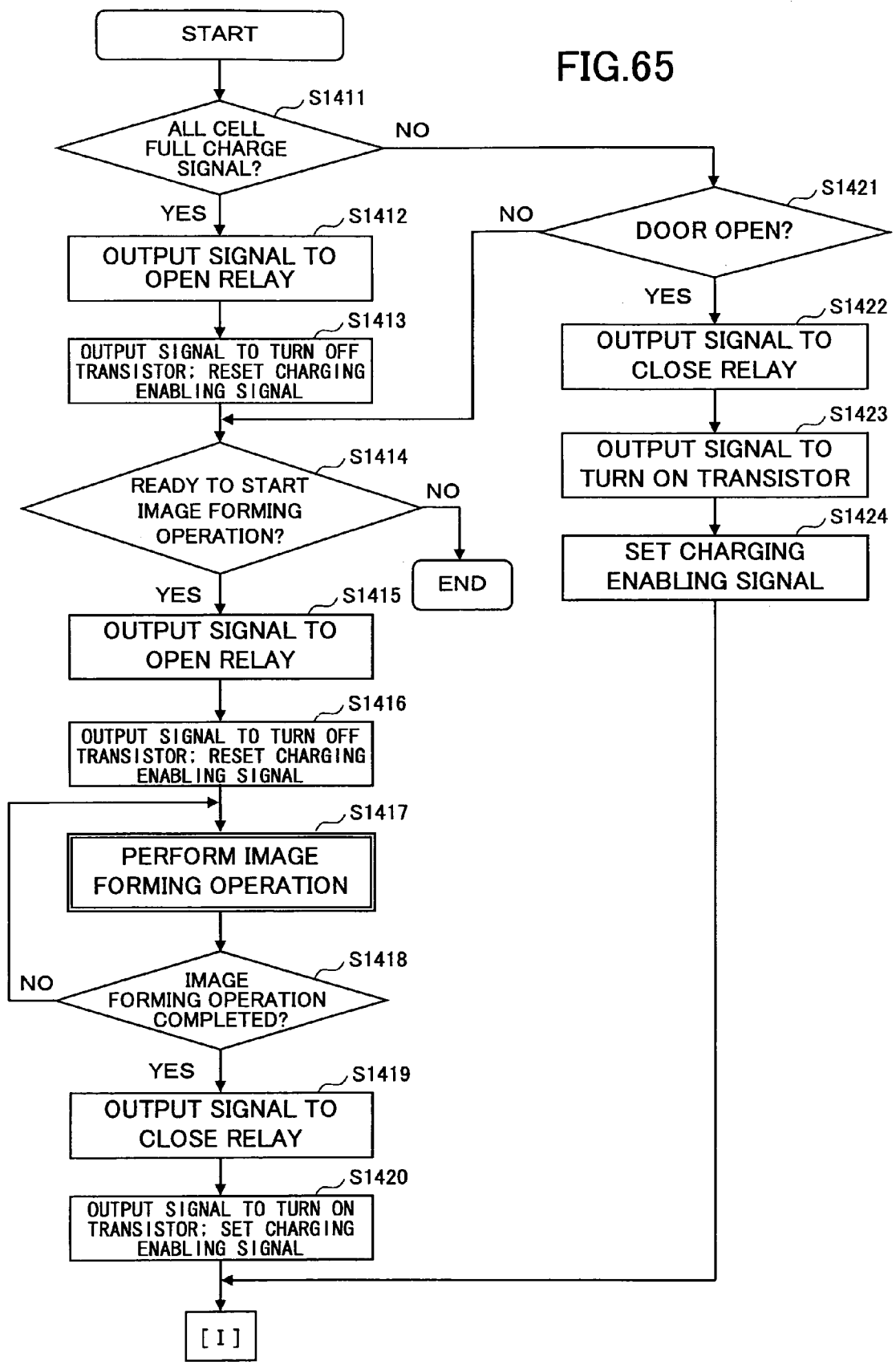
FIG. 65 is a flowchart of the control operation of opening and closing the make-and-break circuit in accordance with the operation mode of the image forming apparatus according to the 11th embodiment of the present invention.

Next, a description is given, with reference to the flowchart of FIG. 65, of the control operation of opening and closing the relay 26a of the make-and-break circuit 26 in accordance with the operation mode of the image forming apparatus.

First, in step S1411, the apparatus control part 10 determines whether the all cell full charge signal 45 has been output from the constant current/constant power charge voltage generation circuit 7. If the all cell full charge signal 45 has been output (YES in step S1411), the charging of the capacitor bank 9 is completed. Accordingly, in step S1412, the apparatus control part 10 transmits a signal to open the relay 26a to the relay drive circuit 25.

Next, in step S1413, the apparatus control part 10 outputs to the transistor Tr2 a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets a charging enabling flag.

Next, in step S1414, the apparatus control part 10 determines whether the image forming apparatus is ready to start an image forming operation. If the image forming apparatus starts an image forming operation (YES in step S1414), it is necessary to supply power to the main body load 20. Accordingly, in step S1415, the apparatus control part 10 outputs a signal to open the relay 26a to the relay drive circuit 25.

Next, in step S1416, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets the charging enabling flag.

After turning OFF the transistor Tr2 and resetting the charging enabling flag, in step S1417, the image forming apparatus performs an image forming operation.

In step S1418, the apparatus control part 10 determines whether the image forming operation is completed. The apparatus control part 10 repeats this determination during the image forming operation. If the image forming operation is completed (YES in step S1418), it is possible to charge the capacitor bank 9. Accordingly, in step S1419, the apparatus control part 10 outputs a signal to close the relay 26a to the relay drive circuit 25.

Next, in step S1420, the apparatus control part 10 outputs to the transistor Tr2 a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

When the image forming operation is completed, it may be necessary to charge the capacitor bank 9. Accordingly, after setting the charging enabling flag, the apparatus control part 10 proceeds to arrow [I] of FIG. 60, and performs control to charge the capacitor bank 9.

Returning to step S1411, if the all cell full charge signal 45 has not been output from the capacitor bank 9 (NO in step S1411), in step S1421, the apparatus control part 10 determines whether the image forming apparatus is capable of performing image formation (for example, whether the door of the image forming apparatus is open or whether the image forming apparatus has run out of paper). For example, in this case, the apparatus control part 10 determines whether the door of the image forming apparatus is open.

If the door is not open (NO in step S1421), it is possible to perform image formation without the all cell full charge signal 45. Accordingly, the apparatus control part 10 proceeds to step S1414 to determine whether the image forming apparatus is ready to start an image forming operation.

If the door is open (YES in step S1421), it is not possible to perform an image forming operation. Accordingly, it is possible to charge the capacitor bank 9.

In step S1422, the apparatus control part 10 outputs a signal to close the relay 26a to the relay drive circuit 25. Then, in step S1423, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Then, in step S1424, the apparatus control part 10 sets the charging enabling signal, and thereafter, proceeds to arrow [I] of FIG. 60 to perform control to charge the capacitor bank 9.

Figure 66:
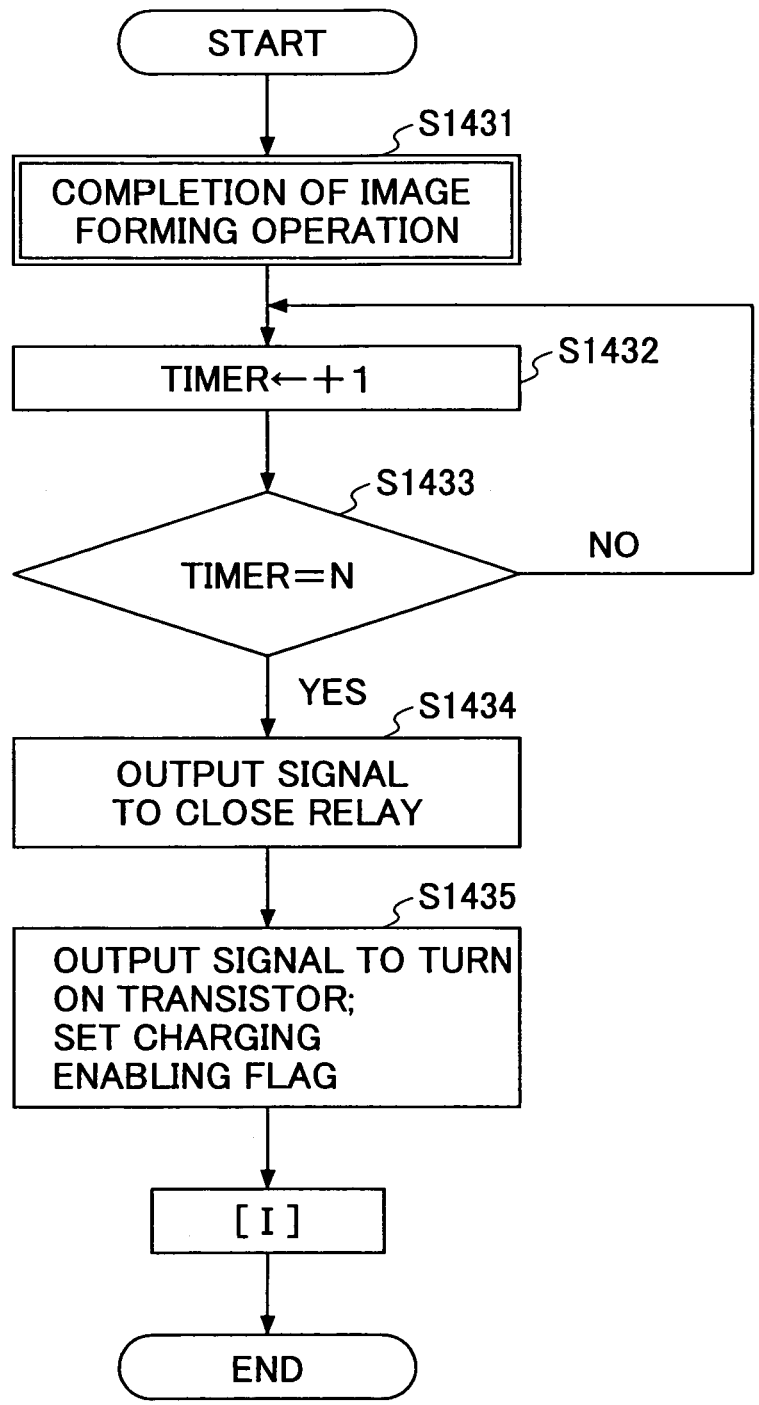
FIG. 66 is a flowchart showing a control operation in the case where the image forming apparatus enters the energy saving mode according to the 11th embodiment of the present invention.

Next, a description is given, with reference to the flowchart of FIG. 66, of a control operation in the case where the image forming apparatus enters an energy saving mode.

The image forming apparatus enters an energy saving mode after passage of a certain period of time since completion of an image forming apparatus (step S1431). According to the flowchart of FIG. 66, in step S1432, counting is repeated with a timer, and in step S1433, it is determined whether the counted timer value is a predetermined value N. If the counted timer value is N (YES in step S1433), the image forming apparatus enters an energy saving mode.

In the case of entering an energy saving mode, there is no need to supply power to the main body load 20, and it is possible to charge the capacitor bank 9. Accordingly, in step S1434, the apparatus control part 10 outputs a signal to close the relay 26a to the relay drive circuit 25.

Next, in step S1435, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled. Further, the apparatus control part 10 sets a charging enabling flag. Thereafter, the apparatus control part 10 proceeds to arrow [I] of FIG. 60, and performs control to charge the capacitor bank 9. Thus, it is possible to charge the capacitor bank 9 in the case of entering an energy saving mode.

The apparatus control part 10 does not enter an energy saving mode while charging the capacitor bank 9. When detecting the all cell full charge signal 45 from the constant current/constant power charge voltage generation circuit 7, the apparatus control part 10 outputs to the DC/DC converter 33 a signal to stop part of its power supply output to the image forming apparatus.

Figure 67:
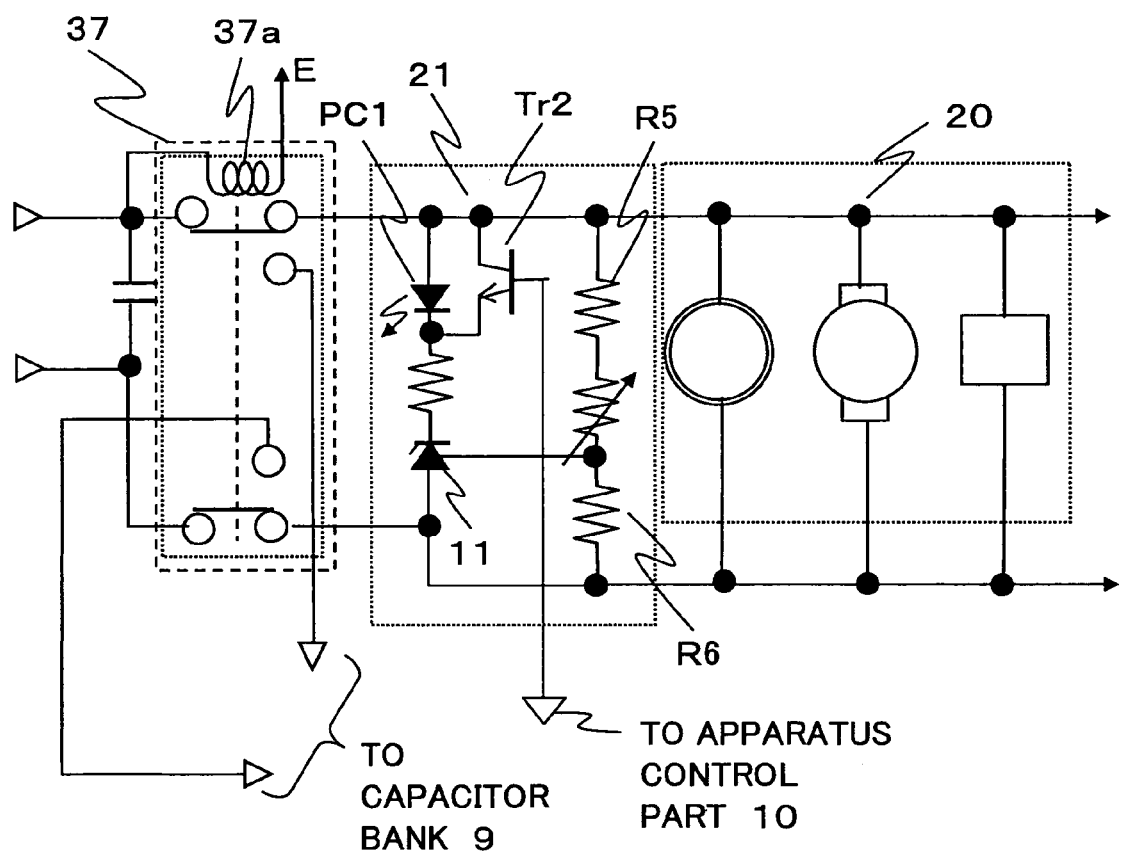
FIG. 67 is a diagram showing a circuit where the make-and-break circuit is replaced by the switching circuit according to the 11th embodiment of the present invention.

The make-and-break circuit 26 of FIG. 59 may be replaced by the switching circuit 37. FIG. 67 is a diagram showing a circuit where the make-and-break circuit 26 of FIG. 59 is replaced by the switching circuit 37. If the relay 37a is not energized, the switching circuit 37 is connected to the main body load 20 side. In the case of charging the capacitor bank 9, a signal is output to the relay drive circuit 25, and the relay 37a is energized by the relay drive circuit 25, so that the switching circuit 37 switches to the capacitor bank 9 side.

Figure 68:
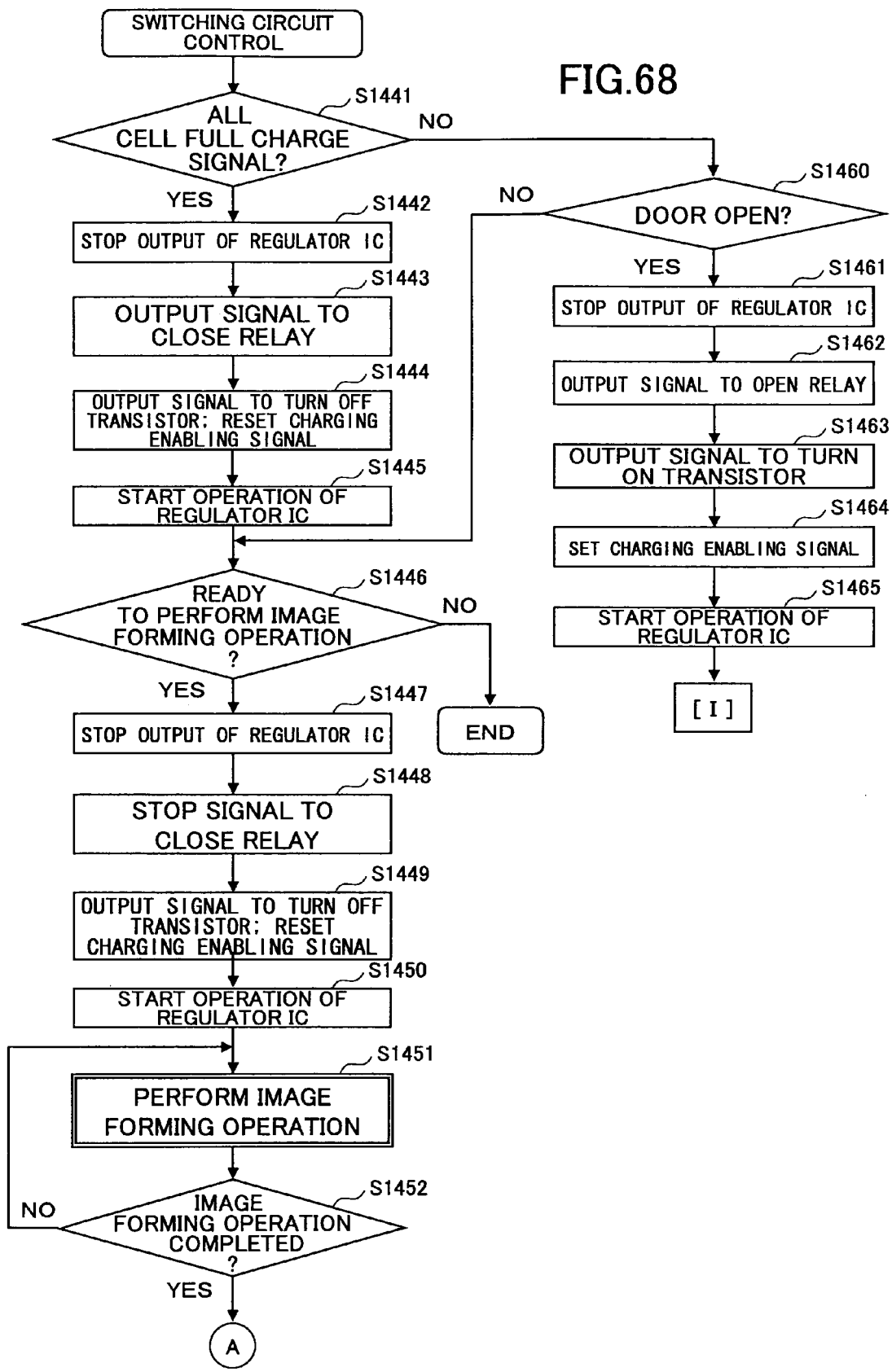
FIG. 68 is a flowchart of the operation of controlling switching the switching circuit in accordance with the operation mode of the image forming apparatus according to the 11th embodiment of the present invention.
Figure 69:
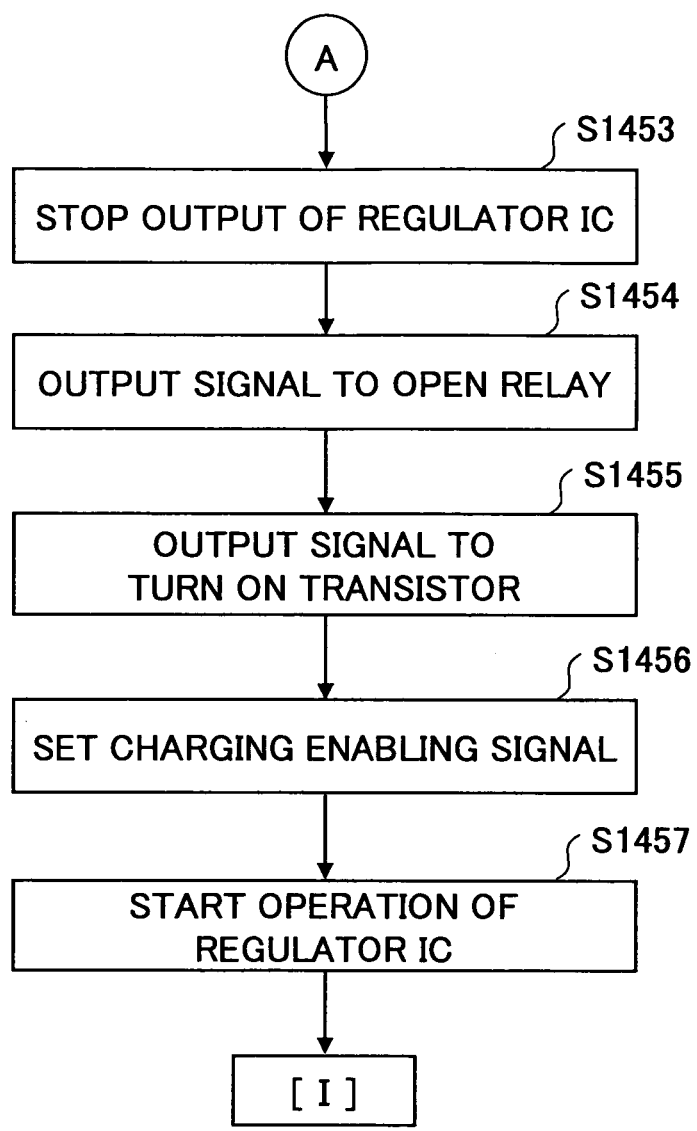
FIG. 69 is a flowchart of the operation of controlling switching the switching circuit in accordance with the operation mode of the image forming apparatus according to the 11th embodiment of the present invention.

A description is given next, with reference to the flowcharts of FIGS. 68 and 69, of the operation of controlling switching of the relay 37a of the switching circuit 37 in accordance with the operation mode of the image forming apparatus. FIGS. 68 and 69 show the operation of controlling switching of the relay 37a of the switching circuit 37 in accordance with the operation mode of the image forming apparatus.

First, in step S1441, the apparatus control part 10 determines whether the all cell full charge signal 45 has been output from the constant current/constant power charge voltage generation circuit 7. If the all cell full charge signal 45 has been output (YES in step S1441), the capacitor bank 9 is charged. Accordingly, in step S1442, the apparatus control part 10 outputs a signal to stop a PWM signal to the switching regulator IC 13.

Next, since the charging of the capacitor bank 9 is completed, in step S1443, the apparatus control part 10 transmits a signal to close the relay 37a to the relay drive circuit 25. Thereby, power is supplied to the main body load 20 side.

Next, in step S1444, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Further, since the charging of the capacitor bank 9 is completed, the apparatus control part 10 resets the charging enabling flag.

Next, in step S1445, the apparatus control part 10 outputs to the switching regulator IC 13 a start signal to cause the switching regulator IC 13 to output a PWM signal.

Next, in step S1446, the apparatus control part 10 determines whether the image forming apparatus is ready to start an image forming operation. If the image forming apparatus starts an image forming operation (YES in step S1446), in step S1447, the apparatus control part 10 outputs a signal to cause the switching regulator IC 13 to stop the PWM signal to the switching regulator IC 13. In the case of performing image formation, it is necessary to supply power to the main body load 20. Accordingly, in step S1448, the apparatus control part 10 outputs a signal to close the relay 37a to the relay drive circuit 25.

Next, in step S1449, the apparatus control part 10 outputs a signal to turn OFF the transistor Tr2 of the constant voltage detection circuit 21 that feeds back a voltage value in order for the power supply generation circuit 12 to output a constant voltage. By turning OFF the transistor Tr2, the power supply generation circuit 12 can output a constant voltage. Since the charging of the capacitor bank 9 is completed, the apparatus control part 10 resets a charging enabling flag.

Next, in step S1450, the apparatus control part 10 outputs from a port to the switching regulator IC 13 a start signal to cause the switching regulator IC 13 to output a PWM signal.

Since the image forming apparatus has started the image forming operation in step S1446 (step S1451), in step S1452, the apparatus control part 10 determines whether the image forming operation is completed.

If the image forming operation is completed (YES in step S1452), in step S1453 of FIG. 69, the apparatus control part 10 outputs to the switching regulator IC 13 a signal to cause the switching regulator IC 13 to stop the PWM signal. Further, since a charging operation is performable, in step S1454, the apparatus control part 10 outputs a signal to open the relay 37a to the relay drive circuit 25.

Next, in step S1455, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Next, in step S1456, the apparatus control part 10 sets the charging enabling signal. Further, in step S1457, the apparatus control part outputs to the switching regulator IC 13 a signal to cause the switching regulator IC 13 to output a PWM signal. Since the image forming operation is completed, the apparatus control part 10 proceeds to arrow [I] of the flowchart of FIG. 60, and performs control to charge the capacitor bank 9.

Returning to step S1441, if the all cell full charge signal 45 has not been output (NO in step S1441), in step S1460, the apparatus control part 10 determines whether the image forming apparatus is capable of performing image formation (for example, whether the door of the image forming apparatus is open or whether the image forming apparatus has run out of paper). For example, in this case, the apparatus control part 10 determines whether the door of the image forming apparatus is open.

If the door is not open (NO in step S1460), it is possible to perform image formation without the all cell full charge signal 45. Accordingly, the apparatus control part 10 proceeds to step S1446 to determine whether the image forming apparatus is ready to start an image forming operation.

If the door is open (YES in step S1460), it is not possible to perform an image forming operation. Accordingly, it is possible to charge the capacitor bank 9. In step S1461, the apparatus control part 10 outputs to the switching regulator IC 13 a signal to cause the switching regulator IC 13 to stop a PWM signal.

In step S1462, the apparatus control part 10 outputs a signal to open the relay 37a to the relay drive circuit 25. Then, in step S1463, the apparatus control part 10 outputs a signal to turn ON the transistor Tr2 of the constant voltage detection circuit 21 that feeds back a voltage value in order for the power supply generation circuit 12 to output a constant voltage. By turning ON the transistor Tr2, the feedback signal of the constant current/constant power charge voltage generation circuit 7 is enabled.

Then, in step S1464, the apparatus control part 10 sets the charging enabling signal, and in step S1465, the apparatus control part 10 outputs to the switching regulator IC 13 a start signal to cause the switching regulator IC 13 to output a PWM signal. Then, the apparatus control part 10 proceeds to arrow [I] of FIG. 60, and performs control to charge the capacitor bank 9. Thus, even if the make-and-break circuit 26 is replaced by the switching circuit 37, it is possible to switch the destination of the output of the power supply generation circuit 12 between the main body load 20 and the capacitor bank 9 in accordance with an image forming operation.

Figure 70:
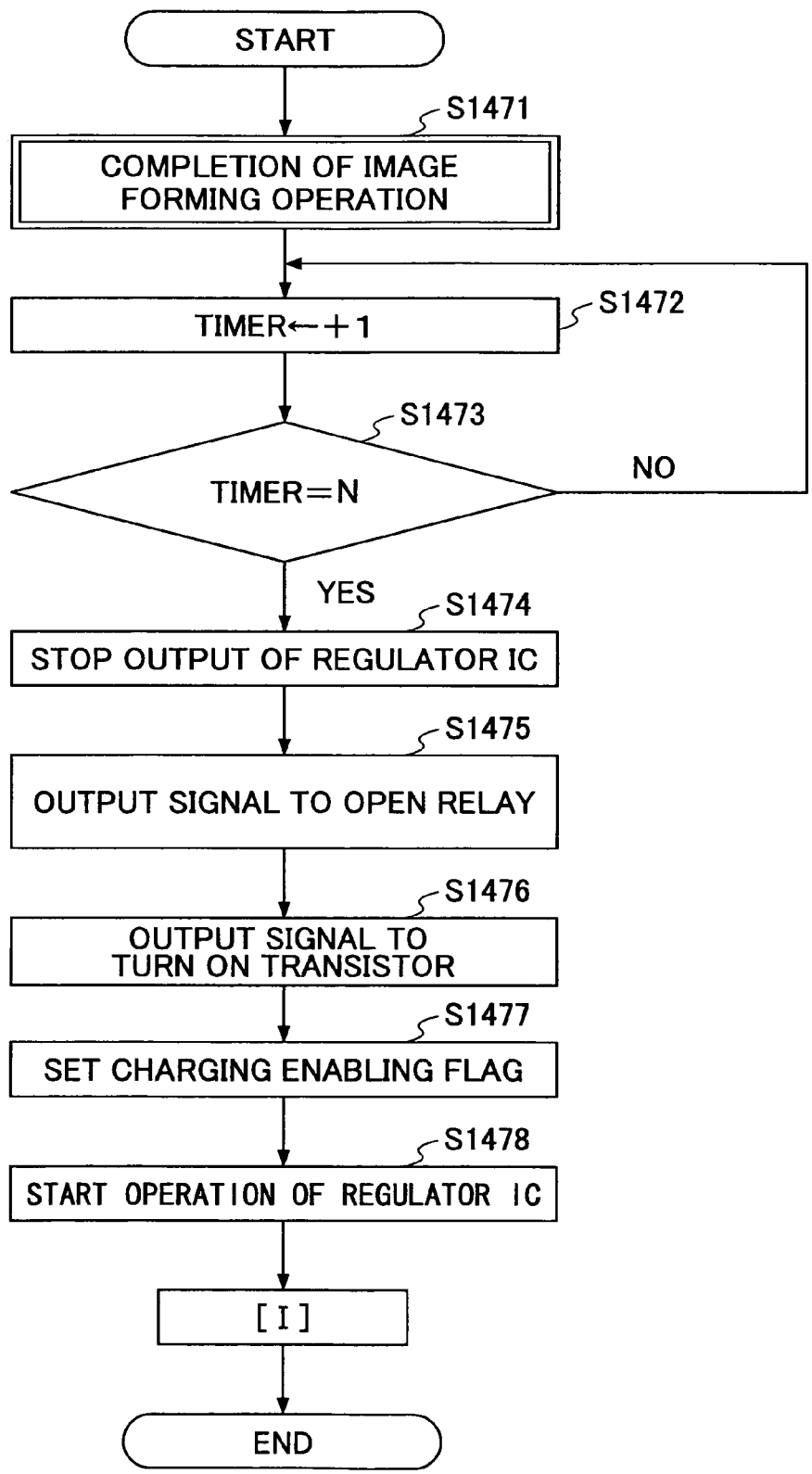
FIG. 70 is a flowchart of a control operation in the case of the image forming apparatus entering the energy saving mode according to the 11th embodiment of the present invention.

Next, a description is given, with reference to the flowchart of FIG. 70, of a control operation in the case of the image forming apparatus entering an energy saving mode when the switching circuit 37 of FIG. 67 is employed.

The image forming apparatus enters an energy saving mode after passage of a certain period of time since completion of an image forming apparatus (step S1471). According to the flowchart of FIG. 70, in step S1472, counting is repeated with a timer, and in step S1473, it is determined whether the counted timer value is a predetermined value N. If the counted timer value is N (YES in step S1473), the image forming apparatus enters an energy saving mode.

In the case of entering the energy saving mode, there is no need to supply power to the main body load 20, and it is possible to charge the capacitor bank 9. Accordingly, in step S1474, the apparatus control part 10 outputs to the switching regulator IC 13 a signal to cause the switching regulator IC 13 to stop a PWM signal.

Next, since it is possible to charge the capacitor bank 9, in step S1475, the apparatus control part 10 outputs a signal to open the relay 37a to the relay drive circuit 25. Further, in step S1476, the apparatus control part 10 outputs a signal to turn ON the transistor Tr2. By turning ON the transistor Tr2, the feedback signal of the constant current/constant power charge voltage generation circuit 7 is enabled.

Then, in step S1477, the apparatus control part 10 sets a charging enabling flag, and in step S1478, the apparatus control part 10 outputs to the switching regulator IC 13 a start signal to cause the switching regulator IC 13 to output a PWM signal. Then, the apparatus control part 10 proceeds to arrow [I] of FIG. 60, and performs control to charge the capacitor bank 9.

The image forming apparatus does not enter the energy saving mode during a charging operation. When detecting the all cell full charge signal 45 from the constant current/constant power charge voltage generation circuit 7, the apparatus control part 10 outputs to the DC/DC converter 33 a signal to stop part of its power supply output to the image forming apparatus.

As described above, according to the image forming apparatus of this embodiment, the output of the power supply generation circuit 12 can be used as the power supply of the image forming apparatus when required for an image forming operation, and the power supply generation circuit 12 can be used a charger at the time of a charging operation. Accordingly, it is possible to charge the capacitor bank 9 without the need for a dedicated charger, so that it is possible to reduce the cost and the size of the apparatus.

Since time required for charging is approximately a few to tens of seconds, the image forming operation of the image forming apparatus is prevented from being delayed.

Further, power is stored in the capacitor bank 9 after increasing its voltage to substantially the same as the operating voltage of the main body load 20, and the voltage is increased by the boost part 80 when it is necessary to supply the power to the fixing heater 22. Therefore, compared with storing power after increasing its voltage to a voltage to be supplied to the fixing heater 22, it is possible to reduce the capacitor bank 9 in size and charging (power storing) time. Further, even if the temperature of a fixing unit is extremely lower than a preset temperature, it is possible to prevent inrush current because the duty ratio of PWM can be gradually increased (soft start).

Further, at the time of the energy saving mode, it is possible to cause current to flow from the power supply generation circuit 12 to the capacitor bank 9 by closing the make-and-break circuit 26 (or switching the switching circuit 37 to the capacitor bank 9 side). Accordingly, it is possible to charge the capacitor bank 9 even at the time of the energy saving mode.

As described below, the increased voltage detection circuit 50 may be omitted. If the increased voltage detection circuit 50 is not provided, the power storage unit may control voltage increase in accordance with the temperature of the heating part of the fixing unit 112 or in accordance with a control signal from an external apparatus.

12$^{th}$ Embodiment

In the ninth through 11$^{th}$ embodiments, a description is given of image forming apparatuses to which power storage units are applied. In a 12$^{th}$ embodiment, a description is given of a power storage unit.

Figure 71:
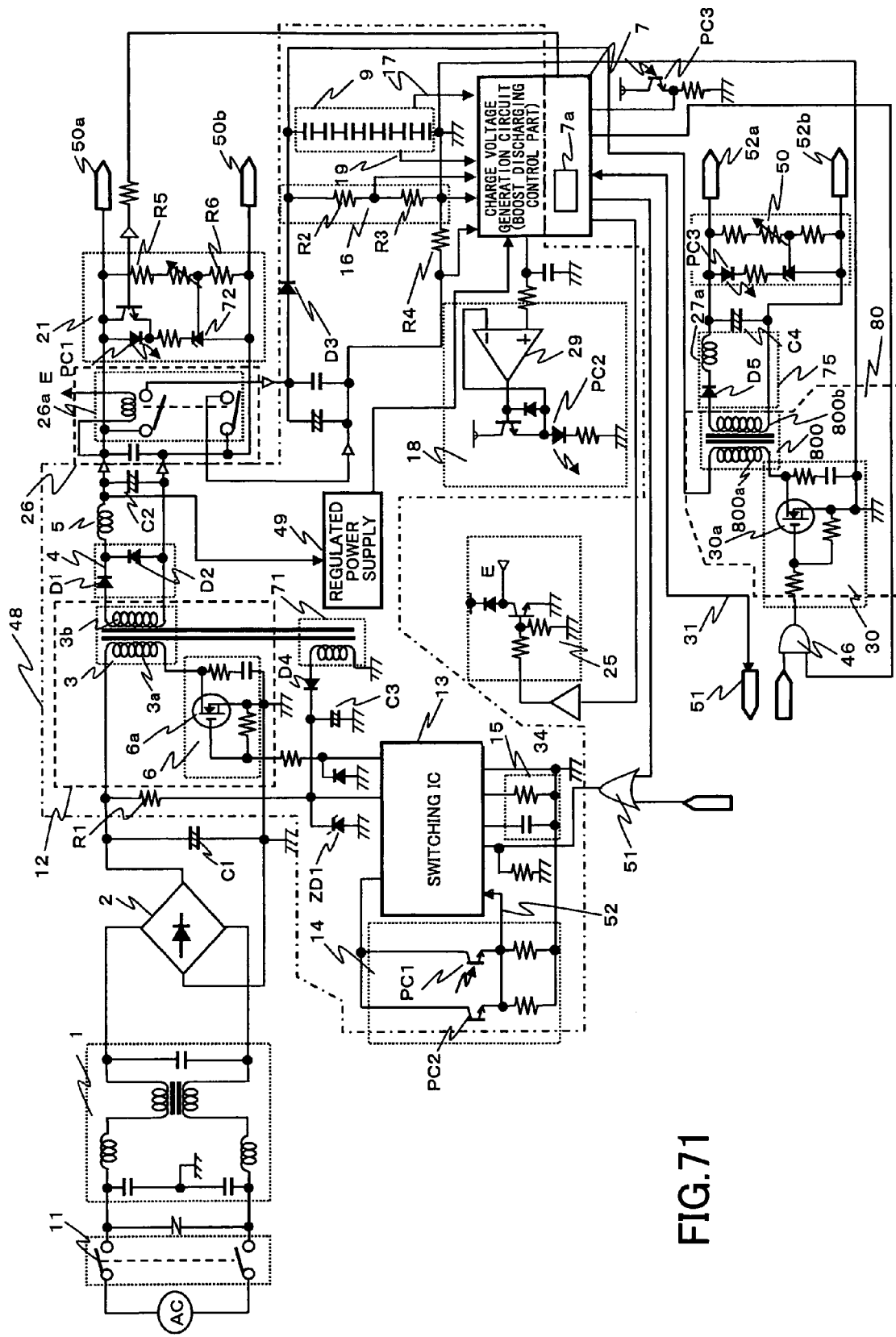
FIG. 71 is a circuit diagram showing a power storage unit according to a 12th embodiment of the present invention.

FIG. 71 is a circuit diagram showing a power storage unit according to this embodiment. In FIG. 71, the same elements as those of FIG. 34 are referred to by the same reference numerals. An AC power supply is connected to the power supply generation circuit 12 via the main power switch 11, the filter 1, and the full-wave rectification circuit 2. The power supply generation circuit 12 is connected to the constant voltage detection circuit 21, output terminals 50a and 50b, and the make-and-break circuit 26 through the rectification circuit 4 and the choke coil 5. The output terminals 50a and 50b supply power to an external apparatus.

If the make-and-break circuit 26 is closed, the power supply generation circuit 12 is connected to the charge voltage detection circuit 16 and the capacitor bank 9. The charge voltage detection circuit 16 includes an equalization circuit that is not graphically illustrated. Further, the capacitor bank 9 and the charge voltage detection circuit 16 are connected to the constant current/constant power charge voltage generation circuit 7. The capacitor bank 9 is connected via the boost part 80, the rectification and smoothing circuit 75, and the increased voltage detection circuit 50 to output terminals (external terminals) 52a and 52b that supply power of increased voltage to an external apparatus. The output terminals 52a and 52b correspond to an output part.

Further, the constant current/constant power charge voltage generation circuit 7 is connected to the voltage-to-current conversion circuit 18 and the boost part 80.

The switching regulator IC 13 is connected to the power supply generation circuit 12, the circuit 15, and the feedback voltage detection circuit 14. Light emitted from the photocoupler PC1 of the feedback voltage detection circuit 14 and light emitted from the photocoupler PC2 of the voltage-to-current conversion circuit 18 are input to the feedback voltage detection circuit 14.

When the main power switch 11 is turned ON, an alternative current from the AC power supply (commercial power supply) passes through the filter 1 to be subjected to full-wave rectification in the full-wave rectification circuit 2. The output of the full-wave rectification circuit 2 has ripple components thereof removed by a smoothing capacitor C1, and is input to the power supply generation circuit 12.

The primary coil 3a of the high-frequency transformer 3 is connected to the DC output side of the full-wave rectification circuit 2 in parallel with the smoothing capacitor C1. The FET 6a is connected as a switching part in series to the primary coil 3a. The switching circuit 60 having the FET 6a is switched (ON and OFF) by a PWM signal output from the switching regulator IC 13, so that a switching current flows into the primary coil 3a. The switching current on the primary side induces a switching voltage in the secondary coil 3b of the transformer 3. Accordingly, it is possible to control output voltage by changing the conduction period of the switching frequency.

The diode D1 and the diode D2 are connected as the rectification circuit 4 to the secondary coil 3b of the transformer 3. The switching voltage is rectified by this rectification circuit 4 and smoothed by the choke coil 5 and the capacitor C2 to be converted into DC output. This DC output is connected to the output terminals 50a and 50b that supply power to an external apparatus.

The DC output of the choke coil 5 and the capacitor C2 is connected to the relay 26a of the make-and-break circuit 26. When the relay 26a is energized, the make-and-break circuit 26 is closed so that power can be supplied to the capacitor bank 9.

Figure 72:
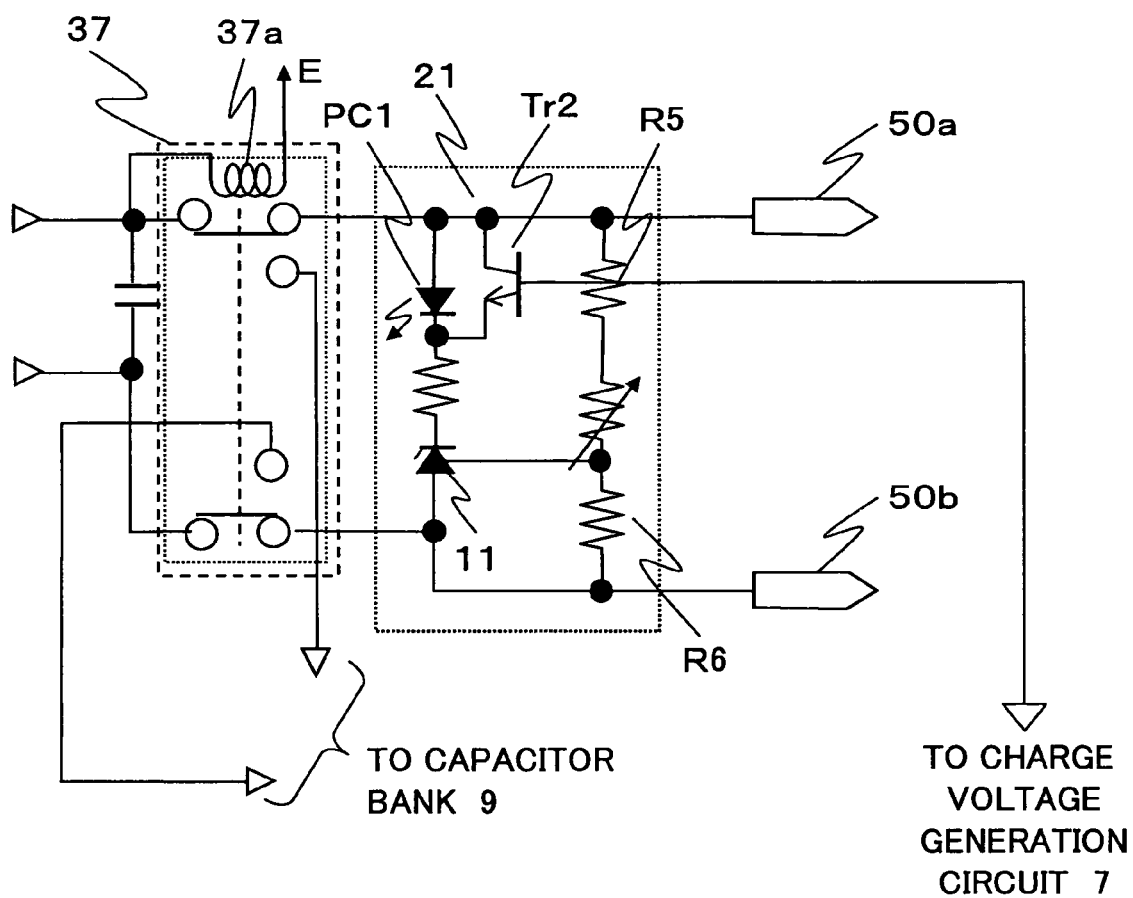
FIG. 72 is a diagram showing a circuit in which the switching circuit replaces the make-and-break circuit according to the 12th embodiment of the present invention.

The make-and-break circuit 26 may be replaced by another configuration. FIG. 72 is a diagram showing a circuit in which the switching circuit 37 replaces the make-and-break circuit 26. The switching circuit 37 is connected to the main body load side when the relay 37a thereof is not energized. In the case of charging the capacitor bank 9, the relay 37a is energized by a relay drive circuit, so that the switching circuit 37 switches to the capacitor bank 9 side. A description is given below of an operation of the make-and-break circuit 26 or the switching circuit 37.

The voltage supplied to the external apparatus from the output terminals 50a and 50b is a constant voltage. This voltage is detected by the constant voltage detection circuit 21. The voltage by the constant voltage detection circuit 21 is detected using the voltage divided by a volume connected in series to the resistor R5 and the resistor R6, and the output is input to the reference terminal of the shunt regulator IC 72. The diode current of the photocoupler PC1 is determined by the voltage input to the reference terminal, is fed back to the feedback voltage detection circuit 14.

When the make-and-break circuit 26 is closed, the DC output is connected to the diode D3, and its output is supplied to the capacitor bank 9 having capacitor cells connected in series.

The capacitor bank 9 of this embodiment includes the n capacitor cells (electric double layer capacitors) that are connected in series. When each capacitor cell is fully charged, the voltage across the capacitor cell is M [V]. Therefore, when the n capacitor cells are fully charged, a voltage (energy) of M×n [V] (hereinafter simply referred to as N [V]) is stored.

Each end of the capacitor bank 9 is connected to the charge voltage detection circuit 16. The output of the charge voltage detection circuit 16 is connected to the constant current/constant power charge voltage generation circuit 7. The charge voltage detection circuit 16 includes a divider circuit formed of the resistor R2 and the resistor R3, and detects the voltage of the capacitor bank 9 by voltage division of the resistor R2 and the resistor R3.

The resistor R4 is connected in series between the smoothing capacitor C5 and the capacitor bank 9, so that the charging current of the capacitor bank 9 can be detected by monitoring the voltage across the resistor R4. The voltage across the resistor R4 is input to the constant current/constant power charge voltage generation circuit 7.

The capacitor bank 9 is connected to the equalization circuit (not graphically illustrated). The equalization circuit detects the full charge of each individual capacitor cell to put a corresponding bypass circuit into operation, thereby equalizing the charge voltages of the capacitor cells. When a first one of the capacitor cells is fully charged to N [V], the equalization circuit bypasses charging current to a second one of the capacitor cells. The bypass circuit of the second one of the capacitor cells operates in the same manner, so that the charge voltages of the capacitor cells are equalized.

When the equalization circuit detects the full charge of any one of the capacitor cells (that any one of the capacitor cells is fully charged) and puts a corresponding bypass circuit into operation, the equalization circuit outputs the single cell full charge signal 44 to the constant current/constant power charge voltage generation circuit 7. Further, when the equalization circuit detects the full charges of all the capacitor cells and puts all the bypass circuits into operation, the equalization circuit outputs the all cell full charge signal 45 to the constant current/constant power charge voltage generation circuit 7. A detailed description is given below of the equalization circuit.

In response to this all cell full charge signal 45, the constant current/constant power charge voltage generation circuit 7 stops charging, and outputs a signal to turn OFF the relay 26 to the relay drive circuit 25 in order to connect the relay 26a to the external apparatus side. Further, as described below, the constant current/constant power charge voltage generation circuit 7 enables the constant voltage detection circuit 21 of a feedback circuit for the power supply generation circuit 12 outputting a constant voltage. Further, the constant current/constant power charge voltage generation circuit 7 outputs the all cell full charge signal 45 to the external apparatus. Further, the voltage supplied to the external apparatus is a constant voltage, and this voltage is detected by the constant voltage detection circuit 21.

Next, a description is given of an operation of the switching regulator IC 13 that generates a PWM signal. The DC output of the full-wave rectification circuit 2 is supplied to the switching regulator IC 13 via a circuit made up of the resistor R1, the capacitor C3, and the Zener diode ZD1. This causes the switching regulator IC 13 to start operation, and the switching regulator IC 13 continues the operation with an auxiliary power supply made up of the auxiliary coil 71 and the diode D4.

The frequency of the PWM signal is determined by the resistance and the capacitance of the circuit 15 made up of a resistor and a capacitor. The feedback voltage 52 of the output voltage of the photocoupler PC1 or PC2 of the feedback voltage detection circuit 14 is input to the switching regulator IC 13. The switching regulator IC 13 includes a voltage-pulse width conversion circuit that modulates the pulse width of the PWM signal in accordance with the feedback voltage 52.

The pulse width of the PWM signal changes in accordance with the feedback voltage 52. The PWM signal is input to the gate of the FET 6a, causing the FET 6a to switch the primary coil 3a of the transformer 3. This makes it possible to cause different output voltages to be generated in the secondary coil 3b of the transformer 3.

The voltage generated by the constant current/constant power charge voltage generation circuit 7 is supplied to the base of the transistor Tr1 of the voltage-to-current conversion circuit 18 that converts voltage into current, and is fed back to the feedback voltage detection circuit 14 by the photocoupler PC2 connected to the emitter of the transistor Tr1.

Next, a description is given of the operation in which the current/constant power charge voltage generation circuit 7 detects the operation of a bypass circuit based on detection of the charge voltage and the charging current of the capacitor bank 9, and performs constant current charging and constant power charging.

The current/constant power charge voltage generation circuit 7 includes a CPU, a ROM, a RAM, a timer, an interruption control circuit, an A/D converter, a serial controller (UART), a D/A converter, and an I/O port that are not graphically illustrated. The current/constant power charge voltage generation circuit 7 transmits a signal to report charging of a capacitor cell to the external apparatus through serial communications.

When detecting the single cell full charge signal 44 that indicates that the bypass circuit of one of the capacitor cells has operated, the current/constant power charge voltage generation circuit 7 performs a constant current charging operation in order to perform preset constant current charging. Further, when receiving the all cell full charge signal 45 indicating that all the bypass circuits have operated, the current/constant power charge voltage generation circuit 7 outputs a signal to stop a charging operation to the external apparatus.

The current/constant power charge voltage generation circuit 7 includes a PWM generation circuit 7a that generates a PWM (Pulse Width Modulation) signal.

The PWM generation circuit 7a includes a timer (not graphically illustrated) that determines the frequency of the PWM signal, and an internal timer (not graphically illustrated) for pulse width modulation that determines the duty ratio of the PWM signal.

The PWM generation circuit 7a may generate a PWM signal constantly or in response to an instruction from the external apparatus. A detailed description is given below of duty ratio control.

If the voltage across the capacitor bank 9 is lower than a preset value, the current/constant power charge voltage generation circuit 7 outputs a voltage for performing preset constant current charging to an operational amplifier 29 of the voltage-to-current conversion circuit 18 from the D/A terminal of the current/constant power charge voltage generation circuit 7.

A current for performing constant current charging on the capacitor bank 9 is detected by the voltage across the resistor R4 connected in series to the capacitor bank 9. The constant current/constant power charge voltage generation circuit 7 successively detects the voltage across the resistor R4, and outputs the voltage for performing the preset constant current charging to the operational amplifier 29 of the voltage-to-current conversion circuit 18 from the D/A terminal of the current/constant power charge voltage generation circuit 7.

When the voltage across the capacitor bank 9 is higher than or equal to the preset value, the constant current/constant power charge voltage generation circuit 7 detects the charging current of the capacitor bank 9 and the voltage across the capacitor bank 9 as described above in order to perform constant power charging, and calculates and determines a voltage for performing preset constant power charging from the detected charging current and charge voltage.

The analog voltage output from the D/A terminal of the current/constant power charge voltage generation circuit 7 may be determined using a table that records an analog voltage to be output in correlation to a corresponding voltage across the capacitor bank 9.

A current corresponding to the analog voltage input to the operational amplifier 29 of the voltage-to-current conversion circuit 18 flows from the transistor Tr1 to the diode of the photocoupler PC2 so as to be fed back to the feedback voltage detection circuit 14. This feedback voltage controls the signal width of the output PWM signal of the switching regulator IC 13, and a PWM signal for performing constant current charging is output to the gate of the FET 6a from the switching regulator IC 13.

When receiving the all cell full charge signal 45 indicating that all the bypass circuits have operated, the current/constant power charge voltage generation circuit 7 stops a charging operation and outputs a signal to connect the relay 26a to the external apparatus side (turn OFF the relay 26a) to the relay drive circuit 25. Further, the current/constant power charge voltage generation circuit 7 outputs a signal to turn OFF the transistor Tr2 to the transistor Tr2, which connects the anode and the cathode of the photocoupler PC1 that detects a feedback voltage for making constant the voltage that the power supply generation circuit 12 outputs to the external apparatus, and outputs a all cell full charge signal to the external apparatus through a UART terminal.

A description is given of the boost part 80. The primary coil 800a of the isolation transformer 800 and the FET 30a connected in series thereto are connected in parallel to the capacitor bank 9 between its terminals. The FET 30a switches the primary coil 800a for voltage increasing.

When a PWM signal is input to the AND circuit 46 from the constant current/constant power charge voltage generation circuit 7 so that the FET 30a of the switching circuit 30 is switched (ON and OFF), a switching current flows through the primary coil 800a. This switching current of the primary coil 800a induces a switching voltage in a secondary coil 800b of the transformer 800. It is possible to control the increased voltage by changing the conduction period of the switching frequency. An input from the external apparatus is connected to the other input terminal of the AND circuit 46.

The switching voltage of the secondary coil 800b of the isolation transformer 800 is connected to the rectification and smoothing circuit 75 that performs rectification and smoothing using the diode D5, the choke coil 27a, and the capacitor C4. The smoothed output of the rectification and smoothing circuit 75 is connected to the DC fixing heater 22. The smoothed voltage is fed back to the constant current/constant power charge voltage generation circuit 7 by the photocoupler PC3 of the increased voltage detection circuit 50.

The increased voltage of the rectification and smoothing circuit 75 is determined by the voltage stored in the capacitor bank (input voltage) and the ON/OFF duty ratio (the ratio of the ON period to the sum of the ON period and OFF period) of the PWM signal. Further, the increased voltage of the rectification and smoothing circuit 75 is detected by the increased voltage detection circuit 50, and is controlled by the constant current/constant power charge voltage generation circuit 7 changing the duty ratio of the PWM signal. The increased voltage can be controlled to a preset constant voltage by changing the duty ratio of the PWM signal by monitoring the voltage of the increased voltage detection circuit 50.

A description is given, based on flowcharts, of specific operations according to this embodiment using the above-described configuration. The below description is based on the circuit diagram of FIG. 71 unless otherwise described.

Figure 73:
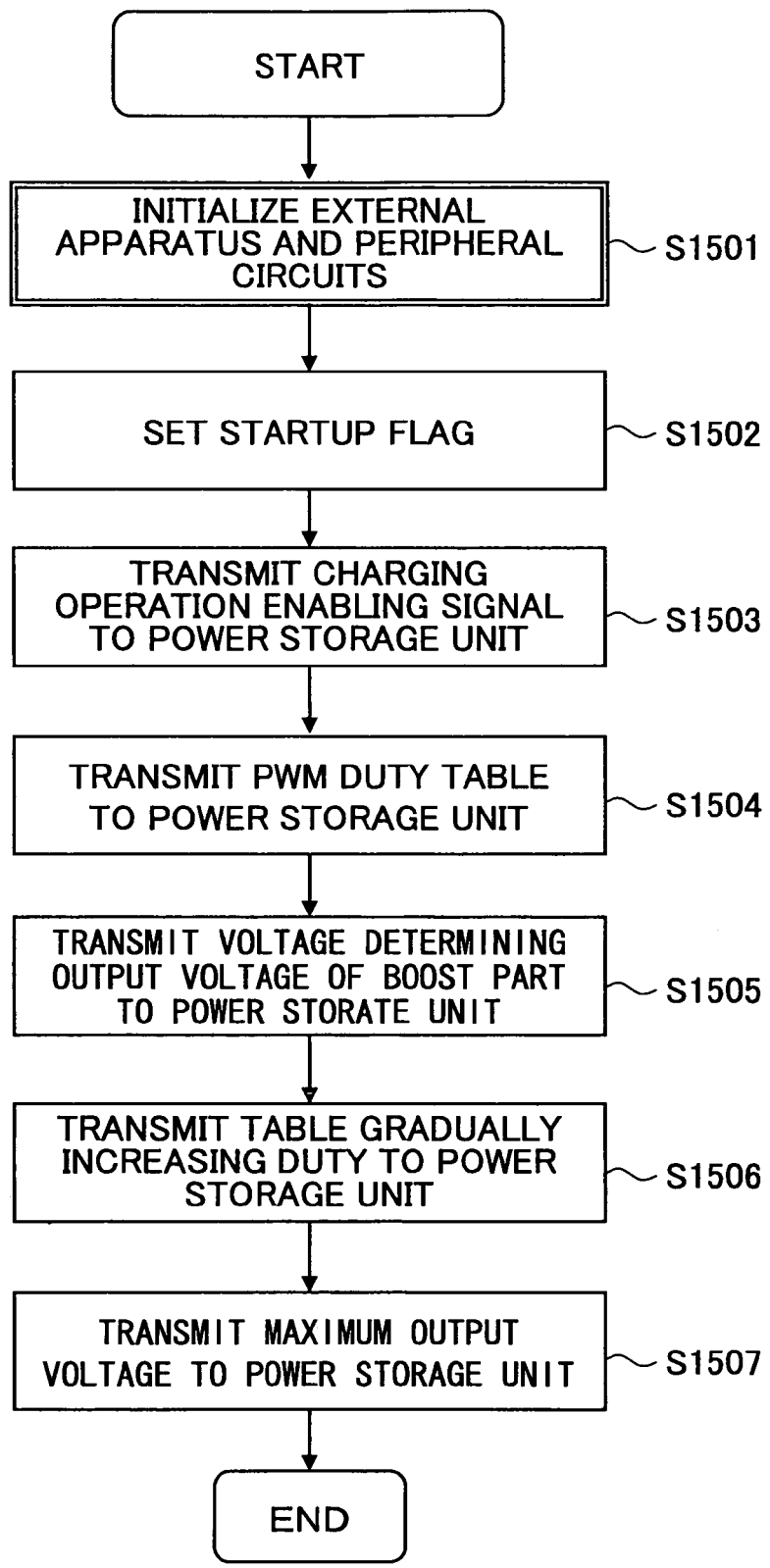
FIG. 73 is a flowchart of the operation in which an external apparatus outputs control information necessary for a boost operation to the power storage unit when the main power of the external apparatus is ON or at the time of canceling the energy saving mode according to the 12th embodiment of the present invention.

FIG. 73 is a flowchart of the control operation in which an external apparatus outputs control information necessary for a boost (voltage increasing) operation to the power storage unit when the main power of the external apparatus is ON or when the power consumption of the external apparatus increases for operations (hereinafter referred to as cancellation of the energy saving mode). The external apparatus is, for example, an image forming apparatus.

When the main power switch 11 is turned ON or the energy saving mode is canceled, the external apparatus performs initialization. First, in step S1501, the external apparatus and its peripheral circuits are initialized.

Next, in step S1502, when the external apparatus is started, the external apparatus sets a startup flag for using the power of the power storage unit.

The external apparatus is not ready to operate immediately after its startup. Accordingly, in step S1503, the external apparatus transmits a charging operation enabling signal to the power storage unit.

Next, in step S1504, the external apparatus transmits a PWM signal table determining the duty ratio of a PWM signal for boosting (voltage increasing) (corresponding to duty control information) to the power storage unit in order to provide the power storage unit with the table. The power storage unit may use the table by storing the table in, for example, the RAM of the constant current/constant power charge voltage generation circuit 7. Alternatively, the power storage unit may use a PWM signal table prestored therein or create a PWM signal table by performing operations.

Next, in step S1505, the external apparatus transmits a voltage that determines the output voltage of the boost part 80 to the power storage unit. The power storage unit controls the duty ratio of the PWM signal so that the output of the boost part 80 is this voltage.

Next, in step S1506, the external apparatus transmits a PWM signal table in which the duty ratio of the PWM signal is set so as to gradually increase (soft start) to the power storage unit. This PWM signal table is used in the case of preventing an inrush current from the boost part 80.

Next, in step S1507, the external apparatus transmits a maximum output voltage limiting value that limits the maximum output voltage of the boost part 80. This prevents voltage from being increased more than expected. Thereby, the control of FIG. 73 ends.

Figure 74:
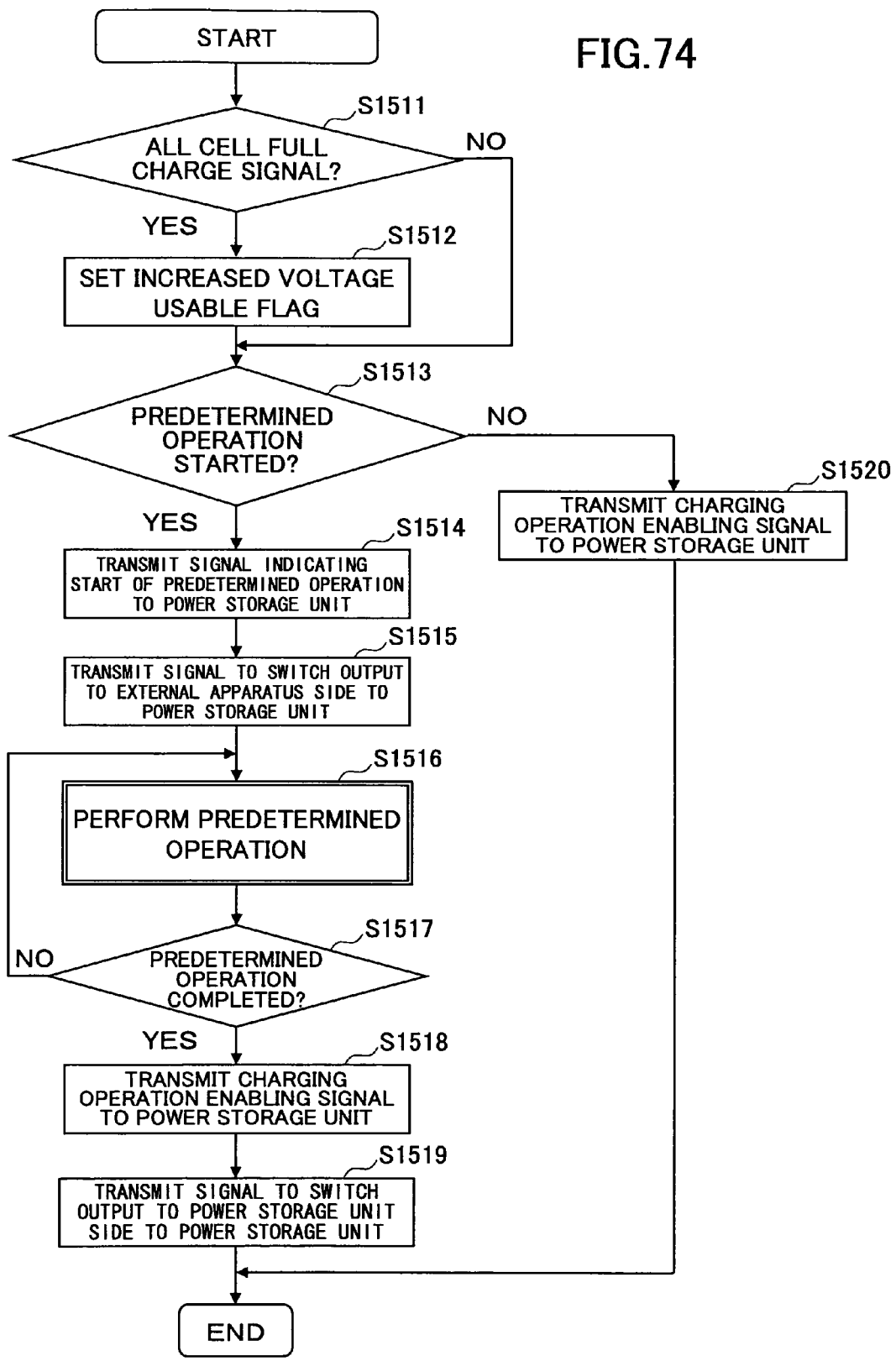
FIG. 74 is a flowchart of the control operation of giving instructions for control of the opening and closing of the make-and-break circuit of the power storage unit and for the charging operation of the power storage unit in accordance with the operation mode of the external apparatus according to the 12th embodiment of the present invention.

Next, a description is given, with reference to the flowchart of FIG. 74, of the control operation of giving instructions for control of the opening and closing of the make-and-break circuit 26 of the power storage unit and for the charging operation of the power storage unit in accordance with the operation mode of the external apparatus.

First, in step S1511, the external apparatus determines whether the all cell full charge signal 45 has been output from the constant current/constant power charge voltage generation circuit 7. If the all cell full charge signal 45 has been output (YES in step S1511), charging of the capacitor bank 9 is completed. Accordingly, in step S1512, the external apparatus sets an INCREASED VOLTAGE USABLE flag.

Next, in step S1513, the external apparatus determines whether the external apparatus is ready to start an operation that may use the power of the power storage unit (hereinafter simply referred to as "predetermined operation"). In the case of starting the predetermined operation (YES in step S1513), in step S1514, the external apparatus transmits a signal indicating the start of the predetermined operation to the power storage unit.

If the external apparatus has not started the predetermined operation (NO in step S1513), in step S1520, the external apparatus transmits a charging operation enabling signal to the power storage unit, and the control of FIG. 74 ends.

In the case of starting the predetermined operation (YES in step S1513), it is necessary to supply power to the load side of the external apparatus. Accordingly, in step S1515, the external apparatus outputs a signal to open the relay 26a to the power storage unit.

Since the predetermined operation has been started from step S1513 (step S1516), in step S1517, the external apparatus determines whether the predetermined operation is completed. If the predetermined operation is completed (YES in step S1517), it is possible to charge the capacitor bank 9. Accordingly, in step S1518, the external apparatus transmits a charging operation enabling signal to the power storage unit.

Since the predetermined operation is completed, in step S1519, the external apparatus transmits a signal to switch the output of the power supply generation circuit 12 to the power storage unit side to the power storage unit. Thereby, the relay 26a is closed so that it is possible to charge the capacitor bank 9. Thereby, the control of FIG. 74 ends.

Figure 75:
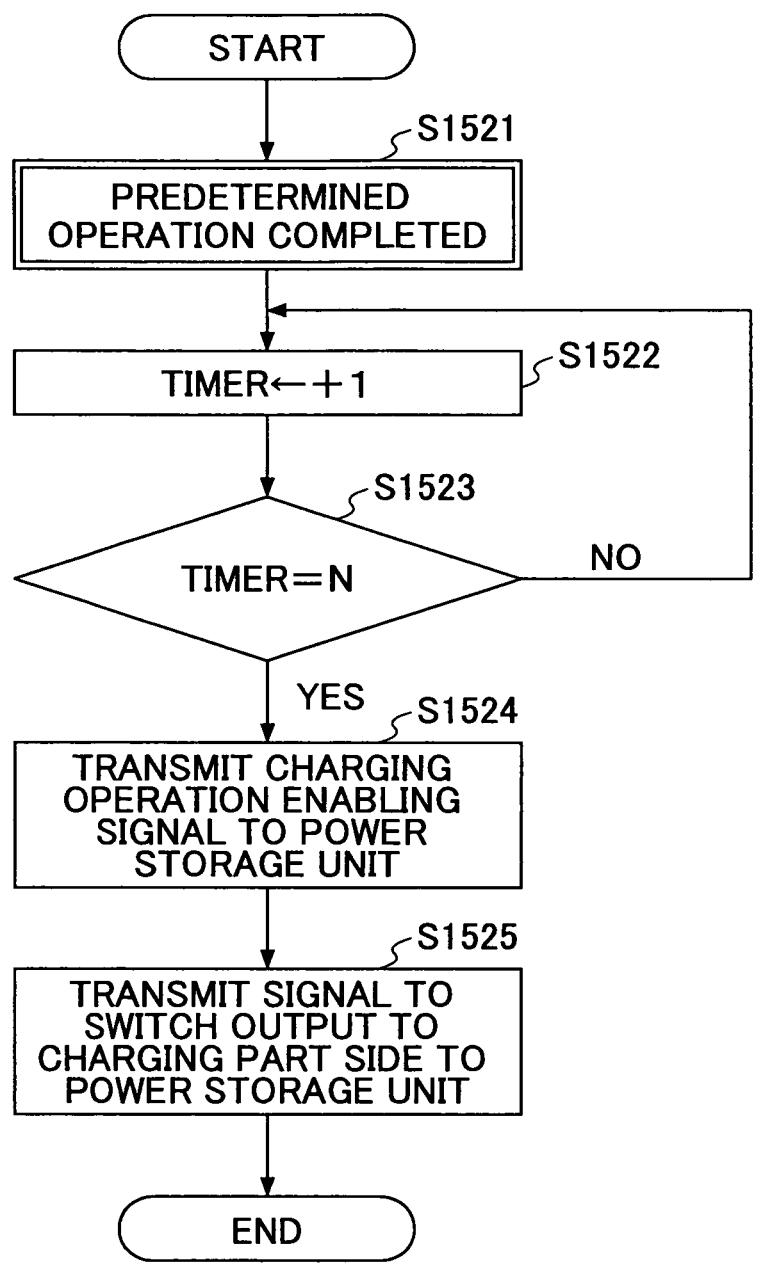
FIG. 75 is a flowchart of the control operation in which the external apparatus enters the energy saving mode after completion of a predetermined operation according to the 12th embodiment of the present invention.

The external apparatus enters an energy saving mode after passage of a certain period of time since the end of the predetermined operation. Accordingly, a description is given next, with reference to the flowchart of FIG. 75, of the control operation in which the external apparatus enters an energy saving mode.

According to this embodiment, after the predetermined operation ends (step S1521), in step S1522, passage of time is measured by the counting up of a timer. Then, in step S1523, it is determined based on the value of the timer whether a certain period of time has passed.

If a certain period of time has passed (YES in step S1523), the external apparatus enters an energy saving mode. After entry into the energy saving mode, it is possible to charge the capacitor bank 9. Accordingly, in step S1524, the external apparatus transmits a charging operation enabling signal to the power storage unit. Next, the external apparatus transmits a signal to switch the output of the power supply generation circuit 12 to the charging part side to the power storage unit. Thereby, the control based on the flowchart of FIG. 75 ends.

Figure 76:
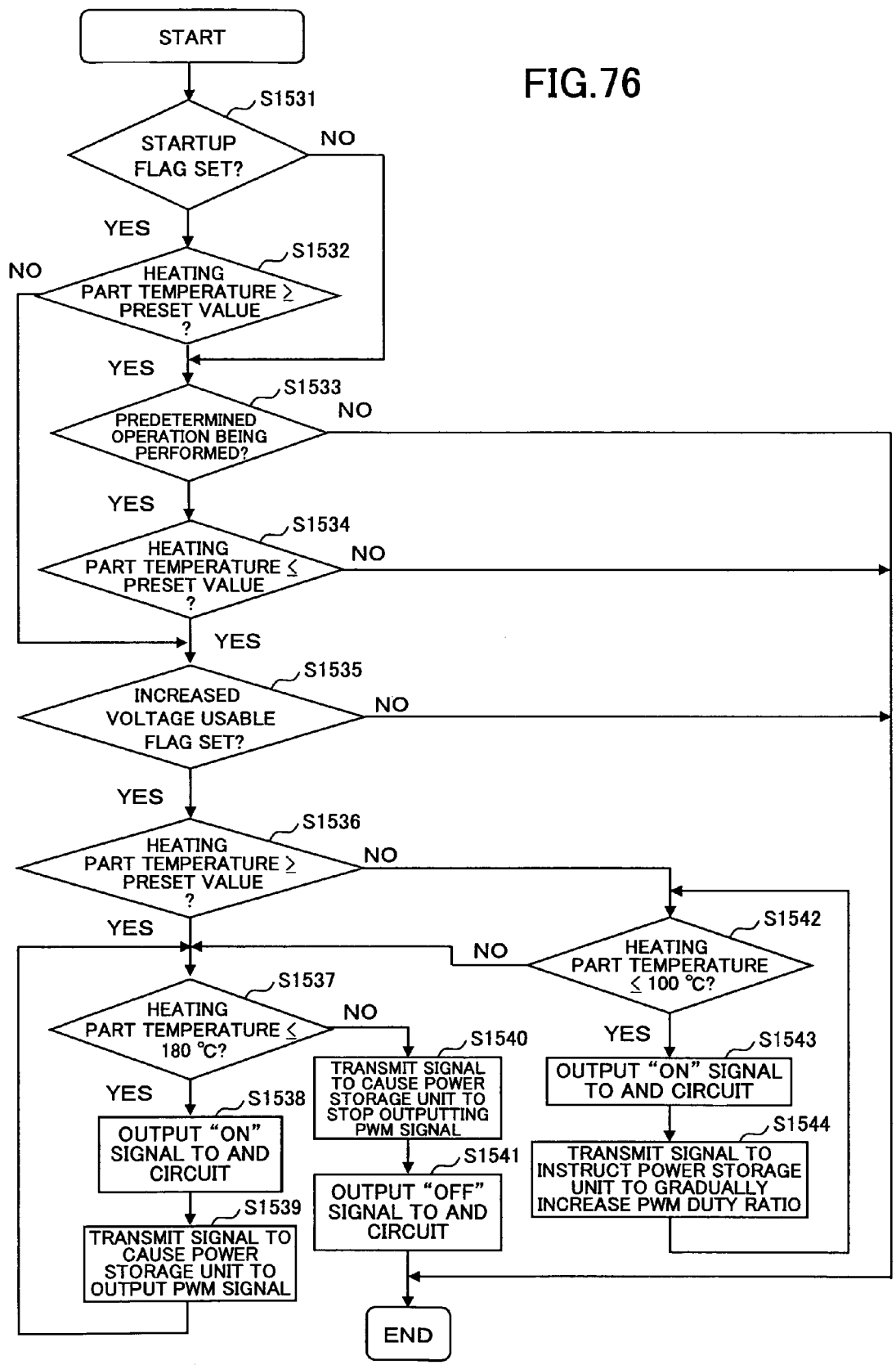
FIG. 76 is a flowchart of the operation where the external apparatus controls the temperature of its heating part using the power stored in the power storage unit according to the 12th embodiment of the present invention.

Next, a description is given, with reference to the flowchart of FIG. 76, of the operation where the external apparatus controls the temperature of its heating part using the power stored in the power storage unit.

First, in step S1531, the external apparatus determines whether a startup flag that is set when the main power switch 11 is turned ON or the energy saving mode is canceled is set.

When the startup flag is set (YES in step S1531), in step S1532, the external apparatus detects the temperature of the heating part, and determines whether the temperature of the heating part is higher than or equal to a preset temperature (for example, 130° C.).

If the temperature of the heating part is higher than or equal to the preset temperature (YES in step S1532), in step S1533, the external apparatus determines whether the external apparatus is performing a predetermined operation. If the external apparatus is not performing the predetermined operation (NO in step S1533), there is no need to supply power from the boost part 80 to the output terminals 52a and 52b connected to the heater of the heating part. Accordingly, the control ends.

If the external apparatus is performing the predetermined operation (YES in step S1533), in step S1534, the external apparatus determines whether the temperature of the heating part is lower than or equal to a preset temperature. If there is no drop in the temperature of the heating part and the temperature of the heating part is not lower than or equal to the preset temperature (NO in step S1534), there is no need to supply power from the boost part 80 to the output terminals 52*a* and 52*b*. Accordingly, the control ends.

If the temperature of the heating part is lower than or equal to the preset temperature (for example, 155° C.) (YES in step S1534), there may be a problem in the predetermined operation. Accordingly, in step S1535, the external apparatus determines whether an INCREASED VOLTAGE USABLE flag is set.

The INCREASED VOLTAGE USABLE flag is set by the all cell full charge signal 45 from the power storage unit or an increased voltage use enabling signal.

If the INCREASED VOLTAGE USABLE flag is not set (NO in step S1535), the charge voltage of the charging part is insufficient so that power cannot be supplied to the external apparatus. Accordingly, the control ends.

If the INCREASED VOLTAGE USABLE flag is set (YES in step S1535), in step S1536, the external apparatus determines whether the temperature of the heating part is higher than or equal to a preset temperature (for example, 20° C.).

If the temperature of the heating part is higher than or equal to the preset temperature (YES in step S1536), in step S1537, the external apparatus determines whether the temperature of the heating part is lower than or equal to a preset temperature (for example, 180° C.). If the temperature of the heating part is lower than or equal to the preset temperature (YES in step S1537), in step S1538, the external apparatus outputs to the AND circuit 46 a signal for supplying power to the output terminals 52*a* and 52*b*. Next, in step S1539, the external apparatus transmits to the power storage unit a signal to cause a PWM signal to be output. This signal (corresponding to a signal instructing a voltage increasing operation to be started) causes the power storage unit to output a preset PWM signal to the AND circuit 46.

When the external apparatus inputs the signal to the AND circuit 46 and the constant current/constant power charge voltage generation circuit 7 outputs the preset PWM signal, the switching circuit 30 performs a switching operation so that the voltage increased by the isolation transformer 800 is supplied to the output terminals 52*a* and 52*b*.

In step S1537, the external apparatus again determines whether the temperature of the heating part is lower than or equal to the preset temperature, and repeats the control of steps S1538 and S1539.

If the temperature of the heating part is not lower than or equal to the preset temperature (NO in step S1537), there is no need to supply power from the boost part 80 to the output terminals 52*a* and 52*b*. Accordingly, in step S1540, the external apparatus transmits to the power storage unit a signal to stop outputting of the PWM signal (corresponding to a signal instructing the voltage increasing operation to be ended). Further, in step S1541, the external apparatus outputs a signal to turn OFF the PWM signal to the AND circuit 46.

Returning to step S1536, if the temperature of the heating part is not higher than or equal to the preset temperature (for example, 20° C.) (NO in step S1536), that is, in the case where the heating part has such an extremely low temperature, the operation of gradually increasing the duty ratio of the PWM signal (soft start) is performed in order to reduce inrush current.

First, in step S1542, the external apparatus determines whether the temperature of the heating part is lower than or equal to a preset temperature, for example, 100° C. If the temperature of the heating part is lower than or equal to 100° C. (YES in step S1542), in step S1543, the external apparatus outputs a signal for supplying power to the output terminals 52*a* and 52*b* to the AND circuit 46.

Next, in step S1544, the external apparatus transmits to the power storage unit a signal to instruct the power storage unit to output a PWM signal whose duty ratio is gradually increased (soft start).

In step S1542, the external apparatus again determines whether the temperature of the heating part is lower than or equal to the preset temperature (for example, 100° C.). If the temperature of the heating part is lower than or equal to the preset temperature (YES in step S1542), the external apparatus repeats the operations of steps S1543 and S1544.

If the temperature of the heating part is not lower than or equal to the preset temperature (NO in step S1542), the external apparatus performs the above-described control of steps S1537 through S1541, thereby supplying power to the output terminals 52*a* and 52*b*.

Control of power supply to the external apparatus is performed at a startup time or when there is a temperature drop during a predetermined operation. Accordingly, once a predetermined temperature is reached, the power supply to the external apparatus is stopped.

Further, in the description of FIG. 76, the same power supply control is performed at a startup time and at the time of a temperature drop during a predetermined operation. Alternatively, the power supply control may be performed with different target temperatures of the heating part at a startup time and at the time of a temperature drop during a predetermined operation.

Figure 77:
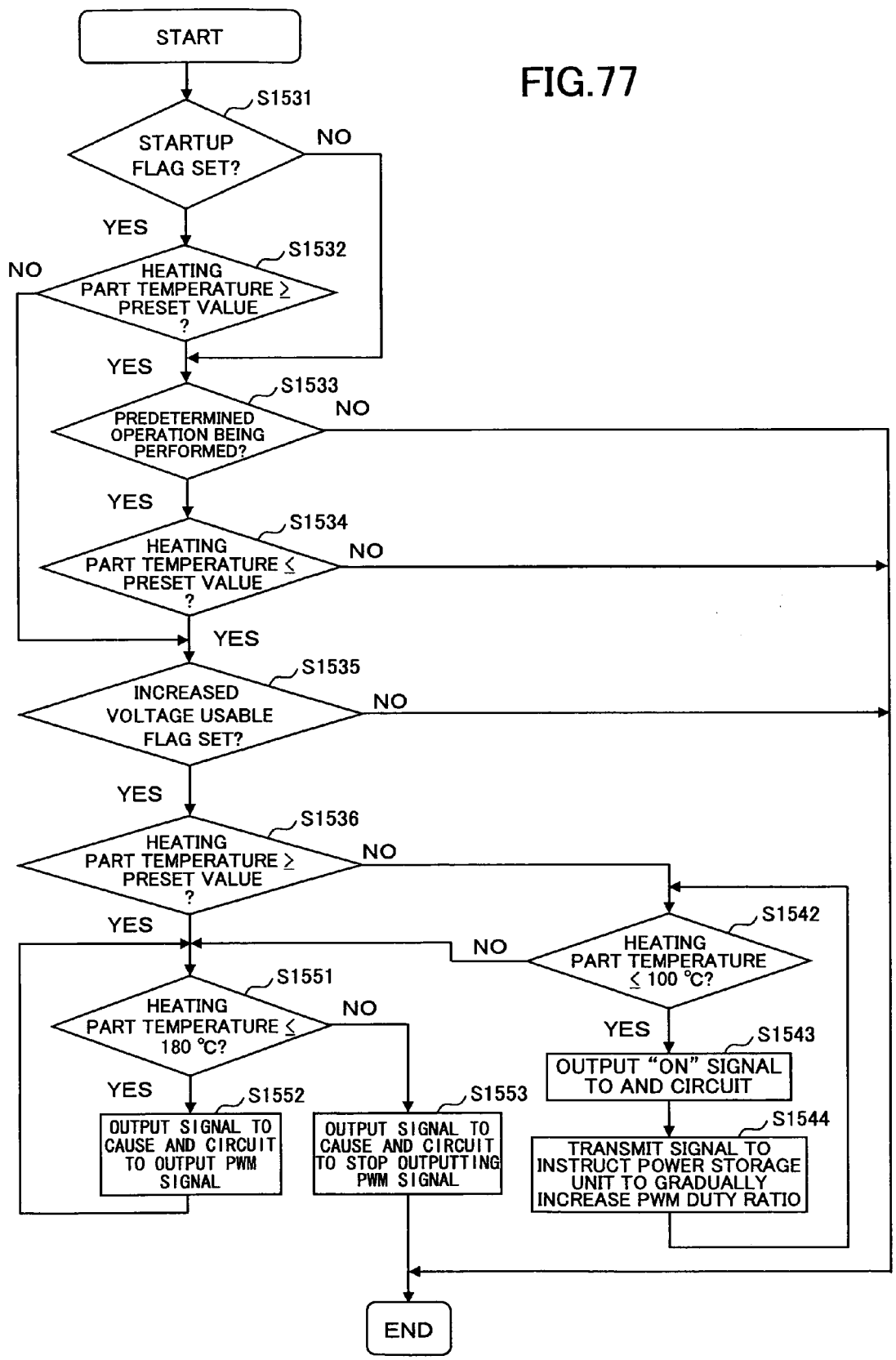
FIG. 77 is a flowchart of the external apparatus controlling the increased voltage by turning ON and OFF a PWM signal output from the power storage unit in accordance with the temperature of the heating part according to the 12th embodiment of the present invention.

FIG. 77 is a variation of the flowchart of FIG. 76. FIG. 77 shows a flowchart of the external apparatus controlling the increased voltage by turning ON and OFF the PWM signal output from the power storage unit in accordance with the temperature of the heating part. In FIG. 77, the power storage unit outputs a PWM signal of a constant duty ratio. Since steps S1531 through S1536 and steps S1542 through S1544 of FIG. 77 are equal to those of FIG. 76, a description thereof is omitted.

First, in step S1551, the external apparatus determines whether the temperature of the heating part is lower than or equal to a preset temperature (for example, 180° C.). If the temperature of the heating part is lower than or equal to the preset temperature (YES in step S1551), in step S1552, the external apparatus outputs an "ON" signal to the AND circuit 46 in order to output a PWM signal to the FET 30*a* of the switching circuit 30.

In step S1551, the external apparatus again determines whether the temperature of the heating part is lower than or equal to the preset temperature. If the temperature of the heating part is lower than or equal to the preset temperature (YES in step S1551), the external apparatus repeats the operation of step S1552.

If the temperature of the heating part is not lower than or equal to the preset temperature (NO in step S1551), there is no need to supply power from the boost part 80 to the output terminals 52*a* and 52*b*. Accordingly, in step S1553, the external apparatus outputs to the AND circuit 46 a signal to stop outputting of the PWM signal.

Figure 78:
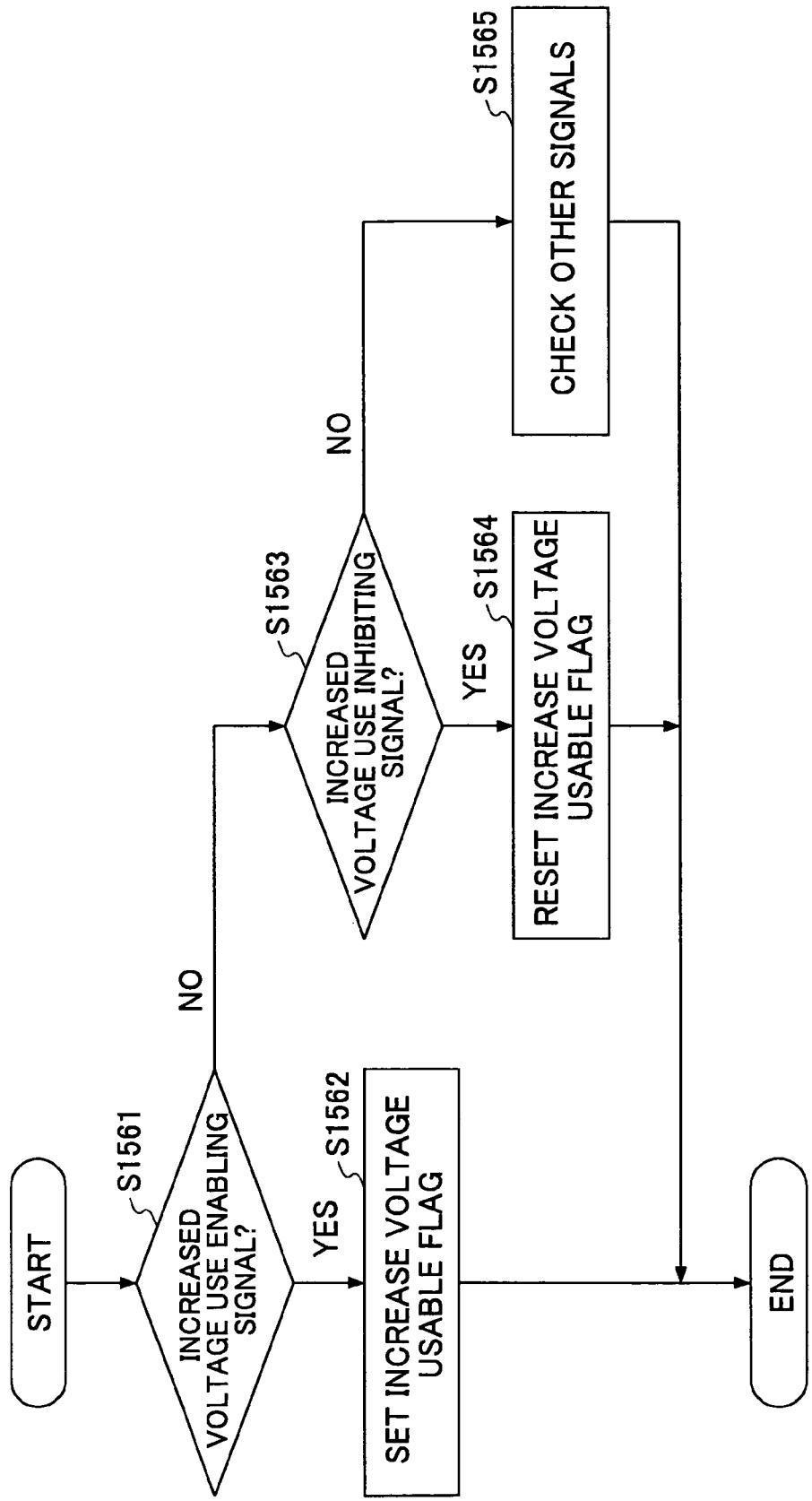
FIG. 78 is a flowchart of the control operation where the external apparatus checks a signal transmitted from the power storage unit according to the 12th embodiment of the present invention.

The external apparatus determines whether the power having its voltage increased by the power storage unit is usable based on the increased voltage use enabling signal. FIG. 78 is a flowchart of the control operation where the external apparatus checks a signal transmitted from the power storage unit.

In step S1561, the external apparatus determines whether the external apparatus has received an increased voltage use enabling signal from the power storage unit. If the external apparatus has received the increased voltage use enabling signal (YES in step S1561), in step S1562, the external apparatus sets an INCREASED VOLTAGE USABLE flag.

If the external apparatus has not received the increased voltage use enabling signal (NO in step S1561), in step S1563, the external apparatus determines whether the external apparatus has received an increased voltage use inhibiting signal. If the external apparatus has received the increased voltage use inhibiting signal (YES in step S1563), in step S1564, the external apparatus resets the INCREASED VOLTAGE USABLE flag. This flag is used to determine whether to supply power to the external apparatus.

If the external apparatus does not receive the increased voltage use inhibiting signal (NO in step S1563), in step S1565, the external apparatus determines whether the external apparatus has received another signal. The external apparatus sets a flag in accordance with the signal, and ends the operation.

Figure 79:
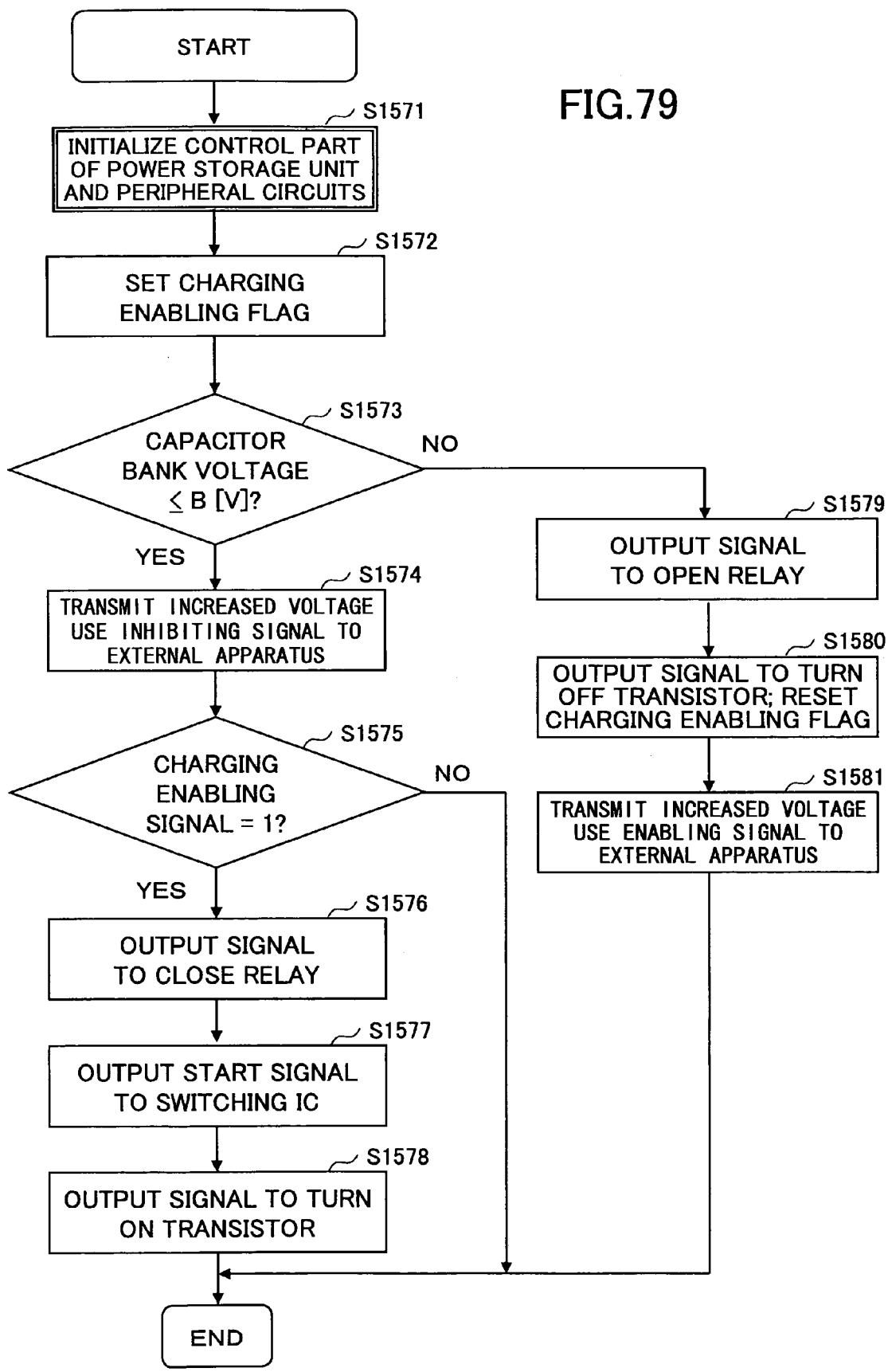
FIG. 79 is a flowchart of the operation where the power storage unit controls charging in accordance with charge voltage according to the 12th embodiment of the present invention.

Next, a description is given of controlling charging of the capacitor bank 9. FIG. 79 is a flowchart of the operation where the power storage unit controls charging in accordance with the charge voltage.

When the main power switch 11 is turned ON so that the constant current/constant power charge voltage generation circuit 7 receives power supplied from a regulated power supply 49 (FIG. 71), in step S1571, the constant current/constant power charge voltage generation circuit 7 initializes the control part of the power storage unit and its peripheral circuits. Since a predetermined operation is not ready to be performed immediately after power is turned ON, in step S1572, a charging enabling flag is set.

Next, in step S1573, it is determined based on the output of the charge voltage detection circuit 16 whether the charge voltage of the capacitor bank 9 is lower than or equal to a predetermined voltage value B [V]. If the charge voltage of the capacitor bank 9 is lower than or equal to B [V] (YES in step S1573), it is necessary to perform charging. Accordingly, in step S1574, the power storage unit transmits an increased voltage use inhibiting signal to the external apparatus.

Next, in step S1575, it is determined whether a charging enabling flag is set. If a charging enabling flag is not set (NO in step S1575), it is necessary to supply power to the external apparatus side. Accordingly, the control of FIG. 79 ends without performing a charging operation.

If the charge voltage of the capacitor bank 9 is not lower than or equal to preset B [V] (YES in step S1573), the capacitor bank 9 is in a charged state. Accordingly, in step S1579, a signal to open the relay 26a is output to the relay drive circuit 25. Thereby, the output of the power supply generation circuit 12 is switched to the external apparatus side. If the make-and-break circuit 26 is replaced by the switching circuit 37 of FIG. 72, a signal to close the relay 37a may be output to the relay drive circuit 25.

Next, in step S1580, the external apparatus outputs a signal to turn OFF the transistor Tr2 to the transistor Tr2. As a result, the power supply generation circuit 12 can perform a constant voltage operation. There is no need to perform charging if the charge voltage of the capacitor bank 9 is higher than B [V]. Accordingly, the charging enabling flag is reset. Then, in step S1581, the power storage unit transmits an increased voltage use enabling signal to the external apparatus, and the control of FIG. 79 ends.

Returning to step S1575, if a charging enabling signal is set (YES in step S1575), in step S1576, the external apparatus outputs a signal to close the relay 26a to the relay drive circuit 25.

Next, in step S1577, a start signal is output to the switching regulator IC 13 through the OR circuit 51. Further, in step S1578, a signal to turn ON the transistor Tr2 is output to the transistor Tr2, which connects the anode and the cathode of the photocoupler PC1 of the constant voltage detection circuit 21 that feeds back a voltage value in order for the power supply generation circuit 12 to output a constant voltage. The transistor Tr2 is turned ON to enable the feedback signal of the constant current/constant power charge voltage generation circuit 7.

By the above-described control, the capacitor bank 9 is charged. As described above, the constant current/constant power charge voltage generation circuit 7 detects the charge voltage and the charging current of the capacitor bank 9 and the operations of the bypass circuits, and performs constant current charging or constant power charging.

Figure 80:
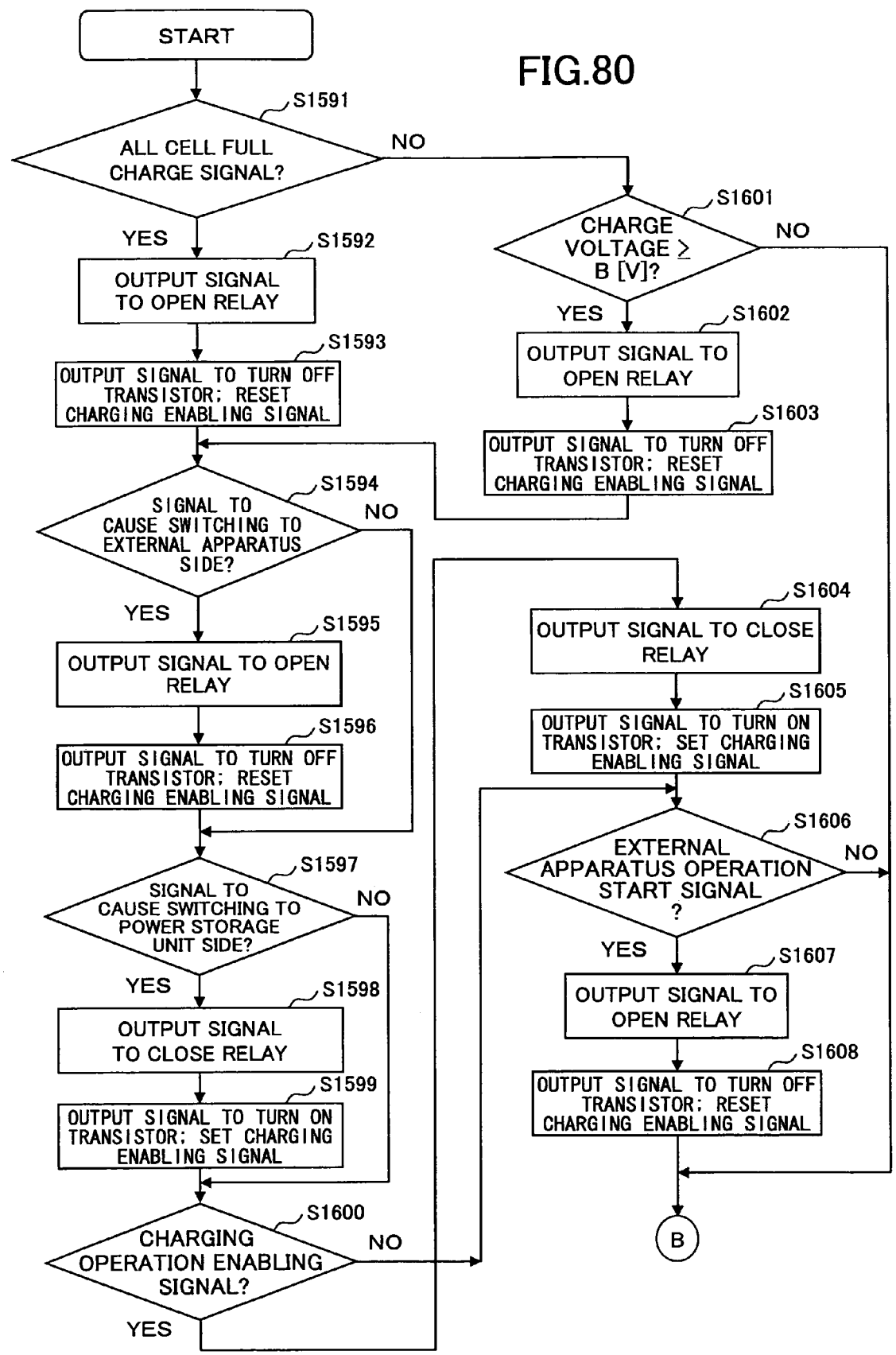
FIG. 80 is a flowchart showing checking of a signal transmitted from the external apparatus and controlling of the make-and-break circuit according to the 12th embodiment of the present invention.
Figure 81:
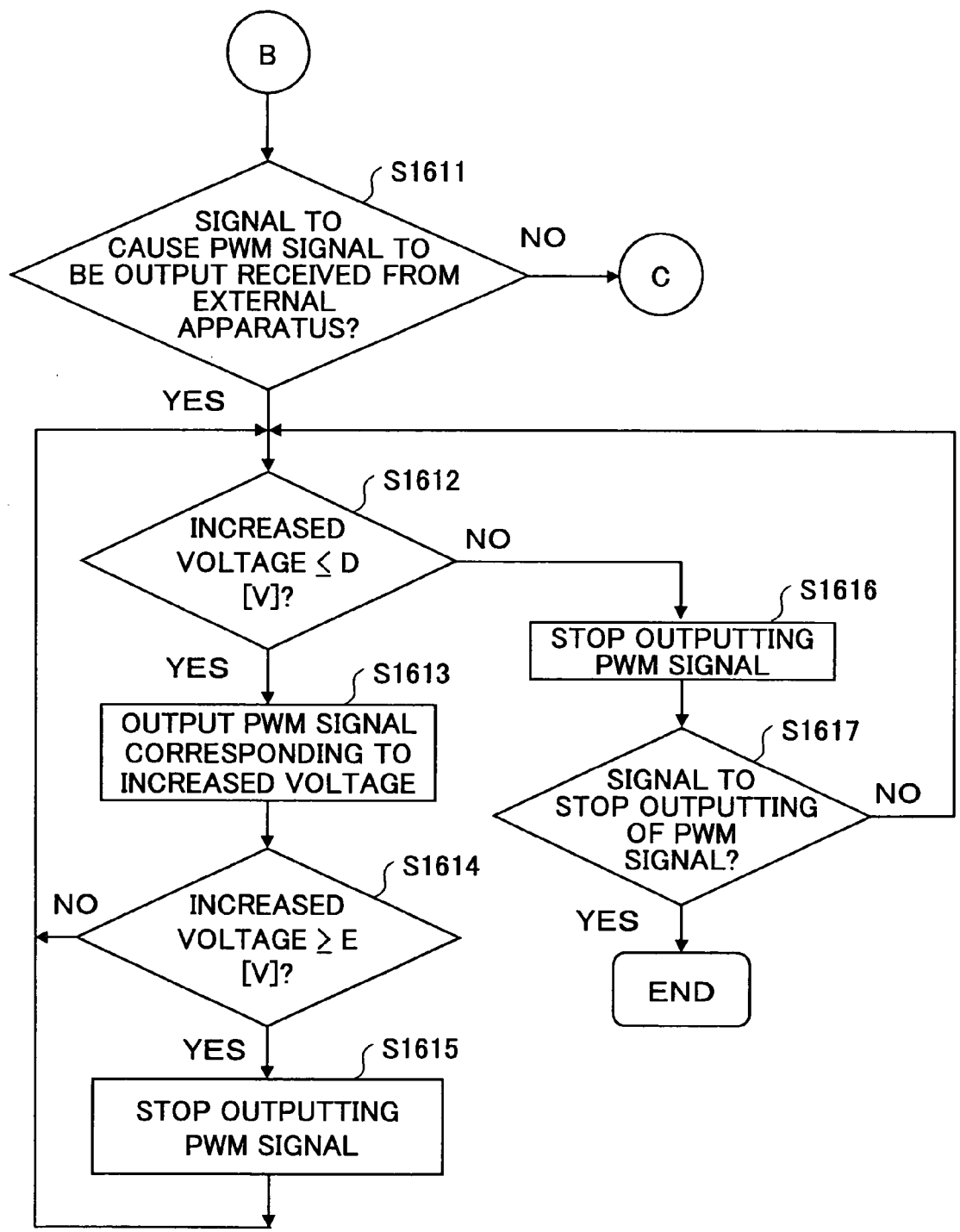
FIG. 81 is a flowchart showing the checking of a signal transmitted from the external apparatus and the controlling of the make-and-break circuit according to the 12th embodiment of the present invention.

Next, a description is given, with reference to the flowcharts of FIGS. 80 and 81, of checking a signal transmitted from the external apparatus and controlling the make-and-break circuit 26.

First, in step S1591, the external apparatus determines whether the all cell full charge signal 45 has been output from the capacitor bank 9. If the all cell full charge signal 45 has been output (YES in step S1591), the charging of the capacitor bank 9 is completed. Accordingly, in step S1592, the external apparatus transmits a signal to open the relay 26a to the relay drive circuit 25. As a result, the output of the power supply generation circuit 12 is switched to the external apparatus side.

Next, in step S1593, the power storage unit outputs a signal to turn OFF the transistor Tr2. This makes it possible for the power supply generation circuit 12 to perform a constant voltage operation. Further, since there is no need to perform charging, the power storage part resets a charging enabling flag.

If the all cell full charge signal 45 has not been detected (NO in step S1591), in step S1601, it is determined whether the charge voltage is higher than or equal to B [V]. If the charge voltage is higher than or equal to B [V] (YES in step S1601), the power storage unit outputs a signal to open the relay 26a to the relay drive circuit 25. Further, in step S1603, the power storage unit outputs a signal to turn OFF the transistor Tr2, and resets the charging enabling flag.

If the charge voltage is not higher than or equal to B [V] (NO in step S1601), the operation proceeds to step S1611 of FIG. 81.

Next, in step S1594, the power storage unit determines whether a switching signal has been received from the external apparatus. If a switching signal has been received (YES in step S1594), the power storage unit outputs a signal to open the relay 26a to the relay drive circuit 25. Thereby the output of the power supply generation circuit 12 is switched to the external apparatus side.

Next, in step S1596, the power storage unit outputs a signal to turn OFF the transistor Tr2. As a result, the power supply generation circuit 12 can perform a constant voltage operation. Since it is not possible to perform a charging operation, the power storage unit resets the charging enabling flag.

Next, in step S1597, the power storage unit determines whether the power storage unit has received a signal to cause switching to the power storage unit side from the external apparatus. If the switching signal has been received (YES in step S1597), in step S1598, the power storage unit outputs a signal to close the relay 26a. Then, in step S1599, the power storage unit outputs a signal to turn ON the transistor Tr2, and sets the charging enabling flag. As a result, the power supply generation circuit 12 can perform a charging operation.

Next, in step S1600, the power storage unit determines whether the power storage unit has received a charging operation enabling signal from the external apparatus. If the charging operation enabling signal has been received (YES in step S1600), in step S1604, the power storage unit outputs a signal to close the relay 26a to the relay drive circuit 25. In step S1605, the power storage unit outputs a signal to turn ON the transistor Tr2, and sets the charging enabling flag. As a result, the power supply generation circuit 12 can perform a charging operation.

Next, in step S1606, the power storage unit determines whether the power storage unit has received a signal that indicates the start of a predetermined operation from the external apparatus.

If the signal indicating the start of the predetermined operation has been received (YES in step S1606), in step S1607, the power storage unit outputs a signal to open the relay 26a to the relay drive circuit 25. As a result, the output of the power supply generation circuit 12 is switched to the external apparatus side.

Next, in step S1608, the power storage unit outputs a signal to turn OFF the transistor Tr2. As a result, the power supply generation circuit 12 can perform a constant voltage operation. Further, since it is not possible to perform a charging operation, in step S1608, the power storage unit resets the charging enabling flag.

Referring to FIG. 81, in step S1611, the power storage unit determines whether the power storage unit has received a signal to cause a PWM signal to be output (a signal instructing a voltage increasing operation to be started) from the external apparatus. If the signal to cause a PWM signal to be output has been received (YES in step S1611), in step S1612, the power storage unit reads the output of the increased voltage detection circuit 50, and determines whether the increased voltage is lower than or equal to preset D [V].

If the signal to cause a PWM signal to be output has not been received (NO in step S1611), the operation proceeds to the below-described operation of the flowchart of FIG. 83.

If the increased voltage is lower than or equal to preset D [V] (YES in step S1612), in step S1613, the power storage unit outputs a PWM signal corresponding to the increased voltage to the FET 30a of the switching circuit 30.

Next, in step S1614, the power storage unit determines whether the increased voltage is higher than or equal to E [V]. If the increased voltage is not higher than or equal to E [V] (NO in step S1614), in step S1612, the power storage unit again reads the output of the increased voltage detection circuit 50, and determines whether the increased voltage is lower than or equal to preset D [V]. Then, the power storage unit repeats the operation of step S1613.

If the increased voltage is higher than or equal to E [V] (YES in step S1614), in step S1615, the power storage unit stops outputting the PWM signal. Then, the power storage unit again detects the output, of the increased voltage detection circuit 50, and repeats the operations of steps S1612 through S1614.

If the increased voltage is not lower than or equal to preset D [V] (NO in step S1612), in step S1616, the power storage unit stops outputting the PWM signal. Then in step S1617, the power storage unit determines whether the power storage unit has received a signal to stop outputting of the PWM signal (a signal instructing the voltage increasing operation to be ended) from the external apparatus.

If the signal to stop outputting of the PWM signal has been received (YES in step S1617), this control flow ends. If the signal to stop outputting of the PWM signal has not been received (NO in step S1617), the power storage unit again detects the output of the increased voltage detection circuit 50. Then, in step S1612, the power storage unit determines whether the increased voltage is lower than or equal to D [V], and repeats the operation of step S1616.

Figure 82:
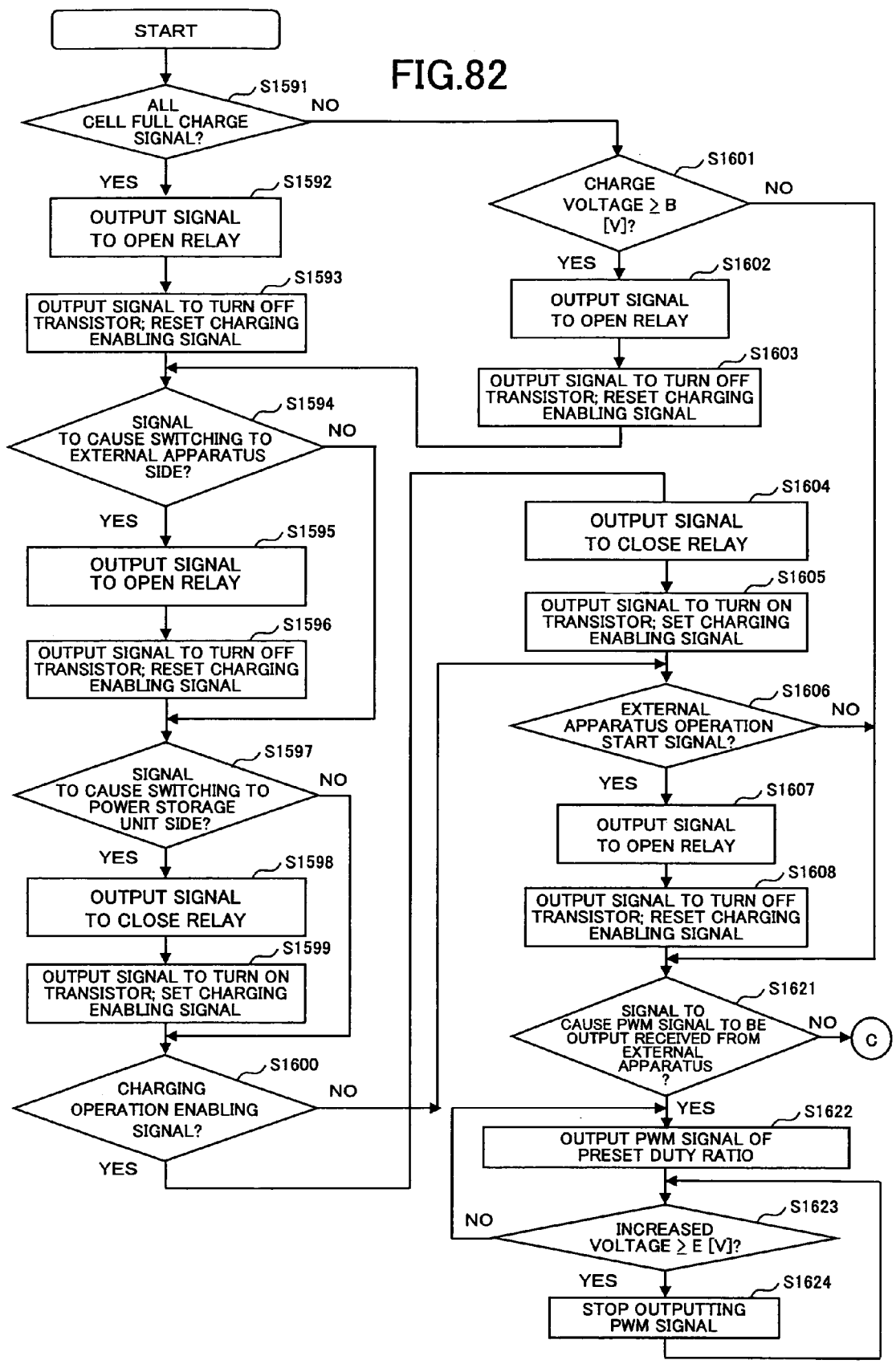
FIG. 82 is a flowchart of the control operation of outputting a PWM signal whose duty ratio for the increased voltage is constant according to the 12th embodiment of the present invention.

In FIGS. 80 and 81, a description is given of the flow of controlling the increased voltage to a constant voltage of D [V]. Next, a description is given, with reference to the flowchart of FIG. 82, of the control operation of outputting a PWM signal whose duty ratio is constant. In FIG. 82, the operations of steps S1591 through S1608 are the same as those of FIG. 80, and accordingly, a description thereof is omitted.

First, in step S1621, the power storage unit determines whether the power storage unit has received a signal to cause a PWM signal to be output (a signal instructing a voltage increasing operation to be started) from the external apparatus. If the signal has been received (YES in step S1621), in step S1622, the power storage unit outputs a PWM signal of a preset duty ratio to the FET 30a of the switching circuit 30.

If the signal to cause a PWM signal to be output has not been received (NO in step S1621), the operation proceeds to the below-described operation of the flowchart of FIG. 83.

Next, in step S1623, the power storage unit determines whether the increased voltage is higher than or equal to E [V]. If the increased voltage is not higher than or equal to E [V] (NO in step S1623), in step S1622, the power storage unit outputs a PWM signal of a preset duty ratio to the FET 30a of the switching circuit 30.

If the increased voltage is higher than or equal to E [V] (YES in step S1623), in step S1624, the power storage unit stops outputting the PWM signal, and in step S1623, again determines whether the increased voltage is higher than or equal to E [V].

If the increased voltage is not higher than or equal to E [V] (NO in step S1623), in step S1622, the power storage unit outputs a PWM signal of a preset duty ratio to the FET 30a of the switching circuit 30. Then, the power storage unit repeats the operations of steps S1623 and S1624.

Figure 83:
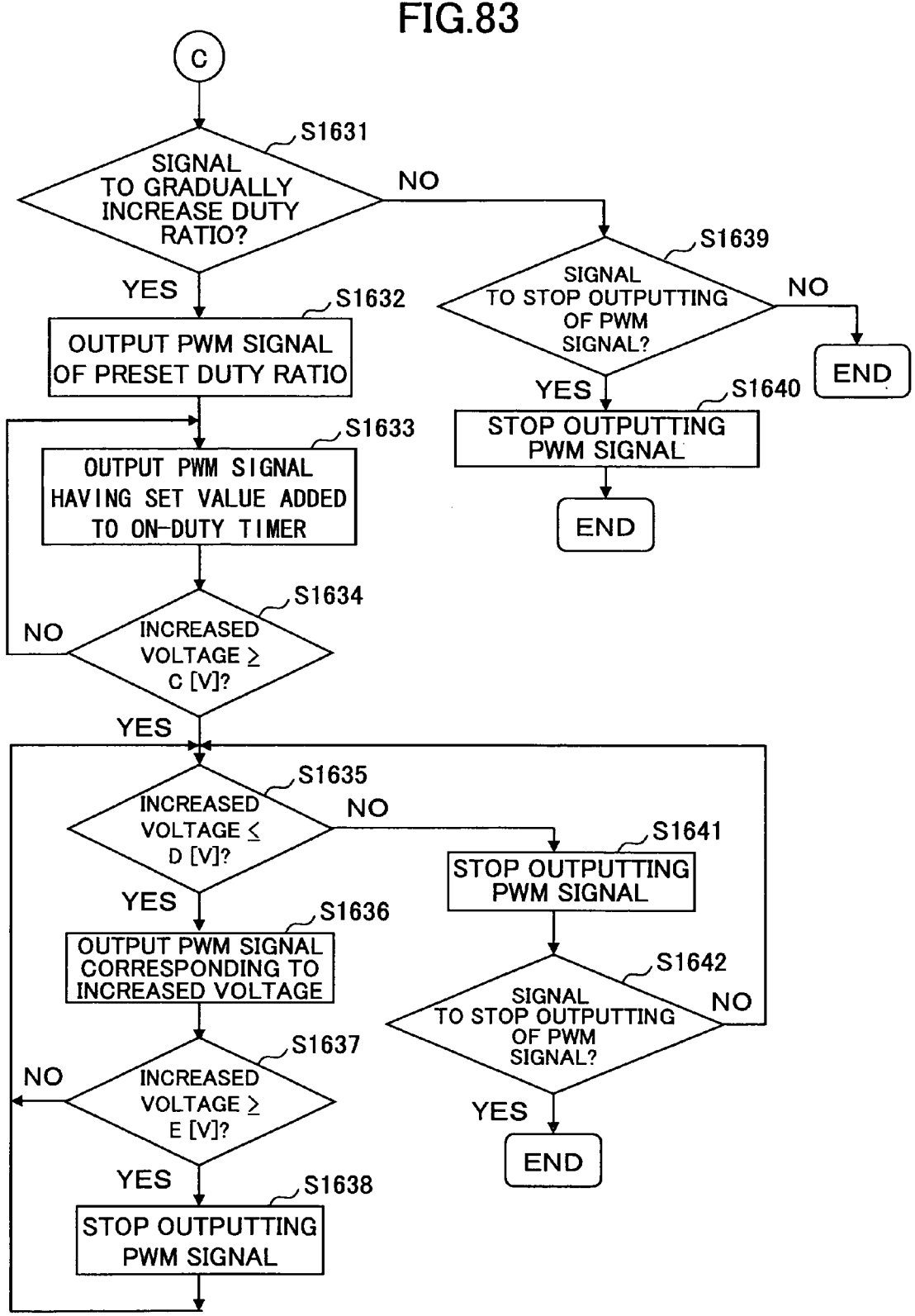
FIG. 83 is a flowchart of the control operation of reducing inrush current in the case of supplying power to the heating part of the external apparatus according to the 12th embodiment of the present invention.

Next, a description is given, with reference to the flowchart of FIG. 83, of the control operation of reducing inrush current in the case of supplying power to the heating part of the external apparatus.

In step S1631, the power storage unit determines whether the power storage unit has received a signal to gradually increase the duty ratio of the PWM signal (soft start) from the external apparatus. If the signal to gradually increase the duty ratio has not been received (NO in step S1631), in step S1639, the power storage unit determines whether a signal to stop outputting of the PWM signal (a signal instructing a voltage increasing operation to be ended). If the signal to stop outputting of the PWM signal has been received (YES in step S1639), in step S1640, the power storage unit stops outputting the PWM signal. If the signal to stop outputting of the PWM signal is not detected (NO in step S1639), the operation ends.

If the signal to gradually increase the duty ratio has been received (YES in step S1631), in step S1632, the power storage unit outputs a PWM signal of a preset duty ratio.

Next, in step S1633, the power storage unit outputs a PWM signal having a set value added to an ON-duty (duty ratio) timer.

Next, in step S1634, the power storage unit determines whether the output voltage of the increased voltage detection circuit 50 is higher than or equal to C [V]. If the output voltage of the increased voltage detection circuit 50 is not higher than or equal to C [V] (NO in step S1634), in step S1633, the power storage unit again outputs a PWM signal having a set value added to the ON-duty (duty ratio) timer.

If the output voltage of the increased voltage detection circuit 50 is higher than or equal to C [V] (YES in step S1634), in step S1635, the power storage unit obtains the output of the increased voltage detection circuit 50, and determines whether the increased voltage is lower than or equal to preset D [V].

If the increased voltage is lower than or equal to preset D [V] (YES in step S1635), in step S1636, the power storage unit outputs a PWM signal corresponding to the increased voltage to the FET 30a of the switching circuit 30.

Next, in step S1637, the power storage unit determines whether the increased voltage is higher than or equal to E [V]. If the increased voltage is not higher than or equal to E [V] (NO in step S1637), in step S1635, the power storage unit again obtains the output of the increased voltage detection circuit 50, and determines whether the increased voltage is lower than or equal to D [V]. If the increased voltage is lower than or equal to D [V], the power storage unit repeats the operations of steps S1636 and S1637.

If the increased voltage is higher than or equal to E [V] (YES in step S1637), in step S1638, the power storage unit stops outputting the PWM signal. Then, the power storage unit again obtains the output of the increased voltage detection circuit 50, and repeats the operations of steps S1635 through S1638.

If the increased voltage is not lower than or equal to D [V] (NO in step S1635), in step S1641, the power storage unit stops outputting the PWM signal. Then, in step S1642, the power storage unit determines whether the power storage unit has received a signal to stop outputting of the PWM signal (a signal instructing a voltage increasing operation to be ended) from the external apparatus.

If the signal to stop outputting of the PWM signal has been received (YES in step S1642), the operation of FIG. 83 ends. If the signal has not been received (NO in step S1642), in step S1635, the power storage unit again obtains the output of the increased voltage detection circuit 50, and determines whether the increased voltage is lower than or equal to D [V]. Thereafter, the power storage unit repeats the operations subsequent to step S1635.

Figure 84:
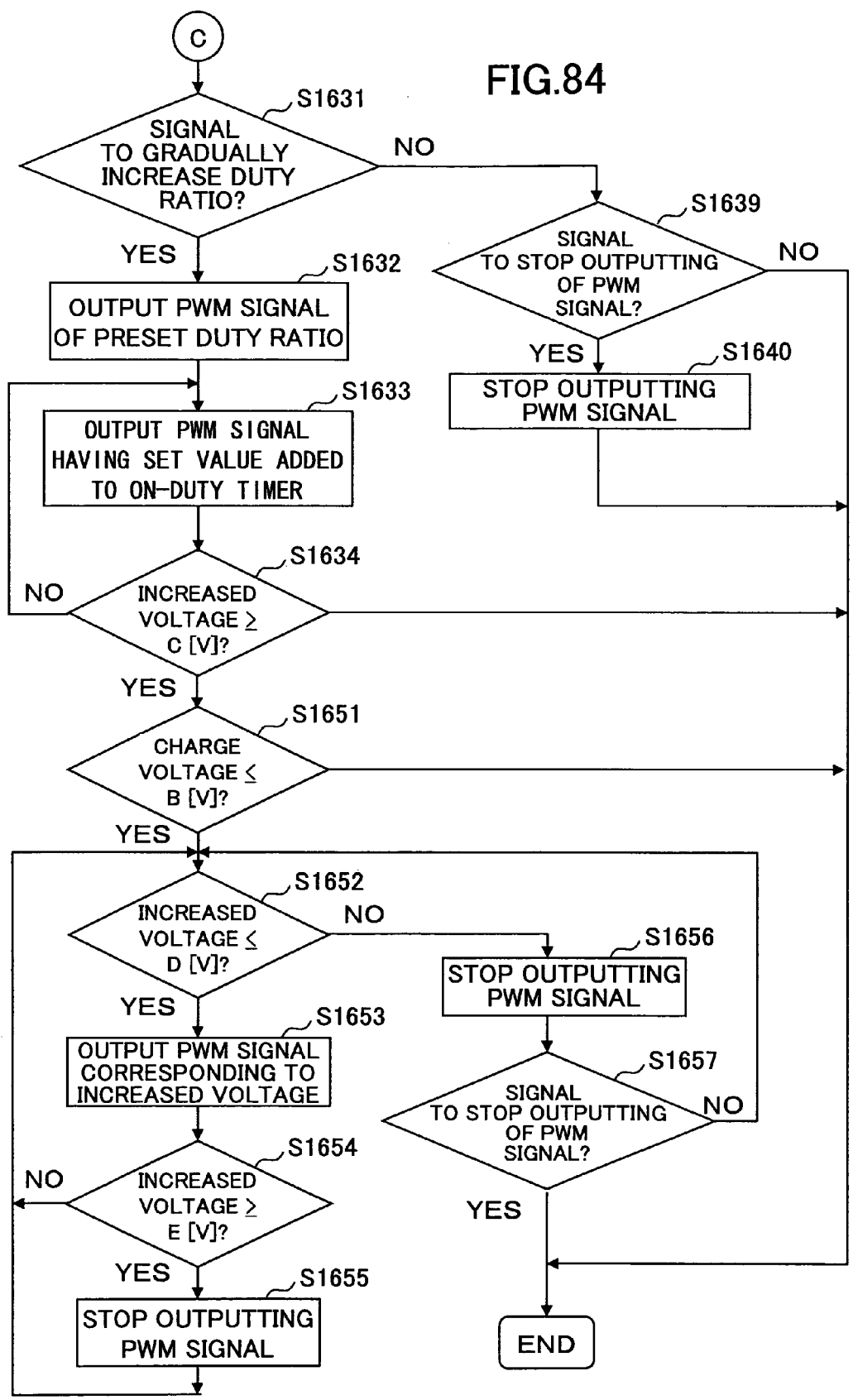
FIG. 84 is a flowchart of the control operation where a boost operation is performed after checking the charge voltage before increasing voltage according to the 12th embodiment of the present invention.

The charge voltage may be checked before control of voltage increasing. FIG. 84 is a flowchart of the control operation where a boost (voltage increasing) operation is performed after checking the charge voltage before increasing voltage. In FIG. 84, steps S1631 through S1634 and steps S1639 and S1640 are the same as those of FIG. 83, and accordingly, a description thereof is omitted.

In step S1651, the power storage unit determines whether the charge voltage is lower than or equal to B [V]. If the charge voltage is not lower than or equal to B [V] (NO in step S1651), there is no need for charging. Accordingly, the operation ends.

If the charge voltage is lower than or equal to B [V] (YES in step S1651), boost (voltage increasing) control is performed (steps S1652 through S1657). Steps S1652 through S1657 are the same as steps S1635 through S1642 of FIG. 83. Accordingly, a description thereof is omitted.

Figure 85:
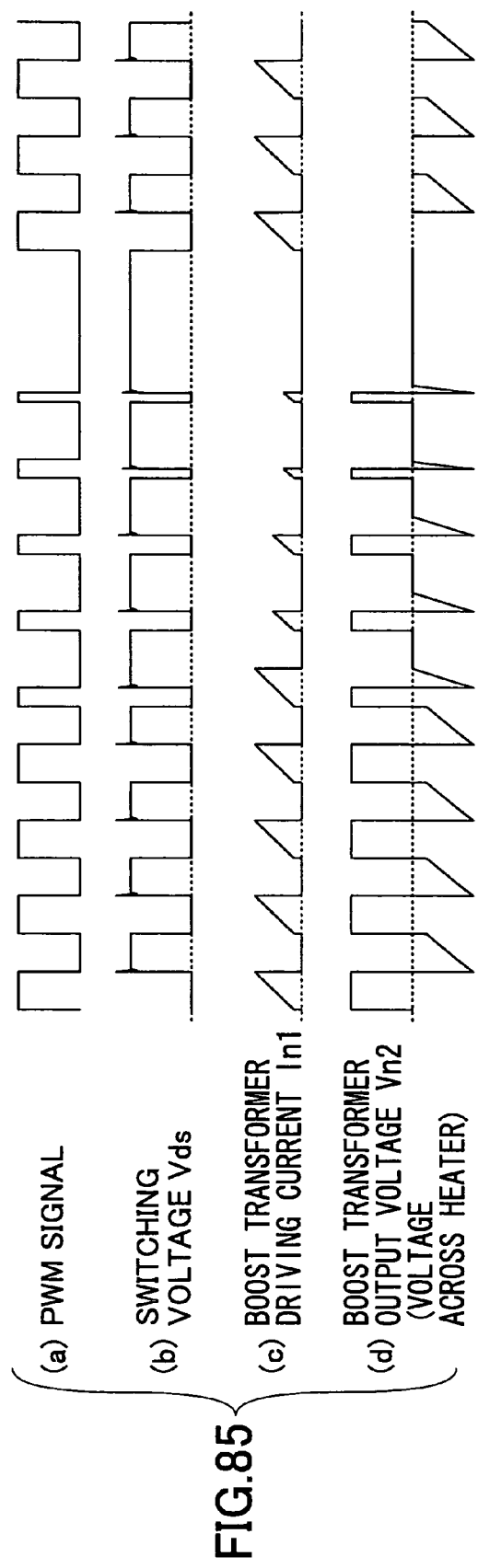
FIG. 85 is a timing chart showing the relationship among a PWM signal input to a switching circuit, an input to a primary coil of an isolation transformer, and the increased voltage of a secondary coil of the isolation transformer according to the 12th embodiment of the present invention.

FIG. 85 is a timing chart showing the relationship among the PWM signal input to the switching circuit 30, the input to the primary coil 800a of the isolation transformer 800, and the increased voltage of the secondary coil 800b of the isolation transformer 800. In FIG. 85, (a) indicates the PWM signal, (b) indicates the switching voltage, (c) indicates the driving current (boost transformer driving current) of the primary coil 800a, and (d) indicates the increased voltage of the secondary coil 800b (the voltage at the output terminals 52a and 52b). The increased voltage of the secondary coil 800b is controlled in accordance with the pulse width of the PWM signal. Accordingly, it is possible to supply controlled power to the external apparatus.

As described above, according to the power storage unit of this embodiment, a charge voltage can be increased and then be supplied to the external apparatus using the output of the power supply generation circuit 12 as power supply for the external apparatus when the external apparatus requires power and using the power supply generation circuit 12 as a charger at the time of a charging operation. By providing the power storage unit in an image forming apparatus, it is possible to provide an image forming apparatus offering a short waiting period and having a charging function that is less likely to degrade.

Further, when it is necessary to charge the capacitor bank 9 after increasing voltage to substantially the same level as the operating voltage of the main body load 20 and supply power to the DC fixing heater 22, the voltage is increased by the boost part 80. Accordingly, compared with the case of charging the capacitor bank 9 after increasing voltage to the level of voltage to be supplied to the DC fixing heater 22, it is possible to reduce the size of the capacitor bank 9 and to reduce time for charging the capacitor bank 9. Further, even if the temperature of the heating part is extremely lower than a preset temperature, it is possible to prevent inrush current by gradually increasing the duty ratio of the PWM signal.

Figure 86:
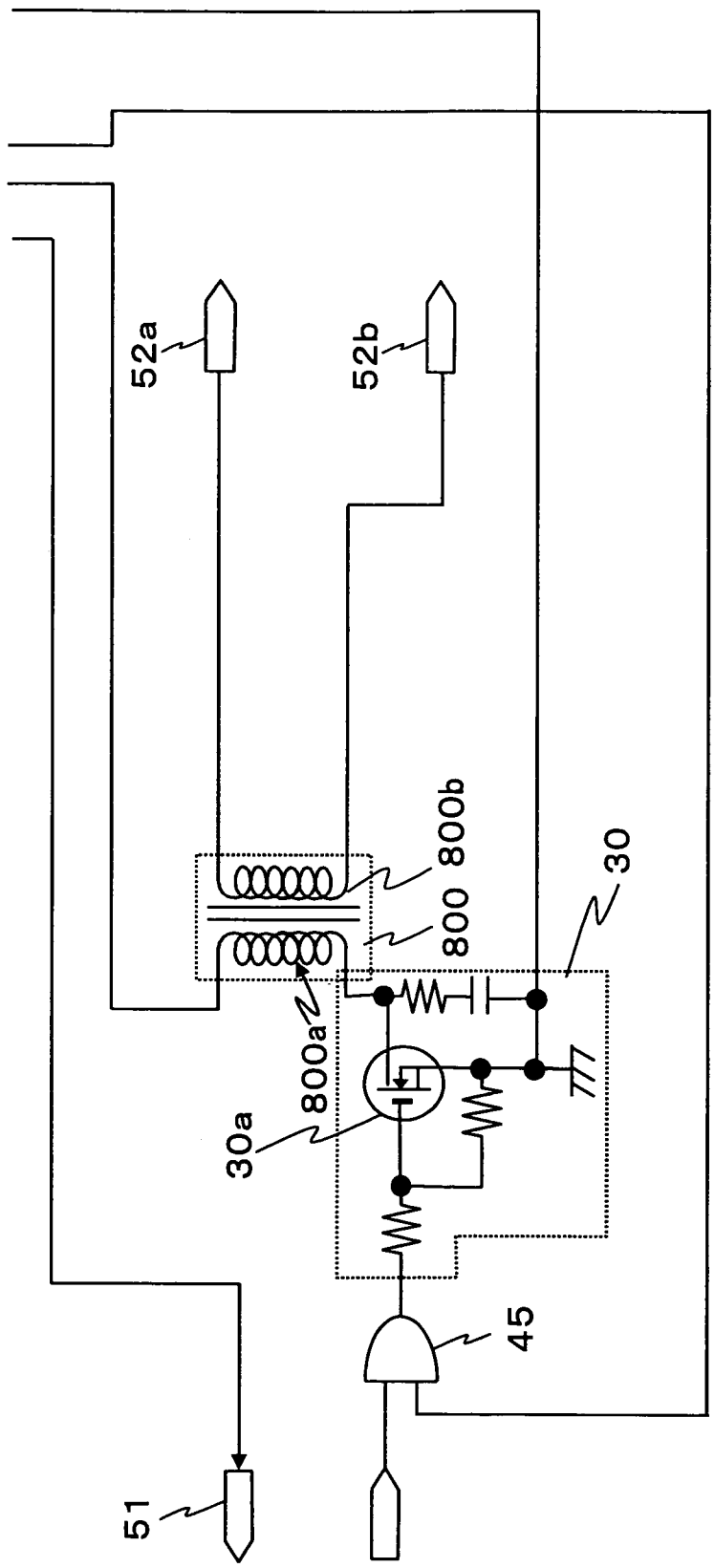
FIG. 86 is a circuit diagram showing the boost part of the power storage unit without the increased voltage detection circuit according to the 12th embodiment of the present invention.

According to this embodiment, the increased voltage detection circuit 50 provided in the boost part 80 detects the increased voltage in the case of performing boost control. However, the increased voltage detection circuit 50 may be omitted. FIG. 86 is a circuit diagram showing the boost part 80 of the power storage unit without the increased voltage detection circuit 50. Referring to FIG. 86, the output of the secondary coil 800b is supplied to the output terminals 52a and 52b. The detailed circuit diagram is the same as FIG. 71 except for the increased voltage detection circuit 50, and accordingly, a description thereof is omitted.

If the increased voltage detection circuit 50 is not provided, the power storage unit may perform boost control in accordance with the temperature of the heating part of the external apparatus or in accordance with a control signal fed from the external apparatus.

13$^{th}$ Embodiment

Figure 87:
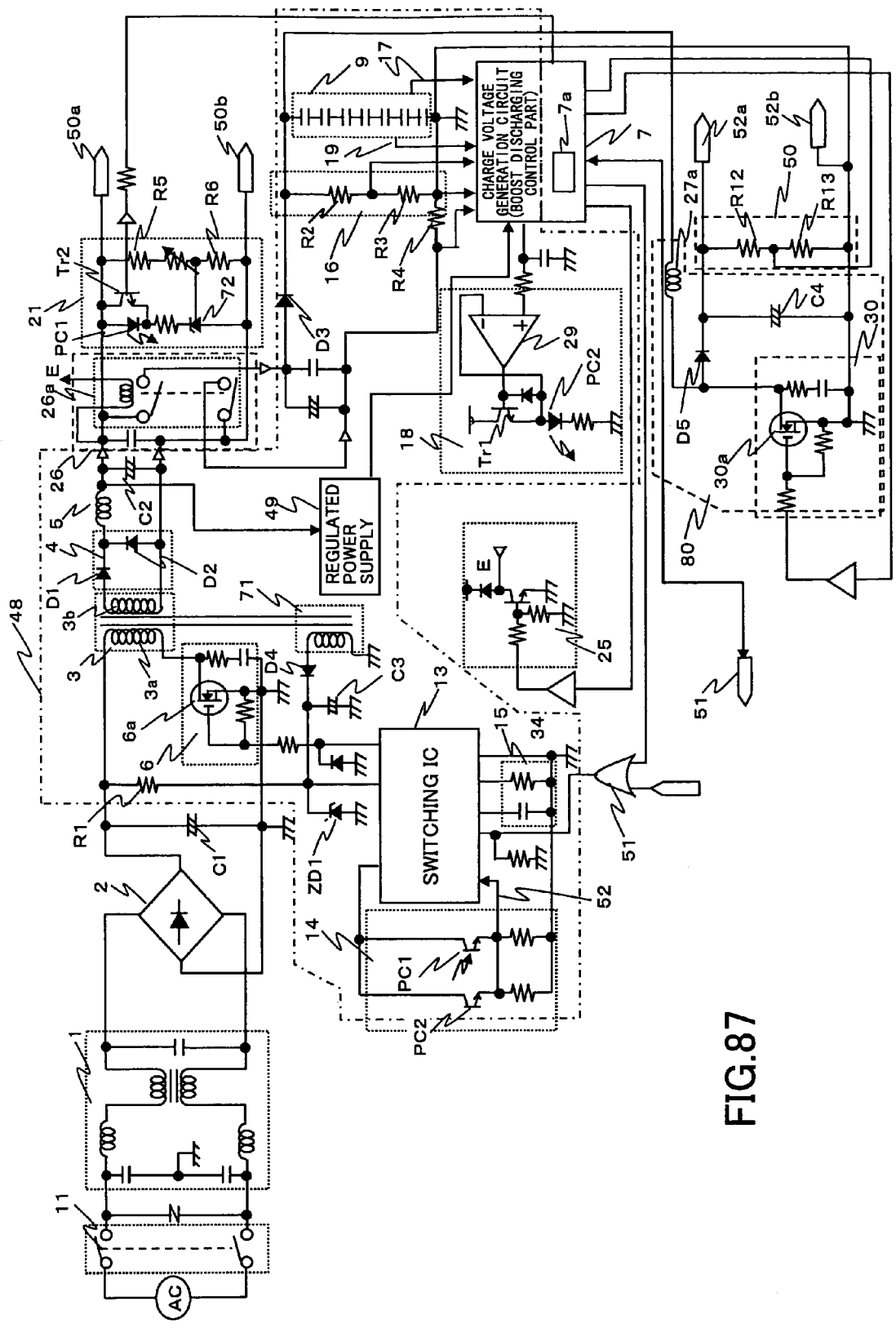
FIG. 87 is a circuit diagram showing a power storage unit according to a 13th embodiment of the present invention.

In the 12$^{th}$ embodiment, an isolation transformer is employed in the boost part 80. On the other hand, according to a 13$^{th}$ embodiment, a boost choke coil is employed in the boost part 80. FIG. 87 is a circuit diagram showing a power storage unit according to this embodiment. In FIG. 87, the same elements as those of FIG. 71 are referred to by the same reference numerals, and a description thereof is omitted.

The boost part 80 has the boost choke coil 27a on the side of the input from the capacitor bank 9. The output of the boost choke coil 27a and the output of the switching circuit 30 are connected via the rectification and smoothing circuit 75 and the increased voltage detection circuit 50 to the output terminals 52a and 52b to the external apparatus.

The FET 30a of the switching circuit 30, and the boost rectification diode D5 and the smoothing capacitor C4 of the rectification and smoothing circuit 75 are connected in parallel between the terminals of the capacitor bank 9.

Figure 88A:
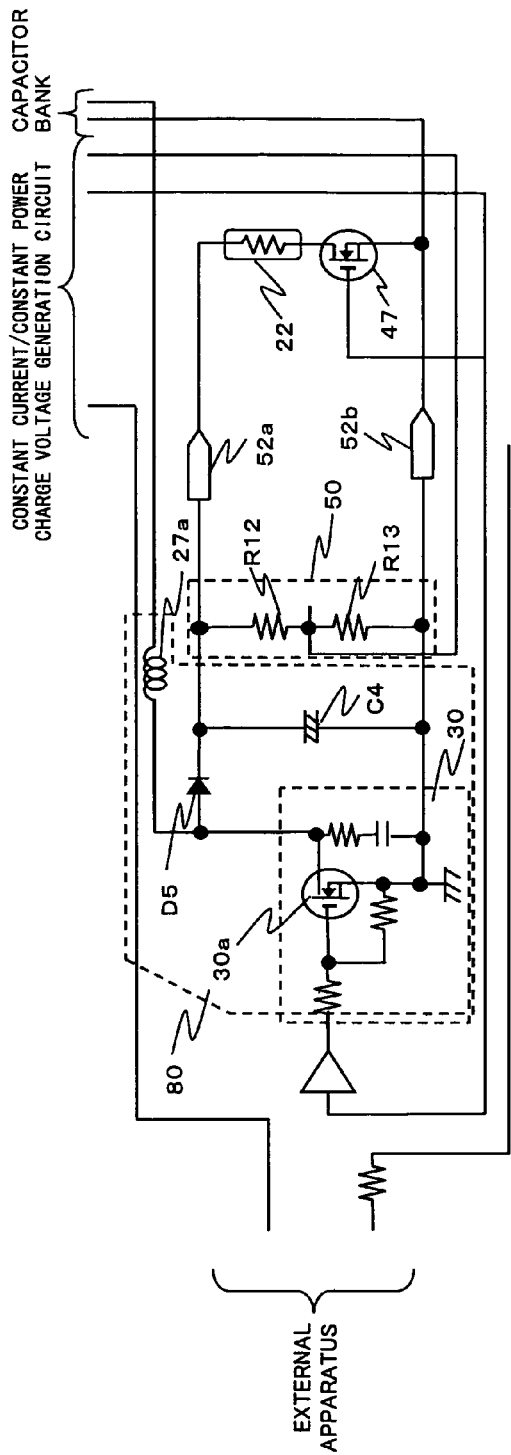
FIGS. 88A and 88B are diagrams showing configurations of the boost part connected to the external apparatus according to the 13th embodiment of the present invention.
Figure 88B:
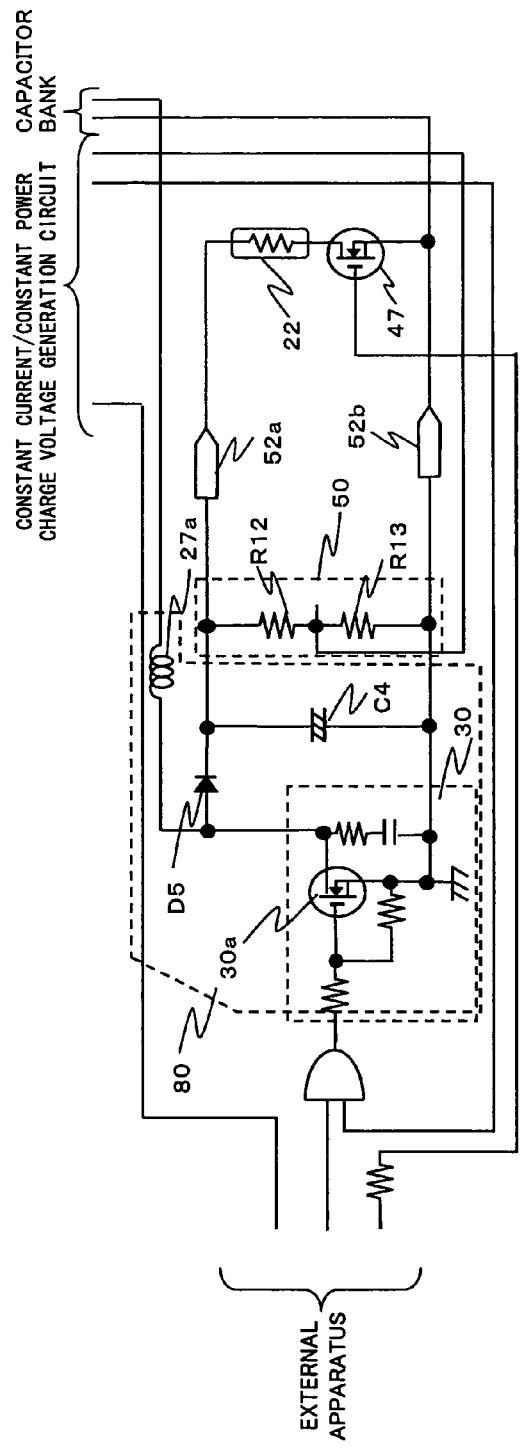

According to the configuration of FIG. 87, the capacitor bank 9 may discharge through the output terminals 52a and 52b. Accordingly, it is preferable to provide a switch device in the external apparatus. FIGS. 88A and 88B are diagrams showing configurations of the boost part 80 connected to the external apparatus.

Referring to FIGS. 88A and 88B, the FET 47 is provided on the output side of the DC fixing heater 22 (external apparatus). The control part of the external apparatus is connected to the gate of the FET 47.

Further, according to FIGS. 88A and 88B, the increased voltage is detected using resistors. Alternatively, the increased voltage may be detected using a photocoupler (photocoupler PC3) as in the increased voltage detection circuit 50 of FIG. 71.

When the constant current/constant power charge voltage generation circuit 7 outputs a PWM signal to the FET 30a, the voltage stored in the capacitor bank 9 causes a current to flow through the boost choke coil 27a so that energy is stored therein. When the FET 30a is turned OFF, the energy stored in the boost choke coil 27a during the ON period is output, being superposed on an input voltage. This current is stored in the smoothing capacitor C4 through the boost rectification diode D5. The voltage is increased by repeating this operation, so that an increased, smoothed voltage is supplied to the DC fixing heater 22 (external apparatus).

A voltage to be increased and smoothed (increased voltage) is determined by the voltage stored in the capacitor bank (input voltage) and the ON/OFF duty ratio (the ratio of the ON period to the sum of the ON period and OFF period) of the PWM signal. Further, the increased voltage is fed back to the constant current/constant power charge voltage generation circuit 7 by the increased voltage detection circuit 50 having resistors R13 and R14 connected in series. The increased, smoothed voltage is controlled by the constant current/constant power charge voltage generation circuit 7 changing the duty ratio of the PWM signal by monitoring the voltage of the increased voltage detection circuit 50.

Next, a description is given, with reference to flowcharts, of specific operations according to this embodiment. In this embodiment, the circuit diagram of FIG. 88A is used unless otherwise noted.

Figure 89:
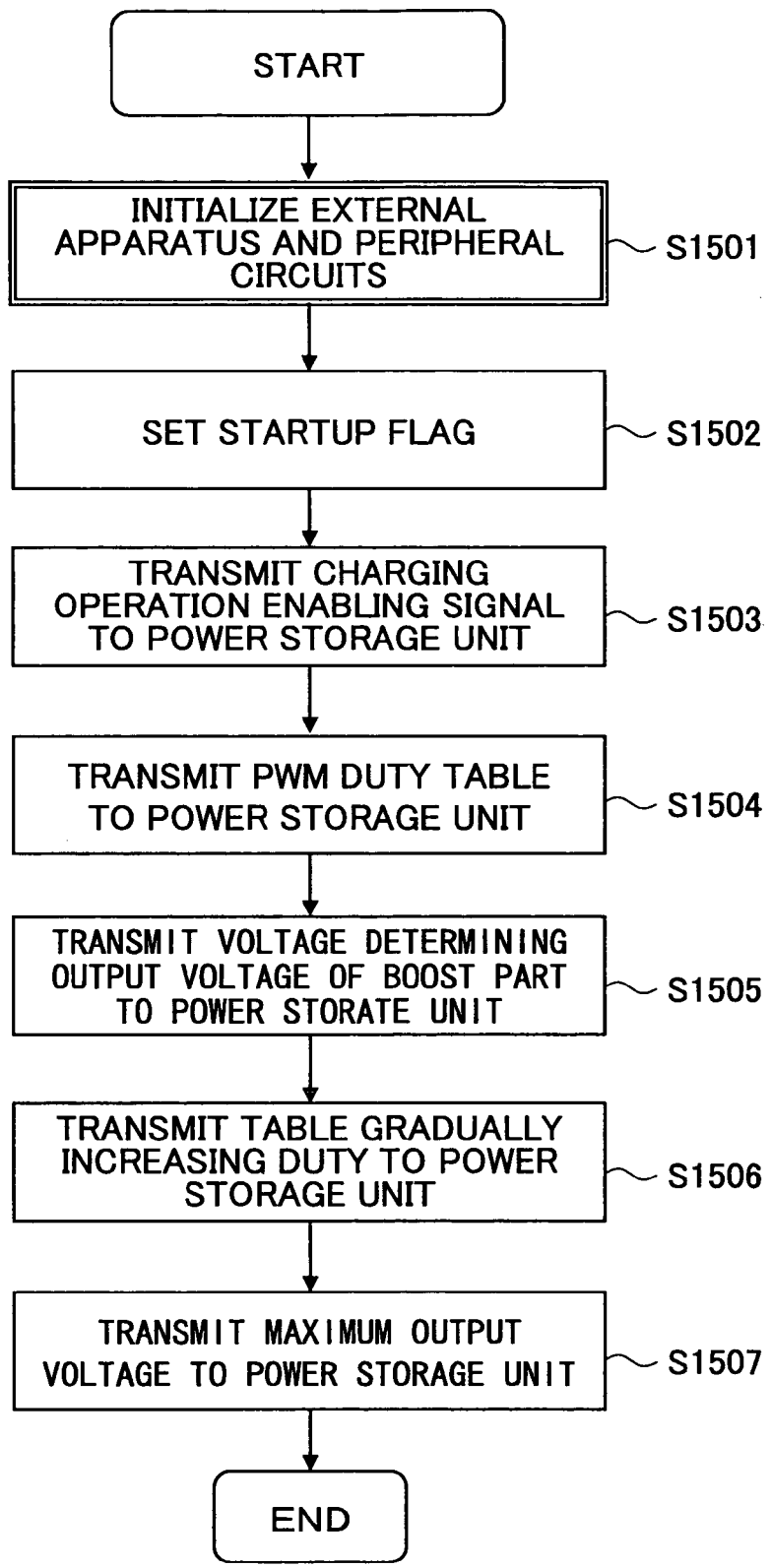
FIG. 89 is a flowchart of the control operation in which the external apparatus outputs control information necessary for a boost operation to the power storage unit when the main power of the external apparatus is ON or at the time of canceling the energy saving mode according to the 13th embodiment of the present invention.

FIG. 89 is a flowchart of the control operation in which an external apparatus outputs control information necessary for a boost (voltage increasing) operation to the power storage unit when the main power of the external apparatus is ON or when the power consumption of the external apparatus increases for operations (hereinafter referred to as cancellation of the energy saving mode). The external apparatus is, for example, an image forming apparatus. Since the contents of the control of FIG. 89 are the same as those of FIG. 73, a description thereof is omitted. By the operation of FIG. 89, the power storage unit can obtain control information necessary for a boost operation.

Figure 90:
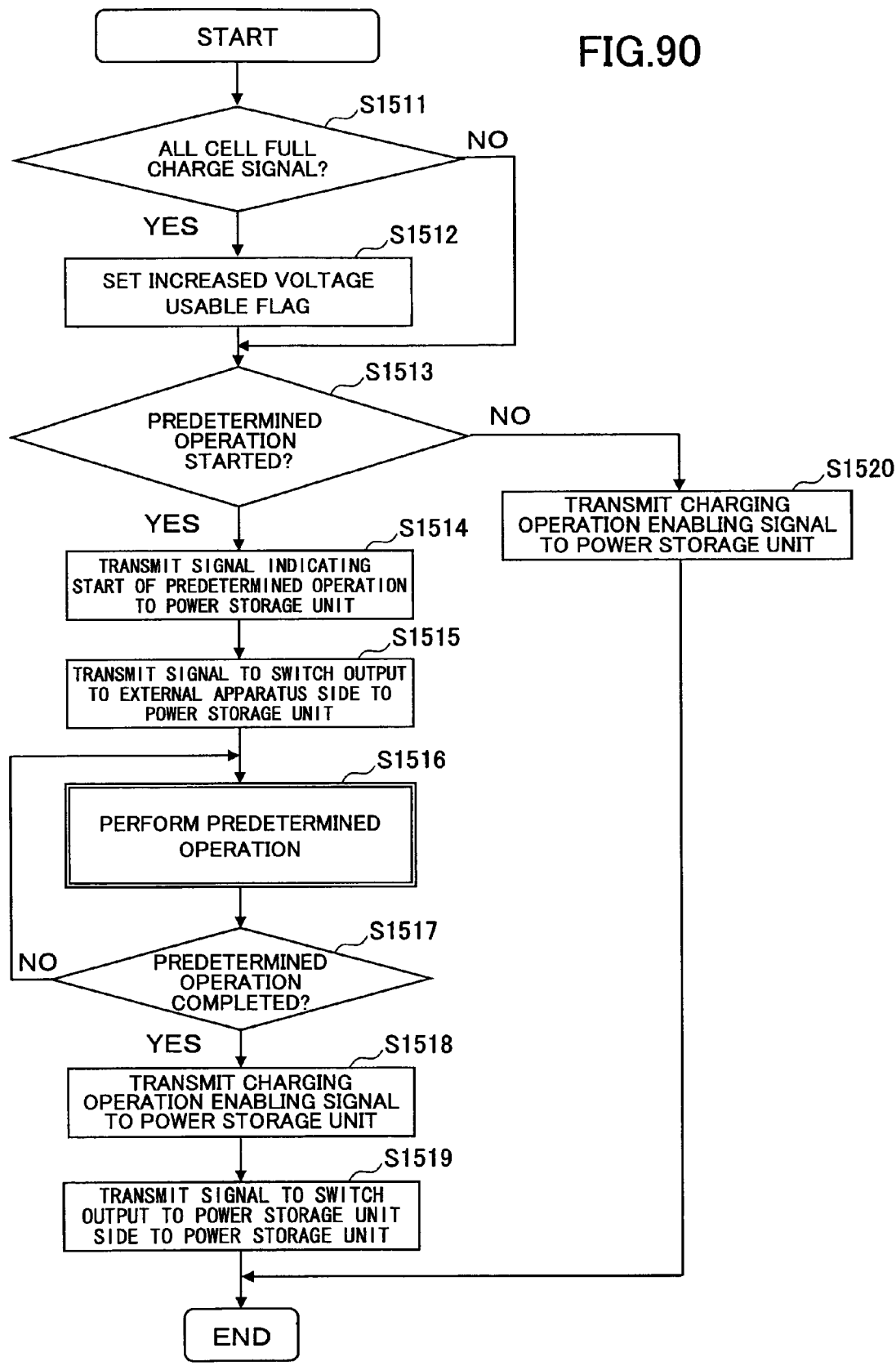
FIG. 90 is a flowchart of the control operation of giving instructions for control of the opening and closing of the make-and-break circuit of the power storage unit and for the charging operation of the power storage unit in accordance with the operation mode of the external apparatus according to the 13th embodiment of the present invention.

FIG. 90 is a flowchart of the control operation of giving instructions for control of the opening and closing of the make-and-break circuit 26 of the power storage unit and for the charging operation of the power storage unit in accordance with the operation mode of the external apparatus. Since the contents of the control of FIG. 90 are the same as those of FIG. 74, a description thereof is omitted. By the operation of FIG. 90, it is possible to control the opening and closing of the make-and-break circuit 26 in accordance with the operation mode of the external apparatus. The make-and-break circuit 26 may be replaced by the switching circuit 37 the same as in the 12$^{th}$ embodiment.

Figure 91:
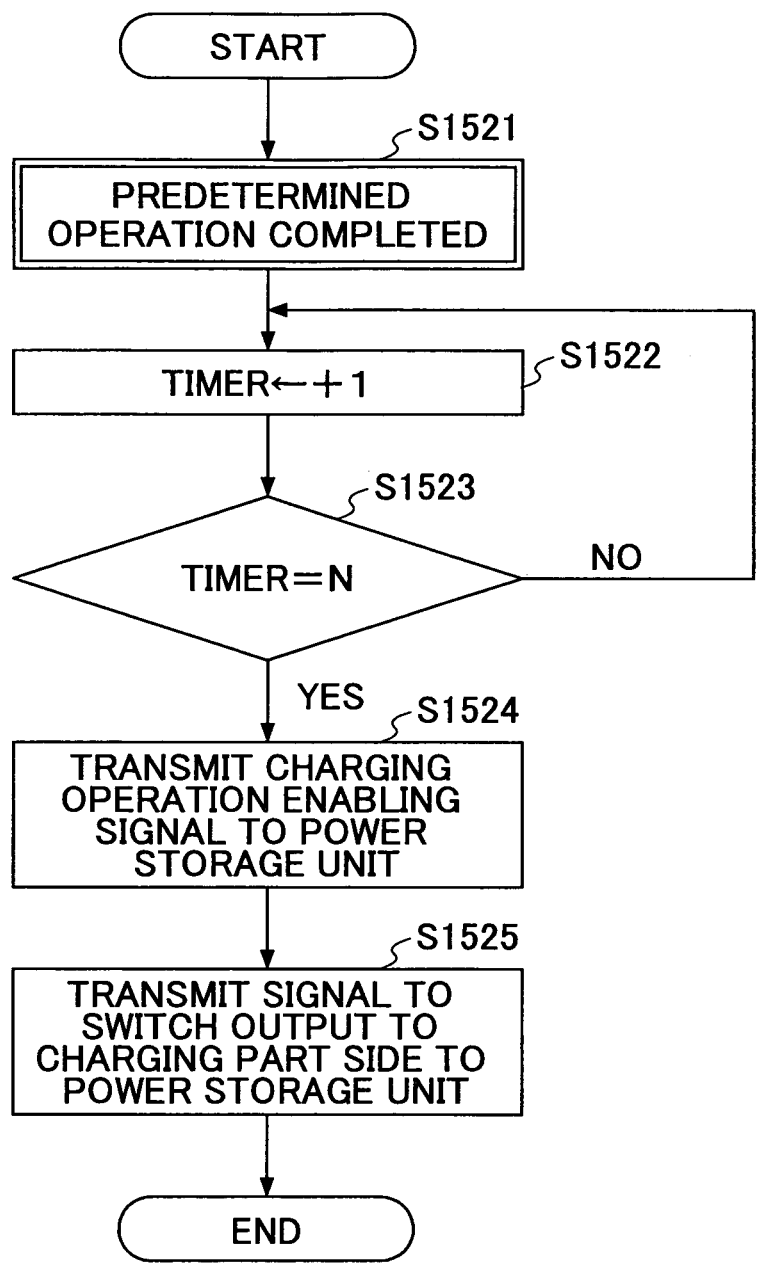
FIG. 91 is a flowchart of the external apparatus in the case where the external apparatus enters the energy saving mode according to the 13th embodiment of the present invention.

The external apparatus enters an energy saving mode after passage of a certain period of time since the end of the predetermined operation. Accordingly, a description is given next, with reference to FIG. 91, of the control operation in which the external apparatus enters an energy saving mode. FIG. 91 is a flowchart of the external apparatus in the case where the external apparatus enters an energy saving mode. Since the contents of the control of FIG. 91 are the same as those of FIG. 75, a description thereof is omitted.

Figure 92:
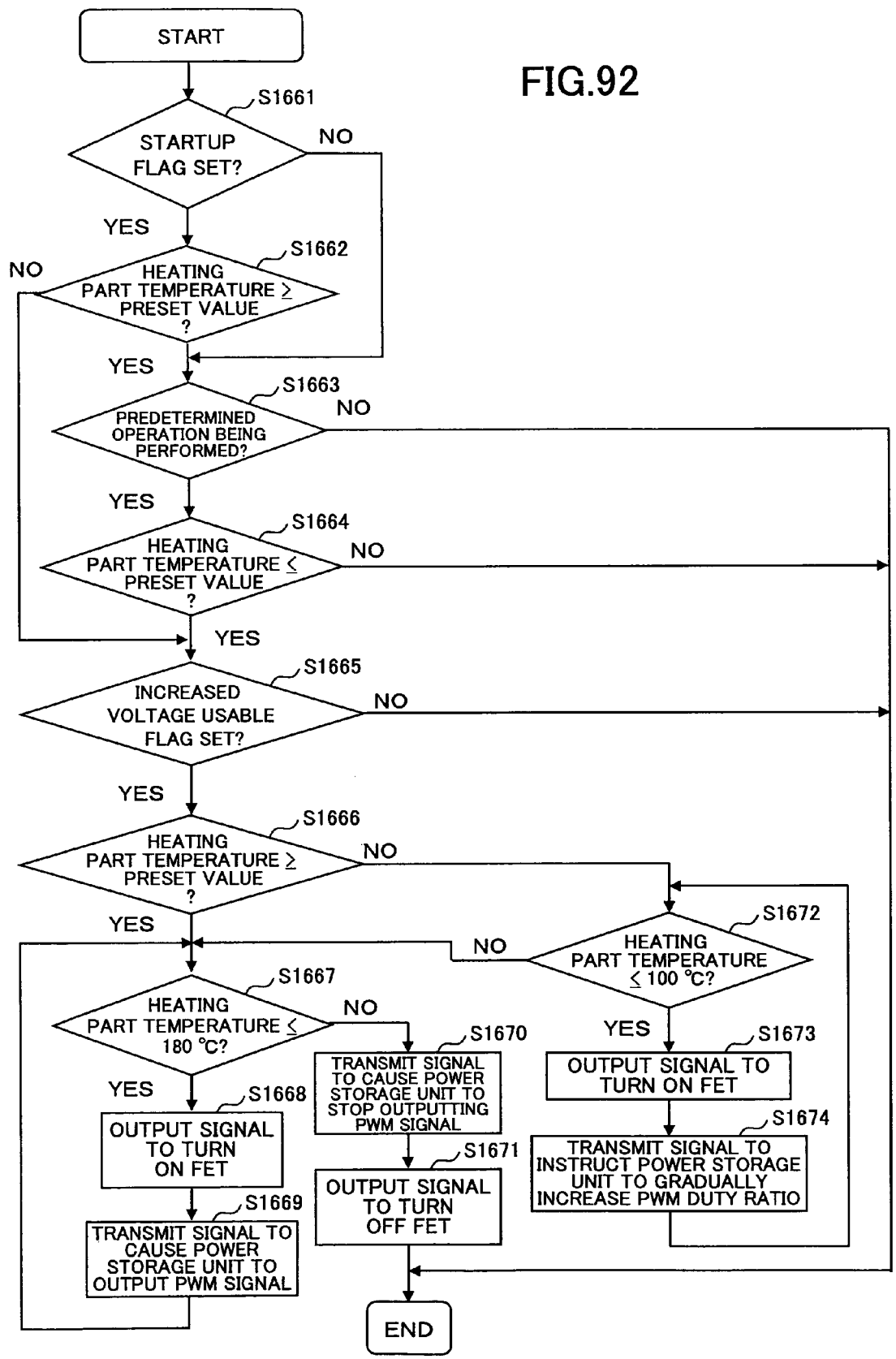
FIG. 92 is a flowchart of the operation where the external apparatus controls the temperature of its heating part using the power stored in the power storage unit according to the 13th embodiment of the present invention.

Next, a description is given, with reference to the flowchart of FIG. 92, of the operation where the external apparatus controls the temperature of its heating part using the power stored in the power storage unit.

First, in step S1661, the external apparatus determines whether a startup flag that is set when the main power switch 11 is turned ON or the energy saving mode is canceled is set.

When the startup flag is set (YES in step S1661), in step S1662, the external apparatus detects the temperature of the heating part, and determines whether the temperature of the heating part is higher than or equal to a preset temperature (for example, 130° C.).

If the temperature of the heating part is higher than or equal to the preset temperature (YES in step S1662), in step S1663, the external apparatus determines whether the external apparatus is performing a predetermined operation. If the external apparatus is not performing the predetermined operation (NO in step S1663), there is no need to supply power from the boost part 80 to the output terminals 52a and 52b connected to the heater of the heating part. Accordingly, the control ends.

If the external apparatus is performing the predetermined operation (YES in step S1663), in step S1664, the external apparatus determines whether the temperature of the heating part is lower than or equal to a preset temperature. If there is no drop in the temperature of the heating part and the temperature of the heating part is not lower than or equal to the preset temperature (NO in step S1664), there is no need to supply power from the boost part 80 to the output terminals 52a and 52b. Accordingly, the control ends.

If the temperature of the heating part is lower than or equal to the preset temperature (for example, 155° C.) (YES in step S1664), there may be a problem in the predetermined operation. Accordingly, in step S1665, the external apparatus determines whether an INCREASED VOLTAGE USABLE flag is set.

The INCREASED VOLTAGE USABLE flag is set by the all cell full charge signal 45 from the power storage unit or an increased voltage use enabling signal.

If the INCREASED VOLTAGE USABLE flag is not set (NO in step S1665), the charge voltage of the charging part is insufficient so that power cannot be supplied to the external apparatus. Accordingly, the control ends.

If the INCREASED VOLTAGE USABLE flag is set (YES in step S1665), in step S1666, the external apparatus determines whether the temperature of the heating part is higher than or equal to a preset temperature (for example, 20° C.).

If the temperature of the heating part is higher than or equal to the preset temperature (YES in step S1666), in step S1667, the external apparatus determines whether the temperature of the heating part is lower than or equal to a preset temperature (for example, 180° C.). If the temperature of the heating part is lower than or equal to the preset temperature (YES in step S1667), in step S1668, the external apparatus outputs a signal to turn ON the FET 47 in order to supply power to the external apparatus.

Next, in step S1669, the external apparatus transmits to the power storage unit a signal to cause a PWM signal to be output. This signal causes the power storage unit to output a preset PWM signal to the FET 30a of the boost switching circuit 30.

Next, in step S1667, the external apparatus again determines whether the temperature of the heating part is lower than or equal to the preset temperature. If the temperature of the heating part is lower than or equal to the preset temperature (YES in step S1667), in step S1668, the external apparatus again outputs a signal to turn ON the FET 47 in order to supply power to the external apparatus. Next, in step S1669, the external apparatus transmits to the power storage unit a signal to cause a PWM signal to be output (a signal instructing a voltage increasing operation to be started). Thereafter, in step S1667, the external apparatus again determines whether the temperature of the heating part is lower than or equal to the preset temperature, and repeats the operations of steps S1667 through S1669.

If the temperature of the heating part is not lower than or equal to the preset temperature (NO in step S1667), there is no need to supply power from the boost part 80 to the output terminals 52a and 52b. Accordingly, in step S1670, the external apparatus transmits to the power storage unit a signal to stop outputting of the PWM signal (a signal instructing the voltage increasing operation to be ended). Further, in step S1671, the external apparatus outputs a signal to turn OFF the FET 47, and the control ends.

Control of power supply to the external apparatus is performed at a startup time or when there is a temperature drop in the heating part. Accordingly, once the temperature of the heating part returns to a predetermined temperature, the power supply to the external apparatus is stopped.

In step S1666, if the temperature of the heating part is not higher than or equal to the preset temperature (NO in step S1666), which corresponds to the case where the heating part has an extremely low temperature, the operation of gradually increasing the duty ratio of the PWM signal (soft start) is performed in order to reduce inrush current.

First, in step S1672, the external apparatus determines whether the temperature of the heating part is lower than or equal to a preset temperature, for example, 100° C. If the temperature of the heating part is lower than or equal to 100° C. (YES in step S1672), in step S1673, the external apparatus outputs a signal to turn ON the FET 47. Next, in step S1674, the external apparatus transmits to the power storage unit a signal to instruct the power storage unit to output a PWM signal whose duty ratio is gradually increased (soft start).

Next, in step S1672, the external apparatus again determines whether the temperature of the heating part is lower than or equal to the preset temperature. If the temperature of the heating part is lower than or equal to the preset temperature (YES in step S1672), the external apparatus repeats the operations of steps S1673 and S1674. Thereby, the temperature of the external apparatus is controlled.

If the temperature of the heating part is not lower than or equal to the preset temperature (NO in step S1672), the external apparatus performs the above-described control of steps S1667 through S1671, thereby supplying power to the external apparatus.

Further, in the description of FIG. 92, the same power supply control is performed at a startup time and at the time of a temperature drop. Alternatively, the power supply control may be performed with different target temperatures of the heating part at a startup time and at the time of a temperature drop.

Figure 93:
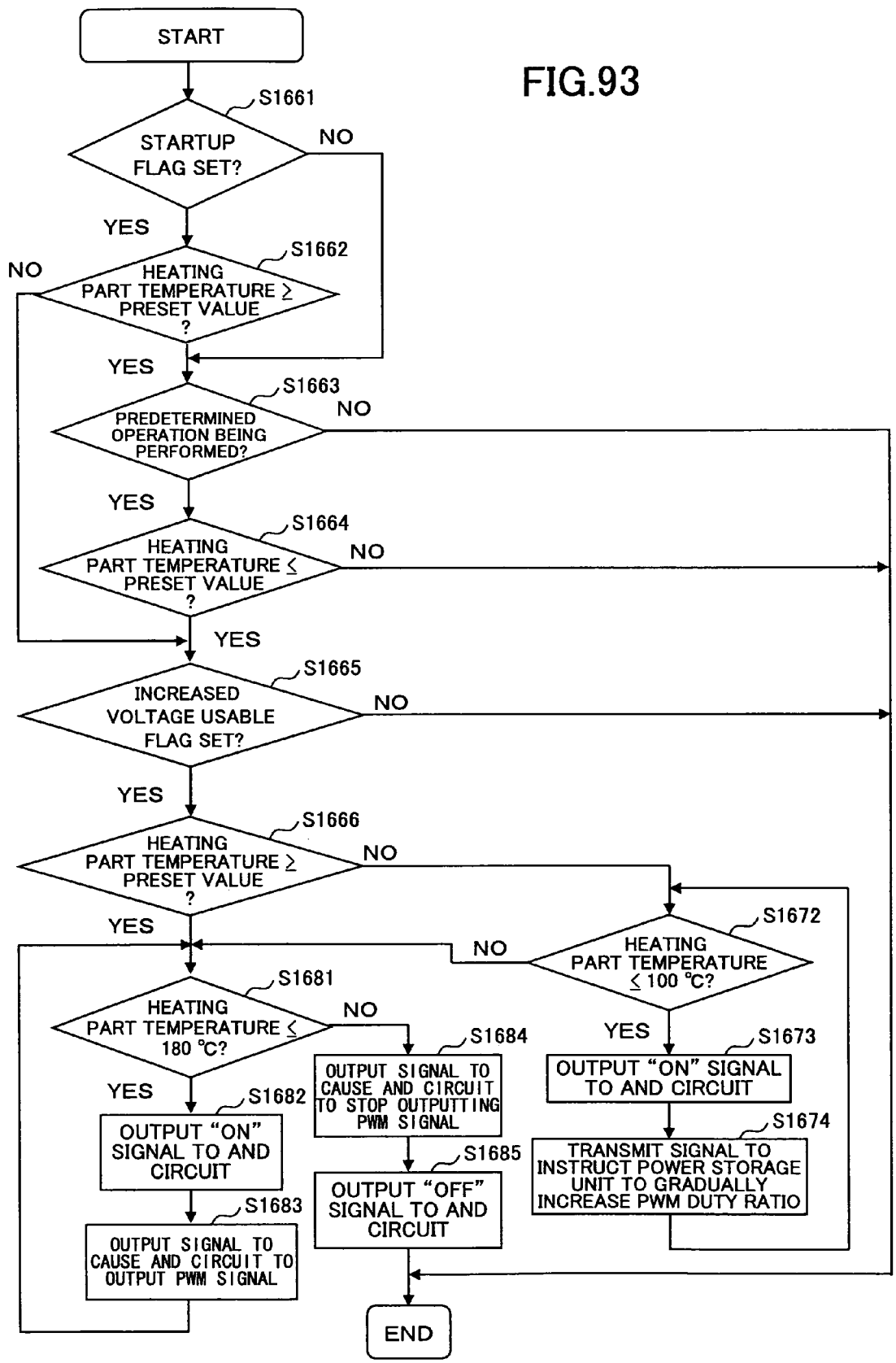
FIG. 93 is a flowchart of the external apparatus controlling the increased voltage by turning ON and OFF a PWM signal output from the power storage unit in accordance with the temperature of the heating part according to the 13th embodiment of the present invention.

FIG. 93 is a variation of the flowchart of FIG. 92. FIG. 93 shows a flowchart of the external apparatus controlling the increased voltage by turning ON and OFF the PWM signal output from the power storage unit in accordance with the temperature of the heating part. In FIG. 93, the power storage unit outputs a PWM signal of a constant duty ratio. Since steps S1661 through S1666 and steps S1672 through S1674 of FIG. 93 are equal to those of FIG. 92, a description thereof is omitted.

First, in step S1681, the external apparatus determines whether the temperature of the heating part is lower than or equal to a preset temperature (for example, 180° C.). If the temperature of the heating part is lower than or equal to the preset temperature (YES in step S1681), in step S1682, the external apparatus outputs a signal to turn ON the FET 47.

Next, in step S1683, the external apparatus outputs an "ON" signal to the AND circuit 46 in order to cause a PMW signal to be output to the FET 30a of the switching circuit 30.

In step S1681, the external apparatus again determines whether the temperature of the heating part is lower than or equal to the preset temperature. If the temperature of the heating part is lower than or equal to the preset temperature (YES in step S1681), the external apparatus repeats the operation of step S1681.

If the temperature of the heating part is not lower than or equal to the preset temperature (NO in step S1681), there is no need to supply power form the boost part 80 to the output terminals 52a and 52b. Accordingly, in step S1684, the external apparatus outputs to the AND circuit 46 a signal to stop outputting of the PWM signal, and in step S1685, outputs a signal to turn OFF the FET 47.

Figure 94:
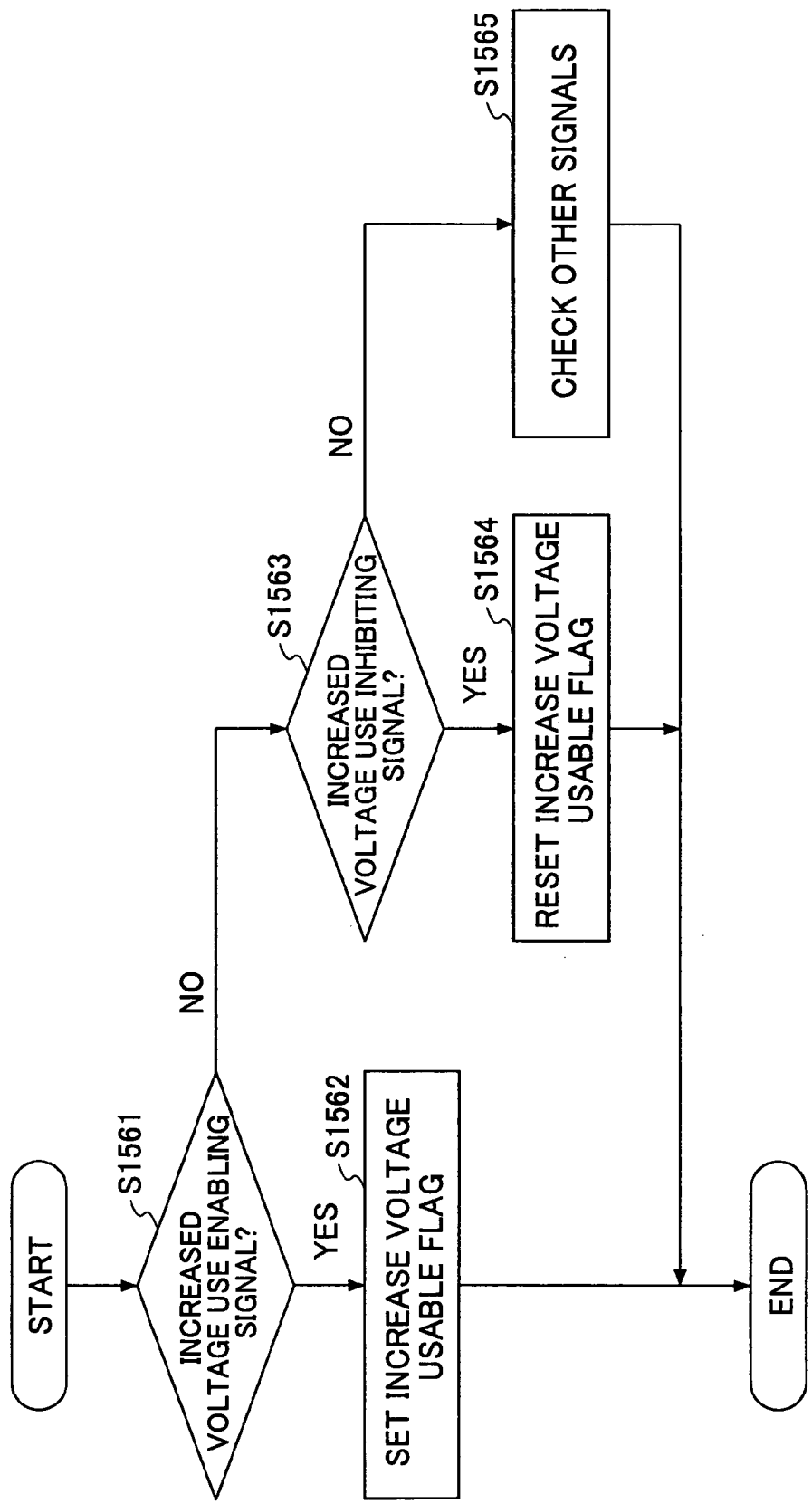
FIG. 94 is a flowchart of the control operation where the external apparatus checks a signal transmitted from the power storage unit according to the 13th embodiment of the present invention.

The external apparatus determines whether the power having its voltage increased by the power storage unit is usable based on the increased voltage use enabling signal. FIG. 94 is a flowchart of the control operation where the external apparatus checks a signal transmitted from the power storage unit. Since the contents of the control of FIG. 94 are the same as those of FIG. 78, a description thereof is omitted.

Figure 95:
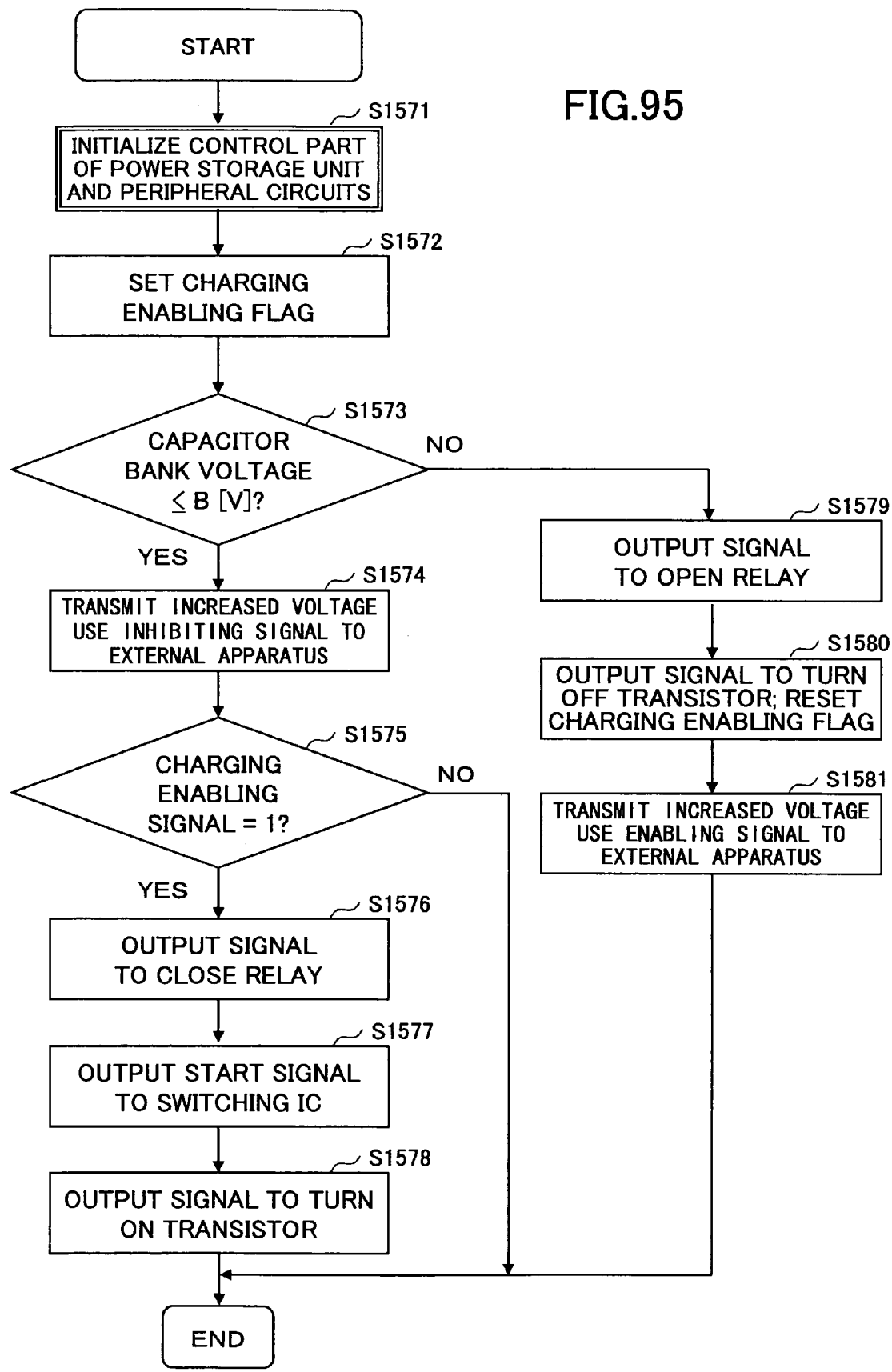
FIG. 95 is a flowchart of the operation where the power storage unit controls charging in accordance with charge voltage according to the 13$^{th}$ embodiment of the present invention.

Next, a description is given of controlling charging of the capacitor bank 9. FIG. 95 is a flowchart of the operation where the power storage unit controls charging in accordance with the charge voltage. Since the contents of the control of FIG. 95 are the same as those of FIG. 79, a description thereof is omitted. By the control of FIG. 95, it is possible to charge the capacitor bank 9 in accordance with the operation of the external apparatus and the charge voltage.

Figure 96:
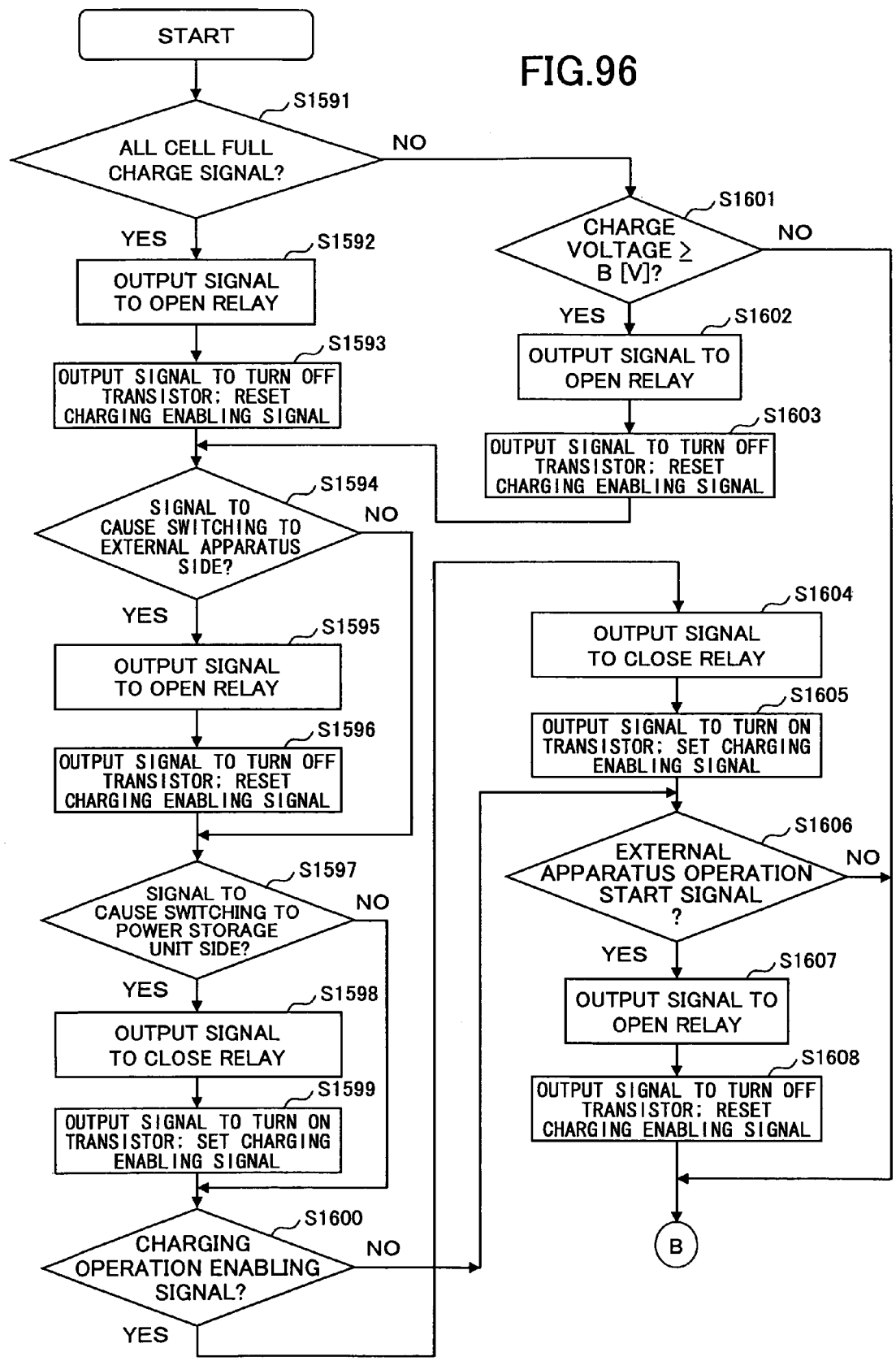
FIG. 96 is a flowchart showing checking of a signal transmitted from the external apparatus and controlling of the make-and-break circuit according to the 13$^{th}$ embodiment of the present invention.
Figure 97:
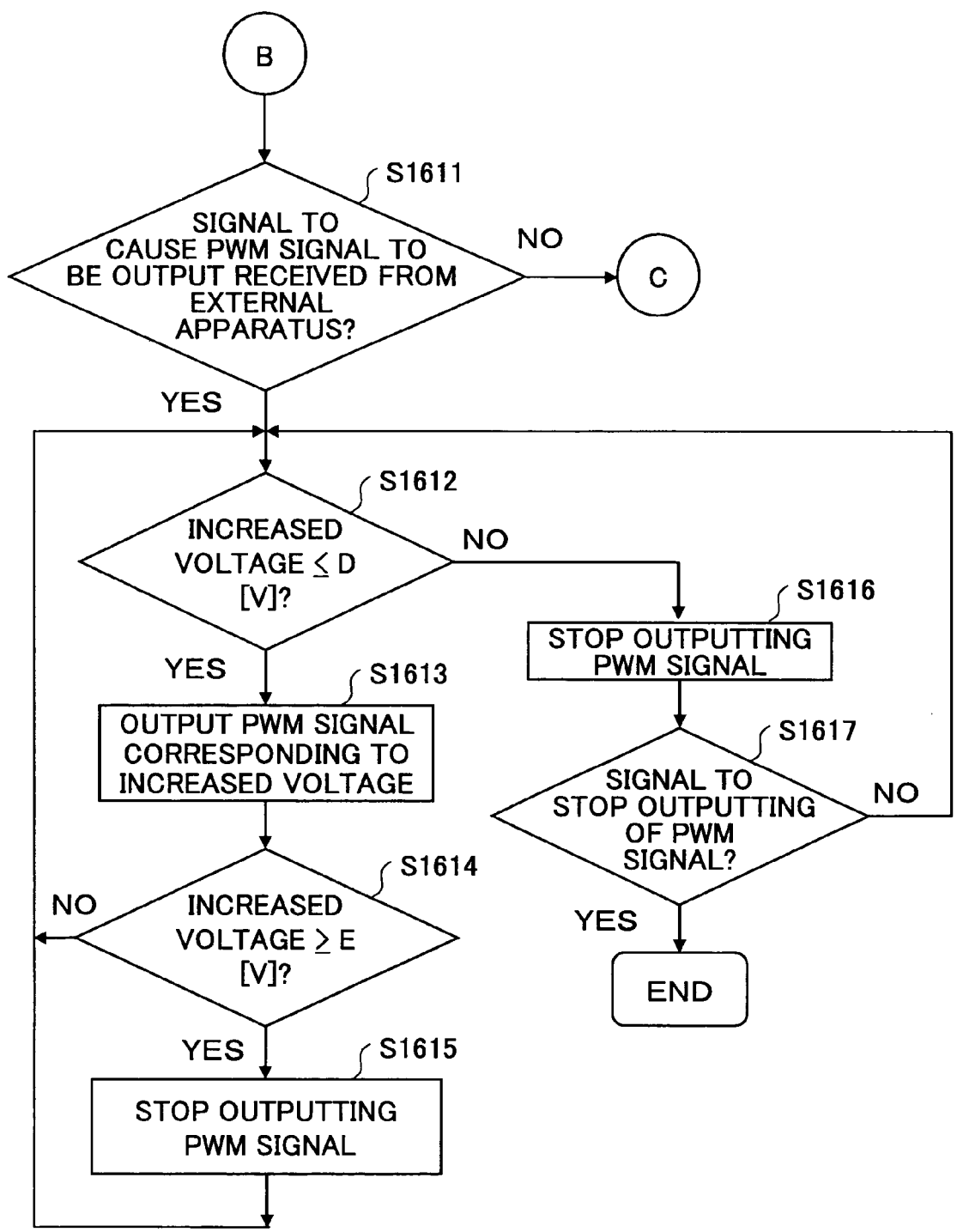
FIG. 97 is a flowchart showing the checking of a signal transmitted from the external apparatus and the controlling of the make-and-break circuit according to the 13$^{th}$ embodiment of the present invention.

FIGS. 96 and 97 show a flowchart of checking a signal transmitted from the external apparatus and controlling the make-and-break circuit 26. Since the operation of FIGS. 96 and 97 is the same as that of FIGS. 80 and 81, a description thereof is omitted. By the control of FIGS. 96 and 97, it is possible to open and close the make-and-break circuit 26 in accordance with the operation of the external apparatus and the charge voltage.

Figure 98:
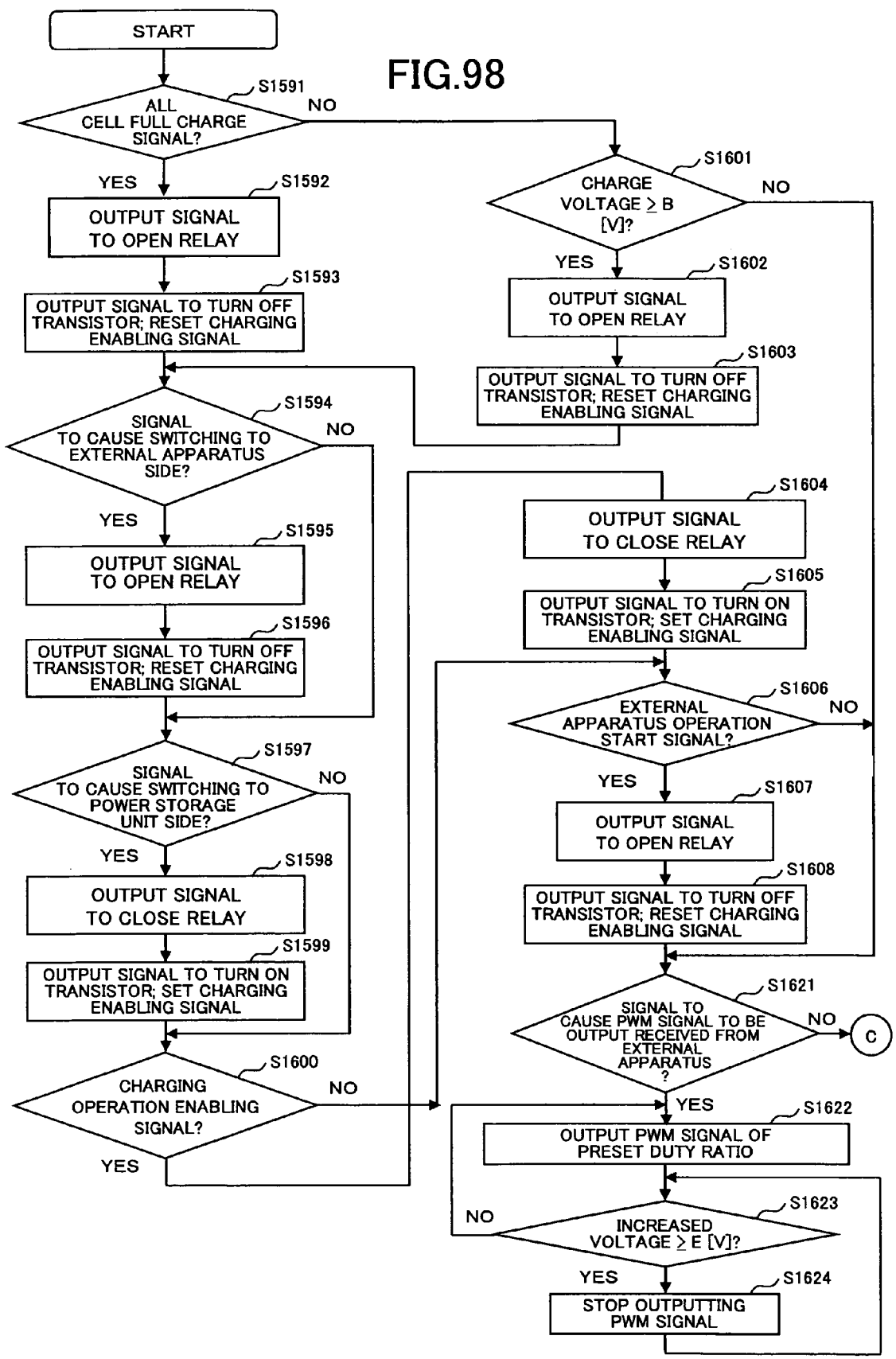
FIG. 98 is a flowchart of the control operation of outputting a PWM signal whose duty ratio is constant according to the 13$^{th}$ embodiment of the present invention.

In FIGS. 96 and 97, a description is given of the flow of controlling the increased voltage to a constant voltage of D [V]. Next, a description is given, with reference to the flowchart of FIG. 98, of the control operation of outputting a PWM signal whose duty ratio is constant. Since the operation of FIG. 98 is the same as that of FIG. 82, a description thereof is omitted.

Figure 99:
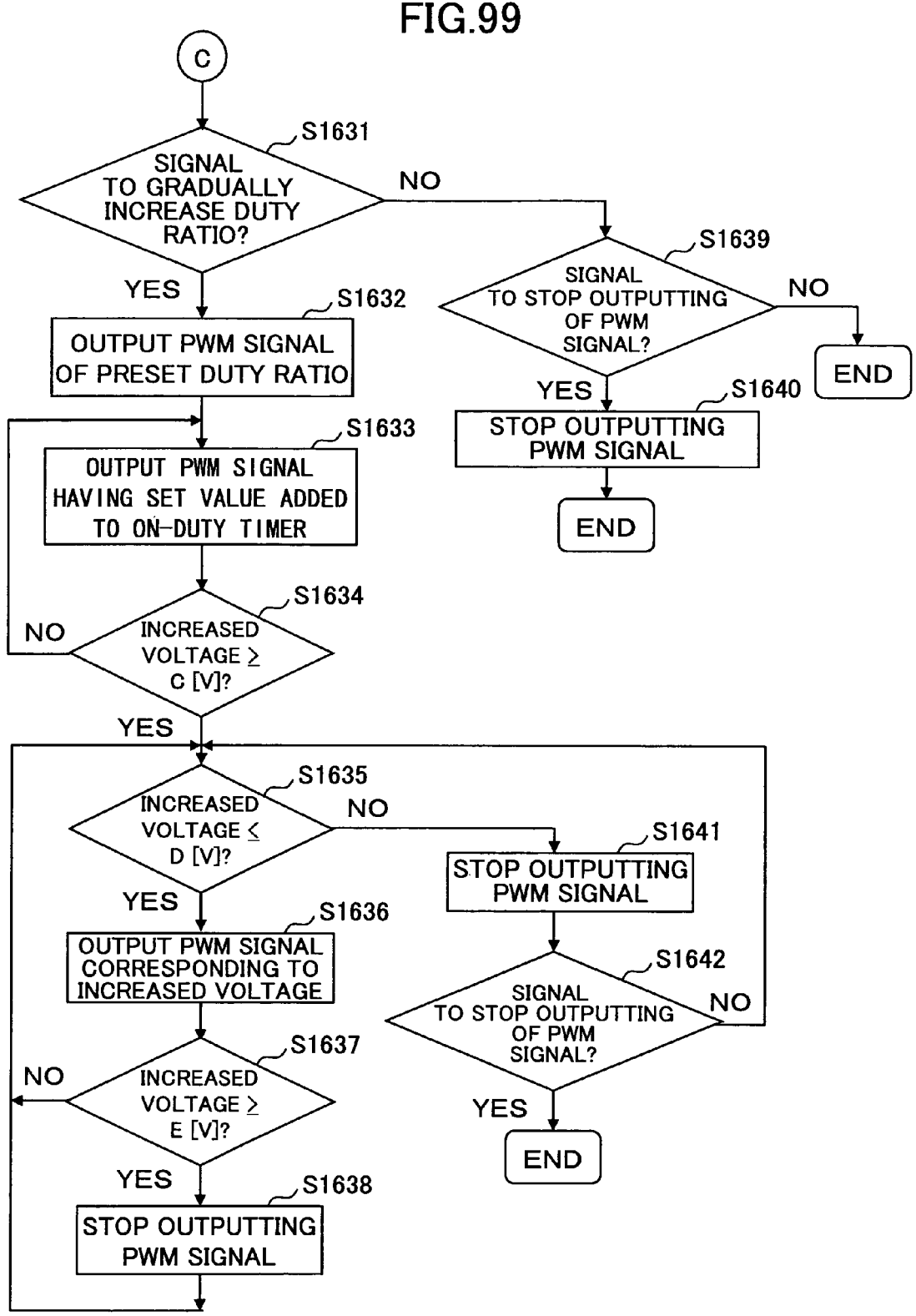
FIG. 99 is a flowchart of the control operation of reducing inrush current in the case of supplying power to the heating part of the external apparatus according to the 13$^{th}$ embodiment of the present invention.

FIG. 99 is a flowchart of the control operation of reducing inrush current in the case of supplying power to the heating part of the external apparatus. By the operation of FIG. 99, it is possible to prevent inrush current even if the temperature of the heating part of the external apparatus is extremely low. Since the operation of FIG. 99 is the same as that of FIG. 83, a description thereof is omitted.

Figure 100:
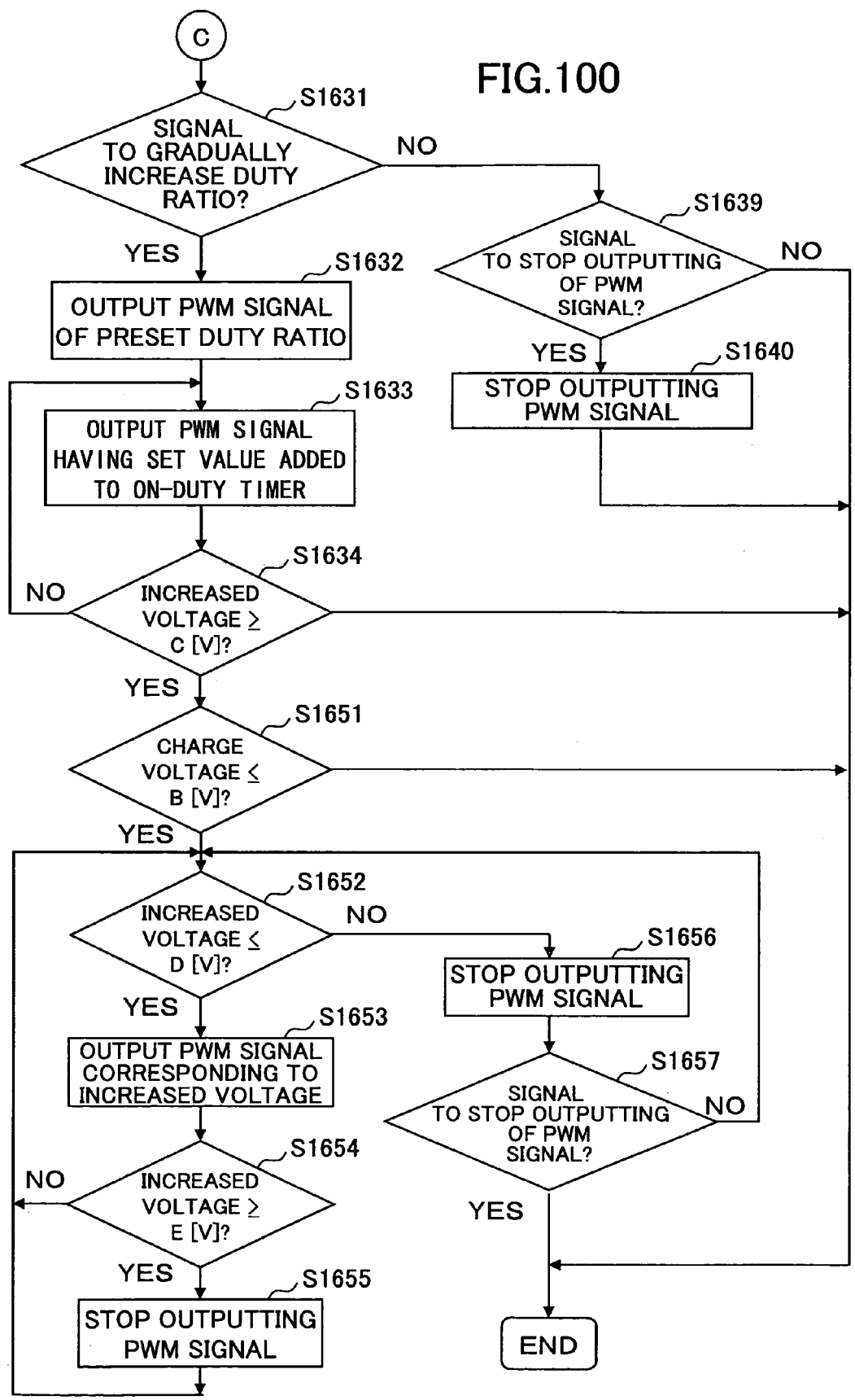
FIG. 100 is a flowchart of the control operation where a boost operation is performed after checking the charge voltage before increasing voltage according to the 13$^{th}$ embodiment of the present invention.

FIG. 100 is a flowchart of the control operation where a boost operation is performed after checking the charge voltage before increasing voltage. The charge voltage may be thus checked before a boost operation. Since the operation of FIG. 100 is the same as that of FIG. 99, a description thereof is omitted.

The increased voltage detection circuit 50 may be omitted the same as in the 12th embodiment. If the increased voltage detection circuit 50 is not provided, the power storage unit may perform boost control in accordance with the temperature of the heating part of the external apparatus or in accordance with a control signal fed from the external apparatus.

As described above, according to the power storage unit of this embodiment, a charge voltage can be increased and then be supplied to the external apparatus using the output of the power supply generation circuit 12 as power supply for the external apparatus when the external apparatus requires power and using the power supply generation circuit 12 as a charger at the time of a charging operation. By providing the power storage unit in an image forming apparatus, it is possible to provide an image forming apparatus offering a short waiting period and having a charging function that is less likely to degrade.

Further, when it is necessary to charge the capacitor bank 9 after increasing voltage to substantially the same level as the operating voltage of the main body load 20 and supply power to the DC fixing heater 22, the voltage is increased by the boost part 80. Accordingly, compared with the case of charging the capacitor bank 9 after increasing voltage to the level of voltage to be supplied to the DC fixing heater 22, it is possible to reduce the size of the capacitor bank 9 and to reduce time for charging the capacitor bank 9. Further, even if the temperature of the heating part is extremely lower than a preset temperature, it is possible to prevent inrush current by gradually increasing the duty ratio of the PWM signal.

Accordingly, it is possible to reduce apparatus cost and size with the image forming apparatus of the ninth through 11th embodiments and the power storage units of the 12th and 13th embodiments.

Thus, according to one embodiment of the present invention, there is provided an image forming apparatus including a power storage unit that includes a constant voltage generation part (for example, the DC/DC converter 12) configured to generate a constant voltage from a commercial power supply, the constant voltage generation part being connected to an external apparatus operating by consuming power; a voltage increasing circuit (for example, the high-frequency transformer 3 or the choke coil 5) configured to increase the constant voltage generated by the constant voltage generation part; a capacitor (the capacitor bank 9) configured to store an electric charge supplied from the voltage increasing circuit; a circuit control part (for example, the constant current/constant power charge voltage generation circuit 7) configured to control charging of the capacitor; and an output part (for example, the output terminals 152a and 152b) configured to output power stored in the capacitor, the power having a voltage different from the constant voltage.

According to one aspect of the present invention, it is possible to provide an image forming apparatus that can be reduced in cost and size. The external apparatus is, for example, a load of the image forming apparatus. Therefore, image formation is performed with a commercial power supply, and if an image forming operation is not being performed, it is possible to charge a power storage unit. Accordingly, there is no need to provide a charger as a single unit, so that it is possible to reduce cost and size. Since the capacitor can be charged at much higher speed than, for example, a lithium battery, the image forming operation is prevented from being delayed. Further, since there is provided an output part to output the voltage of a constant voltage generation part that is different from the voltage stored in the capacitor, it is possible to supply power to loads having different operating voltages.

Additionally, the power storage unit may include a first opening and closing circuit (for example, the make-and-break circuit 26) configured to open and close the connection between the constant voltage generation part and the external apparatus, wherein the first opening and closing circuit may be opened and closed based on a signal fed from the control part of the external apparatus.

According to this feature, it is possible to control the connection between the constant voltage generation part and the external apparatus in accordance with the operating state of the image forming apparatus. The operating state of the image forming apparatus is, for example, a state where the image forming apparatus is consuming power by performing an image forming operation.

Additionally, the power storage unit may include a second opening and closing circuit (for example, the make-and-break circuit 400) configured to open and close the connection between the constant voltage generation part and the voltage increasing circuit, wherein the second opening and closing circuit may be opened and closed based on a signal fed from the control part of the image forming apparatus.

According to this feature, it is possible to control the connection between the constant voltage generation part and the voltage increasing circuit in accordance with the operating state of the image forming apparatus.

Additionally, the power storage unit may include a switching circuit (for example, the switching circuit 77) configured to switch the connection destination of the constant voltage generation part from the external apparatus to the voltage increasing circuit, wherein the switching circuit may perform the switching to the voltage increasing circuit based on a signal fed from the control part of the image forming apparatus.

According to this feature, it is possible to control the connection between the constant voltage generation part and the voltage increasing circuit or the external apparatus in accordance with the operating state of the image forming apparatus.

According to another embodiment of the present invention, there is provided a power storage unit including: a rectification circuit configured to rectify a current supplied from a commercial power supply; a voltage decreasing circuit (for example, the choke coil 5) configured to decrease a voltage rectified by the rectification circuit; a capacitor configured to store an electric charge supplied from the voltage decreasing circuit; a circuit control part configured to control charging of the capacitor; an output part configured to output power of the capacitor to an external apparatus; and a constant voltage generation part configured to generate a constant voltage from the commercial power supply in order to supply the constant voltage to the external apparatus, the constant voltage being different from the voltage of the capacitor.

Additionally, in the power storage unit, the commercial power supply and the rectification circuit may be isolated by an isolation transformer.

According to this feature, since the commercial power supply and the rectification circuit are isolated, it is easy to increase the charge voltage of the capacitor.

Additionally, each of the above-described power storage units may include a charge voltage detection circuit configured to detect the charge voltage of the capacitor; and a charging current detection circuit configured to detect the charging current of the capacitor, wherein the circuit control part may control one of the voltage increasing circuit and the voltage decreasing circuit so that one of constant current charging and constant power charging is performed on the capacitor, based on one of the charge voltage detected by the charge voltage detection circuit and the charging current detected by the charging current detection circuit.

According to this feature, it is possible to perform constant current charging or constant power charging in accordance with the charge voltage or the charging current of the capacitor, and it is also possible to perform charging in an optimized period of time so that a charging time can be reduced. Further, by using constant power charging together, the charging can be performed with efficiency.

Additionally, each of the above-described power storage units may include a cell full charge detection circuit configured to detect the full charge of each of individual capacitor cells forming the capacitor; and an all cell full charge detection circuit configured to detect the full charge of the capacitor, wherein the circuit control part may perform the constant current charging if the cell full charge detection circuit detects the full charge of at least one of the capacitor cells; and the circuit control part may stop charging if the all cell full charge detection circuit detects the full charge of the capacitor.

According to this feature, constant current charging can be performed when one of the capacitor cells is charged, and the charging can be stopped when all the capacitor cells are charged.

Additionally, each of the above-described power storage units may include a communications part configured to perform communications with the control part of the image forming apparatus, wherein the circuit control part may charge the capacitor on receiving a charging enabling signal indicating that it is possible to charge the capacitor.

According to this feature, the circuit control part charges the capacitor based on a charging enabling signal issued by the control part of the image forming apparatus. Accordingly, it is possible to prevent the circuit control part from charging the capacitor while the image forming apparatus is in operation.

Additionally, in each of the above-described power storage units, the control part of the image forming apparatus may open and close the first opening and closing circuit, open and close the second opening and closing circuit, or switch the switching circuit based on the charge voltage.

According to this feature, it is possible to switch the opening and closing circuit or the switching circuit so that the connection is made to the voltage increasing circuit when there is a decrease in the charge voltage of the capacitor. Further, if the charge voltage is higher than or equal to a predetermined voltage, it is possible to perform an image forming operation by switching the opening and closing circuit or the switching circuit so that the connection is made to the external apparatus.

According to another embodiment of the present invention, there is provided an image forming apparatus including a power storage unit that includes a power supply generation circuit configured to generate power supply of one of a constant current, constant power, and a constant voltage from a commercial power supply, the power supply generation circuit being connected to an external apparatus that operates by consuming power; a capacitor configured to store an electric charge supplied from the power supply generation circuit; a circuit control part configured to control charging of the capacitor; a voltage increasing part configured to increase a voltage supplied from the capacitor; and an output part configured to output power having a voltage thereof increased by the voltage increasing part to the external apparatus.

According to one aspect of the present invention, the output of a power supply generation circuit can be used as a power supply of an external apparatus when required by the external apparatus, and the power supply generation part can be used as a charger in the case of charging a capacitor. As a result, it is possible to charge the capacitor without the need for a dedicated charger. Accordingly, it is possible to reduce the cost and the size of a power storage unit.

The present invention is not limited to the specifically disclosed embodiments, and variations and modifications may be made without departing from the scope of the present invention.

The present application is based on Japanese Priority Patent Applications No. 2005-264412, filed on Sep. 12, 2005, No. 2005-264413, filed on Sep. 12, 2005, and No. 2006-184778, filed on Jul. 4, 2006, the entire contents of which are hereby incorporated by reference.

What is claimed is:

1. An image forming apparatus, comprising:
a radiating load that operates, by radiating, by consuming power at a first voltage;
a power storage unit including a power supply generation circuit to provide a power supply of one of a constant current, constant power, and a constant voltage from a commercial power supply to a main body load;
a capacitor bank including a plurality of capacitors, the capacitor bank storing an electric charge supplied from the power supply generation circuit;
a circuit control part to control charging of the capacitor bank;
a voltage changing part to change a voltage supplied from the capacitor bank; and
an output part to output power having a voltage thereof changed by the voltage changing part to the radiating load, such that the radiating load operates by consuming power at the first voltage, wherein
the power storage unit further comprises a charge voltage detection circuit to detect a charge voltage of the capacitor bank,
the capacitor bank includes two ends and each of the two ends is connected to the charge voltage detection circuit,
the image forming apparatus further comprises the main body load, which is connected in parallel to the capacitor bank by a switch that, when closed, causes the capacitor bank to charge by the power supply generation circuit, and
the circuit control part controls charging of the capacitor bank by closing and opening the switch based on an amount of radiating of the radiating load.

2. The image forming apparatus as claimed in claim 1, wherein the power storage unit further comprises one of:
an opening and closing circuit to open and close a connection between the power supply generation circuit and the capacitor bank, the opening and closing circuit connecting the power supply generation circuit to the radiating load when the opening and closing circuit is open and to the capacitor bank when the opening and closing circuit is closed; and
a switching circuit to switch a connection destination of the power supply generation circuit from the radiating load to the capacitor bank.

3. The image forming apparatus as claimed in claim 2, wherein if the opening and closing circuit is opened or the switching circuit is caused to switch to the radiating load, the circuit control part performs control so that the power supply generation circuit outputs a predetermined constant voltage.

4. The image forming apparatus as claimed in claim 2, wherein:
the power supply generation circuit performs one of constant current charging and constant power charging on the capacitor bank when the opening and closing circuit is closed or the switching circuit is caused to switch to a side of the capacitor bank; and
an output of the power supply generation circuit is caused to be a constant voltage when the opening and closing circuit is opened or the switching circuit is caused to switch to a side of the image forming apparatus.

5. The image forming apparatus as claimed in claim 1, wherein:
the power storage unit further comprises a communications part to perform communications with a control part of the image forming apparatus; and
the circuit control part charges the capacitor bank on receiving a charging enabling signal indicating that it is possible to charge the capacitor bank.

6. The image forming apparatus as claimed in claim 5, wherein:
the voltage changing part includes one of a boost chopper circuit and an isolation transformer connected to the capacitor bank; and
the circuit control part outputs a pulse signal with a predetermined duty ratio, the pulse signal switching the one of the boost chopper circuit and the isolation transformer.

7. The image forming apparatus as claimed in claim 6, wherein:
the voltage changing part includes a changed voltage detection circuit to detect the changed voltage; and
the pulse signal is controlled so that the duty ratio thereof gradually changes, based on the changed voltage detected by the changed voltage detection circuit.

8. The image forming apparatus as claimed in claim 6, wherein:
the circuit control part includes a storage part to store duty control information transmitted from the control part of the image forming apparatus, the duty control information controlling the duty ratio of the pulse signal; and
the circuit control part controls the duty ratio of the pulse signal based on the duty control information.

9. The image forming apparatus as claimed in claim 6, wherein the circuit control part controls the duty ratio of the pulse signal without causing the changed voltage detected by the changed voltage detection circuit to exceed a preset predetermined limit voltage.

10. The image forming apparatus as claimed in claim 5, wherein:
the voltage changing part includes one of a boost chopper circuit and an isolation transformer connected to the capacitor bank; and
the one of the boost chopper circuit and the isolation transformer is switched by a pulse signal having a predetermined duty ratio based on a signal transmitted from the control part of the image forming apparatus.

11. The image forming apparatus as claimed in claim 10, wherein:
the voltage changing part includes an changed voltage detection circuit to detect the changed voltage; and
the pulse signal is controlled so that the duty ratio thereof gradually changes, based on the changed voltage detected by the changed voltage detection circuit.

12. The image forming apparatus as claimed in claim 5, wherein:
the voltage changing part includes one of a boost chopper circuit and an isolation transformer connected to the capacitor bank;
the circuit control part outputs a pulse signal to the voltage changing part through an AND circuit, the pulse signal switching the one of the boost chopper circuit and the isolation transformer; and
ON/OFF control is performed on the AND circuit based on a signal fed from the control part of the image forming apparatus.

13. The image forming apparatus as claimed in claim 12, wherein:
the voltage changing part includes an changed voltage detection circuit to detect the changed voltage; and
the pulse signal is controlled so that the duty ratio thereof gradually changes, based on the changed voltage detected by the changed voltage detection circuit.

14. The image forming apparatus as claimed in claim 1, wherein the circuit control part increases the voltage supplied from the capacitor bank when the charge voltage of the capacitor bank detected by the charge voltage detection circuit is higher than or equal to a predetermined value.

15. The image forming apparatus as claimed in claim 1, wherein the circuit control part starts to increase the voltage on receiving, from a control part of the image forming apparatus, a signal to instruct a voltage increasing operation to be started, and ends the increasing of the voltage on receiving a signal to instruct the voltage increasing operation to be ended.

16. The image forming apparatus as claimed in claim 1, wherein when a temperature of a heating part controlled by a control part of the image forming apparatus is lower than or equal to a predetermined value, power of the capacitor bank is supplied to the heating part based on a signal fed from a control part of the radiating load.

17. The image forming apparatus as claimed in claim 1, wherein:
the voltage changing part is to increase the voltage supplied from the capacitor bank; and
the output part is to output power having a voltage thereof increased by the voltage changing part to the radiating load, such that the radiating load operates by consuming power at the first voltage.

18. The image forming apparatus as claimed in claim 1, wherein the radiating load is a heater.

19. The image forming apparatus as claimed in claim 1, further comprising:
an operating condition detection circuit to detect an amount of radiating of the radiating load, wherein
the circuit control part controls charging of the capacitor bank by closing and opening the switch based on the amount of radiating of the radiating load detected by the operating condition detection circuit.

20. The image forming apparatus as claimed in claim 19, wherein the radiating load is a heater, and the operating condition detection circuit is a temperature detection circuit.

21. The image forming apparatus as claimed in claim 19, wherein the main body load includes one or more of a clutch, a solenoid, a motor, and a sensor to perform an image forming operation.

22. The image forming apparatus as claimed in claim 19, wherein the main body load and radiating load operate at different voltages.

23. An image forming apparatus, comprising:
a radiating load that operates, by radiating, by consuming power at a first voltage;
a power storage unit including a power supply generation circuit to provide a power supply of one of a constant current, constant power, and a constant voltage from a commercial power supply to a main body load;
a capacitor bank including a plurality of capacitors, the capacitor bank storing an electric charge supplied from the power supply generation circuit;
a circuit control part to control charging of the capacitor bank;
a voltage changing part to change a voltage supplied from the capacitor bank; and
an output part to output power having a voltage thereof changed by the voltage changing part to the radiating load, such that the radiating load operates by consuming power at the first voltage, wherein:
the power storage unit further comprises a charge voltage detection circuit to detect a charge voltage of the capacitor bank;
the capacitor bank includes two ends and each of the two ends is connected to the charge voltage detection circuit;
the voltage changing part to change the voltage supplied from the capacitor bank includes a primary coil, a secondary coil, and a transistor in series with one of the primary and secondary coils that switches on and off to change the voltage supplied from the capacitor bank by changing a conduction period;
the output part includes a rectification and smoothing circuit to rectify and smooth an output of the voltage changing part that is output to the radiating load; and
the primary and secondary coils separate the radiating load from the main body load.

24. An image forming apparatus, comprising:
a radiating load that operates, by radiating, by consuming power at a first voltage;
a power supply generation circuit to provide a power supply of one of a constant current, constant power, and a constant voltage from a commercial power supply to a main body load;
a capacitor bank including a plurality of capacitors, the capacitor bank storing an electric charge supplied from the power supply generation circuit;
a control circuit to control charging of the capacitor bank;
a voltage changing part to change a voltage supplied from the capacitor bank;
an output circuit to output power having a voltage thereof changed by the voltage changing part to the radiating load, such that the radiating load operates by consuming power at the first voltage; and
a charge voltage detection circuit to detect a charge voltage of the capacitor bank, wherein
the capacitor bank includes two ends and each of the two ends is connected to the charge voltage detection circuit,
the main body load is to be connected in parallel to the capacitor bank by a switch that, when closed, causes the capacitor bank to charge by the power supply generation circuit, and
the control circuit is to control charging of the capacitor bank by closing and opening the switch based on an amount of radiating of the radiating load.

* * * * *

UNITED STATES PATENT AND TRADEMARK OFFICE
CERTIFICATE OF CORRECTION

| | |
|---|---|
| PATENT NO. | : 8,736,861 B2 |
| APPLICATION NO. | : 11/518943 |
| DATED | : May 27, 2014 |
| INVENTOR(S) | : Naoki Sato et al. |

Page 1 of 1

It is certified that error appears in the above-identified patent and that said Letters Patent is hereby corrected as shown below:

On the title page, Item (73), the Assignee's Information is incorrect. Item (73) should read:

--(73)  Ricoh Company, Ltd., Tokyo (JP)--

Signed and Sealed this
Thirtieth Day of September, 2014

Michelle K. Lee
*Deputy Director of the United States Patent and Trademark Office*